US012777110B2

(12) United States Patent
Durning et al.

(10) Patent No.: US 12,777,110 B2
(45) Date of Patent: Oct. 27, 2026

(54) HANDHELD ELECTRONIC DEVICE

(71) Applicant: Apple Inc., Cupertino, CA (US)

(72) Inventors: Christopher J. Durning, Halifax (CA); Michael W. Firka, Santa Clara, CA (US); Dana Frankel, Cupertino, CA (US); Lee E. Hooton, Massapequa, NY (US); James L. Johnston, Cupertino, CA (US); Benjamin J. Kallman, Emerald Hills, CA (US); Justin Memar-Makhsous, Cupertino, CA (US); Arian Monavvari, Cupertino, CA (US); Benjamin J. Pope, Woodside, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 18/827,605

(22) Filed: Sep. 6, 2024

(65) Prior Publication Data

US 2025/0240362 A1 Jul. 24, 2025

Related U.S. Application Data

(60) Provisional application No. 63/685,221, filed on Aug. 20, 2024, provisional application No. 63/623,200, filed on Jan. 19, 2024.

(51) Int. Cl.
*H04M 1/02* (2006.01)

(52) U.S. Cl.
CPC ....... *H04M 1/0266* (2013.01); *H04M 1/0283* (2013.01)

(58) Field of Classification Search
CPC .......................... H04M 1/0266; H04M 1/0283
See application file for complete search history.

(56) References Cited

U.S. PATENT DOCUMENTS

| | | | | |
|---|---|---|---|---|
| 11,119,544 | B1 * | 9/2021 | Perez | H05K 7/20154 |
| 2012/0044635 | A1 | 2/2012 | Rothkopf et al. | |
| 2012/0293375 | A1 | 11/2012 | Chirila et al. | |
| 2015/0189049 | A1 * | 7/2015 | Liu | H01Q 13/10 343/702 |

(Continued)

FOREIGN PATENT DOCUMENTS

| | | |
|---|---|---|
| EP | 3754952 | 12/2020 |
| KR | 20190098607 | 8/2019 |

(Continued)

*Primary Examiner* — Raymond S Dean
(74) *Attorney, Agent, or Firm* — Brownstein Hyatt Farber Schreck, LLP

(57) ABSTRACT

A mobile phone may include a housing including a wall segment, the wall segment defining a through-hole extending therethrough, the wall segment including a cladding portion formed from a first metal. The cladding portion may define a portion of a side exterior surface of the mobile phone, and a first portion of the through-hole. The wall segment may further include a core portion coupled to the cladding portion and formed from a second metal different from the first metal, the core portion defining a counterbore hole extending through the core portion and aligned with the through-hole, and a lining structure formed of the first metal and positioned in the counterbore hole in the core portion and fused to the cladding portion at a fusion region, the lining structure defining a second portion of the through-hole.

20 Claims, 59 Drawing Sheets

(56) References Cited

U.S. PATENT DOCUMENTS

| | | | | |
|---|---|---|---|---|
| 2015/0192958 | A1 | 7/2015 | Sprenger et al. | |
| 2016/0072209 | A1* | 3/2016 | Triplett | H01R 12/7076 439/587 |
| 2017/0244171 | A1 | 8/2017 | Lee | |
| 2017/0290207 | A1 | 10/2017 | Smith et al. | |
| 2017/0347470 | A1 | 11/2017 | Seo et al. | |
| 2018/0017995 | A1 | 1/2018 | Gable et al. | |
| 2018/0210513 | A1 | 7/2018 | Lin et al. | |
| 2019/0020102 | A1 | 1/2019 | Jarvis et al. | |
| 2019/0082555 | A1 | 3/2019 | Hooton et al. | |
| 2019/0261527 | A1* | 8/2019 | Myers | G06F 1/1656 |
| 2020/0081488 | A1 | 3/2020 | Baker et al. | |
| 2020/0221002 | A1* | 7/2020 | Akana | H04N 23/57 |
| 2020/0245487 | A1 | 7/2020 | Counts et al. | |
| 2021/0004058 | A1 | 1/2021 | Lim et al. | |
| 2021/0167487 | A1* | 6/2021 | Varma | H01Q 1/243 |
| 2021/0168231 | A1* | 6/2021 | Baker | H05K 1/189 |
| 2022/0311851 | A1 | 9/2022 | Kim et al. | |
| 2022/0329678 | A1 | 10/2022 | Zhang et al. | |
| 2022/0418135 | A1 | 12/2022 | Lee et al. | |
| 2023/0104743 | A1 | 4/2023 | Cheung et al. | |
| 2024/0012453 | A1 | 1/2024 | Gwak et al. | |

FOREIGN PATENT DOCUMENTS

| | | |
|---|---|---|
| KR | 20200094950 | 8/2020 |
| WO | WO2016112544 | 7/2016 |

* cited by examiner

HANDHELD ELECTRONIC DEVICE

CROSS-REFERENCE TO RELATED APPLICATION(S)

This application is a nonprovisional patent application of U.S. Provisional Patent Application No. 63/623,200, filed Jan. 19, 2024 and titled "Handheld Electronic Device" and U.S. Provisional Patent Application No. 63/685,221, filed Aug. 20, 2024 and titled "Handheld Electronic Device," the disclosures of which are hereby incorporated herein by reference in their entireties.

FIELD

The subject matter of this disclosure relates generally to handheld electronic devices, and more particularly, to mobile phones.

BACKGROUND

Modern consumer electronic devices take many shapes and forms, and have numerous uses and functions. Smartphones, for example, provide various ways for users to interact with other people that extend beyond telephone communications. Such devices may include numerous systems to facilitate such interactions. For example, a smartphone may include a touch-sensitive display for providing graphical outputs and for accepting touch inputs, wireless communications systems for connecting with other devices to send and receive voice and data content, cameras for capturing photographs and videos, and so forth. However, integrating these subsystems into a compact and reliable product that is able to withstand daily use presents a variety of technical challenges. The systems and techniques described herein may address many of these challenges while providing a device that offers a wide range of functionality.

SUMMARY

An electronic device may include an enclosure including a front cover defining a front of the electronic device, and a housing component coupled to the front cover and defining a side of the electronic device. The electronic device may further include an input structure positioned along the side of the electronic device and configured to receive a force input, the input structure including a button member and a touch-sensing element coupled to the button member. The input structure may further include a beam structure at least partially within the enclosure, the beam structure configured to be deflected as a result of the force input, a strain-sensing element coupled to the beam structure, and a dome switch configured to collapse in response to the force input satisfying a first force threshold. The electronic device may further include a processing system operatively coupled to the touch-sensing element, the strain-sensing element, and the dome switch, and configured to determine a location of the force input on the input structure based at least in part on a first signal from the touch-sensing element, cause the electronic device to perform a first operation in response to detecting, based at least in part on a second signal from the strain-sensing element, that the force input satisfies a second force threshold that is less than the first force threshold, and cause the electronic device to perform a second operation, different from the first operation, in response to detecting the collapse of the dome switch. The touch-sensing element may include a linear array of touch-sensing pixels.

The electronic device may further include a haptic actuation system. The processing system may be configured to cause the haptic actuation system to produce a first haptic output in response to detecting that the force input satisfies the second force threshold, and the dome switch may produce a second haptic output when collapsed in response to the force input satisfying the first force threshold.

The electronic device may further include a camera and a display configured to display graphical user interfaces, and the second operation may further include causing the display to transition to a graphical user interface associated with an image capture function. The processing system may be further configured to capture an image in response to detecting the collapse of the dome switch.

The processing system may be further configured to detect a gesture input applied to the input structure based at least in part on a third signal from the touch-sensing element, and cause the electronic device to perform a third operation, different from the first operation and from the second operation, in response to detecting the gesture input. The third operation may include a zoom operation for an image capture function. The gesture input may be a first gesture input corresponding to a swipe in a first direction, the zoom operation may include a zoom-in operation, and the processing system may be further configured to detect a second gesture input corresponding to a swipe in a second direction opposite the first direction, and perform a zoom-out operation in response to detecting the second gesture input.

A portable electronic device may include a touchscreen display, a battery, an enclosure enclosing the touchscreen display and the battery, the enclosure including a front cover positioned over the touchscreen display and defining a front exterior surface of the enclosure, and a housing component coupled to the front cover and defining an opening along a side exterior surface of the enclosure. The portable electronic device may further include an input button system including a beam structure at least partially within the enclosure and defining a compliant segment, a strain-sensing element coupled to the compliant segment, a switch element coupled to the beam structure, a button member positioned at least partially in the opening and configured to impart a force on the switch element as a result of a force input applied to the button member, and a touch-sensing element coupled to the button member. The portable electronic device may further include a processing system configured to cause the portable electronic device to perform a first operation in response to detecting, based at least in part on a first signal from the strain-sensing element, that the force input satisfies a force threshold, cause the portable electronic device to perform a second operation, different from the first operation, in response to detecting, based at least in part on a second signal from the touch-sensing element, a touch input applied to the input button system, and cause the portable electronic device to perform a third operation, different from the first operation and the second operation, in response to detecting actuation of the switch element. The button member may have an elongate shape defining a longitudinal axis, and the touch-sensing element may include a linear array of touch-sensing pixels arranged along the longitudinal axis.

The button member may define a chassis portion and a hollow post extending into a hole defined through the housing component, and the input button system may further include a flexible circuit element coupled to the touch-sensing element and extending through the hollow post, the flexible circuit element operatively coupling the touch-sensing element to the processing system. The portable electronic device may further include a potting material at least partially filling the hollow post and encapsulating at least a portion of the flexible circuit element.

The touch input may correspond to a swipe gesture along an input surface of the input button system, the swipe gesture having a swipe direction. The second operation may correspond to a zoom operation of an image capture function, and a direction of the zoom operation may correspond to the swipe direction.

The portable electronic device may further include a haptic actuation system, and the processing system may be configured to cause the haptic actuation system to produce a first haptic output in response to detecting that the force input satisfies the force threshold and to cause the haptic actuation system to produce a second haptic output in response to a notification event.

A mobile phone may include a housing component, a front cover coupled to the housing component, a display positioned below the front cover, and an input button system positioned along a side of the housing component. The input button system may be responsive to a first force input satisfying a first force threshold, a second force input satisfying a second force threshold different from the first force threshold, and a touch input. The input button system may include a button member, a touch-sensing element coupled to the button member, a beam structure configured to be deflected by the button member in response to the first force input and the second force input, a strain-sensing element coupled to the beam structure, and a switch element configured to be actuated in response to the second force input satisfying the second force threshold. The mobile phone may further include a processing system operably coupled to the touch-sensing element, the strain-sensing element, and the switch element and configured to cause the mobile phone to perform a first operation in response to detecting the touch input with the touch-sensing element, cause the mobile phone to perform a second operation in response to determining, with the strain-sensing element, that the second force input satisfies the first force threshold, and cause the mobile phone to perform a third operation in response to detecting an actuation of the switch element.

The input button system may further include an actuation structure coupled to the button member, the switch element may be coupled to the beam structure and may be positioned between the beam structure and the actuation structure, and the actuation structure imparts an actuation force on the switch element in response to the second force input.

The beam structure may define a compliant segment, and a support segment separated from the compliant segment by a gap, the switch element may be coupled to the compliant segment, and the strain-sensing element may be coupled to the compliant segment. The button member may define a chassis portion, a first post extending from the chassis portion and through a first hole formed through the housing component, and a second post extending from the chassis portion and through a second hole formed through the housing component, and the input button system may further include a stabilization bar coupled to the first post and to the second post and captured between the support segment of the beam structure and the housing component. The first post may be a hollow post, and the input button system may further include a circuit element conductively coupled to the touch-sensing element and extending through the hollow post, the circuit element operatively coupling the touch-sensing element to the processing system. The input button system may further include a cover coupled to the button member and positioned over the touch-sensing element, and a potting material at least partially encapsulating the touch-sensing element and the circuit element and at least partially filling the hollow post.

A mobile phone may include a display, wireless communication circuitry, a battery, and an enclosure enclosing the display, the wireless communication circuitry, and the battery. The enclosure may include a front cover defining a front exterior surface of the mobile phone, a rear cover defining a rear exterior surface of the mobile phone, a housing segment coupled to the front cover and to the rear cover and including a first wall section defining at least a portion of a first side exterior surface of the mobile phone, a second wall section defining at least a portion of a second side exterior surface opposite to the first side exterior surface, and a chassis section extending between the first wall section and the second wall section. The mobile phone may further include a circuit board assembly thermally coupled to the chassis section at a thermal coupling region of the chassis section, the chassis section defining a thermal path extending from the thermal coupling region to the first wall section, and a through-hole positioned in the thermal path and configured to interrupt a flow of heat from the circuit board assembly to the first wall section. The through-hole may define an elongate opening extending along a longitudinal axis, the longitudinal axis parallel to the first side exterior surface of the mobile phone.

The circuit board assembly may include a circuit board and a processor coupled to a first surface of the circuit board, and the mobile phone may further include a thermal bridge thermally coupled to a second surface of the circuit board and positioned below the processor, the second surface opposite the first surface. The thermal bridge may be thermally coupled to the chassis section at the thermal coupling region.

The circuit board assembly may be coupled to a first side of the chassis section and may be positioned between the chassis section and the rear cover, the battery may be thermally coupled to the first side of the chassis section and may be positioned between the chassis section and the rear cover, and the mobile phone may further include a thermal diffusion member coupled to a second side of the chassis section opposite the first side, the thermal diffusion member positioned between the chassis section and the front cover and configured to transfer heat from the display to the chassis section. The thermal diffusion member may include at least one layer of graphite adhered to the second side of the chassis section.

The circuit board assembly may include a first metal cover positioned on an exterior surface of the circuit board assembly and covering a first circuit component, a second metal cover positioned on the exterior surface of the circuit board assembly and covering a second circuit component, a thermal diffusion member coupled to the first metal cover and to the second metal cover and spanning a gap between the first metal cover and the second metal cover, and a thermal bridge coupled to the thermal diffusion member and configured to thermally couple the circuit board assembly to the rear cover.

A portable electronic device may include an enclosure including a front cover assembly defining a front exterior surface of the enclosure, a rear cover assembly defining a rear exterior surface of the enclosure, and a housing segment between the front cover assembly and the rear cover assembly and including a first wall section defining at least a portion of a first side exterior surface of the enclosure, a second wall section defining at least a portion of a second side exterior surface opposite the first side exterior surface, and a chassis section coupled to the first wall section and to the second wall section and defining at least a portion of a first interior cavity between the chassis section and the front cover assembly and at least a portion of a second interior cavity between the chassis section and the rear cover assembly. The portable electronic device may further include a circuit board assembly positioned in the second interior cavity and coupled to the chassis section, a first thermal bridge thermally coupling the circuit board assembly to the rear cover assembly, and a second thermal bridge thermally coupling the circuit board assembly to the chassis section. The chassis section may define a through-hole configured to interrupt a thermal path from the second thermal bridge to the first wall section. The portable electronic device may further include a battery positioned within the second interior cavity and thermally coupled to the chassis section. The through-hole may define an elongate opening extending along a longitudinal axis, the longitudinal axis parallel to the first side exterior surface of the enclosure.

The enclosure may further include a housing component coupled to the housing segment and defining at least a portion of a third side exterior surface of the enclosure, the portable electronic device may further include wireless communications circuitry, and a portion of the housing component may be operatively coupled to the wireless communications circuitry and operate as an antenna radiator. The front cover assembly may include a front cover, a display stack coupled to the front cover, a support frame coupled to the display stack, and a frame member formed from a molded polymer material, the molded polymer material at least partially encapsulating the support frame and defining an upper surface coupled to the front cover, and a lower surface coupled to the housing segment. The housing component may include a rim portion adjacent a side of the front cover assembly, the rim portion defining a first region having a first thickness, and a second region having a second thickness less than the first thickness, and the support frame may define a recessed region positioned opposite the first region of the rim portion. The second region of the rim portion may define at least a portion of the antenna radiator.

An electronic device may include a front cover defining a front exterior surface of the electronic device, a display coupled to an interior surface of the front cover, a rear cover defining a rear exterior surface of the electronic device, and a housing segment. The housing segment may include a chassis section positioned between the front cover and the rear cover, a first wall section positioned along a first side of the chassis section and defining at least a portion of a first side exterior surface of the electronic device, and a second wall section positioned along a second side of the chassis section and defining at least a portion of a second side exterior surface of the electronic device. The electronic device may further include a circuit board assembly thermally coupled to a first side of the chassis section and positioned between the chassis section and the rear cover, a battery thermally coupled to the first side of the chassis section and positioned between the chassis section and the rear cover, and a thermal diffusion member coupled to the second side of the chassis section and positioned between the chassis section and the front cover, the thermal diffusion member configured to transfer heat from the display to the chassis section.

The thermal diffusion member may be configured to spread the heat from the display throughout the thermal diffusion member. The thermal diffusion member may include at least one layer of graphite and extends over at least 80% of the second side of the chassis section.

The circuit board assembly may be thermally coupled to the first side of the chassis section at a thermal coupling region of the chassis section, and the chassis section may define a thermal path extending from the thermal coupling region to the first wall section and a through-hole extending through the chassis section and interrupting the thermal path.

The circuit board assembly may include a first metal cover positioned on an exterior surface of the circuit board assembly and covering a first circuit component, a second metal cover positioned on the exterior surface of the circuit board assembly and covering a second circuit component, and a thermal diffusion member coupled to the first metal cover and to the second metal cover and spanning a gap between the first metal cover and the second metal cover. The circuit board assembly may further include a thermal bridge coupled to the thermal diffusion member and configured to thermally couple the circuit board assembly to the rear cover.

A mobile phone may include a housing, a display at least partially within the housing, a front cover coupled to the housing and positioned over the display, and a rear cover coupled to the housing. The rear cover may define a first portion of a rear exterior surface of the mobile phone, a protrusion defining a raised sensor array region, the raised sensor array region defining a second portion of the rear exterior surface, a first hole defined through the protrusion in the raised sensor array region, a second hole defined through the protrusion in the raised sensor array region, and a third hole defined through the rear cover outside of the raised sensor array region. The mobile phone may further include a first camera lens assembly extending at least partially into the first hole, a second camera lens assembly extending at least partially into the second hole, and a flash module at least partially within the housing and positioned outside the raised sensor array region, the flash module extending at least partially into the third hole.

The rear cover may further define a fourth hole defined through the protrusion in the raised sensor array region, and the mobile phone may further include a microphone module acoustically coupled to the fourth hole. At least a portion of the microphone module may be positioned outside of the raised sensor array region.

The mobile phone may further include a bracket coupled to the rear cover and at least partially defining an acoustic waveguide configured to acoustically couple the microphone module to the fourth hole. The bracket may include a base, and a continuous wall extending from the base, and the continuous wall may be seated against the rear cover to define the acoustic waveguide between the base and the rear cover. The fourth hole may open into the acoustic waveguide at a first end of the acoustic waveguide, the bracket may further include a fifth hole at a second end of the acoustic waveguide opposite the first end, and the fifth hole opens to the microphone module.

The flash module may be coupled to the bracket. The first hole and the second hole may be aligned along a first direction, and the third hole and the fourth hole may be aligned along a second direction perpendicular to the first direction.

The first hole and the second hole may be aligned along a direction parallel to a lateral side of the mobile phone. The third hole may be equidistant from the first hole and from the second hole.

A portable electronic device may include a housing, a front cover coupled to the housing and defining a front exterior surface of the portable electronic device, a display below the front cover, and a rear cover coupled to the housing. The rear cover may define a first portion of a rear exterior surface of the portable electronic device, a protrusion defining a raised sensor array region of the rear cover and a second portion of the rear exterior surface of the portable electronic device, a microphone port defined through the rear cover in the raised sensor array region, a first camera hole defined through the protrusion in the raised sensor array region, and a second camera hole defined through the protrusion in the raised sensor array region. The portable electronic device may further include a camera assembly at least partially within the housing and including a first lens assembly extending at least partially into the first camera hole, and a second lens assembly extending at least partially into the second camera hole, and a microphone module coupled to the rear cover along an interior surface of the rear cover and acoustically coupled to the microphone port, at least a portion of the microphone module positioned outside of the raised sensor array region.

The rear cover may further define a flash hole through the rear cover outside of the raised sensor array region, and the portable electronic device may further include a flash module coupled to the rear cover and extending at least partially into the flash hole.

The camera assembly may include a camera housing, the camera housing defining a recess along a side of the camera housing, and the microphone module may include a cowling that extends at least partially into the recess. The portable electronic device may further include a first camera associated with the first lens assembly, a processing element, and a flexible circuit element operatively coupling the first camera to the processing element and extending along the side of the camera housing, the flexible circuit element defining a notch aligned with the recess along the side of the camera housing, and the cowling extends at least partially into the notch. The portable electronic device may further include a bracket coupled to the rear cover and at least partially defining an acoustic waveguide configured to acoustically couple the microphone module to the microphone port. The bracket may include a wall defining a channel, and the wall seats against the rear cover such that the acoustic waveguide is defined by the channel and the rear cover.

A mobile phone may include an enclosure including a housing defining a top wall, a bottom wall opposite the top wall, a first side wall, and a second side wall opposite the first side wall. The mobile phone may further include a front cover coupled to the housing and defining a front exterior surface of the mobile phone, a battery within the enclosure, a rear-facing camera assembly positioned between the battery and the top wall and including a first lens assembly and a second lens assembly aligned along a first axis parallel to the first side wall, a circuit board assembly including a first segment positioned between the battery and the top wall and a second segment positioned between the battery and the second side wall, a processing element coupled to the circuit board assembly on the first segment between the battery and the top wall, and a haptic actuator positioned between the battery and the second side wall, the haptic actuator including a mass configured to translate along a second axis parallel to the second side wall to produce a haptic output.

The mobile phone may further include a subscriber identity module (SIM) tray assembly coupled to the circuit board assembly on the second segment of the circuit board assembly. The SIM tray assembly may include a SIM tray defining a SIM card cavity, and a longitudinal axis of the SIM card cavity may be parallel to the second side wall.

The mobile phone may further include a first acoustic module between the bottom wall and the battery, and a second acoustic module between the bottom wall and the haptic actuator.

A mobile phone may include a front cover defining a front exterior surface of the mobile phone, a rear cover defining a rear exterior surface of the mobile phone, and a housing positioned between the front cover and the rear cover and including a wall segment, the wall segment defining a through-hole extending therethrough, the wall segment including a cladding portion formed from a first metal. The cladding portion may define a portion of a side exterior surface of the mobile phone, and a first portion of the through-hole. The wall segment may further include a core portion coupled to the cladding portion and formed from a second metal different from the first metal, the core portion defining a counterbore hole extending through the core portion and aligned with the through-hole, and a lining structure formed of the first metal and positioned in the counterbore hole in the core portion and fused to the cladding portion at a fusion region, the lining structure defining a second portion of the through-hole. The first metal may be a titanium alloy, and the second metal may be an aluminum alloy.

The fusion region may define a third portion of the through-hole. The lining structure may be fused to the core portion within the counterbore hole. A seam between the lining structure and the core portion may be exposed within a sealed interior volume of the mobile phone. The mobile phone may further include an input member including a shaft, the shaft extending through the through-hole in the wall segment, and a sealing member seated against the shaft and against a hole surface of the through-hole to define a seal in the through-hole.

A portable electronic device may include a housing including a wall segment, the wall segment including a core portion formed from a first metal and defining a portion of an interior surface of the wall segment and a first hole extending through the core portion. The wall segment may further include a cladding portion coupled to the core portion and formed from a second metal different from the first metal, the cladding portion defining a portion of a side exterior surface of the portable electronic device and a first portion of a second hole. The wall segment may further include a lining structure formed from the first metal and fused to the cladding portion, the lining structure positioned in the first hole in the core portion and defining a second portion of the second hole.

The second hole may be defined by a continuous hole surface, the lining structure may define a first portion of the continuous hole surface, and the cladding portion may define a second portion of the continuous hole surface. The lining structure may be fused to the cladding portion at a fusion region. The fusion region may define a third portion of the continuous hole surface between the first portion and the second portion. The continuous hole surface may be a continuous machined surface defined along the cladding portion, the fusion region, and the lining structure.

The lining structure may be fused to the cladding portion via a laser fusion operation. The first metal may be an aluminum alloy and the second metal may be a titanium alloy. The lining structure may be fused to the core portion along a hole surface of the first hole.

An electronic device may include a front cover defining a front exterior surface of the electronic device, a display below the front cover, a rear cover defining a rear exterior surface of the electronic device, and a housing positioned between the front cover and the rear cover. The housing may include a wall segment, the wall segment defining a first hole extending through the wall segment. The wall segment may include a cladding portion formed from a first metal and defining a portion of a side surface of the electronic device, a core portion formed from a second metal and fused to the cladding portion, the core portion defining a portion of an interior surface of the electronic device, and a second hole through the core portion, the second hole extending from the interior surface to the cladding portion. The wall segment may further include a lining structure positioned in the second hole and fused to the cladding portion at a fusion region. The cladding portion may define a first portion of a hole surface of the first hole, the lining structure may define a second portion of the hole surface of the first hole, and the fusion region between the cladding portion and the lining structure may define a third portion of the hole surface of the first hole.

The hole surface may be a continuous machined surface. The first metal may be a titanium alloy and the second metal may be an aluminum alloy.

The lining structure may be fusion bonded to the cladding portion. The core portion may be diffusion bonded to the cladding portion.

The electronic device may further include an input member defining a shaft, the shaft extending into the first hole, and a sealing member seated against the shaft and the hole surface of the first hole to define a seal between a sealed interior volume of the electronic device and an external environment, and a seam between the lining structure and the core portion may be within the sealed interior volume of the electronic device.

A mobile phone may include an enclosure including a front cover assembly defining a front exterior surface of the enclosure, and a housing structure coupled to the front cover assembly and defining a side exterior surface of the enclosure, the housing structure including a conductive mounting structure. The mobile phone may further include a battery within the enclosure, and an electrically debondable adhesive structure removably coupling the battery to the conductive mounting structure and including a conductive layer coupled to the battery and an electrically debondable adhesive layer adhered to the conductive layer and to the conductive mounting structure. The electrically debondable adhesive layer may define a first surface adhered to and conductively coupled to the conductive layer, and a second surface adhered to and conductively coupled to the conductive mounting structure, the electrically debondable adhesive layer configured to reduce its adhesive strength along at least one of the first surface or the second surface in response to a voltage potential applied across the electrically debondable adhesive layer via the conductive layer and the conductive mounting structure.

The conductive mounting structure may include an aluminum alloy and may define a first surface region having an anodized surface and a second surface region having a passivated conductive surface. The electrically debondable adhesive layer may be adhered to the passivated conductive surface. The conductive layer may be adhesively coupled to the battery along a first side of the conductive layer and adhesively coupled to the electrically debondable adhesive layer along a second side of the conductive layer.

The conductive layer may include a flexible substrate, and a conductive material disposed on the flexible substrate. The conductive layer may define a tab extending from the electrically debondable adhesive structure, the tab including a conductive terminal for coupling to a voltage source. The conductive terminal may be a first conductive terminal, and the housing structure may define a second conductive terminal for coupling to the voltage source.

The electrically debondable adhesive layer may be configured to reduce its adhesive strength along the second surface in response to a voltage potential applied across the electrically debondable adhesive layer via the conductive layer and the conductive mounting structure.

A portable electronic device may include a front cover defining a front exterior surface of the portable electronic device, a display coupled to an interior surface of the front cover, a housing structure coupled to the front cover and including a conductive mounting structure below the front cover, a battery, an electrically debondable adhesive coupling the battery to the conductive mounting structure, a first electrode conductively coupled to a first surface of the electrically debondable adhesive, the first electrode defined by the conductive mounting structure, and a second electrode conductively coupled to a second surface of the electrically debondable adhesive, the electrically debondable adhesive configured to decouple the battery from the conductive mounting structure in response to a voltage potential applied between the first electrode and the second electrode.

The battery may include a conductive battery enclosure and a battery cell within the conductive battery enclosure, and the second electrode may be defined by the conductive battery enclosure. The conductive battery enclosure may include a lower enclosure structure formed from metal, and an upper enclosure structure formed from metal and welded to the lower enclosure structure. The battery may include a positive terminal conductively coupled to a cathode of the battery cell and conductively isolated from the conductive battery enclosure and the conductive battery enclosure may be conductively coupled to an anode of the battery cell.

The second electrode may be defined by a conductive layer positioned between the electrically debondable adhesive and the battery.

The housing structure may include a first wall section defining at least a portion of a first side exterior surface of the portable electronic device, and a second wall section defining at least a portion of a second side exterior surface of the portable electronic device opposite the first side exterior surface, and the conductive mounting structure may extend from the first wall section to the second wall section. The conductive mounting structure may be formed from an aluminum alloy and may define a first surface region having an anodized surface and a second surface region having a passivated conductive surface. The electrically debondable adhesive may be adhered to the passivated conductive surface.

The portable electronic device may further include switching circuitry operably coupled to the battery and to the first electrode and the second electrode and configured to apply the voltage potential between the first electrode and the second electrode from the battery.

An electronic device may include a touchscreen display, a battery, an enclosure enclosing the touchscreen display and the battery. The enclosure may include a front cover assembly defining a front exterior surface of the enclosure, a housing structure coupled to the front cover assembly and including a first wall section defining at least a portion of a first side exterior surface of the enclosure, a second wall section defining at least a portion of a second side exterior surface opposite the first side exterior surface, and a conductive chassis section coupled to the first wall section and to the second wall section. The electronic device may further include an electrically debondable adhesive conductively coupled to the conductive chassis section and coupling the battery to the conductive chassis section, and a conductive layer between the electrically debondable adhesive and the battery and conductively coupled to the electrically debondable adhesive, the electrically debondable adhesive configured to debond from the conductive chassis section in response to a voltage potential applied between the conductive chassis section and the conductive layer.

The conductive chassis section may be formed from an aluminum alloy and may define a first surface region having an anodized surface and a second surface region having a passivated conductive surface. The electrically debondable adhesive may be adhered to the passivated conductive surface.

The electronic device may further include a charging port configured to receive a charging cable configured to supply the voltage potential, and the charging port may be operably coupled to the conductive chassis section and the conductive layer. The electronic device may be configured to apply the voltage potential from the charging cable to the conductive chassis section and the conductive layer in response to a user input. The user input may be provided to the touchscreen display.

The conductive chassis section may define an electrical ground of the electronic device. The conductive layer may include a flexible substrate, and a conductive material disposed on one surface of the flexible substrate.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Mobile phones as described herein may include complex, sophisticated components and systems that facilitate a multitude of functions. For example, mobile phones according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the mobile phones.

Figure 1A:
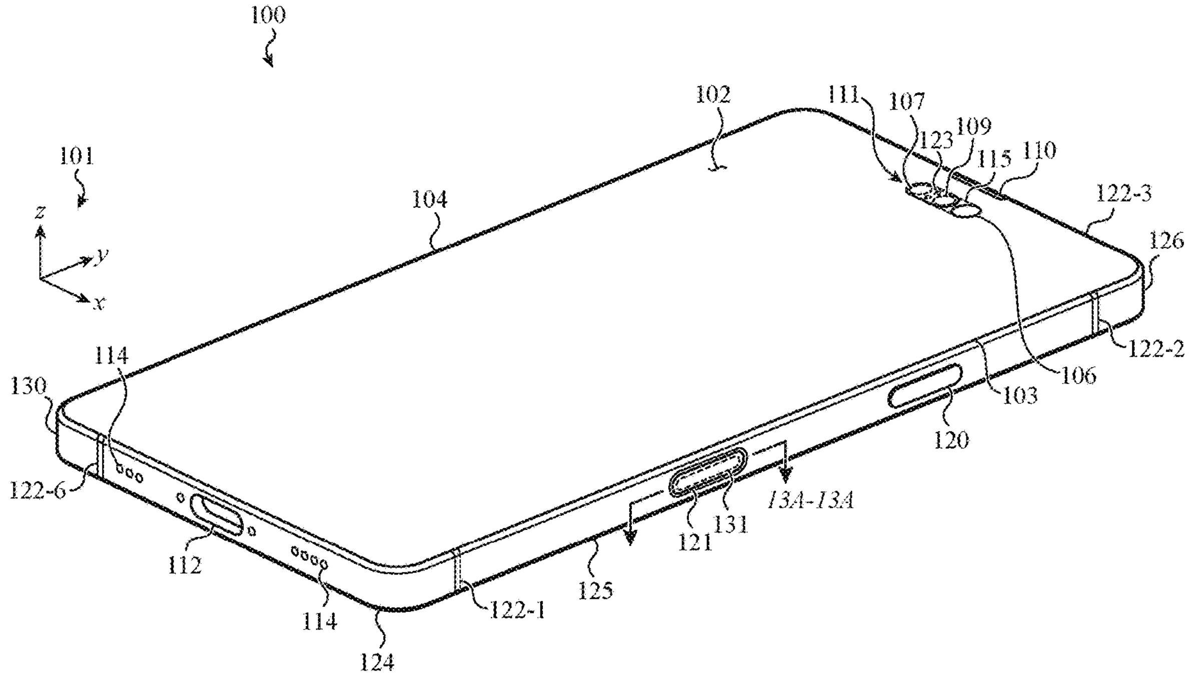
FIGS. 1A-1B depict an example electronic device.
Figure 1B:
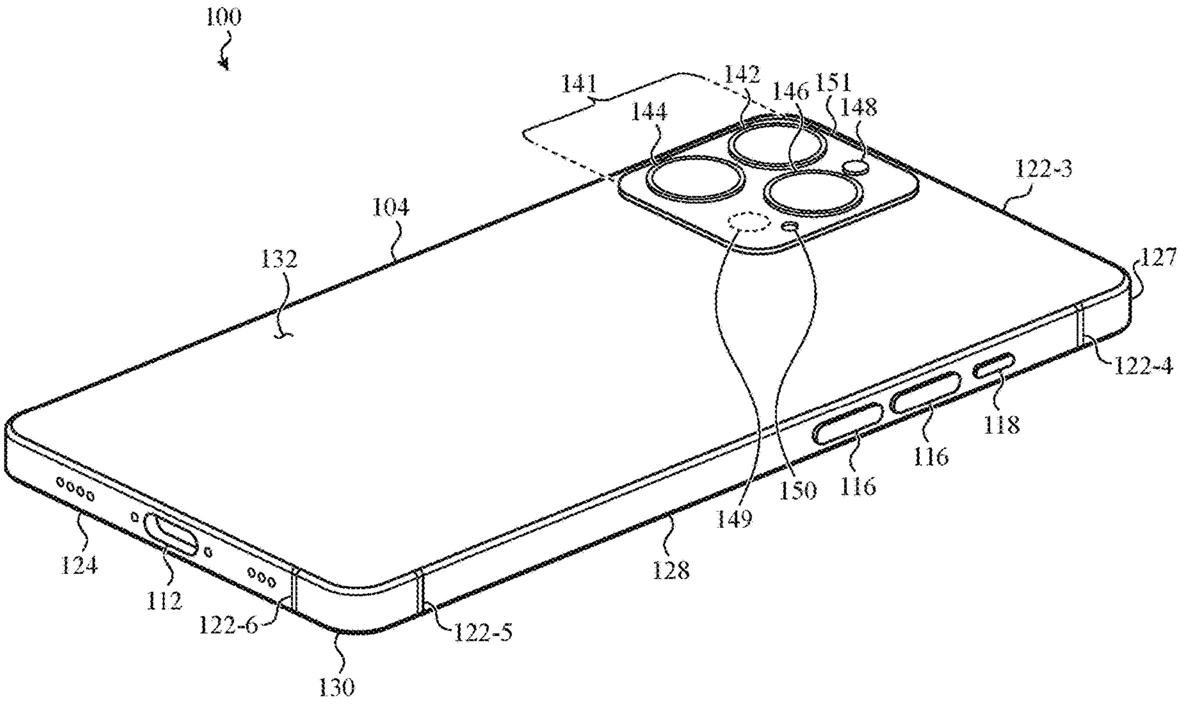

FIGS. 1A and 1B show an example electronic device 100 embodied as a mobile phone. FIG. 1A illustrates a front of the device 100, while FIG. 1B illustrates a back side of the device. While the device 100 is a mobile phone, the concepts presented herein may apply to any appropriate electronic devices, including portable electronic devices, wearable devices (e.g., watches), laptop computers, handheld gaming devices, tablet computers, computing peripherals (e.g., mice, touchpads, keyboards), or any other device. Accordingly, any reference to an "electronic device" encompasses any and all of the foregoing.

The electronic device 100 includes a cover 102 (e.g., a front cover) attached to a housing 104 (which may include a housing structure defined by one or more housing components). The cover 102 may be positioned over a display 103. The cover 102 may be a sheet or sheet-like structure formed from or including a transparent or optically transmissive material. The cover 102 may define a front exterior surface of the device, and an interior surface opposite the exterior surface. In some cases, the cover 102 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 102 include, without limitation, sapphire, ceramic, glass-ceramic, crystallizable glass materials, or plastic (e.g., polycarbonate). A glass-ceramic material may be a silica-based glass-ceramic material, such as an aluminosilicate glass-ceramic material or a boroaluminosilicate glass-ceramic material. The glass-ceramic material may be chemically strengthened by ion exchange. The cover 102 may be formed as a monolithic or unitary sheet. The cover 102 may also be formed as a composite of multiple layers of different materials, coatings, and other elements.

The display 103 may be at least partially positioned within the interior volume of the housing 104. The display 103 may be coupled to the cover 102, such as via an adhesive or other coupling scheme. The display 103 may include a liquid-crystal display (LCD), a light-emitting diode (LED) display, an organic light-emitting diode (OLED) display, an active layer organic light-emitting diode (AMOLED) display, an organic electroluminescent (EL) display, an electrophoretic ink display, or the like. The display 103 may be configured to display graphical outputs, such as graphical user interfaces, that the user may view and interact with. Graphical outputs may be displayed in a graphically active region of the display 103 (e.g., an active display region). The active display region may be surrounded or defined by a border region, which may be defined by an opaque mask on the interior surface of the cover 102 (or using other components or techniques). In some cases, the borders are small (e.g., less than about 3 mm, less than about 2 mm, or less than about 1 mm).

The display 103 may also define a primary display region, which may generally correspond to the main front-facing, contiguous display region, in which graphical user interfaces, images, videos, applications, and other graphical outputs may be displayed.

The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor). The ambient light sensor may be positioned below an active area of the display 103 (e.g., below a portion of the display that produces graphical output). The ambient light sensor may transmit and/or receive light through the active area of the display 103 to perform sensing functions.

The display 103 may include or be associated with one or more touch- and/or force-sensing systems. In some cases, components of the touch- and/or force-sensing systems are integrated with the display stack. For example, touch-sensing components such as electrode layers of a touch and/or force sensor may be provided in a stack that includes display components (and is optionally attached to or at least viewable through the cover 102). The touch- and/or force-sensing systems may use any suitable type of sensing technology and touch-sensing components, including capacitive sensors, resistive sensors, surface acoustic wave sensors, piezoelectric sensors, strain gauges, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102. The front-facing camera 106 may have any suitable operational parameters. For example, the front-facing camera 106 may include a 12-megapixel sensor (with 1 micron pixel size), and an 80-90° field of view. The front-facing camera 106 may have an aperture number of f/1.9. The front-facing camera 106 may include auto-focus functionality (e.g., one or more lens elements may move relative to an optical sensor to focus an image on the sensor). Other types of cameras may also be used for the front-facing camera 106, such as a fixed-focus camera.

The front-facing camera 106 (as well as other components) may be positioned in a front-facing sensor region 111. The front-facing sensor region 111 may be positioned in an island-like area of the front of the device 100 and may be surrounded by a display region (e.g., a main or primary display region) of the device 100. In some cases, as described herein, the front-facing sensor region 111 may be positioned in or defined by one or more holes formed through the display 103. In such cases, the front-facing sensor region 111 may be bordered on all sides by active areas or regions of the display 103. Stated another way, the front-facing sensor region 111 may be completely surrounded by active display areas (e.g., an outer periphery of the front-facing sensor region 111 may be surrounded by active areas of the display). In some cases, the front-facing sensor region 111 includes or is defined by one or more masks or other visually opaque component(s) or treatment(s) that define openings for the sensors of the front-facing sensor region 111. The front-facing sensor region 111 may include components such as an infrared illuminator module 107 (which may include a flood illuminator and a dot projector), an infrared image capture device 109, components of a proximity sensing system 123, and the front-facing camera 106. The infrared illuminator module 107 is an example of a light emitter, and the infrared image capture device 109 is an example of an optical receiver.

The proximity sensing system 123 may determine the proximity of an object (e.g., a user's face) to the device 100. The device 100 may use information from the proximity sensing system 123 to change, modify, adjust, or otherwise control the display 103 or other function of the device 100 (e.g., to deactivate the display when the device 100 is held near a user's face during a telephone call). The proximity sensing system 123 may be part of an integrated module that includes components of the proximity sensing system 123 as well as the illuminator module 107 and the infrared image capture device 109. The proximity sensing system 123 may include an optical emitter and an optical receiver, each of which may be associated with its own light guide. The proximity sensing system 123 may estimate a distance between the device and a separate object or target using lasers and time-of-flight calculations or using other types of proximity sensing components or techniques.

In some cases, the front-facing sensor region 111 is defined by or includes two holes formed through the display 103, such as a first hole to provide optical access for the front facing camera 106 and a second hole to provide access for the infrared illuminator module 107, the infrared image capture device 109, and the proximity sensing system 123. A supplemental display region 115 may be located between the first and second holes. The supplemental display region 115 may provide graphical output and touch- and/or force-sensing functionality to the front-facing sensor region 111. For example, the supplemental display region 115 may be used to display graphical outputs such as lights, shapes, icons, or other elements (e.g., to provide notifications and/or information to the user). In some cases, the supplemental display region 115 may be visually distinguished from other active regions of the display, such that the supplemental display region 115 does not appear to be part of the display. For example, graphical outputs (e.g., graphical user interfaces, images, videos, etc.) displayed on the display 103 may not extend into the supplemental display region 115. In such cases, the front-facing sensor region 111 may appear visually as a single continuous area of the display, despite the display having two separate holes separated by an active display region or area. The supplemental display region 115, and optionally the touch-sensing components of the display that surround the front-facing sensor region 111, may also include touch- and/or force-sensing functionality, such that a user can touch the front-facing sensor region 111 to provide an input to the device. In some cases, touch inputs applied anywhere in the front-facing sensor region 111 (e.g., even directly over the optical components) may be detected by the device. These and other features of the front-facing sensor region 111 are described herein.

The device 100 may also include one or more buttons (e.g., button 120, button 121, and buttons 116 and 118 in FIG. 1B), switches, and/or other physical input systems. Such input systems may be used to control power states (e.g., the button 120), control applications (e.g., the button 121), change speaker volume (e.g., the button 116), switch between "ring" and "silent" modes (e.g., the button 118), and the like. The buttons 116, 118, 120, and 121 may include strain-sensing systems that detect inputs to the buttons based on a detected strain. The buttons 116, 118, 120, and 121 may also be associated with haptic actuation systems that produce a tactile output in response to a detection of a strain that satisfies a condition. Thus, for example, upon detecting a strain or force that satisfies a condition (and/or an electrical parameter that is indicative of a strain satisfying the condition), a haptic actuation system may impart a force on a button to produce a tactile output (e.g., resembling a "click"). This tactile output or response may provide tactile feedback to the user to indicate that the input has been recognized by the device.

In some cases, one or more of the buttons 116, 118, 120, and 121 may use switch members, such as collapsible dome switches, to detect button presses. Such dome switches may be used in place of (and optionally in addition to) strain-based or other non-binary force-sensing systems. In some cases, however, dome switches or other collapsible or tactile switches may be used in addition to strain-based or non-binary force sensing systems in a given button. In such cases, the button may facilitate the detection of binary or momentary inputs, while also detecting a magnitude of a force being applied to the button. In such cases, the device 100 may perform different operations in response to detecting the binary input and in response to detecting a force that satisfies a condition. More particularly, a user may provide a partial actuation of the button (e.g., a half click or half press), in which a force is applied but the switch is not collapsed. The device 100 may perform one or more operations in response to detecting the partial actuation of the button (e.g., in response to detecting a force that satisfies a condition). A user may subsequently (or instead) provide a complete actuation of the button, in which the force is increased until the switch is actuated or otherwise registers an input (e.g., the dome switch collapses). The device 100 may perform one or more additional or different operations in response to detecting the switch actuation. As one non-limiting example, the button may be used to provide inputs to the device 100 when the device 100 is operated in an image capture mode. In such cases, a partial actuation may cause the device 100 to initiate a focusing operation, or lock an exposure setting for image capture (or perform other operations or combinations of operations). When the complete actuation is detected (e.g., the binary or momentary switch is actuated), the device 100 may capture an image with one of the onboard cameras. Other functions may also be initiated in response to partial and/or complete actuation of the button, including other image-capture functions, or other device or application functions. For example, a partial actuation may initiate a scrolling operation (e.g., scrolling through items in a displayed list), and a complete actuation may initiate a selection of a selected item in the list. In some cases, the button 121 of the device 100 includes both a dome switch (or other binary or momentary type switch) and a strain-based sensing system. In some cases, one or more other buttons of the device 100 include both a dome switch (or other binary or momentary type switch) and a strain-based sensing system.

In some cases, one or more of the buttons 116, 118, 120, and 121 may use touch-sensing systems, such as capacitive touch-sensing systems, to detect inputs. For example, the button member of a button (e.g., the movable component that a user presses in order to actuate or provide an input to the button) may include a touch-sensing element positioned thereon. A button equipped with a touch-sensing element may detect various types of touch-based inputs, including static touch inputs (e.g., a finger touching the touch-sensitive button surface), dynamic touch inputs (e.g., a finger sliding along the touch-sensitive button surface, also referred to as gesture or swipe inputs), or the like.

In some cases, the button 121 may include a touch-sensing element 131 to detect such touch-based inputs. The device 100 may perform various operations in response to detecting touch-based inputs. Continuing the example above, when the device 100 is being operated in an image capture mode, a static touch input may initiate a focusing or exposure lock operation, while a dynamic or swipe touch input may initiate a zoom operation (e.g., swiping in one direction may initiate a zoom-in operation, and swiping in the opposite direction may initiate a zoom-out operation).

In some cases, the touch-sensing element 131 may detect the location of a touch input on the button 121 during a button actuation, and the device may perform different actions based on the location of the touch. For example, if the button 121 is actuated with a press input at a first location on the button 121 (e.g., at one end of the button 121, as detected by the touch-sensing element 131), the device may perform a first action (e.g., a zoom-in operation), and if the button 121 is actuated with a press input at a second location on the button 121 (e.g., at an opposite end of the button 121, as detected by the touch-sensing element 131), the device may perform a second action different from the first action (e.g., a zoom-out operation).

In some cases, the touch-sensing element 131 may detect whether an input to the button 121 is applied with a single finger or two fingers, and may perform different operations in response. For example, if the button 121 is actuated with a single finger (as detected by the touch-sensing element 131), the device may perform a first action (e.g., capture a single image), and if the button 121 is actuated with multiple fingers (as detected by the touch-sensing element 131), the device may perform a second action different from the first action (e.g., capture a sequence of images for the duration of the actuation, or initiate a video capture operation).

Other sensing techniques may also be used to detect inputs to the buttons. In some cases, a switch or other input device is used in place of one or more of the buttons.

As noted above, the button 121 may be force- and/or pressure-sensitive (e.g., able to detect variable force inputs) and can produce multiple controls or outputs based on amount of force input, presence of touch, location of touch, movement of touch (gesture). The particular operation that is initiated in response to any given button input may vary in accordance with (e.g., in proportion to) an amount of applied force. In some cases, a force-based input without a detected touch input at the touch-sensing element 131 may suppress an action or be ignored by the device. The button 121 may also be paired with one or more other buttons for designated operations or commands (e.g., the device may perform certain operations in response to detecting simultaneous inputs at multiple buttons or certain sequences of inputs at multiple buttons).

As described in several examples above, the button 121 may be operable to initiate or control image capture functions and operations. For example, a light touch of the button 121 (e.g., a sensed touch input without a force, or with a force that satisfies a first force condition corresponding to a slight deflection of the button) may initiate focus and light metering operations, and a larger force or deflection of the button (e.g., satisfying a second force condition) may initiate an image or video capture operation. Additionally, different haptic outputs may be produced in response to detecting different inputs at the button 121 and/or in response to the different operations that are initiated by the button inputs.

Other example image manipulations and/or camera function controls that can be initiated by inputs to the button 121 (force and/or touch inputs) may include: zooming in or zooming out in response to swipe inputs on the button surface in different directions; increasing or decreasing volume output in response to swipe inputs on the button surface in different directions; capturing a single image or a series of multiple images in response to different force inputs (e.g., single image for a light press, multiple images for a harder press). In such cases, different haptic outputs may be produced in response to detecting different inputs at the button 121 and/or in response to the different operations that are initiated by the button inputs.

The button 121 can also cause the device to perform other functions that are either tied to the operation of the device or set in response to operation of a particular application or use mode on the phone. For example, inputs to the button 121 may cause the device to perform operations such as: selecting one or more alert suppression (mute) modes; verifying purchase or verify application commands; controlling timer commands including watch-related operations; providing input to games such as throttle control or other continuously variable inputs; initiating hard and/or soft reset of the device; initiating user programmable operations; and launching or terminating applications. In some cases, the particular operation of the button may be user programmable or selectable. For example, a user may select what functions or operations are initiated in response to various force inputs, gesture inputs, and touch inputs. The user may also establish different input schemes for different device modes. For example, the user may map force, touch, and gesture inputs to a first set of functions when the device is operating in a first mode (e.g., when a first application is being executed, such as an image capture application), and may map force, touch, and gesture inputs to a second set of functions when the device is operating in a second mode (e.g., when a second application is being executed).

In some cases, the operation of the button 121 may change based on the orientation of the device. For example, if the device is being held in a vertical or "portrait" orientation, the force, touch, and gesture inputs may map to a first set of functions, and if the device is being held in a horizontal or "landscape" orientation, the force, touch, and gesture inputs may map to a second set of functions.

The button 121 may also be used to initiate stereoscopic image or video capture. In some cases, the selection of a stereoscopic image capture mode (or switching between stereoscopic and non stereoscopic image modes) may be controlled by operation of the button 121 or other device inputs (e.g., other buttons, touch-screen inputs, etc.). In some cases, the ability to select a stereoscopic image mode (or switch between a stereoscopic image mode and other image modes) with the button 121 may be dependent on the orientation of the device.

The device 100 may also include a speaker port 110 to provide audio output to a user, such as to a user's ear during voice calls. The speaker port 110, which is an example of an audio port, may also be referred to as a receiver, receiver port, or an earpiece in the context of a mobile phone. The speaker port 110 may be defined by an opening that is defined, along at least one side, by the housing 104, and along at least another side, by the cover 102. In some cases, the cover 102 defines a notch along an edge of the cover, and the notch (also referred to as a recess or cutout) defines at least three sides of the speaker port 110. The speaker port 110 may lack a mesh or other covering that is flush with the front surface of the cover 102. In some cases, a protective grill or grate is positioned within the device 100 and in an audio path between a speaker and the speaker port 110 to inhibit ingress of debris into the device 100. The protective grill or grate may be recessed relative to the front surface or front face of the cover 102.

The device 100 may also include a charging port 112 (e.g., for receiving a connector of a charging cable or power cable for providing power to the device 100 and charging the battery of the device 100). The charging port 112 may receive a connector of any suitable design. In some cases, the charging port 112 receives a connector corresponding to a universal serial bus (USB) connector type, such as a USB-C connector. The charging port 112 may also be configured to send and/or receive data via a cable, such as with a USB or other communication protocol.

The device 100 may also include audio openings 114. The audio openings 114 may allow sound output from an internal speaker system (e.g., the speaker system 224, FIG. 2) to exit the housing 104. The device 100 may also include one or more microphones. In some cases, a microphone within the housing 104 may be acoustically coupled to the surrounding environment through an audio opening 114.

The housing 104 may be a multi-piece housing. For example, the housing 104 may be formed from multiple housing components 124, 125, 126, 127, 128, and 130, which are structurally coupled together via one or more intermediate elements, such as joint structures 122 (e.g., 122-1-122-6). Together, the housing components 124, 125, 126, 127, 128, and 130 and the joint structures 122 may define a band-like housing structure that defines four side walls (and thus four exterior side surfaces) of the device 100. The four walls may include a top wall (e.g., proximate the front-facing sensor array 111), a bottom wall opposite the top wall (e.g., proximate the port 112), a first side wall (e.g., a first lateral side wall, visible in FIG. 1A), and a second side wall opposite the first side wall (e.g., a second lateral side wall, visible in FIG. 1B). Thus, both the housing components and the joint structures define portions of the exterior side surfaces of the device 100.

The housing components 124, 125, 126, 127, 128, and 130 may be formed of a conductive material (e.g., a metal), and the joint structures 122 may be formed of one or more polymer materials (e.g., glass-reinforced polymer). The joint structures 122 may include two or more molded elements, which may be formed of different materials. For example, an inner molded element may be formed of a first material (e.g., a polymer material), and an outer molded element may be formed of a second material that is different from the first (e.g., a different polymer material). The materials may have different properties, which may be selected based on the different functions of the inner and outer molded elements. For example, the inner molded element may be configured to make the main structural connection between housing components, and may have a higher mechanical strength and/or toughness than the outer molded element. On the other hand, the outer molded element may be configured to have a particular appearance, surface finish, chemical resistance, water-scaling function, or the like, and its composition may be selected to prioritize those functions over mechanical strength. The joint structures 122 may be mechanically interlocked with the housing components to structurally couple the housing components and form a structural housing assembly.

The housing components 124, 125, 126, 127, 128, and 130 may be formed from a clad structure that includes multiple materials. For example, the housing components may include a core portion formed from a first metal and a cladding portion formed from a second metal. The cladding portion may define exterior surfaces of the housing components. The exterior surface defined by the cladding portion may have a surface texture that produces a certain visual appearance and/or tactile feel. For example, the surface texture may have a texture that produces diffuse reflections. The surface texture may be produced by grinding, lapping, machining, ablation, blasting (e.g., sand blasting, bead blasting), etching (via mechanical etching, laser etching, chemical etching), or any other suitable texturing operation(s). The exterior surface of the housing components may also include a coating, such as a deposited coating. In some cases, the cladding portion is polished. A deposited coating may be deposited on the housing components via plasma vapor deposition (PVD), chemical vapor deposition (CVD), or the like.

The core portions of the housing components may be aluminum (e.g., an aluminum alloy), and the cladding portions may be titanium (e.g., a titanium alloy). Other metals may be used instead of aluminum and titanium for the core and cladding portions, such as an aluminum core with a stainless steel cladding, or a nickel core with a titanium cladding, or a steel core with stainless steel cladding. Other metals and combinations of metals are also contemplated. In some cases, the core portions of the housing components are aluminum, and the cladding portions are stainless steel. The cladding portions may have an average thickness of between about 0.1 mm and about 1.0 mm. The aluminum of the housing may include recycled aluminum (e.g., up to 70% recycled aluminum, up to 85% recycled aluminum, or another value).

As used herein, unless otherwise specified, a reference to a metal (e.g., aluminum, titanium) includes both pure metals as well as metal alloys. Thus, for example, a component that is formed from aluminum may be formed from pure aluminum, 6061 aluminum alloy, 7071 aluminum alloy, or another aluminum alloy. Similarly, a component that is formed from titanium may be formed from pure titanium, Ti-6Al-4V titanium alloy, Ti-5Al-2.5Sn titanium alloy, or another titanium alloy. References to steel may include various types and/or alloys of steel, including but not limited to low carbon steel, stainless steel, high carbon steel, etc.

In some cases, one or more of the housing components 124, 125, 126, 127, 128, and 130 (or portions thereof) are configured to operate as antennas (e.g., components that are configured to transmit and/or receive electromagnetic waves to facilitate wireless communications with other computers and/or devices). To facilitate the use of the housing components as antennas, feed and ground lines may be conductively coupled to the housing components to couple the housing components to other antennas and/or communication circuitry. The joint structures 122 may be substantially non-conductive to provide suitable separation and/or electrical isolation between the housing components (which may be used to tune the radiating portions, reduce capacitive coupling between radiating portions and other structures, and the like). In some cases, supplemental antenna segments are conductively coupled to the housing components to change an antenna performance parameter of the housing component. Supplemental antenna segments may be coupled to the housing components via switching circuitry that allows the supplemental antenna segments to be selectively coupled or decoupled from the housing components.

The device 100 may include various internal antenna elements that are configured to transmit and receive wireless communication signals through various regions of the device 100. For example, internal antenna elements may be configured to transmit and receive wireless communication signals through the front cover 102, a back or rear cover 132 (FIG. 1B), or optionally through radio-frequency transmissive windows formed through housing components.

The exterior surfaces of the housing components 124, 125, 126, 127, 128, and 130 may have substantially a same color, surface texture, and overall appearance as the exterior surfaces of the joint structures 122. In some cases, the exterior surfaces of the housing components 124, 125, 126, 127, 128, and 130 and the exterior surfaces of the joint structures 122 are subjected to at least one common finishing procedure, such as abrasive-blasting, machining, polishing, grinding, or the like. Accordingly, the exterior surfaces of the housing components and the joint structures may have a same or similar surface finish (e.g., surface texture, roughness, pattern, etc.). In some cases, the exterior surfaces of the housing components and the joint structures may be subjected to a two-stage blasting process to produce the target surface finish.

FIG. 1A also includes an example coordinate system 101 that may define directions with reference to the device 100 (or other electronic devices described herein). The coordinate system 101 defines a positive x direction, a positive y direction, and a positive z direction. Unless stated otherwise, references herein to a positive x, positive y, or positive z direction will be understood to refer generally to the coordinate system 101 and its relationship to the device 100 in FIG. 1A. Negative x, y, and z directions will be understood to be opposite to the positive x, y, and z directions shown in the coordinate system in FIG. 1A. The x, y, and z directions may also be understood as x, y, and z axes.

FIG. 1B illustrates a back side of the device 100. The device 100 may include a back or rear cover 132 coupled to the housing 104 and defining at least a portion of the exterior rear surface of the device 100. The cover 102 (e.g., the front cover), the rear cover 132, and the housing 104 may at least partially define an enclosure of the device 100. The enclosure may define an internal volume in which components of the device 100 are positioned. The rear cover 132 may be formed from or include a transparent or optically transmissive material. For example, the rear cover 132 may include a substrate formed of a glass material. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the rear cover 132 include, without limitation, sapphire, ceramic, glass-ceramic, crystallizable glass materials, and plastic (e.g., polycarbonate). A glass-ceramic material may be a silica-based glass-ceramic material, such as an aluminosilicate glass-ceramic material or a boroaluminosilicate glass-ceramic material. The glass-ceramic material may be chemically strengthened by ion exchange.

The rear cover 132 may be formed as a monolithic or unitary sheet. The rear cover 132 may also be formed as a composite of multiple layers of different materials, coatings, and other elements. The rear cover 132 may include one or more decorative layers on the exterior or interior surface of the substrate. For example, one or more coating layers may be applied to the interior surface of the substrate (or otherwise positioned along the interior surface of the substrate) to provide a particular appearance to the back side of the device 100. The coating layer(s) may include a sheet, ink, dye, or combinations of these (or other) layers, materials, or the like. In some cases, one or more of the coating layer(s) have a color that substantially matches a color of the housing 104 (e.g., the exterior surfaces of the housing components and the joint structures). In some cases, the material of the substrate of the rear cover 132 may be colored, and may include one or more coatings that contribute to the colored appearance of the rear cover. Moreover, the rear cover 132 may be formed from or may include a dielectric material (e.g., the rear cover 132 may be a dielectric member, such as a glass member, sapphire member, polymer member, glass-ceramic member, etc.).

The device 100 may include a wireless charging system, whereby the device 100 can be powered and/or its battery recharged by an inductive (or other electromagnetic) coupling between a charger (e.g., a wireless charging accessory) and a wireless charging system within the device 100. In such cases, the rear cover 132 may be formed of a material that allows and/or facilitates the wireless coupling between the charger and the wireless charging system.

Figure 2:
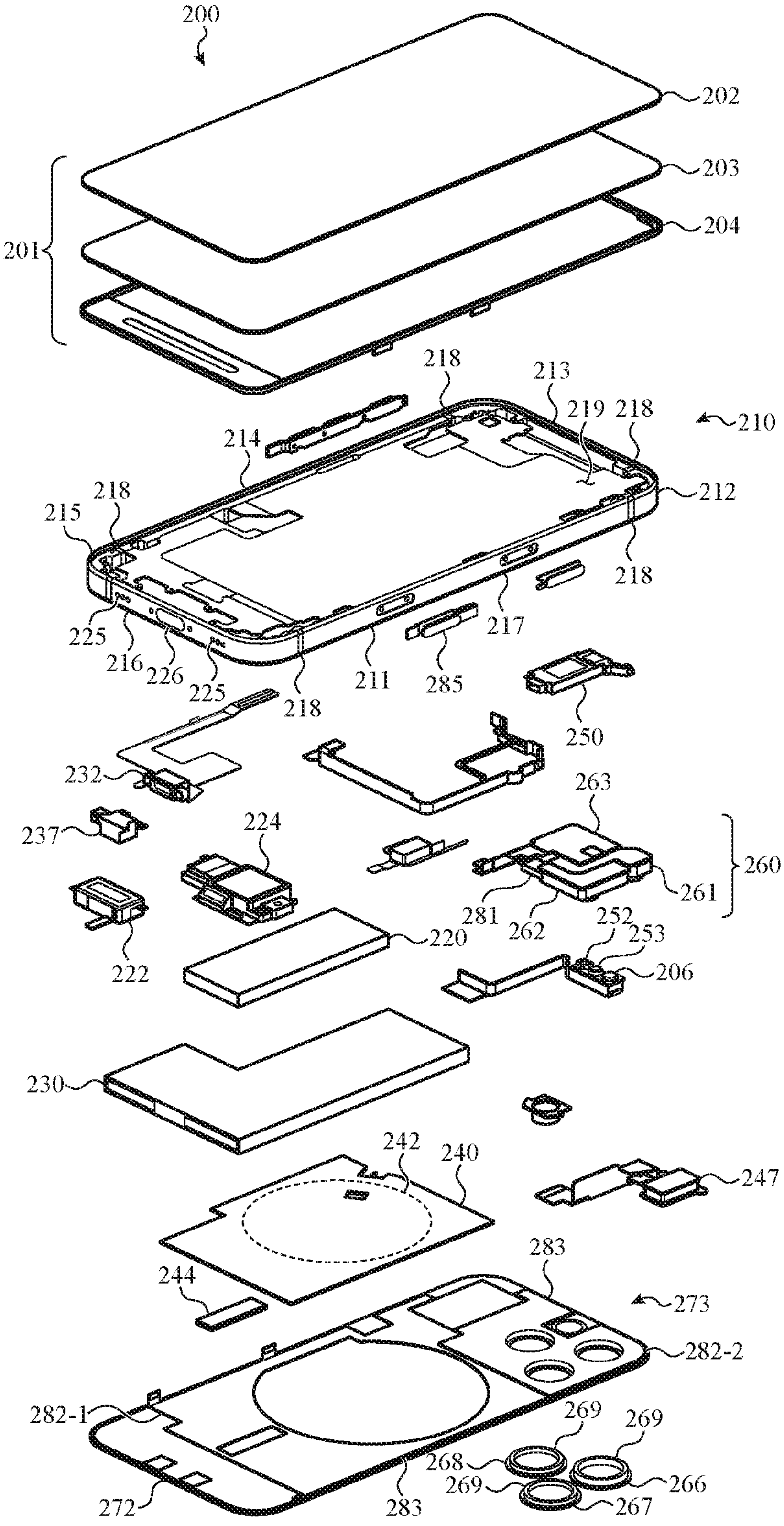
FIG. 2 is exploded view of an example electronic device.

The device 100 may also include a sensor array 141 (e.g., a rear-facing sensor array in a rear-facing sensor array region) that includes three cameras (as shown, for example, in FIG. 2, described herein). The sensor array 141 may be in a sensor array region that is defined by a protrusion 151 in a rear cover of the device 100. The protrusion 151 may define a portion of the rear exterior surface of the device 100, and may at least partially define a raised sensor array region of the sensor array 141. In some cases, the protrusion 151 may be formed by attaching a piece of material (e.g., glass) to another piece of material (e.g., glass). In other cases, the rear cover 132 may include a monolithic structure, and the protrusion 151 may be part of the monolithic structure. For example, the rear cover 132 may include a monolithic glass structure (or glass-ceramic structure or alkali-aluminosilicate structure, or other suitable material) that defines the protrusion 151 as well as the surrounding area. In such cases, the protrusion 151 may be an area of increased thickness of the monolithic structure, or it may have a same or substantially same thickness as the rest of the cover (e.g., the protrusion 151 may correspond to or generally be opposite a recessed region along an interior side of the monolithic structure, such that the monolithic structure has a uniform thickness while also defining the protrusion 151).

A first camera 142 may include a 12-megapixel sensor and a telephoto lens with a 3× optical zoom and an aperture number of f/2.8. In some cases, the first camera 142 has a telephoto lens with a 5× optical zoom. A second camera 144 may include a 48.8-megapixel sensor (optionally with a three-layer sensor arrangement) with sensor-shift image stabilization and a wide-angle lens having an aperture number of f/1.7. A third camera 146 may include a 48-megapixel sensor and a super-wide camera with a wide field of view (FOV) (e.g., 120° FOV) and an aperture number of f/2.2. One or more of the cameras of the sensor array 141 may also include lens-based optical image stabilization, whereby the lens is dynamically moved relative to a fixed structure within the device 100 to reduce the effects of "camera shake" or other movements on images captured by the camera, and/or sensor-based image stabilization, whereby the image sensor is moved relative to a fixed lens or optical assembly. One or more of the cameras may include autofocus functionality, in which one or more lens elements (and/or sensors) are movable to focus an image on a sensor.

The first camera 142 may include an image sensor with a pixel size between about 0.8 microns and about 1.4 microns. The second camera 144 may include an image sensor with a pixel size between about 1.6 microns and about 2.3 microns. The third camera 146 may include an image sensor with a pixel size between about 0.8 microns and about 1.4 microns.

The first and second cameras 142, 144 may be oriented along the y direction of the device (e.g., centered along a line that extends in the y direction). The alignment of the first camera 142 and the second camera 144 along the y direction may facilitate the capture of stereoscopic images and/or video, such as three-dimensional images and/or video. For example, the alignment of the cameras along the y direction positions the cameras horizontally when the device 100 is held in a landscape or horizontal orientation during image capture. In such cases, the horizontal alignment of the cameras 142, 144 facilitates the capture of three-dimensional or stereoscopic images or video. Such images or video may be displayable in a head mounted display or via other three-dimensional display technologies. In the case of a head mounted display, images and/or video captured using the stereoscopic functionality of the cameras 142, 144 may be displayed as three-dimensional media. In some cases, the cameras 142, 144 may be used to capture three-dimensional scans of objects, and the device 100 may generate three-dimensional virtual models of the objects for display using a head-mounted display or other visualization technique.

As used herein, the term stereoscopic may refer to a mode or operation of the device in which two or more cameras are used concurrently or simultaneously to capture an image or video.

The sensor array 141, along with associated processors and software, may provide several image-capture features. For example, the sensor array 141 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The cameras of the sensor array 141 may also have or provide a high-dynamic-range (HDR) mode, in which the camera captures images having a dynamic range of luminosity that is greater than what is captured when the camera is not in the HDR mode. In some cases, the sensor array 141 automatically determines whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The cameras of the sensor array 141 may also include software-based color balance correction. For example, when a flash (e.g., the flash 148) is used during image capture, the cameras (and/or associated processing functionality of the device 100) may adjust the image to compensate for differences in color temperature between the flash output and the ambient lighting in the image. Thus, for example, if a background of an image has a different color temperature than a foreground subject (e.g., because the foreground subject is illuminated by the flash output), the cameras may modify the background and/or the foreground of the image to produce a more consistent color temperature across the image.

The sensor array 141 may also include or be configured to operate in an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and sensor).

The sensor array 141 may also include a depth sensing device 149 that is configured to estimate a distance between the device and a separate object or target. The depth sensing device 149 may estimate a distance between the device and a separate object or target using lasers and time-of-flight calculations, or using other types of depth sensing components or techniques.

The device 100 may also include a flash 148 (e.g., a rear-facing flash) that is configured to illuminate a scene to facilitate capturing images with the cameras of the sensor array 141. The flash 148 may include one or more light sources, such as one or more light-emitting diodes (e.g., 1, 2, 3, 4, or more LEDs). In some cases, the light source(s) may be illuminable in multiple different illumination patterns, which, along with a lens positioned over the light source(s), can produce different fields of illumination on a subject or scene. For example, a light source may be segmented into a plurality of illuminable regions, with the illuminable regions positioned under different regions of the lens. When a first illumination pattern is active (e.g., one or more central illuminable regions), the emitted light may pass through a first region of the lens (e.g., a central region) and produce a first field of illumination on a subject or scene (e.g., a relatively narrow light distribution corresponding to a field of view of a telephoto lens). When a second illumination pattern is active (e.g., one or more peripheral illuminable regions), the emitted light may pass through a second region of the lens (e.g., a peripheral region) and produce a second field of illumination on a subject or scene (e.g., a relatively wider light distribution corresponding to a field of view of a wide angle lens). The flash 148 may be configured to produce two, three, or more different fields of illumination, each corresponding to a field of view of one of the cameras of the sensor array 141. Thus, for example, the flash 148 may produce a first field of illumination that corresponds to (e.g., is substantially equal to or greater than) a field of view of the first camera 142, a second field of illumination that corresponds to (e.g., is substantially equal to or greater than) a field of view of the second camera 144, and a third field of illumination that corresponds to (e.g., is substantially equal to or greater than) a field of view of the third camera 146.

The sensor array 141 may also include a microphone 150. The microphone 150 may be acoustically coupled to the exterior environment through a hole defined in the rear cover of the device 100 (e.g., through the portion of the rear cover that defines the protrusion 151).

Figure 1C:
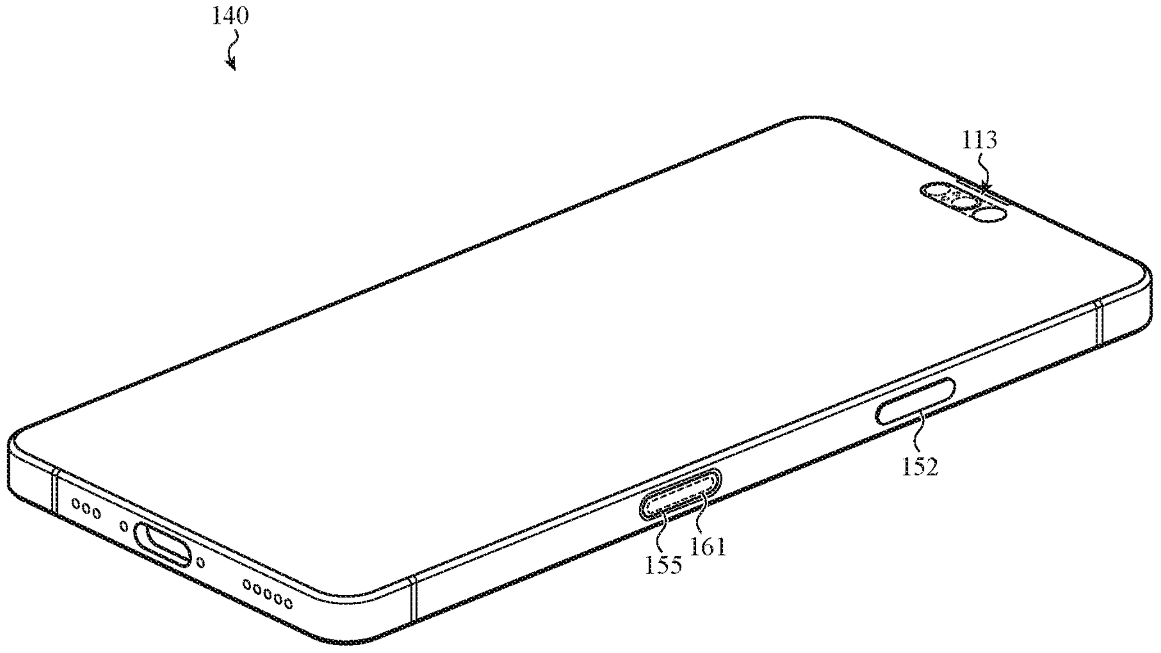
FIGS. 1C-1D depict another example electronic device.
Figure 1D:
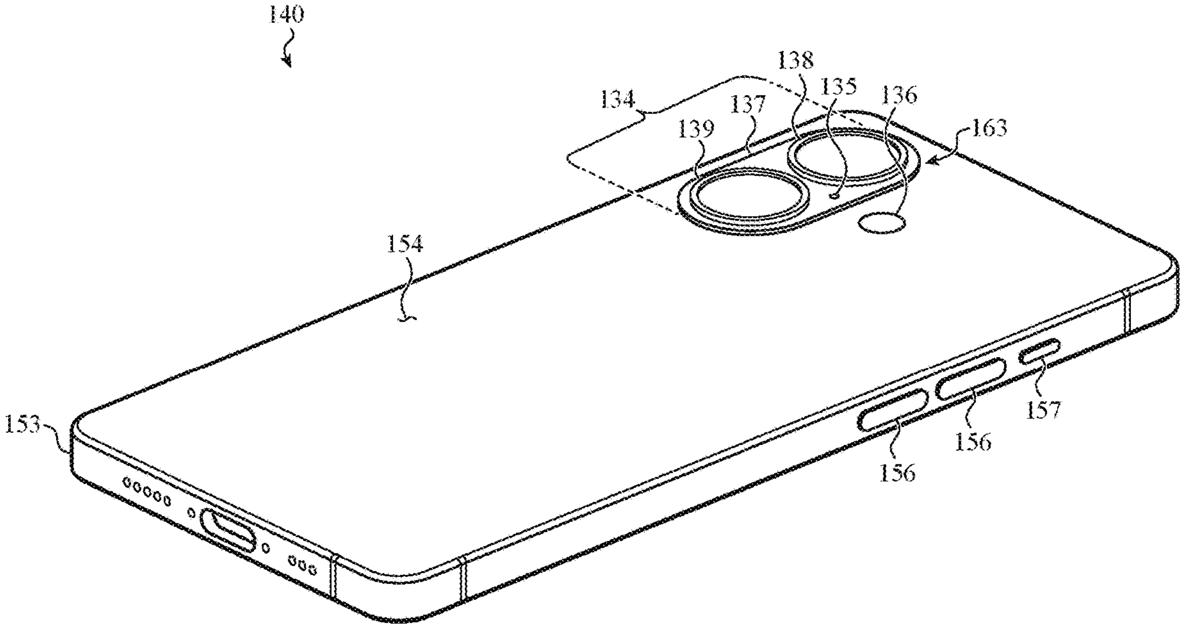

FIGS. 1C and 1D show another example electronic device 140 embodied as a mobile phone. The electronic device 140 may have many of the same or similar outward-facing components as the electronic device 100. Accordingly, descriptions and details of such components from FIGS. 1A-1B (e.g., displays, buttons, switches, housings, covers, charging ports, joint structures, etc.) apply equally to the corresponding components shown in FIGS. 1C and 1D.

The device 140 may include a front-facing sensor region 113, which may generally correspond to the front-facing sensor region 111 in FIG. 1A. The front-facing sensor region 113 may be positioned in an island-like area of the front of the device 140, and may be surrounded by a display region (e.g., a main display region) of the device 140. In some cases, as described herein, the front-facing sensor region 113 may be positioned in or defined by one or more holes formed through a display. In such cases, the front-facing sensor region 113 may be bordered on all sides by active areas or regions of the display. Stated another way, the front-facing sensor region 113 may be completely surrounded by active display areas (e.g., an outer periphery of the front-facing sensor region 113 may be surrounded by active areas of the display). In some cases, the front-facing sensor region 113 includes or is defined by one or more masks or other visually opaque component(s) or treatment(s) that define openings for the sensors of the front-facing sensor region 113. The front-facing sensor region 113 may include components such as an infrared illuminator module (which may include a flood illuminator and a dot projector), an infrared image capture device, components of a proximity sensing system, and a front-facing camera.

While the device 100 in FIG. 1B is shown as including a sensor array 141 with three cameras, the device 140 as shown in FIG. 1D includes a sensor array 134 (e.g., a rear-facing sensor array in a rear-facing sensor array region) that includes two cameras 138, 139. The sensor array 134 may be in a sensor array region that is defined by a protrusion 137 in a rear cover of the device 140. The protrusion 137 may define a raised sensor array region 163. Thus, the rear cover of the device may define a first portion of a rear exterior surface of the device 140, and the protrusion 137 defines a second portion of the rear exterior surface of the device (which is raised or protrudes relative to the first portion of the rear exterior surface). The protrusion 137 may have the same or similar construction as the protrusion 151 in FIG. 1B, though the protrusion 137 may have a different shape. For example, the protrusion 137 may be generally pill-shaped, and may accommodate the two cameras along the y direction of the device 140. The two cameras may be oriented along the y direction.

The alignment of the two cameras 138, 139 along the y direction (e.g., centered on a line that extends along the y direction) may facilitate the capture of stereoscopic images and/or video, such as three-dimensional images and/or video. For example, the alignment of the cameras along the y direction positions the cameras horizontally when the device 140 is held in a landscape or horizontal orientation during image capture. In such cases, the horizontal alignment of the cameras 138, 139 facilitates the capture of three-dimensional or stereoscopic images or video. Such images or video may be displayable in a head mounted display or via other three-dimensional display technologies. In the case of a head mounted display, images and/or video captured using the stereoscopic functionality of the cameras 138, 139 may be displayed as three-dimensional media. In some cases, the cameras 138, 139 may be used to capture three-dimensional scans of objects, and the device 140 may generate three-dimensional virtual models of the objects for display using a head-mounted display or other visualization techniques.

The device 140 may also include, as part of the sensor array 134, one or more rear-facing devices, which may include an ambient light sensor (ALS), a microphone port 135, and/or a depth sensing device that is configured to estimate a distance between the device 140 and a separate object or target.

The sensor array 134 may also include multiple cameras, such as a first camera 138 and a second camera 139. Therefore, the sensor array 134 may include a camera array (which may include one or more cameras). The first camera 138 may include a super-wide camera having a 12-megapixel sensor and a wide field of view (e.g., 120° FOV) optical stack with an aperture number of f/2.4. The second camera 139 may include a wide view camera having a 48.8-megapixel sensor and an aperture number of f/1.6. In some cases, the sensor array 134 may include a telephoto lens having a 12-megapixel sensor with a 3× optical zoom having an aperture number ranging from f/2.0 to f/2.8 (e.g., in addition to the first and second cameras 138, 139, or in place of one of the first or second cameras). As noted above, the cameras (or the camera lenses) may be arranged along the y direction of the device and positioned or set in the protrusion 137.

One or more of the cameras (e.g., cameras 138, 139) of the sensor array 134 may also include optical image stabilization, whereby the lens is dynamically moved relative to a fixed structure within the device 140 to reduce the effects of "camera shake" on images captured by the camera. The camera(s) may also perform optical image stabilization by moving the image sensor relative to a fixed lens or optical assembly. One or more of the cameras may include autofocus functionality, in which one or more lens elements (and/or sensors) are movable to focus an image on a sensor.

The second camera 139 may have an image sensor with a pixel size between about 1.5 microns and about 2.0 microns, and the first camera 138 may have an image sensor with a pixel size between about 0.8 microns and about 1.4 microns. If a camera with a telephoto lens is provided, it may have an image sensor with a pixel size between about 0.8 microns and about 1.4 microns.

The sensor array 134 may also include a flash 136 (e.g., a rear-facing flash). The flash 136 may include a multi-segment LED, or a single LED, or other light emitting component. The flash 136 may be positioned outside of the protrusion 137 (e.g., in a portion of the rear cover 154 that does not include the protrusion 137). In some cases, the flash 136 is positioned at a point that is midway (in the y direction) between the first camera 138 and the second camera 139, and offset from the cameras 138, 139 in the x direction. In other examples, the flash 136 may be positioned in line with and between the cameras 138, 139 (e.g., in the protrusion 137). Stated another way, in some cases, the first camera 138, the flash 136, and the second camera 139 may be centered on a line that extends along the y direction.

The flash 136 and the microphone port 135 may be aligned with one another in the x direction. For example, the flash 136 and the microphone port 135 may be centered on a line that extends along the x direction (which may be midway between the first camera 138 and the second camera 139).

In some cases, the microphone port 135 is positioned on the protrusion 137, and the microphone module inside the device is positioned outside of the area that defines the protrusion 137. In such cases, an internal porting structure may port sound from the microphone port 135 on the protrusion to the microphone module within the device.

Other details about the sensor array, the individual cameras of the sensor array, and/or the flash described with respect to the device 100 may be applicable to the sensor array, the individual cameras, and/or the flash of the device 140, and such details will not be repeated here to avoid redundancy.

With reference to FIG. 1D, the device 140 may include a back or rear cover 154 coupled to a housing 153 and defining at least a portion of the exterior rear surface of the device 140. The rear cover 154 may be formed from or include an optically transmissive material. The optically transmissive material may be colored and, in some cases, may be a colored glass material. The color of the optically transmissive material may be characterized by one or more color space coordinates, which in some cases may be a chroma value.

The rear cover 154 may include a substrate, alternately referred to herein as a rear cover member, formed of an optically transmissive glass material. The glass material may be a silica-based glass material, such as an aluminosilicate glass, a boroaluminosilicate glass, an alkali metal aluminosilicate glass (e.g., a lithium aluminosilicate glass). Other examples of optically transmissive materials for the rear cover 154 include, without limitation, sapphire, ceramic, glass-ceramic, crystallizable glass materials, and plastic (e.g., polycarbonate). A glass-ceramic material may be a silica-based glass-ceramic material, such as an aluminosilicate glass-ceramic material or a boroaluminosilicate glass-ceramic material. The glass or glass-ceramic material may be chemically strengthened by ion exchange. The rear cover 154 may be formed as a monolithic or unitary sheet. The rear cover 154 may also be formed as a composite of multiple layers of different materials, coatings, and other elements.

In some examples, an exterior surface of the rear cover may define different textures at different regions of the cover. In some cases, the different textures may produce different optical effects, such as a matte effect at a first region of the exterior surface and a glossy effect at a second region of the exterior surface. The difference between the matte and glossy effects may be used to define graphics, words, images, logos, or the like. For example, a visible logo may be defined by a glossy region (in the shape of the logo) surrounded by a matte region.

The rear cover 154 may include a coating on the exterior surface of the substrate, the interior surface of the substrate, or both. The coating may contribute to the appearance, such as the color, of the rear cover 154. For example, a coating along an interior surface of the substrate may include one or more color layers. The color layer may include a colorant such as a pigment or dye and may have a distinct hue or may be near neutral in color. In some examples, the color layer includes a polymeric binder, which may be polyester-based, epoxy-based, urethane-based, or based on another suitable type of polymer or copolymer. Alternately, or additionally, the coating may include one or more opaque layers applied to the interior surface of the substrate (or otherwise positioned along the interior side of the substrate) to provide a particular appearance to the back side of the device 140. The opaque layer(s) may include a sheet, ink, dye, or combinations of these (or other) layers, materials, or the like and in some cases may be optically dense. In some cases, the color of the coating along the interior surface of the substrate and the color of the substrate itself (e.g., the color of the optically transmissive material defining the rear cover substrate) together define the apparent color of the back side of the device 140.

In some cases, the coating on the rear cover and/or the material of the rear cover 154 itself present a color that substantially matches a color of the housing 153 (e.g., the exterior surfaces of the housing components and the joint structures). In such cases, the coating on the rear cover and the material of the rear cover may have substantially matching colors, or they may have different colors.

A coating along an exterior surface of the substrate may be a smudge-resistant (e.g., oleophobic) coating. The device 140 may include a wireless charging system, whereby the device 140 can be powered and/or its battery recharged by an inductive (or other electromagnetic) coupling between a charger (e.g., a wireless charging accessory) and a wireless charging system within the device 140. In such cases, the rear cover 154 may be formed of a material that allows and/or facilitates the wireless coupling between the charger and the wireless charging system (e.g., glass).

The housing 153 may have a similar construction as the housing 104. For example, the housing 104 may be a multi-piece housing formed from or including multiple housing components (e.g., housing components 124, 125, 126, 127, 128, and 130 in FIGS. 1A-1B), which are structurally coupled together via one or more intermediate elements, such as joint structures (e.g., 122-1-122-6, FIGS. 1A-1B). Together, the housing components and the joint structures may define a band-like housing structure that defines four side walls (and thus four exterior side surfaces) of the device 140. The four walls may include a top wall (e.g., proximate the front-facing sensor array 113), a bottom wall opposite the top wall (e.g., proximate the charging port), a first side wall (e.g., a first lateral side wall, visible in FIG. 1C), and a second side wall opposite the first side wall (e.g., a second lateral side wall, visible in FIG. 1D). Thus, both the housing components and the joint structures define portions of the exterior side surfaces of the device 140.

The housing components of the housing 153 may be formed of a conductive material (e.g., a metal), and the joint structures may be formed of one or more polymer materials (e.g., glass-reinforced polymer). The joint structures may include two or more molded elements, which may be formed of different materials. For example, an inner molded element may be formed of a first material (e.g., a polymer material), and an outer molded element may be formed of a second material that is different from the first (e.g., a different polymer material). The materials may have different properties, which may be selected based on the different functions of the inner and outer molded elements. For example, the inner molded element may be configured to make the main structural connection between housing components, and may have a higher mechanical strength and/or toughness than the outer molded element. On the other hand, the outer molded element may be configured to have a particular appearance, surface finish, chemical resistance, water-sealing function, or the like, and its composition may be selected to prioritize those functions over mechanical strength. The joint structures may be mechanically interlocked with the housing components to structurally couple the housing components and form a structural housing assembly.

The housing components of the housing 153 may be formed from single metal structures, or clad structures that include multiple materials. As an example single metal structure, the housing components may be formed from aluminum. As an example clad structure, the housing components may include a core portion formed from a first metal and a cladding portion formed from a second metal. The cladding portion may define exterior surfaces of the housing components. The exterior surface defined by the cladding portion may have a surface texture that produces a certain visual appearance and/or tactile feel. For example, the surface texture may have a texture that produces diffuse reflections. The surface texture may be produced by grinding, lapping, machining, ablation, blasting (e.g., sand blasting, bead blasting), etching (via mechanical etching, laser etching, chemical etching), or any other suitable texturing operation(s). The exterior surface of the housing components may also include a coating, such as a deposited coating. In some cases, the cladding portion is polished. A deposited coating may be deposited on the housing components via plasma vapor deposition (PVD), chemical vapor deposition (CVD), or the like.

In the case of clad structures, the core portions of the housing components may be aluminum (e.g., an aluminum alloy), and the cladding portions may be titanium (e.g., a titanium alloy). In some cases, the core portions of the housing components are aluminum, and the cladding portions are stainless steel. The cladding portions may have an average thickness of between about 0.1 mm and about 1.0 mm. The aluminum of the housing may include recycled aluminum (e.g., up to 70% recycled aluminum, up to 85% recycled aluminum, or another value).

The device 140 may also include one or more buttons (e.g., buttons 152 and 155 in FIG. 1C and buttons 156 and 157 in FIG. 1D), switches, and/or other physical input systems. Such input systems may be used to control power states (e.g., the button 152), control applications (e.g., the button 155), change speaker volume (e.g., the button 156), switch between "ring" and "silent" modes (e.g., the button 157), and the like. The buttons 152, 156, 155, and 157 may include strain-sensing systems that detect inputs to the buttons based on a detected strain. The buttons 152, 156, 155, and 157 may also be associated with haptic actuation systems that produce a tactile output in response to a detection of a strain that satisfies a condition. Thus, for example, upon detecting a strain or force that satisfies a condition (and/or an electrical parameter that is indicative of a strain satisfying the condition), a haptic actuation system may impart a force on a button to produce a tactile output (e.g., resembling a "click"). This tactile output or response may provide tactile feedback to the user to indicate that the input has been recognized by the device.

The buttons 152, 156, 155, and 157 may be embodiments of or otherwise correspond to the buttons 116, 118, 120, and 121 described above, and the description of those buttons will be understood to apply equally to the buttons 152, 156, 155, and 157. In some cases, one or more of the buttons 152, 156, 155, and 157 may use switch members, such as collapsible dome switches, to detect button presses. Such dome switches may be used in place of strain-based or other non-binary force-sensing systems. In some cases, however, dome switches or other collapsible or tactile switches may be used in addition to strain-based or non-binary force sensing systems in a given button. In such cases, the button may facilitate the detection of binary or momentary inputs, while also detecting a magnitude of a force being applied to the button. In such cases, the device 100 may perform different operations in response to detecting the binary or momentary input and in response to detecting a force that satisfies a condition. More particularly, a user may provide a partial actuation of the button, in which a force is applied but the switch is not collapsed. The device 100 may perform one or more operations in response to detecting the partial actuation of the button (e.g., in response to detecting a force that satisfies a condition). A user may subsequently provide a complete actuation of the button, in which the force is increased until the switch is actuated or otherwise registers an input (e.g., the dome switch collapses). The device 100 may perform one or more additional operations in response to detecting the switch actuation. As one nonlimiting example, the button may be used to provide inputs to the device 100 when the device 100 is operated in an image capture mode. In such cases, a partial actuation may cause the device 100 to initiate a focusing operation, or lock an exposure setting for image capture. When the complete actuation is detected (e.g., the binary or momentary switch is actuated), the device 100 may capture an image with one of the onboard cameras. Other functions may also be initiated in response to partial and/or complete actuation of the button, including other image-capture functions, or other device or application functions. For example, a partial actuation may initiate a scrolling operation (e.g., scrolling through items in a displayed list), and a complete actuation may initiate a selection of a selected item in the list. In some cases, the button 155 of the device 140 includes both a dome switch (or other binary or momentary type switch) and a strain-based sensing system. In some cases, one or more other buttons of the device 140 include both a dome switch (or other binary or momentary type switch) and a strain-based sensing system.

In some cases, one or more of the buttons 152, 156, 155, and 157 may use touch-sensing systems, such as capacitive touch-sensing systems, to detect inputs. For example, the button member of a button (e.g., the movable component that a user presses in order to actuate or provide an input to the button) may include a touch-sensing element positioned thereon. A button equipped with a touch-sensing element may detect various types of touch-based inputs, including static touch inputs (e.g., a finger touching the touch-sensitive button surface), dynamic touch inputs (e.g., a finger sliding along the touch-sensitive button surface, also referred to as gesture or swipe inputs), or the like.

In some cases, the button 155 may include a touch-sensing element 161 to detect such touch-based inputs. The device 140 may perform various operations in response to detecting touch-based inputs. Continuing the example above, when the device 140 is being operated in an image capture mode, a static touch input may initiate a focusing or exposure lock operation, while a dynamic or swipe touch input may initiate a zoom operation (e.g., swiping in one direction may initiate a zoom-in operation, and swiping in the opposite direction may initiate a zoom-out operation).

In some cases, the touch-sensing element 161 may detect the location of a touch input on the button 155 during a button actuation, and the device may perform different actions based on the location of the touch. For example, if the button 155 is actuated with a press input at a first location on the button 155 (e.g., at one end of the button 155, as detected by the touch-sensing element 161), the device may perform a first action (e.g., a zoom-in operation), and if the button 155 is actuated with a press input at a second location on the button 155 (e.g., at an opposite end of the button 155, as detected by the touch-sensing element 161), the device may perform a second action different from the first action (e.g., a zoom-out operation).

In some cases, the touch-sensing element 161 may detect whether an input to the button 155 is applied with a single finger or two fingers, and may perform different operations in response. For example, if the button 155 is actuated with a single finger (as detected by the touch-sensing element 161), the device may perform a first action (e.g., capture a single image), and if the button 155 is actuated with multiple fingers (as detected by the touch-sensing element 161), the device may perform a second action different from the first action (e.g., capture a sequence of images for the duration of the actuation, or initiate a video capture operation).

Other sensing techniques may also be used to detect inputs to the buttons. In some cases, a switch or other input device is used in place of one or more of the buttons.

As noted above, the button 155 may be force- and/or pressure-sensitive (e.g., able to detect variable force inputs) and can produce multiple controls or outputs based on amount of force input, presence of touch, location of touch, movement of touch (gesture). The particular operation that is initiated in response to any given button input may vary in accordance with (e.g., in proportion to) an amount of applied force. In some cases, a force-based input without a detected touch input at the touch-sensing element 161 may suppress an action or be ignored by the device. The button 155 may also be paired with one or more other buttons for designated operations or commands (e.g., the device may perform certain operations in response to detecting simultaneous inputs at multiple buttons or certain sequences of inputs at multiple buttons).

As described in several examples above, the button 155 may be operable to initiate or control image capture functions and operations. For example, a light touch of the button 155 (e.g., a sensed touch input without a force, or with a force that satisfies a first force condition corresponding to a slight deflection of the button) may initiate focus and light metering operations, and a larger force or deflection of the button (e.g., satisfying a second force condition) may initiate an image or video capture operation. Additionally, different haptic outputs may be produced in response to detecting different inputs at the button 155 and/or in response to the different operations that are initiated by the button inputs.

Other example image manipulation and/or camera function controls that can be initiated by inputs to the button 155 (force and/or touch inputs) may include: zooming in or zooming out in response to swipe inputs on the button surface in different directions; increasing or decreasing volume output in response to swipe inputs on the button surface in different directions; capturing a single image or a series of multiple images in response to different force inputs (e.g., single image for a light press, multiple images for a harder press). In such cases, different haptic outputs may be produced in response to detecting different inputs at the button 155 and/or in response to the different operations that are initiated by the button inputs.

The button 155 can also cause the device to perform other functions that are either tied to the operation of the device or set in response to operation of a particular application or use mode on the phone. For example, inputs to the button 155 may cause the device to perform operations such as: selecting one or more alert suppression (mute) modes; verifying purchase or verify application command; controlling timer commands including watch-related operations; providing input to games such as throttle control or other continuously variable inputs; initiating hard and/or soft reset of the device; initiating user programmable operations; and launching or terminating applications. In some cases, the particular operation of the button may be user programmable or selectable. For example, a user may select what functions or operations are initiated in response to various force inputs, gesture inputs, and touch inputs. The user may also establish different input schemes for different device modes. For example, the user may map force, touch, and gesture inputs to a first set of functions when the device is operating in a first mode (e.g., when a first application is being executed), and may map force, touch, and gesture inputs to a second set of functions when the device is operating in a second mode (e.g., when a second application is being executed).

In some cases, the operation of the button 155 may change based on the orientation of the device. For example, if the device is being held in a vertical or "portrait" orientation, the force, touch, and gesture inputs may map to a first set of functions, and if the device is being held in a horizontal or "landscape" orientation, the force, touch, and gesture inputs may map to a second set of functions.

The button 155 may also be used to initiate stereoscopic image or video capture. In some cases, the selection of a stereoscopic image capture mode (or switching between stereoscopic and non stereoscopic image modes) may be controlled by operation of the button 155 or other device inputs (e.g., other buttons, touch-screen inputs, etc.). In some cases, the ability to select a stereoscopic image mode (or switch between a stereoscopic image mode and other image modes) with the button 155 may be dependent on the orientation of the device.

FIG. 2 depicts an exploded view of an example electronic device. In particular, FIG. 2 depicts an exploded view of a device 200, showing various components of the device 200 and example arrangements and configurations of the components. The device 200 may be an embodiment of the device 100, and the description of the various components and elements of the device 100 of FIGS. 1A and 1B may also be applicable to the device 200 depicted in FIG. 2. A redundant description of some of the components is not repeated herein for clarity.

As shown in FIG. 2, the device 200 includes a cover 202 (e.g., a front cover), which may be formed from or include a transparent or optically transmissive material. In some cases, the cover 202 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 202 include, without limitation, sapphire, ceramic, glass-ceramic, crystallizable glass materials, and plastic (e.g., polycarbonate). The cover 202 may be formed as a monolithic or unitary sheet. The cover 202 may also be formed as a composite of multiple layers of different materials, coatings, and other elements. In this example, the cover 202 may be formed from a glass-ceramic material. A glass-ceramic material may include both amorphous and crystalline or non-amorphous phases of one or more materials and may be formulated to improve strength or other properties of the cover 202. A glass-ceramic material may be a silica-based glass-ceramic material, such as an aluminosilicate glass-ceramic material or a boroaluminosilicate glass-ceramic material. The glass-ceramic material may be chemically strengthened by ion exchange. In some cases, the cover 202 may include a sheet of chemically strengthened glass or glass-ceramic having one or more coatings including an anti-reflective (AR) coating, an oleophobic coating, or other type of coating or optical treatment. In some cases, the cover 202 includes a sheet of material that is less than 1 mm thick. In some cases, the sheet of material is less than 0.80 mm. In some cases, the sheet of material is approximately 0.60 mm or less. The cover 202 may be chemically strengthened using an ion exchange process to form a compressive stress layer along exterior surfaces of the cover 202.

The cover 202 extends over a substantial entirety of the front surface of the device and may be positioned within an opening defined by a housing structure 210. As described in more detail below, the edges or sides of the cover 202 may be surrounded by a protective flange or lip of the housing structure 210 without an interstitial component between the edges of the cover 202 and the respective flanges of the housing structure 210. This configuration may allow an impact or force applied to the housing structure 210 to be transferred to the cover 202 without directly transferring shear stress through the display 203 or frame 204.

As shown in FIG. 2, the display 203 is coupled to an internal surface of the cover 202. The display 203 may include an edge-to-edge organic light-emitting diode (OLED) display that measures 6.86 inches corner-to-corner or 6.27 inches corner-to-corner. The perimeter or non-active area of the display 203 may be reduced to allow for very thin device borders around the active area of the display 203. In some cases, the display 203 allows for border regions of 1.5 mm or less. In some cases, the display 203 allows for border regions of 1 mm or less. In one example implementation, the border region is approximately 0.9 mm. The display 203 may have a relatively high pixel density of approximately 460 pixels per inch (PPI) or greater. The display 203 may use a low temperature polycrystalline silicone (LTPS) or low temperature polycrystalline oxide (LTPO) backplane.

The display 203 may have an integrated (on-cell) touch-sensing system. For example, an array of electrodes (or other touch-sensing components) that are integrated into the OLED display may be time and/or frequency multiplexed in order to provide both display and touch-sensing functionality. The electrodes may be configured to detect a location of a touch, a gesture input, multi-touch input, or other types of touch input along the external surface of the cover 202. In some cases, the display 203 includes another type of display element, such as a liquid-crystal display (LCD) without an integrated touch-sensing system. That is, the device 200 may include one or more touch- and/or force-sensing components or layers that are positioned between the display 203 and the cover 202.

The display 203, also referred to as a display stack, may include always-on-display (AOD) functionality. For example, the display 203 may be configurable to allow designated regions or subsets of pixels to be displayed when the device 200 is powered on such that graphical content is visible to the user even when the device 200 is in a low-power or sleep mode. This may allow the time, date, battery status, recent notifications, and other graphical content to be displayed in a lower-power or sleep mode. This graphical content may be referred to as persistent or always-on graphical output. While some battery power may be consumed when displaying persistent or always-on graphical output, the power consumption is typically less than during normal or full-power operation of the display 203. This functionality may be enabled by only operating a subset of the display pixels and/or at a reduced resolution in order to reduce power consumption by the display 203.

The display 203 may include multiple layers, including touch-sensing layers or components, optional force-sensing layers or components, display layers, and the like. The display 203 may define a graphically active region in which graphical outputs may be displayed. In some cases, portions of the display 203 may include graphically inactive regions, such as portions of the display layers that do not include active display components (e.g., pixels) or are otherwise not configured to display graphical outputs. In some cases, graphically inactive regions may be located along the peripheral borders or other edges of the display stack 203.

As shown in FIG. 2, the device 200 may also include a molded frame member 204, also referred to simply as a molded frame 204, that is positioned below the cover 202 and that extends around at least an outer periphery of the display 203. The molded frame 204 may at least partially encapsulate the edges of the display 203, and may define a structural feature that provides strength and rigidity to the cover 202 and the display 203, and that serves as a mounting structure to couple the cover 202 to a housing (e.g., the housing structure 210).

The molded frame 204 may be produced by molding a moldable material onto a subassembly that includes the cover 202, the display 203, and optionally other structural components. The subassembly may be positioned in a mold or other fixture, and a flowable material may be introduced into a mold cavity such that the material flows around the edges of the display 203, contacts an interior surface of the cover 202, and optionally engages other components of the subassembly (e.g., a back plate that covers the display 203 and acts as a shield and/or support structure for the display and cover). The flowable material then hardens to form the molded frame 204. As a result of the hardening, the molded frame 204 (e.g., an overmolded frame) will become secured to the display 203, the cover 202, and other components of the subassembly (e.g., via mechanical interlocking and/or adhesive bonding).

The molded frame 204 may be attached to a lower or inner surface of the cover 202. A portion of the molded frame 204 may extend below the display 203 and may attach the cover 202 to the housing structure 210. Because the display 203 is attached to a lower or inner surface of the cover 202, the molded frame 204 may also be described as attaching both the display 203 and the cover 202 to the housing structure 210.

The cover 202, display stack 203, and molded frame 204 may be part of a front cover assembly 201 of the device 200. The front cover assembly 201 (and more particularly the cover 202 of the front cover assembly 201) may define a front exterior surface of the device. The cover 202 may define an interior surface opposite the exterior surface.

The front cover assembly 201 may be assembled as a subassembly, which may then be attached to a housing component. For example, as described herein, the display 203 may be attached to the cover 202 (e.g., via a transparent adhesive), and the molded frame 204 may be formed around a periphery of the display stack 203. The front cover assembly 201 may then be attached to a housing component of the device 200 by mounting and adhering the molded frame 204 to a ledge defined by the housing component.

The device 200 also includes a speaker module 250 that is configured to output sound via a speaker port. The speaker port may be positioned in and/or at least partially defined by a recess of the cover 202. As described herein, a trim piece may be positioned at least partially in the recess to facilitate the output of sound while also inhibiting the ingress of debris, liquid, or other materials or contaminants into the device 200. Output from the speaker module 250 may pass through an audio passage or acoustic path defined at least in part by the speaker module 250 itself, and the trim piece. In some cases, part of the acoustic path (e.g., between the speaker module 250 and the trim piece) is defined by the housing structure 210 and/or a molded material that is coupled to the housing structure 210. For example, a molded material (e.g., a fiber-reinforced polymer) may be molded against a metal portion of the housing structure 210 (e.g., the housing component 213, described herein). The molded material may also form one or more intermediate elements, such as joint structures, that also structurally join housing components together (e.g., the joint structures 218). A port or passage (e.g., a tube-like tunnel) may be defined through the molded material to acoustically couple the speaker module 250 to the trim piece and/or the recess more generally, thereby directing sound from the speaker module 250 to the exterior of the device 200.

As shown in FIG. 2, the device 200 also includes one or more cameras, optical emitters, and/or sensing elements that are configured to transmit signals, receive signals, or otherwise operate along the front surface of the device. In this example, the device 200 includes a front camera 206 that includes a high-resolution camera sensor. The front camera 206 may have a 12-megapixel resolution sensor with optical elements that provide an 85° field of view and an aperture number of f/1.9. The front camera 206 may include autofocus functionality in which one or more of the lens elements move (e.g., up to about 100 microns perpendicular to the cover) in order to focus an image on the camera's sensor. In some cases, the autofocusing front-facing camera is capable of providing continuous autofocus functionality during video capture. The device 200 also includes an optical facial recognition system 252 that includes an infrared light projector (for projecting light), and an infrared light sensor that is configured to sense an array of depth points or regions along the face of the user. The array of depth points may be characterized as a unique signature or bio-identifier, which may be used to identify and/or authenticate the user and unlock the device 200 (and/or authorize functionality on the device 200 like the purchase of software apps or the use of payment functionality provided by the device 200).

The device 200 may also include one or more other sensors or components. For example, the device 200 may include a front light illuminator element for providing a flash or illumination for the front camera 206. The device 200 may also include an ambient light sensor (ALS) that is used to detect ambient light conditions for setting exposure aspects of the front camera 206 and/or for controlling the operation of the display. The device 200 may also include a proximity sensing system 253 for detecting the proximity of a user or other object to the device 200. In some cases, as described herein, the proximity sensing system 253 detects proximity to other objects through an active region of the display. The proximity sensing system 253 and the optical facial recognition system 252 may be integrated in a common module. In some cases, information from both the proximity sensing system and the ambient light sensor is used to determine ambient light conditions and/or the proximity of objects to the device 200. For example, information from the proximity sensing system may be used to determine whether a detection by the ambient light sensor of low ambient lighting is due to low ambient lighting, or an object locally or temporarily covering the ambient light sensor (e.g., a finger providing a touch input or a palm during a typing input). Information from both sensing systems may be used to disambiguate between potentially ambiguous conditions, and generally improve the accuracy with which the device can sense or detect certain conditions.

The display 203 may include one or more holes extending through the display to accommodate the front camera 206, the facial recognition system 252, the proximity sensing system 253, and optionally other front-facing sensors or other components. In some cases, the display 203 includes two holes, including a first hole for the front camera 206 and a second hole for the facial recognition system 252 and the proximity sensing system 253. In some cases, the display 203 includes one hole (e.g., a single hole shared by the front camera 206 and the facial recognition system 252). In some cases, the display 203 includes three holes (e.g., a first hole for the front camera 206, a second hole for an emitter of the facial recognition system 252 and optionally the proximity sensing system 253, and a third hole for a receiver of the facial recognition system 252).

FIG. 2 also illustrates one or more cameras, optical emitters, and/or sensing elements that are configured to transmit signals, receive signals, or otherwise operate along the rear surface of the device. As depicted in FIG. 2, these elements may be integrated in a sensor array 260. In this example, the sensor array 260 (or camera array) includes a first camera 263 having a 12-megapixel sensor and a telephoto lens with a 3× optical zoom (or a 5× optical zoom) and an aperture number of f/2.8. The sensor array 260 also includes a second camera 262 having a 48.8-megapixel sensor with a wide-angle lens having an aperture number of f/1.7. The sensor array 260 may also include a third camera 261 having a 48-megapixel sensor and a super-wide camera with a wide field of view (e.g., 120° FOV) and an aperture number of f/2.2. The first, second, and third cameras may include lens-based or sensor-based image stabilization.

The sensor array 260 also includes a light illuminator that may be used as a flash for photography or as an auxiliary light source (e.g., a flashlight). In some cases, the sensor array 260 also includes a microphone, an ambient light sensor, and other sensors that are adapted to sense along the rear surface of the device 200.

The sensor array 260 may also include a depth sensing device 281 (which may correspond to or be an embodiment of the depth sensing device 149, FIG. 1B, or any other depth sensing device described herein) that is able to estimate a distance to objects positioned behind the device 200. The depth sensing device 281 may include an optical sensor that uses time-of-flight or other optical effect to measure a distance between the device 200 and an external object. The depth sensing device 281 may include one or more optical emitters that are adapted to emit one or more beams of light, which may be used to estimate the distance. In some cases, the one or more beams of light are coherent light beams having a substantially uniform wavelength/frequency. A coherent light source may facilitate depth measurements using a time of flight, phase shift, or other optical effect. In some cases, the depth sensing device 281 uses a sonic output, radio output, or other type of output that may be used to measure the distance between the device 200 and one or more external objects. The depth sensing device 281 may be positioned proximate a window (e.g., a region of the rear cover 272 or other component that covers the components of the sensor array 260) through which the depth sensing device 281 may send and/or receive signals (e.g., laser light, infrared light, visible light, etc.).

As shown in FIG. 2, the cameras 261, 262, 263 may be aligned with camera covers 266, 267, 268, respectively. The covers 266, 267, 268 may be formed from a glass or sapphire material and may provide a clear (e.g., transparent or optically transmissive) window through which the cameras 261, 262, 263 are able to capture a photographic image. In other cases, the covers 266, 267, 268 are optical lenses that filter, magnify, or otherwise condition light received by the respective camera 261, 262, 263. The other sensing or transmitting elements of the sensor array 260 may transmit and/or receive signals through a region of the rear cover 272 or through a separate cover that is coupled to the rear cover 272. As shown in FIG. 2, the covers 266, 267, 268 may extend beyond the exterior surface of the cover 272, and may define a recess along the interior side of the cover 272, such that the lenses or other elements of the cameras 261, 262, 263 can extend into the respective recesses. In this way, the device 200 may accommodate a larger lens or other elements of the cameras 261, 262, 263 than would be possible if the recess were not provided. In some cases, trim assemblies 269 may be coupled to the rear cover 272 and may support the covers 266, 267, 268.

The device 200 also includes a battery 230. The battery 230 provides electrical power to the device 200 and its various systems and components. The battery 230 may include a 4.45 V lithium-ion battery that is encased in a rigid metal enclosure (or a flexible foil defining a pouch). The battery 230 may include a rolled electrode configuration, sometimes referred to as a "jelly roll" or a folded or stacked electrode configuration. In the case of a rigid metal enclosure, the enclosure may include a two-part enclosure, in which the two parts define an internal volume that encloses the electrodes and an electrolyte (e.g., a liquid), or another suitable battery formulation. The first and second parts of the enclosure may be attached together via welding, soldering, brazing, adhesive, or another suitable attachment technique. In some cases, the battery enclosure defines one or more pass-through terminals to allow conductive coupling to an internal electrode (e.g., a positive electrode). In some cases, the battery enclosure is conductively coupled to an internal electrode (e.g., a negative electrode), and the battery enclosure itself acts as a negative or "common" electrode for the power circuitry of the device 200.

The battery 230 may be attached to the device 200 (e.g., to a chassis section 219, which may also be referred to as a mid-chassis section or simply a chassis) with one or more adhesives and/or other attachment techniques. In one example, the battery 230 may be attached to the chassis section 219, or another structure of the device 200, with an electrically debondable adhesive (e.g., an adhesive whose adhesion strength can be selectively reduced in response to an electric charge). In such cases, the adhesive may include conductive terminals that conductively contact the electrically debondable adhesive. When an electric current is applied to the electrically debondable adhesive (EDA) (e.g., by a user during a battery replacement operation), the adhesion strength of the adhesive may be reduced until the battery releases from the adhesive and/or the chassis section 219, or until the adhesion strength is sufficiently low that the battery can be easily removed by a user (e.g., without damage to the battery or other device components).

The battery 230 may be recharged via a charging port 232 (e.g., from a charging cable plugged into the charging port 232 through a charging access opening 226), and/or via a wireless charging system 240. The battery 230 may be coupled to the charging port 232 and/or the wireless charging system 240 via battery control circuitry that controls the power provided to the battery and the power provided by the battery to the device 200. The battery 230 may include one or more lithium-ion battery cells or any other suitable type of rechargeable battery element. The charging port 232 may be or may include a connector module.

The wireless charging system 240 may include a coil that inductively couples to an output or transmitting coil of a wireless charger. The coil may provide current to the device 200 to charge the battery 230 and/or power the device. In this example, the wireless charging system 240 includes a coil assembly 242 that includes multiple wraps of a conductive wire or other conduit that is configured to produce a (charging) current in response to being placed in an inductive charging electromagnetic field produced by a separate wireless charging device or accessory. The coil assembly 242 also includes or is associated with an array of magnetic elements that are arranged in a circular or radial pattern. The magnetic elements may help to locate the device 200 with respect to a separate wireless charging device or other accessory. In some implementations, the array of magnets also help to radially locate, orient, or "clock" the device 200 with respect to the separate wireless charging device or other accessory. For example, the array of magnets may include multiple magnetic elements having alternated magnetic polarity that are arranged in a radial pattern. The magnetic elements may be arranged to provide a magnetic coupling to the separate charging device in a particular orientation or set of discrete orientations to help locate the device 200 with respect to the separate charging device or other accessory. This functionality may be described as self-aligning or self-locating wireless charging. As shown in FIG. 2, the device 200 also includes a magnetic fiducial 244 for helping to locate the separate wireless charging device or accessory. In one example, the magnetic fiducial 244 is adapted to magnetically couple to a separate wireless charging device or other accessory. By coupling to the separate wireless charging device/accessory, the rotational alignment of the device 200 and the separate wireless charging device/accessory may be maintained with respect to an absolute or single position. Also, by magnetically coupling the charging device/accessory to the rear surface of the device 200, the charging device or other accessory may be more securely coupled to the device 200.

In some implementations, the wireless charging system 240 includes an antenna or other element that detects the presence of a charging device or other accessory. In some cases, the charging system includes a near-field communications (NFC) antenna that is adapted to receive and/or send wireless communications between the device 200 and the wireless charger or other accessory. In some cases, the device 200 is adapted to perform wireless communications to detect or sense the presence of the wireless charger or other accessory without using a dedicated NFC antenna. The communications may also include information regarding the status of the device, the amount of charge held by the battery 230, and/or control signals to increase charging, decrease charging, start charging, and/or stop charging for a wireless charging operation.

The wireless charging system 240 may also include one or more graphite layers (or other thermally conductive layers) that improve the thermal performance of the wireless charging system 240 and/or the device itself. For example, the graphite layers on the wireless charging system 240 may diffuse and/or distribute heat from the coil during charging operations. In some cases, the graphite layers may absorb and diffuse heat from other components, such as the battery 230.

The device 200 may also include a speaker system 224. The speaker system 224 may be positioned in the device 200 so that a respective port 225 is aligned with or otherwise proximate an audio output of the speaker system 224. Accordingly, sound that is output by the speaker system 224 exits the housing structure 210 via the respective port 225. The speaker system 224 may include a speaker positioned in a housing that defines a speaker volume (e.g., an empty space in front of or behind a speaker diaphragm). The speaker volume may be used to tune the audio output from the speaker and optionally mitigate destructive interference of the sound produced by the speaker.

The device 200 may also include a haptic actuator 222. The haptic actuator 222 may include a movable mass and an actuation system that is configured to move the mass to produce a haptic output. The actuation system may include one or more coils and one or more magnets (e.g., permanent and/or electromagnets) that interact to produce motion. The magnets may be or may include recycled magnetic material.

When the coil(s) are energized, the coil(s) may cause the mass to move, which results in a force being imparted on the device 200. The motion of the mass may be configured to cause a vibration, pulse, tap, or other tactile output detectable via an exterior surface of the device 200. The haptic actuator 222 may be configured to move the mass linearly, though other movements (e.g., rotational) are also contemplated. The mass may move along the x direction. Other types of haptic actuators may be used instead of or in addition to the haptic actuator 222.

In some cases, the haptic actuator 222 is configured to produce a first haptic output in response to the device detecting that a force input applied to a button (e.g., a button with a strain- or other force-sensing element) satisfies a force threshold, and is also configured to produce a second haptic output in response to a notification event (e.g., an event that is associated with a haptic notification, or for which the device produces a haptic output upon occurrence). Thus, the same haptic actuator 222 may be used to produce haptics for notifications, as well as to simulate button presses or otherwise indicate that an input satisfying a force threshold has been received.

The device 200 also includes a circuit board assembly 220. The circuit board assembly 220 may include a substrate, and processors, memory, and other circuit elements coupled to the substrate. The circuit board assembly 220 may include multiple circuit substrates that are stacked and coupled together in order to maximize the area available for electronic components and circuitry in a compact form factor. The circuit board assembly 220 may include provisions for a subscriber identity module (SIM). The circuit board assembly 220 may include electrical contacts and/or a SIM tray assembly for receiving a physical SIM card and/or the circuit board assembly 220 may include provisions for an electronic SIM. Where an electronic SIM is used, a SIM tray may be omitted from the device 200 (e.g., the device may not include openings, trays, slots, doors, or other mechanical means to insert or otherwise access a SIM card). The circuit board assembly 220 may be wholly or partially encapsulated to reduce the chance of damage due to ingress of water or other fluid. As described herein, thermal bridges may be applied to the circuit board assembly 220 to help transfer heat from the circuit board assembly 220 to other regions or components of the device 200 (e.g., to the chassis section 219). The thermal bridges may include graphite-wrapped foams or graphite-coated loops, in which the loop or the foam structure maintains the graphite (which provides thermal conductivity) in contact with the circuit board assembly 220 and the other components.

The circuit board assembly 220 may also include wireless communication circuitry, which may be operably coupled to and/or otherwise use housing components 211, 212, 213, 214, 215, or 216 (or portions thereof) as radiating members to provide wireless communications. The circuit board assembly 220 may also include components such as accelerometers, gyroscopes, near-field communications circuitry and/or antennas, compasses, and the like. In some implementations, the circuit board assembly 220 may include a magnetometer that is adapted to detect and/or locate an accessory. For example, the magnetometer may be adapted to detect a magnetic (or non-magnetic) signal produced by an accessory of the device 200 or other device. The output of the magnetometer may include a direction output that may be used to display a directional indicia or other navigational guidance on the display 203 in order to guide the user toward a location of the accessory or other device.

The device 200 may also include one or more pressure transducers that may be operable to detect changes in external pressure in order to determine changes in altitude or height. The pressure sensors may be externally ported and/or positioned within a water-sealed internal volume of the housing structure 210. The output of the pressure sensors may be used to track flights of stairs climbed, a location (e.g., a floor) of a multi-story structure, movement performed during an activity in order to estimate physical effort or calories burned, or other relative movement of the device 200. A pressure transducer may be positioned in a module 237 that is in fluidic communication with the exterior environment through ports 225 in the housing structure 210. The module 237 may include additional components, such as a microphone and a barometric vent (e.g., to allow pressure equalization between the interior of the device 200 and the exterior environment, while inhibiting water ingress).

The circuit board assembly 220 may also include global positioning system (GPS) electronics that may be used to determine the location of the device 200 with respect to one or more satellites (e.g., a Global Navigation Satellite System (GNSS)) in order to estimate an absolution location of the device 200. In some implementations, the GPS electronics are operable to utilize dual frequency bands. For example, the GPS electronics may use L1 (L1C), L2 (L2C), L5, L1+L5, and other GPS signal bands in order to estimate the location of the device 200.

As shown in FIG. 2, the housing may include a cover 272 (e.g., back or rear cover 272) that may define a substantial entirety of the rear surface of the device 200. The rear cover 272, the front cover 202, and the housing structure 210 may at least partially define an enclosure of the device 200, which may define an internal volume in which components of the device 200 are positioned. The cover 272 may be formed from or include a transparent or optically transmissive material. For example, the cover 272 may include a substrate formed from or including a glass material or other suitable material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). A glass-ceramic material may be a silica-based glass-ceramic material, such as an aluminosilicate glass-ceramic material or a boroaluminosilicate glass-ceramic material. The glass-ceramic material may be chemically strengthened by ion exchange. The substrate may have portions that are less than 1 mm thick. In some cases, the substrate has portions that are less than 0.80 mm. In some cases, the substrate has portions that are approximately 0.60 mm or less. The cover 272 may have a uniform thickness or, in some cases, may have a thickened or raised portion that surrounds the camera covers 266, 267, 268. The cover 272 may be machined (e.g., ground) into a final shape before being polished and/or textured to provide the desired surface finish. The texture may be specially configured to provide a matte appearance while also being resistant to collecting a buildup of skin, lint, or other debris.

The cover 272 may be formed of a colored optically transmissive material, and may include a coating along an interior side of the cover 272 that, together with the color (or lack of color) of the optically transmissive material, define the color of the rear side of the device. For example, a coating along an interior surface of the cover may include one or more color layers. The color layer may include a colorant such as a pigment or dye and may have a distinct hue or may be near neutral in color. Alternately, or additionally, the coating may include one or more opaque layers applied to the interior surface of the substrate (or otherwise positioned along the interior side of the substrate) to provide a particular appearance to the back side of the device. The opaque layer(s) may include a sheet, ink, dye, or combinations of these (or other) layers, materials, or the like and in some cases may be optically dense.

The cover 272 may be part of a rear cover assembly 273. The rear cover assembly 273 may be coupled to the housing structure 210. In some cases, the rear cover assembly 273 includes components such as the camera covers 266, 267, 268, the trim assemblies (e.g., trim assemblies 269) components of a wireless charging system, structural components (e.g., frames), mounting clips, and/or other components, systems, subsystems, and/or materials. The rear cover assembly 273 may be removable from the housing structure 210 to facilitate repair and/or replacement of the rear cover assembly 273 and/or internal components of the device 200.

The rear cover assembly 273 may include a support plate 283 coupled to an interior surface of the rear cover 272. The support plate 283 may be coupled to the interior surface of the rear cover via an adhesive.

The support plate 283 may be formed of metal, and may define a structural mounting surface for components of the rear cover assembly 273 (e.g., a wireless charging system). In some cases, the trim assemblies 269 are secured to the support plate, such as via welding, soldering, brazing, or other suitable attachment means. The support plate 283 may be a unitary metal structure that spans substantially an entire interior surface of the rear cover 272 (e.g., including a wireless charger region and a rear-facing camera region). In other examples, the support plate 283 may be defined by multiple separate metal components 282-1, 282-2 (e.g., a first metal component 282-1 proximate the wireless charger region, and a second metal component 282-2 at the rear-facing camera region). Where the support plate 283 is formed from multiple separate metal components 282, the metal components may be the same metal (e.g., both aluminum, or both stainless steel), or they may be different materials (e.g., the first metal component 282-1 may be formed of aluminum while the second metal component 282-2 may be stainless steel). The first and second metal components 282-1, 282-1 may be attached together. For example, the second metal component 282-2 may define tabs that overlap and are welded, soldered, brazed, or otherwise attached to the first metal component 282-1. Attaching the first and second metal components 282-1, 282-2 may conductively couple the components, and may also increase the structural rigidity and/or integrity of the support plate 283 and the rear cover assembly 273.

The support plate 283 may be thermally coupled to other device components, such as via thermal bridges, as described herein. Example thermal bridges include graphite wrapped foam (e.g., a graphite layer wrapped around a foam or other compliant material), conductive loops (e.g., a graphite or other thermally conductive layer on a loop structure formed by a substrate), direct metal-to-metal contacts, thermal paste or thermal gel, or the like. Thermal bridges may thermally couple the support plate 283 to components such as the circuit board assembly 220, the battery 230, and the sensor array 260. The support plate 283 may be formed of a thermally conductive material, such as a metal (e.g., aluminum), and heat from the other components may be transferred to the support plate 283. The support plate 283 may therefore act as a heat sink, and may also generally distribute the heat throughout the support plate 283, which may help reduce peak device or component temperatures.

The rear cover assembly 273 may also include attachment features, such as tabs or clips, that engage complementary attachment features of another component (e.g., a housing segment 217, which may be a subassembly) to couple the rear cover assembly 273 to the housing segment 217. The attachment features may be unitary with the support plate 283 (e.g., the support plate and the attachment features may be defined by a single piece of metal).

Similar to the description of the cover 202, the cover 272 may be positioned at least partially within an opening defined in the housing structure 210. Also, the edges or sides of the cover 272 may be surrounded by a protective flange or lip of the housing structure 210 without an interstitial component between the edges of the cover 272 and the respective flanges of the housing structure 210. The cover 272 is typically chemically strengthened using an ion exchange process to form a compressive stress layer along exterior surfaces of the cover 272.

The housing structure 210 may include a housing segment 217 (e.g., a middle housing segment 217) that includes the housing components 211 and 214 and a chassis section 219 (e.g., a metal plate-like structure that extends between the housing components 211 and 214, also referred to simply as a chassis 219). The housing component 211 may define a first wall section, which defines at least a portion of a first side exterior surface of the device, and the housing component 214 may define a second wall section which defines at least a portion of a second side exterior surface of the device opposite to the first side exterior surface. The chassis 219, which extends between the first wall section and the second wall section (defined by the housing components 211, 214) may define a mounting structure for components of the device 200. For example, as described herein, components such as the circuit board assembly 220, battery 230, sensor array 260, speaker module 250, speaker system 224, haptic actuator 222, and the like, may be coupled to the chassis 219 (e.g., along a rear-facing side of the chassis 219). By coupling components to the chassis 219 instead of the front cover assembly 201 and/or the rear cover 272, the cost and complexity of the front cover assembly 201 and rear cover assembly 273 may be reduced, and removal and/or replacement of the front cover assembly 201 and/or rear cover 272 may be simplified. The chassis 219 may also define one or more holes extending therethrough to facilitate the coupling of components on one side of the chassis 219 (e.g., the display 203 and/or sensors of the front cover assembly 201) to components on the other side of the chassis 219 (e.g., the circuit board assembly 220). Additionally, as noted above, the chassis 219 may also be thermally coupled to components of the device 200, such as the circuit board assembly 220, to conduct heat away from the thermally coupled components.

The chassis 219 may provide thermal performance functionality for the device 200. For example, heat-generating components (e.g., the circuit board assembly 220 and/or the components thereon) may be thermally coupled to the chassis 219, such that heat from the circuit board assembly 220 may be transferred to the chassis 219. Moreover, the chassis 219 and the thermal coupling between the circuit board assembly 220 and the chassis 219 may be configured to preferentially transfer heat away from the outer walls of the housing structure 210 (or otherwise inhibit heat from transferring to the outer walls). For example, thermal bridges (which may also be referred to as thermal conduits or thermal coupling components) may thermally couple the circuit board assembly 220 to the chassis 219, and they may be preferentially positioned towards the middle of the device (e.g., along the x direction), such that heat tends to be transferred into the chassis 219 away from the side walls. In some cases, the thermal bridges are positioned about 5 mm, about 10 mm, about 15 mm, or about 20 mm away (measured along the x direction) from the nearest housing component. The chassis 219 may also include thermal breaks that inhibit heat transfer from the chassis 219 to the housing components. For example, one or more holes may be formed through the chassis 219 between the housing components and the thermal bridges (or other areas where heat is transferred to the chassis 219) to inhibit heat transfer to the housing components. These and other thermal management features are described herein.

In some cases, instead of being formed from multiple separate housing components attached together (e.g., a housing subassembly), the housing segment 217 may be a unitary structure formed from a single piece of material. For example, the unitary structure of the housing segment 217 may be a metal, such as aluminum, steel, titanium, or the like, and may be formed by extrusion, machining, and/or combinations of these and other forming processes. Thus, the housing components 211 and 214 (which define side exterior surfaces of the device 200) and the chassis 219 may be different portions of a single piece of material. In some cases, the housing segment 217 may be formed from separate components that are attached to one another. For example, the housing components 211, 214 may be formed as separate components from the chassis 219, and then the housing components 211, 214 may be welded, brazed, soldered, adhered, or otherwise attached to the chassis 219 to form the housing segment 217. As described herein, the housing components 211, 214 may be bi-metal clad structures (e.g., a titanium cladding over an aluminum core), and the chassis 219 may be aluminum. The aluminum core portions of the clad structures may be welded to the aluminum chassis 219.

As described above, the housing structure 210 may include housing components 212, 213, 215, and 216 structurally joined together and/or to the housing segment 217 (the middle housing segment 217) via joint structures 218. The joint structures 218 (e.g., the material of the joint structures) may extend over inner surfaces of the housing components. More particularly, a portion of the joint structures 218 may contact, cover, encapsulate, and/or engage with retention features of the housing components that extend from the inner surfaces of the housing components (including, for example, from the housing components of the middle housing component 214). As the housing components 214 and 211 are coupled to a housing segment 217 that includes the chassis 219, the joint structures 218 may also function to structurally join the housing components 212, 213, 215, and 216 to the housing segment 217. When coupled via the joint structures 218, the housing segment 217, the housing components 212, 213, 215, and 216, and the joint structures 218 may define a main housing assembly that defines the exterior side surfaces of the device 200 as well as the chassis 219 within the device.

Housing components 211, 212, 213, 214, 215, and 216 may be formed from aluminum, stainless steel, or other metal. In some cases, housing components 211, 212, 213, 214, 215, and 216 may be formed from a clad metal structure. For example, the housing components may include a core portion formed from a first metal (e.g., aluminum) and a cladding portion formed from a second metal (e.g., titanium, stainless steel). The cladding portion may define exterior surfaces of the housing components. The housing components may be formed by co-extruding the core portion and the cladding portion to form a clad precursor material. The precursor material may then be formed into the housing components (e.g., extrudate members) using various processes. For example, the precursor material may be forged and/or machined to define the overall shape and the mechanical features of the housing components, and then subjected to polishing, texturing, and/or coating operations.

In some cases, where holes are formed through the cladding and core portions of a clad housing component (e.g., for buttons, audio ports, charging ports, etc.), a seam between the cladding portion and the core portion may exist within the hole (e.g., along the hole surface). In some cases, the seam may be covered with another material, such as a paint, adhesive, polymer layer, or the like. Covering the seam may help prevent galvanic corrosion from occurring at the seam due to contact with water or another liquid.

In some cases, a metal deposition process is used to produce holes, through a clad housing component, that do not include seams along the hole surface. For example, a hole through the housing may be formed by first forming a hole only through the core material. Additional cladding material is then added into the hole (such as via a direct metal deposition process), such that the cladding material substantially fills the hole through the core portion. A final hole is then formed through the cladding material as well as the additional cladding material (which was added by the metal deposition process), such that the entire hole surface through the housing component is formed from cladding material (e.g., the core material does not define the hole surface). In this way, no seam between different metals exists in the hole, thereby mitigating the risk of galvanic corrosion within the hole.

The mechanical features may include interlock structures for interlocking with joint structures (e.g., to mechanically couple housing components together), attachment features (e.g., holes for receiving fasteners), mounting surfaces, antenna feed and ground points, and the like. In some cases, the exterior surface of the housing components are subjected to a texturing operation, such as grinding, lapping, machining, ablation, blasting (e.g., sand blasting, bead blasting), etching (via mechanical etching, laser etching, chemical etching, or the like), or the like. Some or all surfaces of the housing components may also be coated, such as using PVD or CVD operations. For housing components that are curved (e.g., the components 212, 213, 215 and 216, which define corner portions of the housing structure 210), the clad precursor material may be bent prior to other processing operations such as machining, forging, polishing, grinding, coating, and the like. After formation, the housing components (including the housing segment 217) may be inserted into a mold and joined together by injection molding a moldable material to form the joint structures 218 that engage with the housing components and secure the components together to define the housing structure 210.

The housing segment 217 may be formed by welding the housing components 211, 214 to the chassis section 219. The chassis section 219 may be formed from metal, such as aluminum, and may be welded to an aluminum core portion of the housing components 211, 214. In some cases, the chassis section 219 may be soldered, brazed, or adhered to the housing components 211, 214 instead of or in addition to welding. The mid-chassis section 219 may be conductive and structurally coupled to the housing components 211, 214.

As described herein, the housing components 212, 213, 215, and 216, and the housing components 211, 214, may provide a robust and impact resistant sidewall for the device 200. In the present example, the housing components 212, 213, 215, and 216 and the housing components 211, 214 define a flat sidewall that extends around the perimeter of the device 200. The flat sidewall may include rounded or chamfered edges that define the upper and lower edges of the sidewall of the housing structure 210. The housing components 212, 213, 215, and 216 and the housing components 211, 214 may each have a flange portion or lip that extends around and at least partially covers a respective side of the front and rear covers 202, 272. There may be no interstitial material or elements between the flange portion or lip and the respective side surface of the front and rear covers 202, 272. This may allow forces or impacts that are applied to the housing structure 210 to be transferred to the front and rear covers 202, 272 without affecting the display or other internal structural elements, which may improve the drop performance of the device 200.

The device 200 may also include a button 285 (which may correspond to the button 121 in FIG. 1A) that incorporates a touch sensor on an exterior surface. For example, the button 285 may detect force (or translational or press) inputs, and may also detect touch inputs applied to a button surface. Force inputs may be detected by a strain-sensing system, a switch member, or any other suitable force and/or translation sensor (and/or combinations of sensors, such as a collapsible dome switch in combination with a force sensor). Touch inputs may be detected by a touch-sensing system, such as capacitive touch-sensing systems. For example, the button member of the button 285 (e.g., the movable component that a user presses in order to actuate or provide an input to the button) may include a touch-sensing element positioned thereon. A button equipped with a touch-sensing element may detect various types of touch-based inputs, including static touch inputs (e.g., a finger touching the touch-sensitive button surface), dynamic touch inputs (e.g., a finger sliding along the touch-sensitive button surface, also referred to as gesture or swipe inputs), or the like. In some cases, the button 285 may include a touch-sensing element to detect such touch-based inputs. As described herein, the button 285 may operate in conjunction with a haptic actuation system, such as the haptic actuator 222, to produce tactile outputs in response to a detection of an input at the button 285 (e.g., force inputs, touch inputs, etc.).

As shown in FIG. 2, the device 200 includes one or more antennas that may be adapted to conduct wireless communication using a 5G communication protocol. For example, the device 200 may include an antenna module 247 that may include one or more antenna arrays that may be configured to transmit and receive wireless communication signals through the rear cover 272 and/or through another housing component of the device (e.g., a radio-frequency transmissive component of the device or housing).

The antenna modules may include multiple antenna arrays. For example, the antenna modules may include one or more millimeter-wave antenna arrays. In the case where the antenna modules include multiple millimeter-wave antenna arrays (each of which may include one or more radiating elements), the multiple millimeter-wave antenna arrays may be configured to operate according to a diversity scheme (e.g., spatial diversity, pattern diversity, polarization diversity, or the like). The antenna modules may also include one or more ultra-wideband antennas.

The antenna arrays may be adapted to conduct millimeter-wave 5G communications and may be adapted to use or be used with beam-forming or other techniques to adapt signal reception depending on the use case. The device 200 may also include multiple antennas for conducting multiple-in multiple-out (MIMO) wireless communications schemes, including 4G, 4G LTE, and/or 5G MIMO communication protocols. As described herein, one or more of the housing components 211, 212, 213, 214, 215, and 216 (or portions thereof) may be adapted to operate as antennas for a MIMO wireless communication scheme (or other wireless communication scheme).

Figure 3:
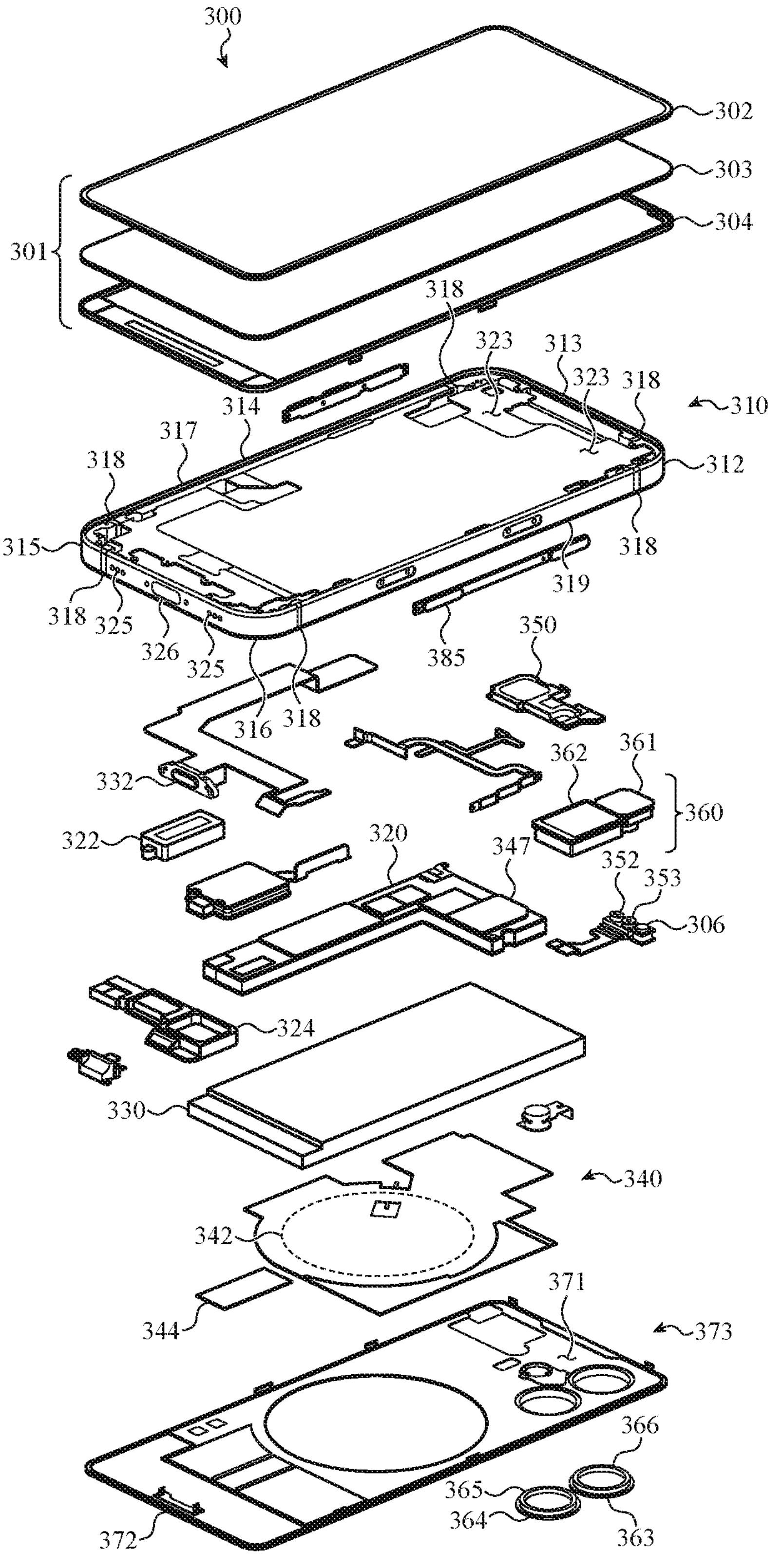
FIG. 3 is exploded view of an example electronic device.

FIG. 3 depicts an exploded view of an example electronic device. In particular, FIG. 3 depicts an exploded view of a device 300, showing various components of the device 300 and example arrangements and configurations of the components. The device 300 may be an embodiment of the device 140, and the description of the various components and elements of device 100 of FIGS. 1A and 1B may also be applicable to the device 300 depicted in FIG. 3. A redundant description of some of the components is not repeated herein for clarity.

As shown in FIG. 3, the device 300 includes a cover 302 (e.g., a front cover), which may be formed from or include a transparent or optically transmissive material. In some cases, the cover 302 is formed from or includes a glass material or other suitable transparent or optically transmissive material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). In this example, the cover 302 may be formed from a glass-ceramic material. A glass-ceramic material may include both amorphous and crystalline or non-amorphous phases of one or more materials and may be formulated to improve strength or other properties of the cover 302. A glass-ceramic material may be a silica-based glass-ceramic material, such as an aluminosilicate glass-ceramic material or a boroaluminosilicate glass-ceramic material. The glass-ceramic material may be chemically strengthened by ion exchange. In some cases, the cover 302 may include a sheet of chemically strengthened material having one or more coatings including an anti-reflective (AR) coating, an oleophobic coating, or other type of coating or optical treatment.

In some cases, the cover 302 includes a sheet of material that is less than 1 mm thick. In some cases, the sheet of material is less than 0.80 mm. In some cases, the sheet of material is approximately 0.60 mm or less, or approximately 0.50 mm or less. The cover 302 may be chemically strengthened using an ion exchange process to form a compressive stress layer along exterior surfaces of the cover 302.

The cover 302 extends over a substantial entirety of the front surface of the device and may be positioned within an opening defined by the housing structure 310. In some cases, the edges or sides of the cover 302 may be surrounded by a protective flange or lip of the housing structure 310 without an interstitial component between the edges of the cover 302 and the respective flanges of the housing structure 310. This configuration may allow an impact or force applied to the housing structure 310 to be transferred to the cover 302 without directly transferring shear stress through the display 303 or frame 304.

As shown in FIG. 3, the display 303 is attached to an internal surface of the cover 302. The display 303 may include an edge-to-edge organic light-emitting diode (OLED) display that measures 15.4 cm (6.1 inches) corner-to-corner. The perimeter or non-active area of the display 303 may be reduced to allow for very thin device borders around the active area of the display 303. In some cases, the display 303 allows for border regions of 1.5 mm or less. In some cases, the display 303 allows for border regions of 1 mm or less. In one example implementation, the border region is approximately 0.9 mm. The display 303 may have a relatively high pixel density of approximately 460 pixels per inch (PPI) or greater. In some cases, the display 303 has a pixel density of approximately 475 PPI. The display 203 may use a low temperature polycrystalline silicon (LTPS) or low temperature polycrystalline oxide (LTPO) backplane The display 303 may have an integrated (on-cell) touch-sensing system. For example, an array of electrodes (or other touch-sensing components) that are integrated into the OLED display may be time and/or frequency multiplexed in order to provide both display and touch-sensing functionality. The electrodes may be configured to detect a location of a touch, a gesture input, multi-touch input, or other types of touch input along the external surface of the cover 302. In some cases, the display 303 includes another type of display element, such as a liquid-crystal display (LCD) without an integrated touch-sensing system. That is, the device 300 may include one or more touch- and/or force-sensing components or layers that are positioned between the display 303 and the cover 302.

The display 303, also referred to as a display stack, may include always-on-display (AOD) functionality. For example, the display 303 may be configurable to allow designated regions or subsets of pixels to be displayed when the device 300 is powered on such that graphical content is visible to the user even when the device 300 is in a low-power or sleep mode. This may allow the time, date, battery status, recent notifications, and other graphical content to be displayed in a lower-power or sleep mode. This graphical content may be referred to as persistent or always-on graphical output. While some battery power may be consumed when displaying persistent or always-on graphical output, the power consumption is typically less than during normal or full-power operation of the display 303. This functionality may be enabled by only operating a subset of the display pixels and/or at a reduced resolution in order to reduce power consumption by the display 303.

The display 303 may include multiple layers, including touch-sensing layers or components, optional force-sensing layers or components, display layers, and the like. The display 303 may define a graphically active region in which graphical outputs may be displayed. In some cases, portions of the display 303 may include graphically inactive regions, such as portions of the display layers that do not include active display components (e.g., pixels) or are otherwise not configured to display graphical outputs. In some cases, graphically inactive regions may be located along the peripheral borders or other edges of the display 303.

As shown in FIG. 3, the device 300 may also include a frame member 304, also referred to simply as a frame 304, that is positioned below the cover 302 and that extends around an outer periphery of the display 303. The frame 304 may be attached to a lower or inner surface of the cover 302. A portion of the frame 304 may extend below the display 303 and may attach the cover 302 to the housing structure 310. Because the display 303 is attached to a lower or inner surface of the cover 302, the frame 304 may also be described as attaching both the display 303 and the cover 302 to the housing structure 310. The frame 304 may be formed of a polymer material, a metal material, or a combination of polymer and metal materials. The frame 304 may support elements of the display stack, provide anchor points for flexible circuits, and/or be used to mount other components and device elements. In some cases, the frame 304 includes one or more metal or conductive elements that provide shielding between device components, such as between the display stack (including display components and touch sensor components) and other components like the haptic actuator 322, the speaker system 324, and the like.

The cover 302, display or display stack 303, and frame member 304 may be part of a front cover assembly 301 of the device 300. The front cover assembly 301 (e.g., a front cover of the front cover assembly) may define a front exterior surface of the device. The cover 302 may define an interior surface opposite the exterior surface. The front cover assembly 301 may be assembled as a subassembly, which may then be attached to a housing component. For example, as described herein, the display 303 may be attached to the cover 302 (e.g., via a transparent adhesive), and the frame member 304 may be attached (e.g., via adhesive) to the cover around a periphery of the display stack 303. The front cover assembly 301 may then be attached to a housing component of the device 300 by mounting and adhering the frame member 304 to a ledge defined by the housing component.

The device 300 also includes a speaker module 350 that is configured to output sound via a speaker port. The speaker port may be positioned in and/or at least partially defined by a recess or notch formed along a side of the cover 302. As described herein, a trim piece may be positioned at least partially in the recess or notch to facilitate the output of sound while also inhibiting the ingress of debris, liquid, or other materials or contaminants into the device 300. Output from the speaker module 350 may pass through an audio passage or acoustic path defined at least in part by the speaker module 350 itself and the trim piece. In some cases, part of the acoustic path (e.g., between the speaker module 350 and the trim piece) is defined by the housing structure 310 and/or a molded material that is coupled to the housing structure 310. For example, a molded material (e.g., a fiber-reinforced polymer) may be molded against a metal portion of the housing structure 310 (e.g., the housing component 313, described herein). The molded material may also form one or more intermediate elements, such as joint structures, that also structurally join housing components together (e.g., the joint structures 318). A port or passage (e.g., a tube-like tunnel) may be defined through the molded material to acoustically couple the speaker module 350 to the trim piece and/or the recess more generally, thereby directing sound from the speaker module 350 to the exterior of the device 300.

As shown in FIG. 3, the device 300 also includes one or more cameras, optical emitters, and/or sensing elements that are configured to transmit signals, receive signals, or otherwise operate along the front surface of the device. In this example, the device 300 includes a front camera 306 that includes a high-resolution camera sensor. The front camera 306 may have a 12-megapixel resolution sensor with optical elements that provide an 85° field of view. The front camera 306 may have an aperture number of f/1.9. The front camera 306 may include autofocus functionality in which one or more of the lens elements move (e.g., up to about 100 microns perpendicular to the cover) in order to focus an image on the camera's sensor. In some cases, the autofocusing front-facing camera is capable of providing continuous autofocus functionality during video capture. The device 300 also includes an optical facial recognition system 352 that includes an infrared light projector (for projecting light) and an infrared light sensor that is configured to sense an array of depth points or regions along the face of the user. The array of depth points may be characterized as a unique signature or bio-identifier, which may be used to identify and/or authenticate the user and unlock the device 300 (and/or authorize functionality on the device 300 like the purchase of software apps or the use of payment functionality provided by the device 300).

The device 300 may also include one or more other sensors or components. For example, the device 300 may include a front light illuminator element for providing a flash or illumination for the front camera 306. The device 300 may also include an ambient light sensor (ALS) that is used to detect ambient light conditions for setting exposure aspects of the front camera 306 and/or for controlling the operation of the display. The device 300 may also include a proximity sensing system 353 for detecting the proximity of a user or other object to the device 300. In some cases, as described herein, the proximity sensing system 353 detects proximity to other objects through an active region of the display. The proximity sensing system 353 and the optical facial recognition system 352 may be integrated in a common module. In some cases, information from both the proximity sensing system and the ambient light sensor is used to determine ambient light conditions and/or the proximity of objects to the device 300. For example, information from the proximity sensing system may be used to determine whether a detection by the ambient light sensor of low ambient lighting is due to low ambient lighting, or an object locally or temporarily covering the ambient light sensor (e.g., a finger providing a touch input or a palm during a typing input). Information from both sensing systems may be used to disambiguate between potentially ambiguous conditions, and generally improve the accuracy with which the device can sense or detect certain conditions.

FIG. 3 also illustrates one or more cameras, optical emitters, and/or sensing elements that are configured to transmit signals, receive signals, or otherwise operate along the rear surface of the device. As depicted in FIG. 3, these elements may be part of a sensor array 360. In this example, the sensor array 360 includes a first camera 361 having a 48.8-megapixel image sensor (optionally with a three-layer sensor arrangement) and a wide-angle lens with an aperture number of f/1.6. The sensor array 360 may also include a second camera 362 having a 12-megapixel image sensor and a super-wide-angle lens (120° FOV) with an aperture number of f/2.4. The sensor array 360 also includes a light illuminator that may be used as a flash for photography or as an auxiliary light source (e.g., a flashlight). In some cases, the sensor array 360 also includes a microphone, an ambient light sensor, a depth sensing device, and/or other sensors that are adapted to sense along the rear surface of the device 300. The first and second cameras 361, 362 (and/or the camera lenses of the first and second cameras 361, 362) may be arranged (e.g., centered) on a line that extends along the y direction of the device.

As shown in FIG. 3, the cameras 361 and 362 may be aligned with camera covers 363 and 364, respectively. The covers 363, 364 may be formed from a glass, glass-ceramic, or sapphire material and may provide a clear (e.g., transparent or optically transmissive) window through which the cameras 361, 362 are able to capture a photographic image. In other cases, the covers 363, 364 are optical lenses that filter, magnify, or otherwise condition light received by the respective camera 361, 362. The other sensing or transmitting elements of the sensor array 360 may transmit and/or receive signals through a region of the rear or rear cover 372 or through a separate cover that is coupled to the rear cover 372. As shown in FIG. 3, the covers 363, 364 may extend beyond the exterior surface of the cover 372, and may define a recess along the interior side of the cover 372, such that the lenses or other elements of the cameras 361 and 362 can extend into the respective recesses. In this way, the device 300 may accommodate a larger lens or other elements of the cameras 361 and 362 than would be possible if the recess were not provided. In some cases, trim assemblies 365, 366 may be coupled to the rear cover 372 and may support the covers 363, 364.

The device 300 also includes a battery 330. The battery 330 provides electrical power to the device 300 and its various systems and components. The battery 330 may include a 4.40 V lithium-ion battery that is encased in a foil or other enclosing element (e.g., a rigid metal enclosure, as described with respect to the battery 230). The battery 330 may include a rolled electrode configuration, sometimes referred to as a "jelly roll" or a folded or stacked electrode configuration.

The battery 330 may be attached to the device 300 (e.g., to a chassis section 323) with one or more adhesives and/or other attachment techniques. In one example, the battery 330 may be attached to the chassis section 323, or another structure of the device 300, with an electrically debondable adhesive (e.g., an adhesive whose adhesion strength can be selectively reduced in response to an electric charge). In such cases, the adhesive may include conductive terminals that conductively contact the electrically debondable adhesive. When an electric current is applied to the electrically debondable adhesive (EDA) (e.g., by a user during a battery replacement operation), the adhesion strength of the adhesive may be reduced until the battery releases from the adhesive and/or the chassis section 323, or until the adhesion strength is sufficiently low that the battery can be easily removed by a user (e.g., without damage to the battery or other device components).

The battery 330 may be recharged via a charging port 332 (e.g., from a charging cable plugged into the charging port 332 through a charging access opening 326), and/or via a wireless charging system 340. The charging port 332 may be or may include a connector module. The battery 330 may be coupled to the charging port 332 and/or the wireless charging system 340 via battery control circuitry that controls the power provided to the battery and the power provided by the battery to the device 300. The battery 330 may include one or more lithium-ion battery cells or any other suitable type of rechargeable battery element.

The wireless charging system 340 may include a coil that inductively couples to an output or transmitting coil of a wireless charging accessory. The coil may provide current to the device 300 to charge the battery 330 and/or power the device. In this example, the wireless charging system 340 includes a coil assembly 342 that includes multiple wraps of a conductive wire or other conduit that is configured to produce a (charging) current in response to being placed in an inductive charging electromagnetic field produced by a separate wireless charging device or accessory. The coil assembly 342 also includes an array of magnetic elements that are arranged in a circular or radial pattern. The magnetic elements may help to locate the device 300 with respect to a separate wireless charging accessory or other device. In some implementations, the array of magnets also help to radially locate, orient, or "clock" the device 300 with respect to the separate wireless charging device or other accessory. For example, the array of magnets may include multiple magnetic elements having alternated magnetic polarity that are arranged in a radial pattern. The magnetic elements may be arranged to provide a magnetic coupling to the separate charging device in a particular orientation or set of discrete orientations to help locate the device 300 with respect to the separate charging device or other accessory. This functionality may be described as self-aligning or self-locating wireless charging. As shown in FIG. 3, the device 300 also includes a magnetic fiducial 344 for helping to locate the separate wireless charging device or accessory.

In one example, the magnetic fiducial 344 is adapted to magnetically couple to a separate wireless charging device or other accessory. By coupling to the separate wireless charging device/accessory, the rotational alignment of the device 300 and the separate wireless charging device/accessory may be maintained with respect to an absolute or single position. Also, by magnetically coupling the charging device/accessory to the rear surface of the device 300, the charging device or other accessory may be more securely coupled to the device 300.

In some implementations, the wireless charging system 340 includes an antenna or other element that detects the presence of a charging device or other accessory. In some cases, the charging system includes a near-field communications (NFC) antenna that is adapted to receive and/or send wireless communications between the device 300 and the wireless charger or other accessory. In some cases, the device 300 is adapted to perform wireless communications to detect or sense the presence of the wireless charger or other accessory without using a dedicated NFC antenna. The communications may also include information regarding the status of the device, the amount of charge held by the battery 330, and/or control signals to increase charging, decrease charging, start charging and/or stop charging for a wireless charging operation.

The wireless charging system 340 may also include one or more graphite layers (or other thermally conductive layers) that improve the thermal performance of the wireless charging system 340 and/or the device itself. For example, the graphite layers on the wireless charging system 340 may diffuse and/or distribute heat from the coil during charging operations. In some cases, the graphite layers may absorb and diffuse heat from other components, such as the battery 330.

The device 300 may also include a speaker system 324. The speaker system 324 may be positioned in the device 300 so that a respective port 325 is aligned with or otherwise proximate an audio output of the speaker system 324. Accordingly, sound that is output by the speaker system 324 exits the housing structure 310 via the respective port 325. The speaker system 324 may include a speaker positioned in a housing that defines a speaker volume (e.g., an empty space in front of or behind a speaker diaphragm). The speaker volume may be used to tune the audio output from the speaker and optionally mitigate destructive interference of the sound produced by the speaker.

The device 300 may also include a haptic actuator 322. The haptic actuator 322 may include a movable mass and an actuation system that is configured to move the mass to produce a haptic output. The actuation system may include one or more coils and one or more magnets (e.g., permanent and/or electromagnets) that interact to produce motion. The magnets may be or may include recycled magnetic material.

When the coil(s) are energized, the coil(s) may cause the mass to move, which results in a force being imparted on the device 300. The motion of the mass may be configured to cause a vibration, pulse, tap, or other tactile output detectable via an exterior surface of the device 300. The haptic actuator 322 may be configured to move the mass linearly, though other movements (e.g., rotational) are also contemplated. Other types of haptic actuators may be used instead of or in addition to the haptic actuator 322.

The haptic actuator 322 may be configured such that the mass moves along the y direction to produce a haptic output. In some cases, the particular movement of the mass along the y direction is tuned to produce a tactile output that is perceptibly similar to a haptic actuator configured to move along the x direction. Configuring the haptic actuator 322 so that the mass moves along the y direction (instead of the x direction, for example), may allow the haptic actuator 322 to be oriented primarily along the y direction (e.g., the long axis of the haptic actuator 322 extends along the y direction), which may allow greater packing efficiency of the components inside the device 300.

In some cases, the haptic actuator 322 is configured to produce a first haptic output in response to the device detecting that a force input applied to a button (e.g., a button with a strain- or other force-sensing element) satisfies a force threshold, and is also configured to produce a second haptic output in response to a notification event (e.g., an event that is associated with a haptic notification, or for which the device produces a haptic output upon occurrence). Thus, the same haptic actuator 322 may be used to produce haptics for notifications, as well as to simulate button presses or otherwise indicate that an input satisfying a force threshold has been received.

The device 300 also includes a circuit board assembly 320. The circuit board assembly 320 may include a substrate, and processors, memory, and other circuit elements coupled to the substrate. The circuit board assembly 320 may include multiple circuit substrates that are stacked and coupled together in order to maximize the area available for electronic components and circuitry in a compact form factor. The circuit board assembly 320 may include provisions for a subscriber identity module (SIM). The circuit board assembly 320 may include electrical contacts and/or a SIM tray assembly for receiving a physical SIM card and/or the circuit board assembly 320 may include provisions for an electronic SIM. Where an electronic SIM is used, a SIM tray may be omitted from the device 300 (e.g., the device may not include openings, trays, slots, doors, or other mechanical means to insert or otherwise access a SIM card).

The circuit board assembly 320 may be wholly or partially encapsulated to reduce the chance of damage due to ingress of water or other fluid.

The circuit board assembly 320 may be thermally coupled to a chassis section 323 of the housing structure 310. As described herein, the chassis section 323, also referred to simply as a chassis 323, may be part of a housing segment 314 (e.g., a middle housing component) that is formed from a unitary structure and that defines the chassis 323 as well as a first wall section 317 that defines a first side exterior surface of the device 300, and a second wall section 319 that defines a second side exterior surface of the device 300. The circuit board assembly 320 may be thermally coupled to the chassis 323 via one or more thermal bridges, such as a graphite structure, a graphite-wrapped foam, or other thermally conductive structure(s). Heat from the circuit board assembly may be transferred to the chassis 323 via the thermal bridges, thereby removing heat from the circuit board assembly 320 (where heat may be detrimental to durability, performance, or the like), and also drawing heat away from exterior surfaces and/or components of the device 300 that come into contact with a user (e.g., the wall sections 317, 319, which define exterior side surfaces of the device and which may be held by a user when the device 300 is in use).

The circuit board assembly 320 may also include wireless communication circuitry, which may be operably coupled to and/or otherwise use the wall sections and/or housing components 312, 313, 317, 315, 316, or 319 (or portions thereof) as radiating members or structures to provide wireless communications. The circuit board assembly 320 may also include components such as accelerometers, gyroscopes, near-field communications circuitry and/or antennas, compasses, and the like. In some implementations, the circuit board assembly 320 may include a magnetometer that is adapted to detect and/or locate an accessory. For example, the magnetometer may be adapted to detect a magnetic (or non-magnetic) signal produced by an accessory of the device 300 or other device. The output of the magnetometer may include a direction output that may be used to display a directional indicia or other navigational guidance on the display 303 in order to guide the user toward a location of the accessory or other device.

The device 300 may also include one or more pressure transducers that may be operable to detect changes in external pressure in order to determine changes in altitude or height. The pressure sensors may be externally ported and/or positioned within a water-sealed internal volume of the housing structure 310. The output of the pressure sensors may be used to track flights of stairs climbed, a location (e.g., a floor) of a multi-story structure, movement performed during an activity in order to estimate physical effort or calories burned, or other relative movement of the device 300.

The circuit board assembly 320 may also include global positioning system (GPS) electronics that may be used to determine the location of the device 300 with respect to one or more satellites (e.g., a Global Navigation Satellite System (GNSS)) in order to estimate an absolution location of the device 300. In some implementations, the GPS electronics are operable to utilize dual frequency bands. For example, the GPS electronics may use L1 (L1C), L2 (L2C), L5, L1+L5, and other GPS signal bands in order to estimate the location of the device 300.

As shown in FIG. 3, the housing may include a cover 372 (e.g., rear or rear cover) that may define a substantial entirety of the rear surface of the device 300. The rear cover 372, the front cover 302, and the housing structure 310 may at least partially define an enclosure of the device 300, which may define an internal volume in which components of the device 300 are positioned. The cover 372 may be formed from or include a transparent or optically transmissive material. For example, the cover 372 may include a substrate formed from or including a glass material or other suitable material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). A glass-ceramic material may be a silica-based glass-ceramic material, such as an aluminosilicate glass-ceramic material or a boroaluminosilicate glass-ceramic material. The glass-ceramic material may be chemically strengthened by ion exchange. The substrate may have portions that are less than 1 mm thick. In some cases, the substrate has portions that are less than 0.80 mm. In some cases, the substrate has portions that are approximately 0.60 mm or less. The cover 372 may have a uniform thickness or, in some cases, may have a thickened or raised portion that surrounds the camera covers 363, 364. The rear cover 372 may be machined (e.g., ground) into a final shape before being polished and/or textured to provide the desired surface finish. The texture may be specially configured to provide a matte appearance while also being resistant to collecting a buildup of skin, lint, or other debris.

The cover 372 may be formed of a colored optically transmissive material, and may include a coating along an interior side of the cover 372 that, together with the color (or lack of color) of the optically transmissive material, defines the color of the rear side of the device. For example, a coating along an interior surface of the cover may include one or more color layers. The color layer may include a colorant such as a pigment or dye and may have a distinct hue or may be near neutral in color. Alternately, or additionally, the coating may include one or more opaque layers applied to the interior surface of the substrate (or otherwise positioned along the interior side of the substrate) to provide a particular appearance to the back side of the device. The opaque layer(s) may include a sheet, ink, dye, or combinations of these (or other) layers, materials, or the like and in some cases may be optically dense.

The cover 372 may be part of a rear cover assembly 373. The rear cover assembly 373 may be coupled to the housing structure 310. In some cases, the rear cover assembly 373 includes components such as camera covers 363 and 364, trim assemblies 365, 366, components of a wireless charging system, structural components (e.g., frames), other trim assemblies, mounting clips, and/or other components, systems, subsystems, and/or materials.

The rear cover assembly 373 may include a support plate 371 coupled to an interior surface of the rear cover 372. The support plate 371 may be coupled to the interior surface of the rear cover via an adhesive.

The support plate 371 may be formed of metal (e.g., aluminum), and may define a structural mounting surface for components of the rear cover assembly 373 (e.g., a wireless charging system). In some cases, the trim assemblies 365, 366 are secured to the support plate, such as via welding, soldering, brazing, or other suitable attachment means. The support plate 371 may be a unitary metal structure that spans substantially an entire interior surface of the rear cover 372 (e.g., including a wireless charger region and a rear-facing camera region). In other examples, the support plate 371 may be defined by multiple separate metal components. Where the support plate 371 is formed from multiple separate metal components, the metal components may be the same metal (e.g., both aluminum, or both stainless steel), or they may be different materials, as described above with respect to the metal components 282 (the discussion of which applies to a multi-component support plate 371).

The support plate 371 may be thermally coupled to other device components, such as via thermal bridges, as described herein. Example thermal bridges include graphite wrapped foam (e.g., a graphite layer wrapped around a foam or other compliant material), conductive loops (e.g., a graphite or other thermally conductive layer on a loop structure formed by a substrate), direct metal-to-metal contacts, thermal paste or thermal gel, or the like. Thermal bridges may thermally couple the support plate 371 to components such as the circuit board assembly 320, the battery 330, and the sensor array 360. The support plate 271 may be formed of a thermally conductive material, such as a metal (e.g., aluminum), and heat from the other components may be transferred to the support plate 371. The support plate 371 may therefore act as a heat sink, and may also generally distribute the heat throughout the support plate 371, which may help reduce peak device or component temperatures.

Similar to the description above with respect to cover 302, the cover 372 may be positioned at least partially within an opening defined in the housing structure 310. Also similar to the description above with respect to cover 302, the edges or sides of the cover 372 may be surrounded by a protective flange or lip of the housing structure 310 without an interstitial component between the edges of the cover 372 and the respective flanges of the housing structure 310. The cover 372 may be chemically strengthened using an ion exchange process to form a compressive stress layer along exterior surfaces of the cover 372. In some cases, the (rear) cover 372 is formed from the same or a similar material as the (front) cover 302.

The rear cover 372 may be removably coupled to the rest of the housing structure 310 such that the rear cover 372 can be removed and/or replaced quickly and efficiently. In some cases, the wireless charging system 340 is the only component that is attached to the rear cover 372 that needs to be electrically coupled to the circuit board assembly 320 (which is coupled to the housing segment 314). Accordingly, the rear cover 372 may be completely removed from the device by unfastening the rear cover 372 from the remainder of the housing (e.g., from the housing segment 314) and decoupling the wireless charging system's electrical connector(s). In this way, the device 300 may provide improved reparability.

The housing structure 310 may include a housing segment 314 (e.g., a middle housing segment 314) that includes the wall sections 317 and 319 and the chassis section 323 (e.g., a metal plate-like structure that extends between the wall sections 317 and 319). The chassis 323 may define a mounting structure for components of the device 300. For example, as described herein, components such as the circuit board assembly 320, battery 330, sensor array 360, speaker module 350, speaker system 324, haptic actuator 322, and the like, may be coupled to the chassis 323 (e.g., along a rear-facing side of the chassis 323). By coupling components to the chassis 323 instead of the front cover assembly 301 and/or the rear cover 372, the cost and complexity of the front cover assembly 301 and rear cover assembly 373 may be reduced, and removal and/or replacement of the front cover assembly 301 and/or rear cover 372 may be simplified. The chassis 323 may also define one or more holes extending therethrough to facilitate the coupling of components on one side of the chassis 323 (e.g., the display 303 and/or sensors of the front cover assembly 301) to components on the other side of the chassis 323 (e.g., the circuit board assembly 320). Additionally, as noted above, the chassis 323 may also be thermally coupled to components of the device 300, such as the circuit board assembly 320, to conduct heat away from the thermally coupled components.

The housing segment 314 may be a unitary structure formed from a single piece of material. For example, the unitary structure of the housing segment 314 may be a metal, such as aluminum, steel, titanium, or the like, and may be formed by extrusion, machining, and/or combinations of these and other forming processes. Thus, the wall sections 317 and 319 (which define side exterior surfaces of the device 300) and the chassis 323 may be different portions of a single piece of material. In some cases, the housing segment 314 is formed of a polymer material, reinforced polymer material (e.g., fiber reinforced), carbon fiber, or other suitable material. In some cases, the wall sections 317, 319 may be separate housing components that are attached to the chassis 323, similar to the construction of the housing segment 217 described above.

As described above, the housing structure 310 may include housing components 312, 313, 315, and 316 structurally joined together and/or to the housing segment 314 (the middle housing segment 314) via joint structures 318. The joint structures 318 (e.g., the material of the joint structures) may extend over inner surfaces of the housing components. More particularly, a portion of the joint structures 318 may contact, cover, encapsulate, and/or engage with retention features of the housing components that extend from the inner surfaces of the housing components (including, for example, from the wall sections of the middle housing segment 314). As the wall sections 317 and 319 are part of a single unitary structure, the joint structures 318 may also function to structurally join the housing components 312, 313, 315, and 316 to the housing segment 314. When coupled via the joint structures 318, the housing segment 314, the housing components 312, 313, 315, and 316, and the joint structures 318 may define a main housing assembly that defines the exterior side surfaces of the device 300 as well as the chassis 323 within the device.

Housing components 312, 313, 315, and 316 may be formed from aluminum, stainless steel, or another metal. The housing components may also be formed from a clad structure that includes multiple materials (as described above).

In some cases, where holes are formed through the cladding and core portions of a clad housing component (e.g., for buttons, audio ports, charging ports, etc.), a seam between the cladding portion and the core portion may exist within the hole (e.g., along the hole surface). In some cases, the seam may be covered with another material, such as a paint, adhesive, polymer layer, or the like. Covering the seam may help prevent galvanic corrosion from occurring at the seam due to contact with water or another liquid.

In some cases, a metal deposition process is used to produce holes, through a clad housing component, that do not include seams along the hole surface. For example, a hole through the housing may be formed by first forming a hole only through the core material. Additional cladding material is then added into the hole (such as via a direct metal deposition process), such that the cladding material substantially fills the hole through the core portion. A final hole is then formed through the cladding material as well as the additional cladding material (which was added by the metal deposition process), such that the entire hole surface through the housing component is formed from cladding material (e.g., the core material does not define the hole surface). In this way, no seam between different metals exists in the hole, thereby mitigating the risk of galvanic corrosion within the hole.

As described herein, the housing components 312, 313, 315, and 316, and the wall sections 317, 319, may provide a robust and impact resistant sidewall for the device 300. In the present example, the housing components 312, 313, 315, and 316 and the wall sections 317, 319 define a flat sidewall that extends around the perimeter of the device 300. The flat sidewall may include rounded or chamfered edges that define the upper and lower edges of the sidewall of the housing structure 310. The housing components 312, 313, 315, and 316 and the wall sections 317, 319 may each have a flange portion or lip that extends around and at least partially covers a respective side of the front and rear covers 302, 372. There may be no interstitial material or elements between the flange portion or lip and the respective side surface of the front and rear covers 302, 372. This may allow forces or impacts that are applied to the housing structure 310 to be transferred to the front and rear covers 302, 372 without affecting the display or other internal structural elements, which may improve the drop performance of the device 300.

The device 300 may also include a button 385 (which may correspond to the button 155 in FIG. 1C) that incorporates a touch sensor on an exterior surface. For example, the button 385 may detect force (or translational or press) inputs, and may also detect touch inputs applied to a button surface. Force inputs may be detected by a strain-sensing system, a switch member, or any other suitable force and/or translation sensor (and/or combinations of sensors, such as a collapsible dome switch in combination with a force sensor). Touch inputs may be detected by a touch-sensing system, such as capacitive touch-sensing systems. For example, the button member of the button 385 (e.g., the movable component that a user presses in order to actuate or provide an input to the button) may include a touch-sensing element positioned thereon. A button equipped with a touch-sensing element may detect various types of touch-based inputs, including static touch inputs (e.g., a finger touching the touch-sensitive button surface), dynamic touch inputs (e.g., a finger sliding along the touch-sensitive button surface, also referred to as gesture or swipe inputs), or the like. In some cases, the button 385 may include a touch-sensing element to detect such touch-based inputs. As described herein, the button 385 may operate in conjunction with a haptic actuation system, such as the haptic actuator 322, to produce tactile outputs in response to a detection of an input at the button 385 (e.g., force inputs, touch inputs, etc.).

As shown in FIG. 3, the device 300 includes multiple antennas that may be adapted to conduct wireless communication using a 5G communication protocol. For example, the device 300 may include an antenna module 347 that may include one or more antenna arrays that may be configured to transmit and receive wireless communication signals through the rear cover 372 and/or through another housing component of the device (e.g., a radio-frequency transmissive component of the device or housing). The antenna module may be attached to a back or bottom surface of the circuit board assembly 320.

The antenna modules may include multiple antenna arrays. For example, the antenna modules may include one or more millimeter-wave antenna arrays. In the case where the antenna modules include multiple millimeter-wave antenna arrays (each of which may include one or more radiating elements), the multiple millimeter-wave antenna arrays may be configured to operate according to a diversity scheme (e.g., spatial diversity, pattern diversity, polarization diversity, or the like). The antenna modules may also include one or more ultra-wideband antennas.

Each of the antenna arrays (e.g., the antenna array and the millimeter-wave arrays of the antenna module) may be adapted to conduct millimeter-wave 5G communications and may be adapted to use or be used with beam-forming or other techniques to adapt signal reception depending on the use case. The device 300 may also include multiple antennas for conducting multiple-in multiple-out (MIMO) wireless communications schemes, including 4G, 4G LTE, and/or 5G MIMO communication protocols. As described herein, one or more of the housing components 312, 313, 315, and 316 and the wall sections 317, 319 (or portions thereof) may be adapted to operate as antennas for a MIMO wireless communication scheme (or other wireless communication scheme).

Figure 4A:
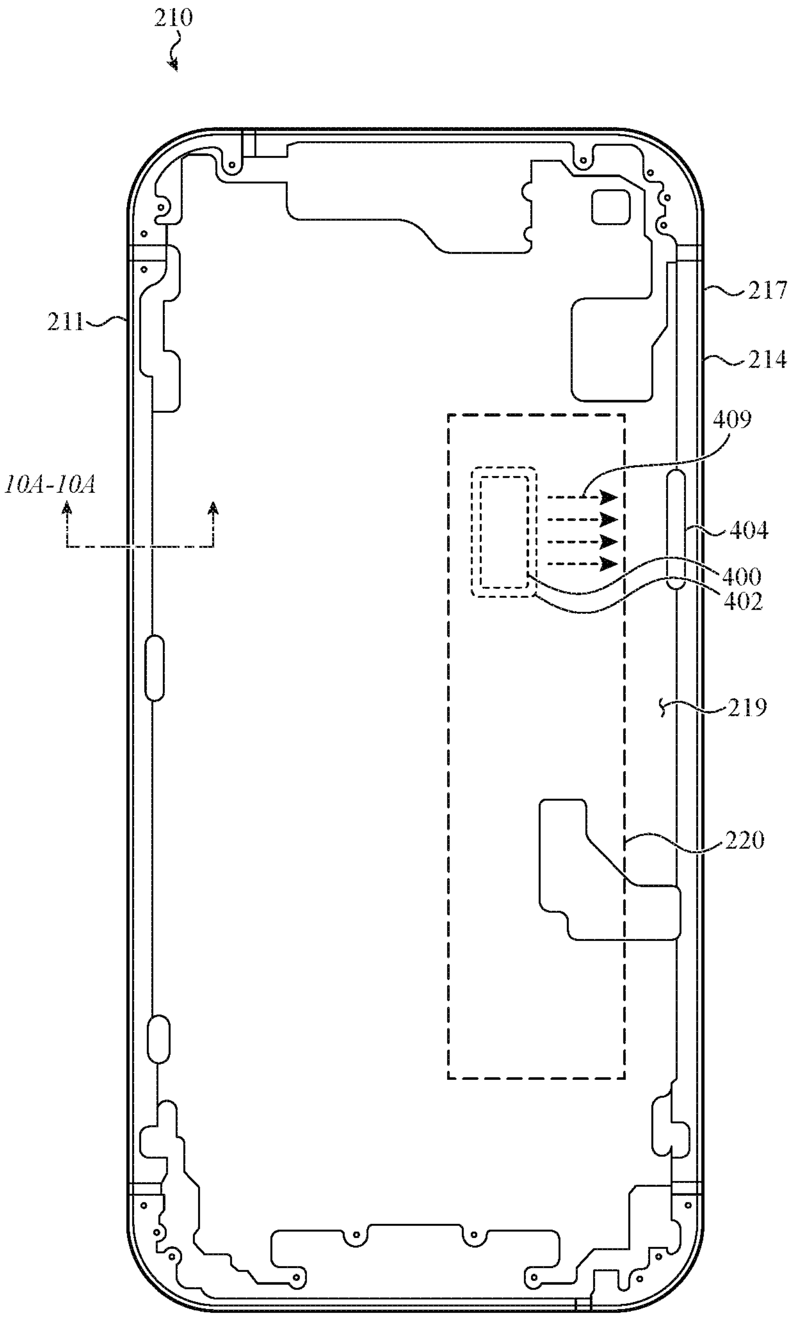
FIG. 4A is a plan view of an example housing structure of an electronic device.

As described herein, a device housing may include thermal breaks that inhibit heat transfer along certain paths in the device. FIG. 4A illustrates the housing structure 210 that includes a thermal break 404 defined through the chassis section 219 of the housing segment 217. The thermal break 404 may be a through-hole that extends through the chassis section 219. The thermal break 404 may be positioned between the housing component 214 (which defines a wall section defining at least a portion of a side surface of the device 200) and a location where a processing element 400 on the circuit board assembly 220 is thermally coupled to the chassis section 219 (e.g., a thermal coupling region 407, FIG. 4C). For example, the circuit board assembly 220 may be coupled to the chassis section 219, and may be thermally coupled to the chassis section 219 at a thermal coupling region 407 via a thermal bridge 402. The thermal bridge 402 may be positioned over or overlapping with the location of the processing element 400 on the circuit board assembly 220. In some cases, the circuit board assembly 220 includes a circuit board, and the processing element is coupled to a first surface of the circuit board, and the thermal bridge is thermally coupled to a second surface of the circuit board and positioned below the processing element. In some cases, the processing element 400 may be positioned between two circuit boards of the circuit board assembly 220. The thermal bridge 402 may be any suitable thermal coupling, including a graphite wrapped foam, a thermally conductive loop structure, a thermal paste or gel, a direct metal-to-metal coupling, or another suitable thermal bridge. In some cases, no separate thermal bridge is included, but the heat from the processing element 400 may thermally couple to the chassis section 219 in the location indicated as the processing element 400 in FIG. 4A. As depicted in FIG. 4A, the circuit board assembly 220, processor 400, and thermal bridge 402 may be positioned on an opposite side of the chassis section 219 than that shown.

As described, the thermal break 404 may be positioned in a thermal path 409 that extends from the thermal coupling region (e.g., the location where the heat from the processor 400 or the circuit board assembly more generally is transferred to the chassis section 219) to the wall section defined by the housing component 214. As shown, the thermal path generally extends along the x direction. The thermal break 404 thus interrupts the direct thermally conductive path through the chassis section 219 (e.g., indicated by broken arrows in FIG. 4A) to the housing component 214 (and thus the exterior surface of the device) that would otherwise exist through the chassis section 219, and therefore is configured to interrupt a flow of heat from the circuit board assembly to the housing component 214 (e.g., the wall section defined by the housing component 214). Accordingly, the temperature of the external surface along the housing component 214 may be less than it would be if the chassis section 219 were continuous along that path. This may also allow the processor to be operated at higher temperatures (resulting from operating with higher processing performance and/or speed) without causing an undesirable temperature increase at the exterior surface. Thus, the thermal break 404 may improve thermal as well as operational (e.g., processing) performance of the device.

The through-hole of the thermal break 404 may define an elongate opening extending along a longitudinal axis, the longitudinal axis parallel to the first side exterior surface of the device (e.g., parallel to a y direction of the device). The elongate opening extending along the y direction of the device may provide thermal resistance along the x direction, while also reducing the material loss in the chassis section 219 and maintaining structural integrity of the chassis section 219. In some cases, the elongate opening may have a length, along the y direction, that is equal or substantially equal to the length, along the y direction, of the thermal coupling region.

While FIG. 4A illustrates heat being transferred to the chassis section 219 from a processing element, thermal breaks may instead or additionally be positioned elsewhere on the chassis section 219 to interrupt the heat transfer from other components as well. For example, the battery 230 may thermally couple to the chassis section 219 at a particular location, and a thermal break may be positioned between that particular location and a housing component. Thermal breaks may be provided in the chassis section 219 to inhibit the transfer of heat from other components or heat sources as well.

Thermal breaks may be positioned between a thermal coupling region on the chassis section 219 and a nearest exterior surface of the housing. Thus, a thermal break may provide a gap along a thermally conductive path that is most likely to cause a temperature increase at an exterior surface of the device.

Figure 4B:
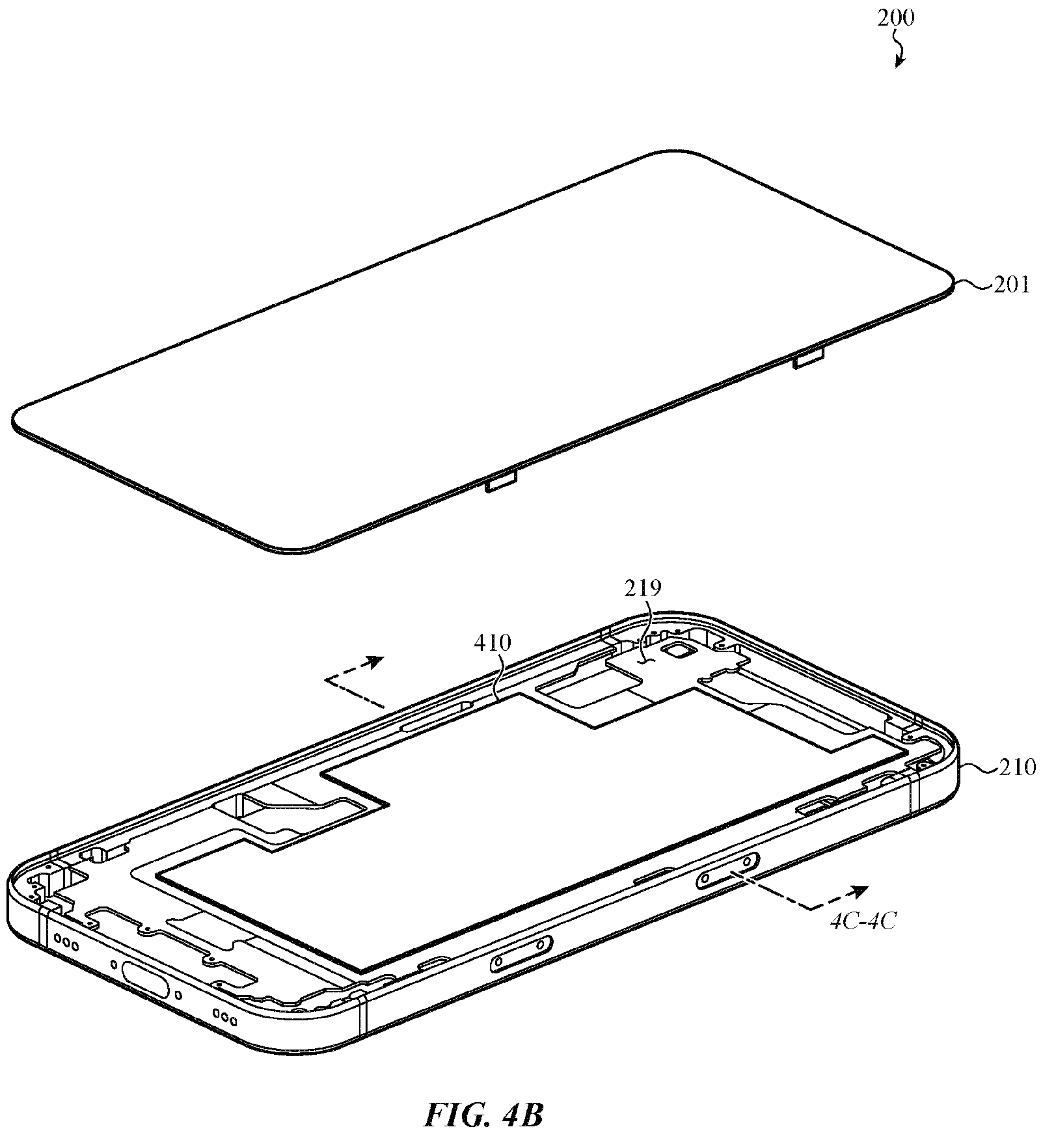
FIG. 4B is a partial exploded view of an example electronic device.

FIG. 4B depicts a partial exploded view of the device 200, showing the front cover assembly 201 separated from the housing structure 210. A thermal diffusion member 410 may be positioned on the chassis section 219 of the housing structure 210. The thermal diffusion member 410 may be formed from one or more layers of graphite or other thermally conductive materials, and may be adhered to or otherwise coupled to a surface of the chassis section 219. The thermal diffusion member 410 may have a thickness between about 10 microns and about 20 microns. The thermal diffusion member 410 may extend over at least 80% of the first side of the chassis section (or over 85%, or over 90% or over 95% of the first side of the chassis section).

The thermal diffusion member 410 may be configured to generally receive heat from other components and spread the heat among a large area. The thermal diffusion member 410 may also transfer heat to the chassis section 219. For example, the thermal diffusion member 410 is positioned across from a display of the front cover assembly 201 (e.g., the bottom layer of the display stack faces the thermal diffusion member 410). Heat from the display may be transferred to the thermal diffusion member 410 across an air gap (or via direct contact). The received heat may be generally diffused or spread throughout the thermal diffusion member 410 and optionally into the chassis section 219. Example effects of the thermal diffusion member 410 include reducing peak temperatures in the display and/or front cover assembly 201, transferring heat away from the display, and producing more even or uniform temperature profiles in the display and/or front cover assembly 201, as well as in the chassis section 219.

Figure 4C:
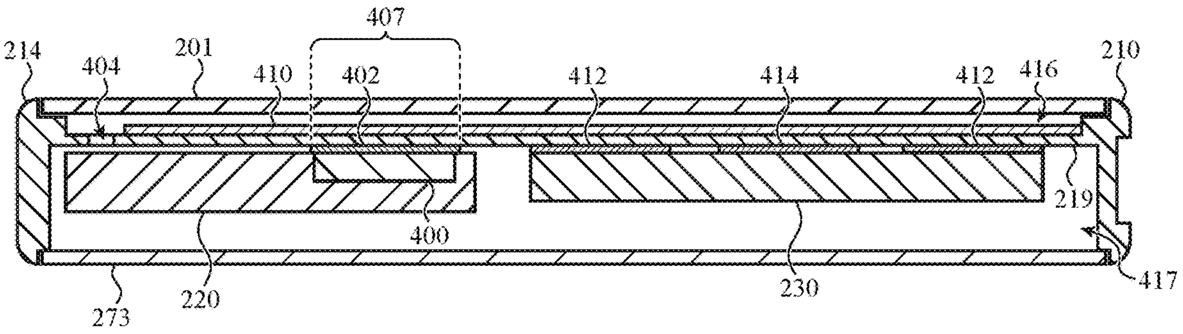
FIG. 4C is a partial cross-sectional view of an example electronic device.

FIG. 4C is a partial cross-sectional view of the device 200, viewed along line 4C-4C in FIG. 4B. FIG. 4C illustrates example positions of various components within the device 200. As shown in FIG. 4C, the chassis section 219 is positioned between the front cover assembly 201 and the rear cover assembly 273. The chassis section 219 may define at least a portion of a first interior cavity 416 between the chassis section 219 and the front cover assembly 201 and at least a portion of a second interior cavity 417 between the chassis section 219 and the rear cover assembly 273. The battery 230 and the circuit board assembly 220 may be positioned in the second interior cavity 417, between the chassis section 219 and the rear cover assembly 273. The battery 230 and the circuit board assembly 220 (and the processing element 400) are additionally thermally coupled to the surface of the chassis section 219 along the first side of the chassis section 219, as described herein.

For example, FIG. 4C illustrates the thermal diffusion member 410 (e.g., one or more layers of graphite) positioned on a second side of the chassis section 219 (in the first interior cavity 416) and below the front cover assembly 201 (e.g., across an air gap from the display 203, FIG. 2). FIG. 4C also illustrates the processing element 400 of the circuit board assembly 220 thermally coupled to a first side of the chassis section 219 (opposite the second side) via the thermal bridge 402, and the thermal break 404 positioned between the coupling location and the exterior side surface defined by the housing component 214. As described, the circuit board assembly 220 is thermally coupled (e.g., via the thermal bridge 402) to the chassis section 219 at the thermal coupling region 407.

FIG. 4C also illustrates an example arrangement of the battery 230 within the device 200. For example, the battery 230 may be coupled to the first side of the chassis section 219, such as via adhesive 412. As described herein, the adhesive 412 may be an electrically debondable adhesive, or another suitable adhesive. In some cases, a thermal diffusion member 414 is positioned between the battery 230 and the first side of the chassis section 219 (e.g., in areas where the adhesive 412 is not present). The thermal diffusion member 414 may be coupled to the chassis section 219, and may or may not be in contact with the battery 230. The thermal diffusion member 414 may be formed from one or more layers of graphite or other thermally conductive materials. The thermal diffusion member 414 may have a thickness between about 10 microns and about 20 microns. The thermal diffusion member 414 may be configured to generally receive heat from other components and spread the heat throughout the diffusion member 414 and also transfer heat to the chassis section 219. For example, heat from the battery 230 may be transferred to the thermal diffusion member 414 across an air gap (or via direct contact), and the received heat may be generally diffused throughout the thermal diffusion member 414 and optionally into the chassis section 219. Example effects of the thermal diffusion member 414 include reducing peak temperatures in the battery 230, transferring heat away from the battery 230, and producing more even or uniform temperature profiles in the battery 230 as well as in the chassis section 219. In some cases, the thermal diffusion member 414 is positioned between the battery 230 and the chassis section 219, and also extends along other portions of the chassis section 219 to be positioned between other components and the chassis section 219. For example, a portion of the thermal diffusion member 414 may be positioned between the circuit board assembly 220 and the chassis section 219.

While FIGS. 4A-4C use components of the device 200 to illustrate various features and concepts, it will be understood that the same features and concepts apply equally to the corresponding components of the device 300, or other devices described herein.

Figure 5:
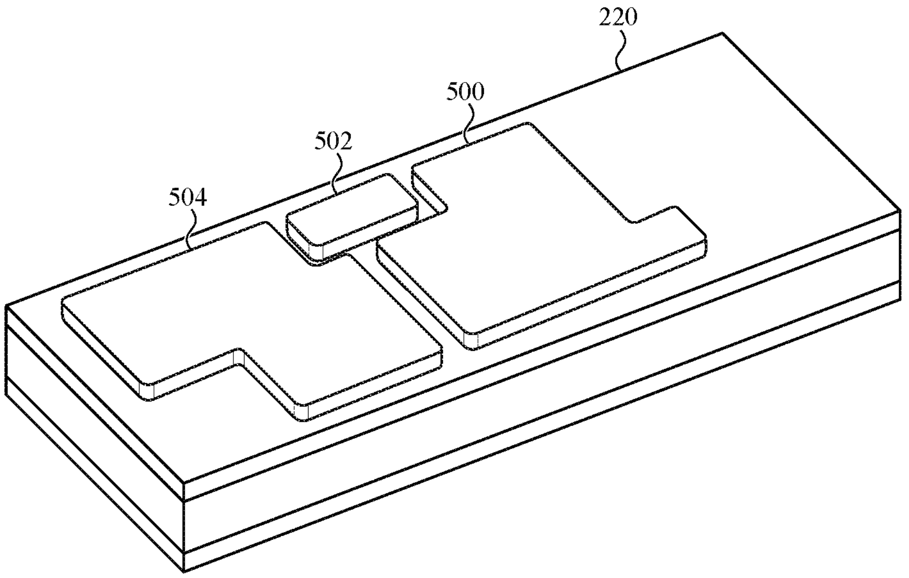
FIGS. 5-6 depict an example circuit board assembly of an electronic device.
Figure 6:
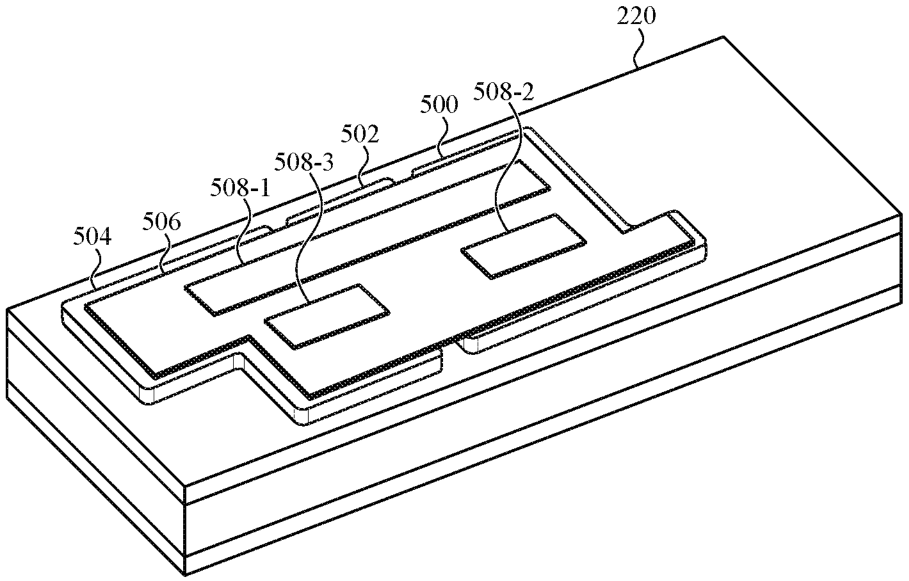

FIGS. 5-6 illustrate the circuit board assembly 220, including various features that improve the thermal performance of the circuit board assembly 220. As shown in FIG. 5, the circuit board assembly 220 may include one or more covers (e.g., shielding structures), such as covers 500, 502, 504. The covers 500, 502, 504 may be positioned over and may at least partially cover and/or enclose circuit components that are coupled to an exterior side of the circuit board assembly 220. The covers 500, 502, 504 may be formed from a thermally conductive material, such as a metal. In some cases, the covers are formed from aluminum, rather than other metals such as steel, nickel, etc., to provide a high thermal conductivity. The covers may absorb heat from the circuit components and diffuse the heat along the covers (which may be a larger area than the circuit components themselves, thereby reducing peak temperatures), and may also help transfer the heat to other device structures (e.g., a rear cover assembly 273, FIG. 2). In some cases, the covers may be mounted on a surface of the circuit board assembly 220 that is opposite the surface that is coupled to the chassis section 219 (e.g., the covers may be on a surface that faces the rear cover assembly of the device).

FIG. 6 illustrates the circuit board assembly 220 with additional thermal components coupled thereto. In particular, the circuit board assembly 220 includes a thermal diffusion member 506 coupled to the top exterior surfaces of the covers. The thermal diffusion member 506 may be formed from one or more layers of graphite or other thermally conductive materials, and may be coupled to the covers. The thermal diffusion member 506 may have a thickness between about 10 microns and about 20 microns. The thermal diffusion member 506 may be configured to generally receive heat from the covers and spread the heat throughout the member, and optionally transfer heat to other components or structures in the device. The thermal diffusion member 506 may be a single member that spans gaps between multiple metal covers, thereby thermally coupling the multiple covers and providing a relatively larger area of thermal diffusion for the covers (as compared to the covers alone).

One or more thermal bridges 508 may be positioned on the covers (and on the thermal diffusion member 506, if present) to transfer heat from the circuit board assembly, via the covers, to other device components or structures. For example, the thermal bridges 508-1, 508-2, 508-3 may contact a rear cover assembly 273 in order to transfer heat from the circuit board assembly 220 to the rear cover assembly 273. The thermal bridges 508 may be any suitable thermal coupling, including a graphite wrapped foam, a thermally conductive loop structure, a thermal paste or gel, a direct metal-to-metal coupling, or another suitable thermal bridge.

While FIGS. 5-6 use components of the device 200 to illustrate various features and concepts, it will be understood that the same features and concepts apply equally to the corresponding components of the device 300, or other devices described herein.

FIGS. 7A-7D illustrate various aspects of the battery 230. While the description uses the battery 230 as an example, the same concepts discussed with respect to the battery 230 may be used by other batteries described herein, including the battery 330.

As noted above, the battery 230 may include a conductive battery enclosure, such as a metal enclosure 701 that encases a battery cell (e.g., which may include an electrode assembly and an electrolyte). The battery cell may be within the metal enclosure 701. The metal enclosure 701 may provide a substantially rigid outer structure for the battery 230. As compared to a foil or pouch-style flexible enclosure, the metal battery enclosure may be manufactured to a tighter dimensional tolerance (e.g., less variation in the battery size). This may allow the internal battery components to be larger, thereby improving battery capacity and device performance. This may also allow the space allocated to the battery within the device to be reduced, allowing more space for other device components or allowing the device to be made smaller. The enclosure 701 may be formed from stainless steel, aluminum, or another suitable conductive material. In some cases, the enclosure 701 includes one or more cladding or coating layers to improve thermal performance. For example, a stainless steel enclosure 701 may include an aluminum cladding (or an aluminum enclosure may include a stainless steel cladding). The aluminum material may improve the thermal performance of the enclosure 701 due to greater thermal conductivity of the aluminum compared to the stainless steel.

The battery 230 may include first and second conductive connectors 702, 704 to facilitate conductive coupling to the cathode of the battery cell (connector 702) and to the anode of the battery cell (connector 704). As described herein, the metal enclosure 701 (or another conductive battery enclosure) may be conductively coupled to the anode of the battery cell, such that the metal of the enclosure 701 is at the same potential as the anode (e.g., the enclosure 701 is at the negative or common voltage potential of the battery 230). In such cases, the first conductive connector 702 (e.g., the cathode) may be conductively isolated from the enclosure 701. The hole in the enclosure may be used to fill the enclosure with an electrolyte solution or other liquid after the electrode assembly is positioned in the enclosure 701 and the enclosure 701 is sealed closed.

Figure 7A:
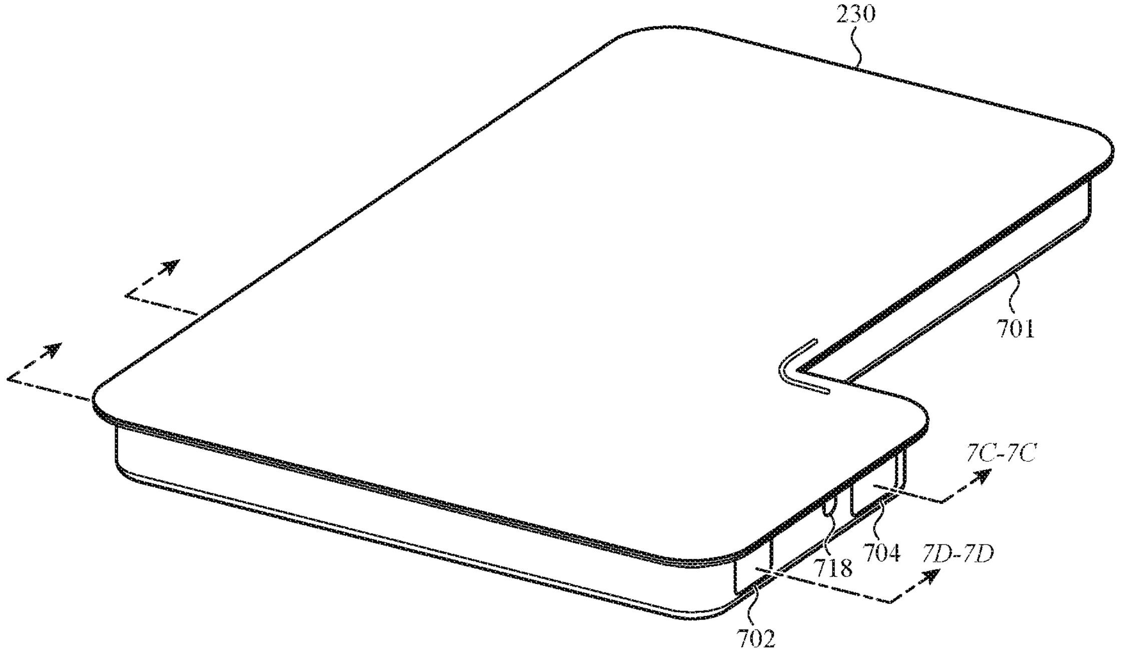
FIG. 7A depicts an example battery of an electronic device.
Figure 7B:
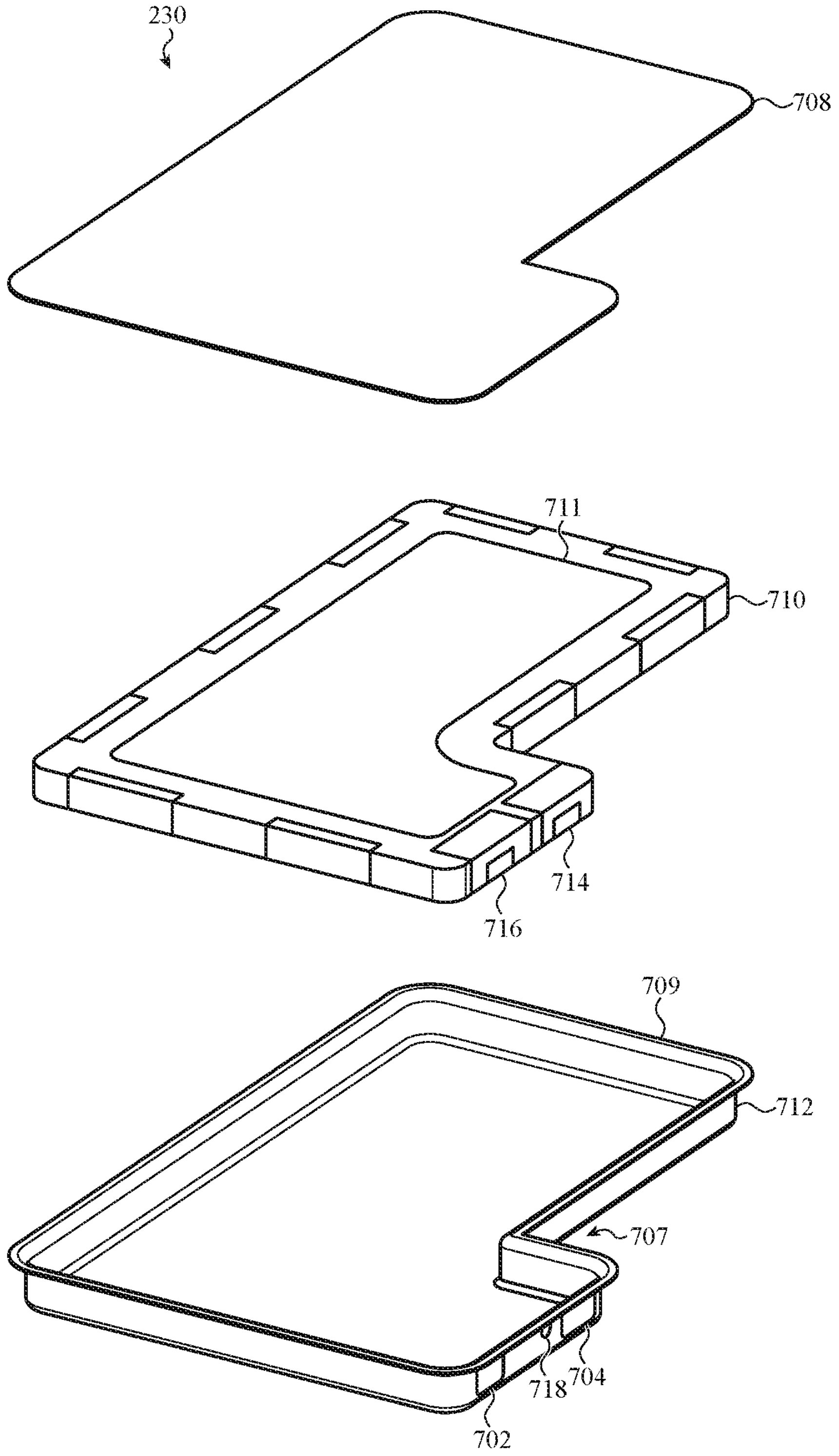
FIG. 7B is a partial exploded view of an example battery of an electronic device.

FIG. 7B illustrates an exploded view of the battery 230. As shown, the enclosure 701 includes an upper enclosure structure 708 and a lower enclosure structure 712. The lower enclosure structure 712 may define a bottom wall and peripheral side walls of the enclosure 701, and the upper enclosure structure 708 may define a top wall of the enclosure 701. The bottom wall of the enclosure may be attached to a chassis of a device (e.g., the chassis 219, 323), such as via an adhesive (e.g., an electrically debondable adhesive).

The walls of the enclosure 701 (e.g., the bottom wall and top wall) may also be configured to transfer heat from the battery 230 to other device components, such as a chassis (e.g., a graphite layer mounted on the chassis), a rear cover assembly (e.g., a graphite layer mounted on the rear cover assembly), and the like. In some cases, thermal bridges may be positioned between the battery 230 and other device structures (e.g., between the lower enclosure structure 712 and a chassis such as the chassis 219, 323) to transfer heat from the battery 230 to the chassis. The thermal bridges may include graphite-wrapped foams or graphite-coated loops, in which the loop or the foam structure maintains the graphite (which provides thermal conductivity) in contact with the battery 230 and the other structures.

In some cases, the enclosure 701 may include or define one or more tabs. The tabs may extend from the enclosure and may be coupled to other device components. In some cases, the tabs define a thermal coupling between the enclosure 701 and other components. Tabs may be used to transfer heat from the battery to other components (e.g., to a chassis of the device), or to transfer heat to the battery from other components. In some cases, tabs may include attachment features (e.g., through-holes) to facilitate fastening components to the battery (or fastening the battery to other components). For example, the tab may be used to attach a component such as a circuit board assembly, camera, speaker module, or the like, to the battery 230 (or to attach the battery 230 to another component, such as a chassis, housing member, or the like).

The upper and lower enclosure structures 708, 712 may be formed from stainless steel, aluminum, a bi-metal clad material (e.g., stainless steel and aluminum), or another suitable material. The upper and lower enclosure structures 708, 712 may have a thickness between about 80 and about 120 microns, or between about 95 and 110 microns. In some cases, the thickness selected allows for the lower enclosure structure 712 to be subjected to a deep drawing operation to form the shape of the lower enclosure structure 712 (e.g., the tub-like shape defined by the bottom wall and the peripheral side walls). For example, selecting the material thickness so that the final thickness of the lower enclosure structure 712 is between about 95 and about 110 microns may allow the material to be formed without excessive thinning or other structural issues (such as at the internal corner 707 of the L-shaped enclosure).

As shown in FIG. 7B, the battery 230 includes an electrode assembly 710, which may include a rolled electrode configuration, sometimes referred to as a "jelly roll" or a folded or stacked electrode configuration. The electrode assembly 710 may generally conform to the shape of the enclosure 701. Thus, in the illustrated example, both the enclosure 701 and the electrode assembly 710 may be generally L shaped. The electrode assembly 710 may be positioned in the enclosure 701, and an adhesive 711 may couple the electrode assembly 710 to the enclosure 701. While FIG. 7B illustrates an adhesive 711 on the top of the electrode assembly 710 to adhere to the upper enclosure structure 708, a similar adhesive may be positioned on the bottom of the electrode assembly 710 to adhere to the lower enclosure structure 712. The adhesive 711 may be a styrene-isoprene-styrene (SIS) adhesive, or any other suitable adhesive. The adhesive 711 may prevent or inhibit movement of the electrode assembly 710 within the enclosure 701.

The electrode assembly 710 may also include conductive terminals 716, 714 that conductively couple to (or define) the cathode and the anode (respectively) of the electrode assembly 710. As described with respect to FIGS. 7C and 7D, the conductive terminals 716, 714 may be conductively coupled to the conductive connectors 702, 704, respectively, to allow the battery to provide power to external components of the device.

To assemble the battery 230, the electrode assembly 710 may be positioned between the upper and lower enclosure structures (e.g., in the lower enclosure structure 712), and the upper and lower enclosure structures may be sealed. For example, the upper and lower enclosure structures may be welded together. In the example shown in FIG. 7B, the lower enclosure structure 712 defines a flange 709, and the peripheral portion of the upper enclosure structure 708 may be welded to the flange 709 along the entire periphery of the enclosure 701. During the assembly process, the adhesive 711 (as well as an adhesive on the bottom of the electrode assembly 710) may contact a surface of the enclosure 701 to adhesively couple the electrode assembly 710 to the enclosure 701.

Once the enclosure is sealed, an electrolyte (e.g., a liquid, gel, or other flowable material) may be introduced into the enclosure via a hole 718 formed through the enclosure. Once the electrolyte has been introduced, the hole 718 may be sealed shut.

Figure 7C:
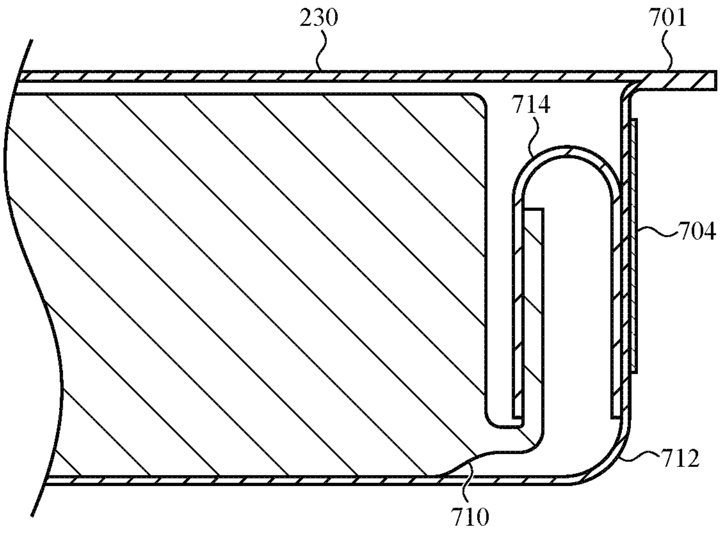
FIGS. 7C-7D are partial cross-sectional views of an example battery of an electronic device.
Figure 7D:
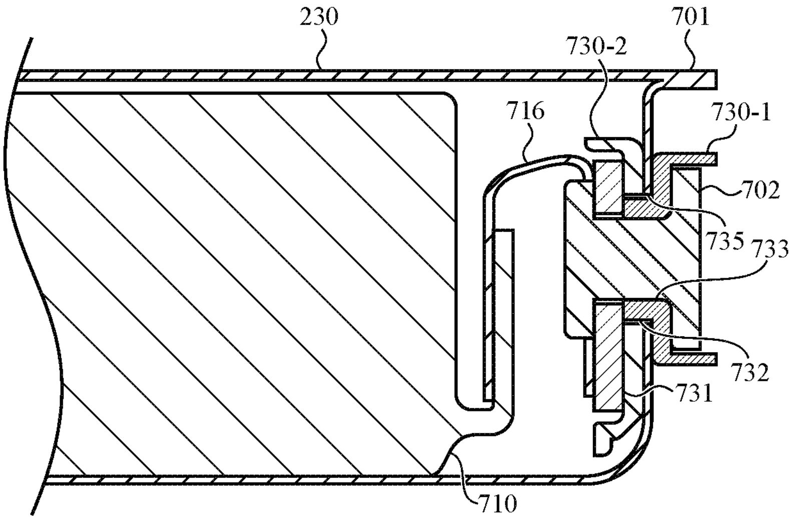

FIGS. 7C-7D are partial cross-sectional views of the battery 230, viewed along lines 7C-7C and 7D-7D (respectively) in FIG. 7A. FIGS. 7C-7D illustrate example couplings between the conductive terminals of the electrode assembly 710 to the conductive connectors 702, 704.

As noted above, the conductive terminal 714 (which may be or may include a flexible conductive element) of the electrode assembly 710, which is coupled to or defines the anode of the battery (e.g., the negative or neutral terminal) of the battery 230, is conductively and physically coupled to the enclosure 701. As shown in FIG. 7C, the conductive terminal 714, which may be conductively coupled to one or more electrodes in the electrode assembly 710, is attached to an internal surface of the enclosure 701 (e.g., an internal surface of the peripheral wall of the lower enclosure structure 712). For example, the conductive terminal 714 may be welded, soldered, brazed, or coupled using a conductive adhesive. By attaching the conductive terminal 714 to the enclosure 701 itself, the entire enclosure 701 may be at the anode potential of the battery (e.g., the negative or neutral connection). The conductive connector 704 may be a conductive pad configured to be physically and conductively coupled to other circuit components of the device to provide electrical power to the device. Because the conductive terminal 714 is conductively coupled to the enclosure 701, the conductive connector 704 may be attached to the enclosure 701 in order to conductively couple to the conductive terminal 714. Thus, for example, the conductive connector 704 may be welded, soldered, brazed, or otherwise attached to the enclosure 701 in a manner that conductively couples them.

FIG. 7D illustrates an example coupling between the conductive terminal 716 (which may be or may include a flexible conductive element), which is coupled to or defines the cathode of the battery (e.g., the positive terminal). Because the enclosure 701 is conductively coupled to the cathode, the conductive terminal 716 and the conductive connector 702 are conductively isolated from the enclosure 701. For example, a connector assembly that provides a conductive connection to the conductive terminal 716 may include an internal conductive member 731, the conductive connector 702, an external isolator 730-1, and an internal isolator 730-2. The conductive terminal 716 may be conductively coupled to the conductive member 731, which may be a metal or other conductive plate within the enclosure 701. The conductive terminal 716 may be welded, soldered, brazed, or otherwise conductively coupled to the conductive member 731. The internal isolator 730-2 is positioned between the conductive member 731 and the interior surface of the enclosure 701 to conductively isolate the conductive member 731 (and thus the conductive terminal 716) from the enclosure 701. The internal isolator 730-2 may be formed from an electrically insulating or dielectric material, such as a polymer, to provide the conductive isolation.

The external isolator 730-1 may be positioned between the conductive connector 702 and the exterior surface of the enclosure 701. The external isolator 730-1 may also include a ferrule portion 732 that extends into and/or through a hole

735 in the enclosure 701 to conductively isolate the hole surfaces from the conductive connector 702. The conductive connector 702 may define an extension portion 733 that extends through the hole 735 and conductively couples to the conductive member 731. The ferrule portion 732 of the external isolator 730-1 may ensure that the extension portion 733 does not contact the enclosure 701 in the hole 735, thereby maintaining electrical isolation of the conductive connector 702 from the enclosure 701. The extension portion 733 may be welded, brazed, soldered, swaged, or otherwise attached to the conductive member 731 in a manner that both conductively couples the conductive connector 702 to the conductive member 731, and secures the conductive connector 702 to the conductive member 731. By securing the conductive connector 702 to the conductive member 731, the conductive member 731, the internal isolator 730-2, and the external isolator 730-1 may be effectively clamped in place, thereby retaining the components to the enclosure 701 and sealing the hole 735.

While FIGS. 7A-7D use components of the device 200 to illustrate various features and concepts, it will be understood that the same features and concepts apply equally to the corresponding components of the device 300, or other devices described herein.

Figure 8A:
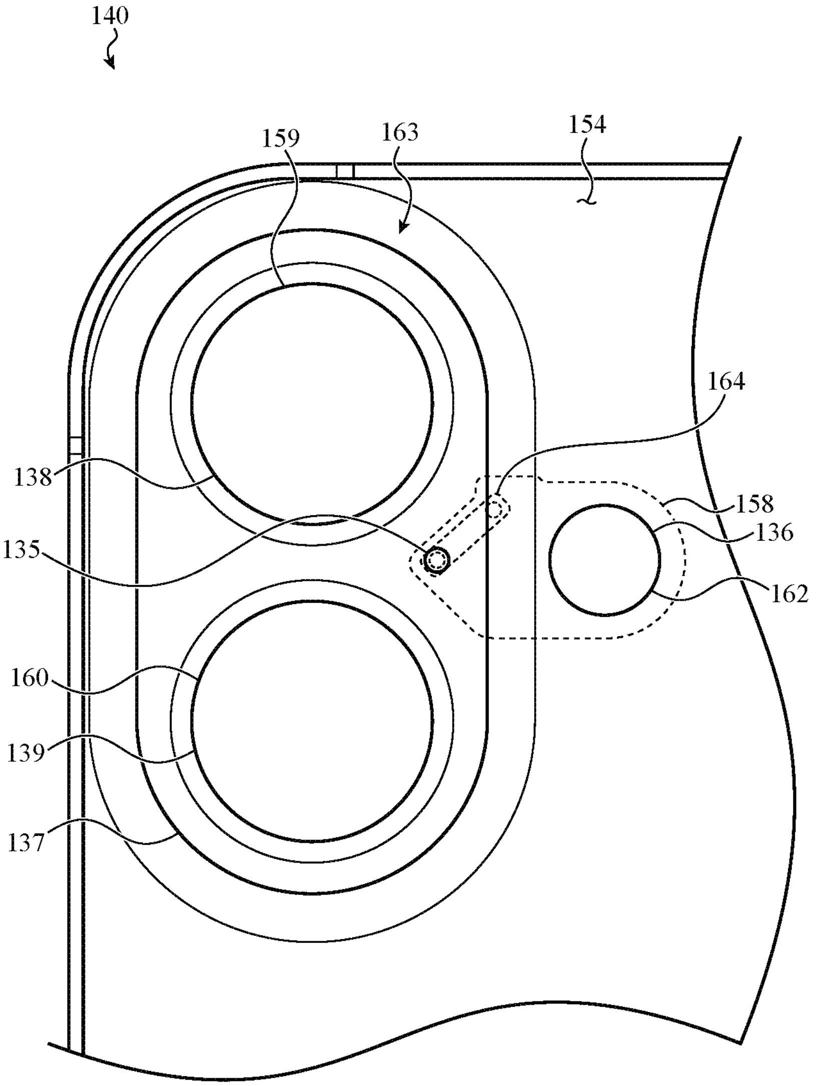
FIGS. 8A-8B depict a portion of an example electronic device with a rear-facing sensor array.

FIG. 8A shows a portion of the device 140, and in particular, a portion of the rear of the device 140 that includes the protrusion 137, which defines the raised sensor array region 163 of the device 140. The rear cover 154 further defines a first hole 159 through the protrusion 137 in the raised sensor array region 163, and a second hole 160 through the protrusion 137 in the raised sensor array region 163. A first lens of a first camera 138 extends at least partially into the first hole 159, and a second lens of a second camera 139 extends at least partially into the second hole 160.

The device 140 also includes a flash 136 (which may be or may include a flash module), at least partially within the device housing and positioned outside the raised sensor array region 163, and extending at least partially into a third hole 162 (e.g., a flash hole) defined by the rear cover 154 outside the raised sensor array region 163.

The rear cover 154 also defines a fourth hole 135, which corresponds to a microphone port (e.g., the microphone port 135). The fourth hole 135 is defined through the protrusion 137 in the raised sensor array region 163, and a microphone module is acoustically coupled to the fourth hole 135.

The camera lenses, the flash, and the microphone port may be arranged relative to one another in a particular orientation. For example, the first hole 159 and the second hole 160 (for the cameras) are aligned along a first direction (e.g., parallel to the lateral side of the phone; parallel to the y direction), and the third hole 162 and the fourth hole 135 (for the flash and microphone) are aligned along a second direction perpendicular to the first direction (e.g., perpendicular to the y direction, and/or parallel to the x direction). Moreover, the third hole 162 is equidistant from the first and second holes 159, 160, and the fourth hole 135 is also equidistant from the first and second holes 159, 160. The alignment and positioning of the third and fourth holes in this manner relative to the cameras (e.g., the first and second holes 159, 160) may provide optical and acoustic performance advantages. For example, the flash may provide substantially equal or even illumination patterns for each of the cameras, and the microphone port similarly has the same or similar relative position to each of the cameras, thereby providing the same or similar illumination and audio capture performance during image capture using either camera.

As described herein, while the microphone port 135 is positioned in the raised sensor array region 163, the microphone module that receives audio through the microphone port is positioned outside the raised sensor array region 163 (e.g., under an area of the rear cover 154 that is outside of the protrusion 137). Accordingly, the device 140 may include a bracket 158 coupled to the rear cover 154 (e.g., on an interior side of the rear cover assembly) and at least partially defining an acoustic waveguide 164 configured to acoustically couple the microphone module 165 (FIG. 8D) to the fourth hole 135. The acoustic waveguide thus allows the microphone port 135 to be located in the raised sensor array region 163, while allowing the microphone itself to be located remote from the raised sensor array region 163. More particularly, because the cameras are located below the raised sensor array region 163, there may not be sufficient space within the device to also incorporate the microphone module in the raised sensor array region (without increasing the thickness of the device in the z direction). Accordingly, the acoustic waveguide 164 may allow for the placement of the microphone port 135 in the raised sensor array region 163, without increasing the size or thickness of the device 140. While the instant example describes an acoustic waveguide for acoustically coupling a hole in the raised sensor array region to a microphone module that is remote from the raised sensor array region, the same or similar construction may be used to acoustically or fluidically couple a hole in the raised sensor array to other remotely located components. For example, a pressure sensor may be located remote from the raised sensor array region, and may be fluidically coupled to a hole in the raised sensor array using the same or similar components and techniques described herein (e.g., the acoustic waveguide may serve to fluidically couple the hole to the pressure sensor). As another example, a remote barometric venting system may be fluidically coupled to a hole in the raised sensor array. Other components are also contemplated.

Figure 8B:
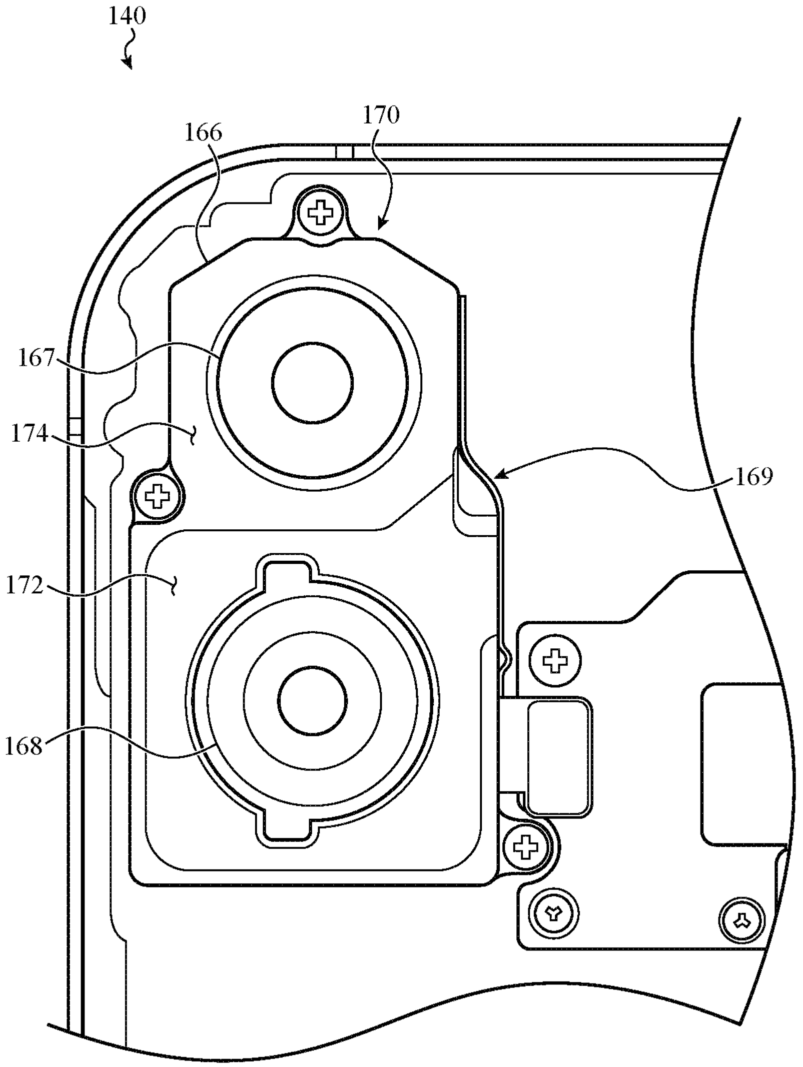
Figure 8C:
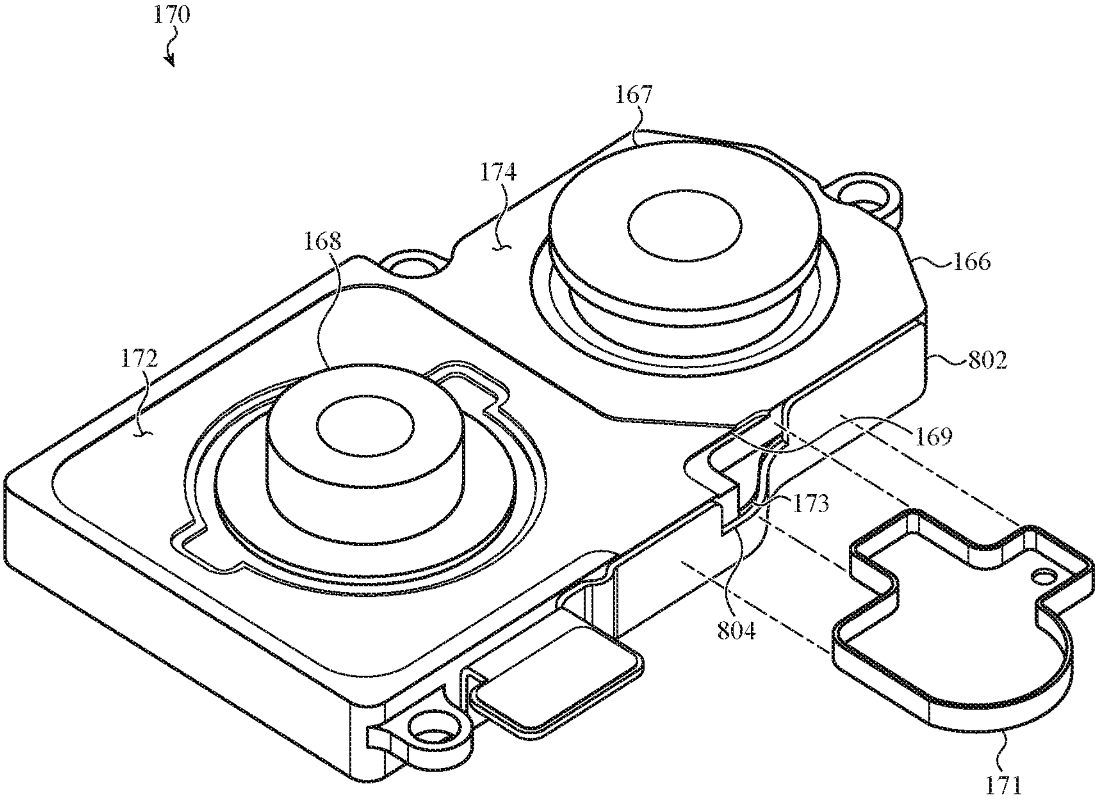
FIG. 8C depicts an example of a rear-facing camera assembly.

FIG. 8B illustrates the portion of the device 140 illustrated in FIG. 8A with the rear cover assembly removed. As shown in FIG. 8B, the device 140 includes a rear-facing camera assembly 170, which is positioned at least partially within the housing of the device 140. FIG. 8C illustrates a perspective view of the camera assembly 170. The camera assembly 170 includes a first lens assembly 167 that extends at least partially into the first camera hole 159 (FIG. 8A), and a second lens assembly 168 that extends at least partially into the second camera hole 160 (FIG. 8A). The first and second lens assemblies may be coupled to a camera housing 166. The camera housing 166 may be formed of metal or another suitable material, and may support the first and second lens assemblies, as well as other camera components including image sensors, optical components, circuitry, and the like.

The camera housing 166 may define a recess 169 along a side of the camera housing 166 to accommodate a portion of a cowling 171 of the microphone module. In particular, as noted above, the microphone module for the rear-facing sensor array may be positioned outside of the raised sensor array region, but acoustically coupled to a microphone port in the raised sensor array region. In order to accommodate the microphone module close to the microphone port, the camera housing 166 defines the recess 169, such that the cowling 171 can extend into the recess and at least partially overlap with the camera housing 166.

The recess 169 may be generally between the cameras of the camera assembly 170, and may extend into the camera housing 166 only a portion of the thickness of the camera housing 166. More particularly, the non-recessed region 173 or corner of the camera housing 166 may be occupied by components of the cameras, and thus the recess may be limited to a portion of the depth of the camera housing 166. The recess 169 may also provide a clearance, in the z direction, between the cowling 171 and the camera housing 166, such that if the device is subjected to an impact or other force, forces are not directly imparted to the rear cover through the cowling 171 (e.g., due to contact between the cowling 171 and the camera housing 166).

The camera housing 166 may also define a recessed region 172 around the second lens assembly 168. The recessed region 172 may be recessed, along the outer surface of the camera housing 166 relative to the region 174 around the first lens assembly 167. In some cases, the camera housing 166 may be thinned in the region 174 to allow the camera module within the camera housing 166 to be positioned closer to the rear cover assembly, which may result in the first lens assembly 167 extending further into the first hole 159 in the rear cover, and consequently allowing the use of a thinner camera cover (as compared to a housing without the thinned wall).

The recessed region 172 and the non-recessed region 174 may define substantially planar surfaces that extend completely around the second and first lens assemblies, respectively, to provide a continuous planar surface on which seals may be positioned. The seals may provide light sealing and environmental sealing to the camera housing 166 and/or the lens assemblies. The seals may contact or seal against an interior side of the rear cover assembly. The seals may be formed of or include foam, adhesives, or another deformable sealing material.

FIG. 8C also illustrates a flexible circuit element 802 that operatively couples one or more of the cameras of the rear-facing camera assembly 170 (e.g., a first camera associated with the first lens assembly 167 and/or the second camera associated with the second lens assembly 168) to a processing system of the electronic device (e.g., to a circuit board assembly with a processor, or to another processing system). The flexible circuit element 802 may extend along a side of the camera housing 166, and in particular, along the side of the camera housing 166 that defines the recess 169. The flexible circuit element 802 may define a notch 804 that is aligned with the recess 169 (e.g., that conforms to a periphery of the recess 169 or does not occlude or cover the recess 169 from the side). The notch 804 therefore provides a clearance at the location of the recess 169 for the cowling 171 to extend into both the recess 169 and the notch 804. Traces or other conductive elements in the flexible circuit element 802 may be routed through the flexible circuit element 802 along a side of the notch 804 (e.g., through the portion of the circuit substrate that defines the notched region).

Figure 8D:
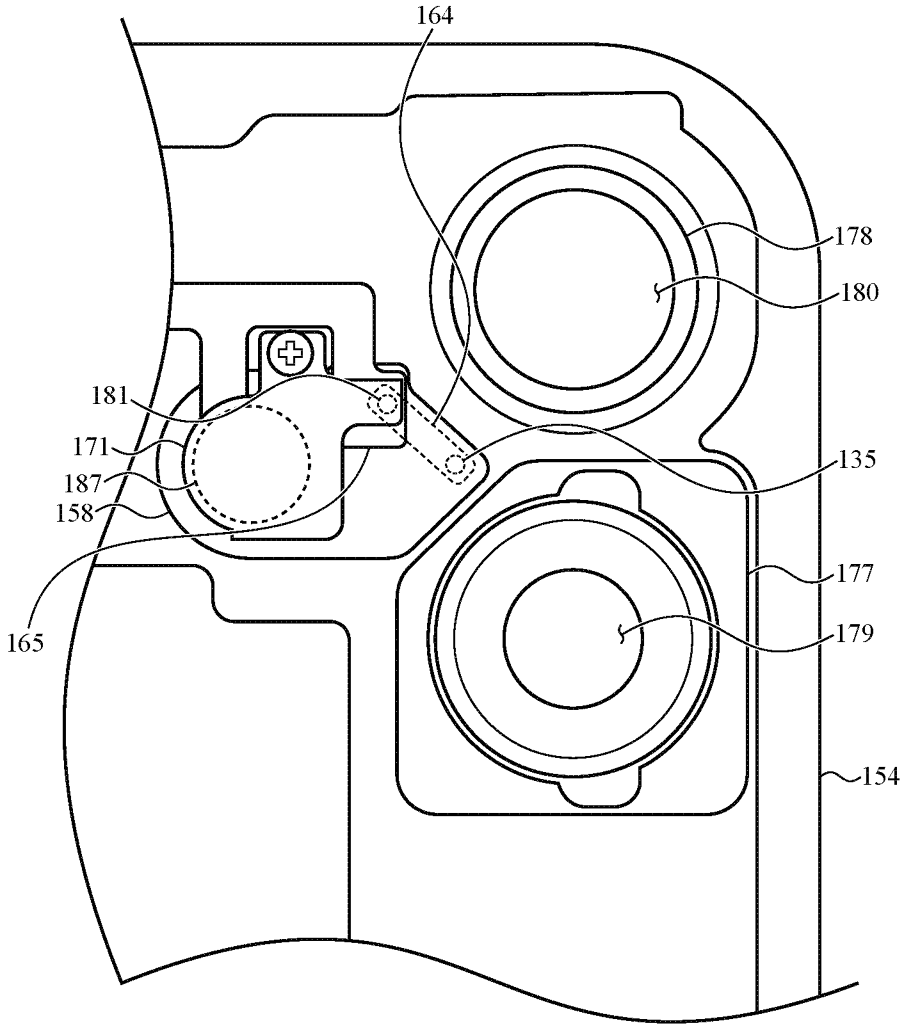
FIG. 8D depicts a portion of an example rear cover assembly for an electronic device.

FIG. 8D illustrates a portion of the rear cover assembly that is positioned over the rear-facing camera assembly 170. The rear cover assembly includes the rear cover 154 and a camera cover 180 that covers the first lens assembly 167, and a camera cover 179 that covers the second lens assembly 168. Also shown are seals 177, 178, which seal against the recessed region 172 and the non-recessed region 174, as described above.

FIG. 8D also illustrates an example of the microphone module 165, flash module 187, cowling 171, and bracket 158, which are coupled to an interior surface of the rear cover 154. The cowling 171 may at least partially cover the flash module 187 and the microphone module 165, and may at least partially structurally couple the flash module 187 and the microphone module 165 to the rear cover 154.

Figure 9:
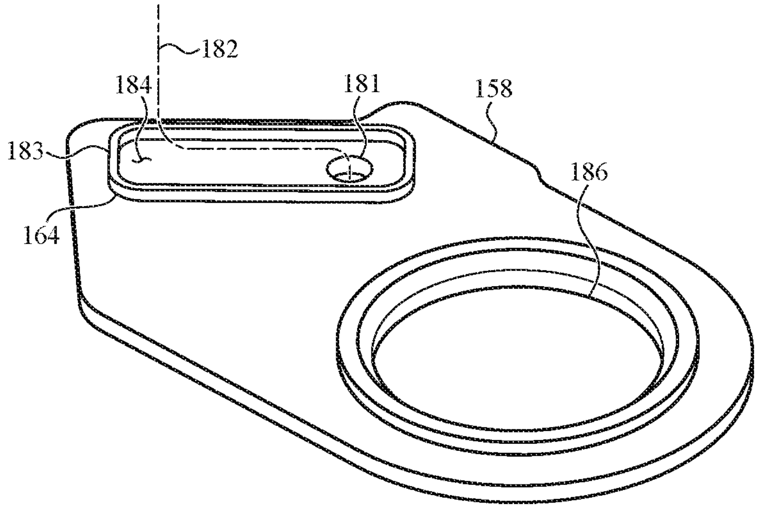
FIG. 9 depicts an example bracket for use with a strobe and microphone module of an electronic device.

As noted above, the bracket 158 defines an acoustic waveguide 164 that acoustically couples the microphone port 135 to the microphone module 165. FIG. 9 illustrates an isolated view of an example bracket 158. The bracket 158 may include or define a base 184, and a continuous wall 183 extending from the base 184. The bracket 158 may also define a hole 181 that acoustically couples to the microphone module 165. The bracket 158 may further define a hole 186 through which a flash module may at least partially extend (and/or through which the flash may emit light). The flash module 187 may also be coupled to the bracket 158 (e.g., via adhesive, fasteners, mechanical couplings, etc.).

The continuous wall 183 may seat against the rear cover (or the rear cover assembly) to define the acoustic waveguide 164 between the base 184 and the rear cover (or any other component of the rear cover assembly). For example, when seated against the rear cover, the continuous wall 183 defines a channel or tunnel that acoustically couples the microphone port 135 to the microphone module 165. For example, FIG. 9 illustrates an example acoustic path 182 that is defined by the acoustic waveguide 164. In this example, the acoustic path 182 extends through the microphone port, into a first end of the acoustic waveguide 164, through the channel or tunnel defined by the wall 183, the base 184, and the rear cover (or other rear cover component), and through the hole 181 at a second end of the acoustic waveguide (opposite the first end) and to the microphone module 165.

In some cases, a compliant material, adhesive, or other sealing element may be positioned along the top of the wall 183 or otherwise positioned between the top of the wall 183 and the rear cover assembly. The compliant material, adhesive, or other sealing element may seal the acoustic waveguide, thereby reducing sound attenuation or loss or other acoustic interference or issues. The bracket 158 may be formed of a polymer, metal, or another suitable material (including combinations or assemblies of different materials).

Figure 10A:
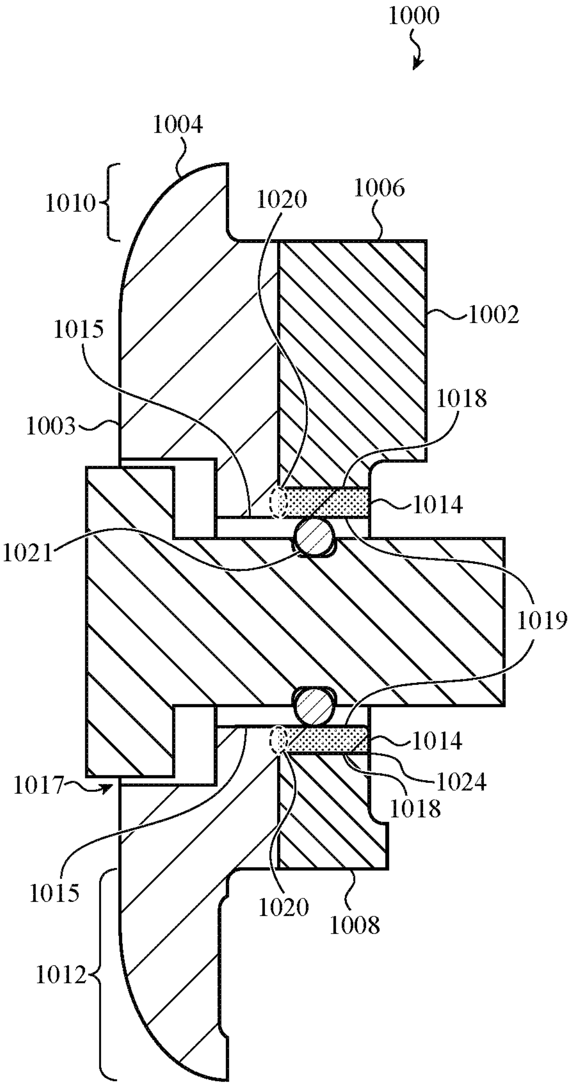
FIG. 10A is a partial cross-sectional view of a housing component having a clad construction.

FIG. 10A is a partial cross-sectional view of a housing component 1000 having a clad construction. The housing component 1000 may correspond to any housing and/or housing component described herein that may have a clad construction, such as the housing components 124, 125, 126, 127, 128, and 130 of the device 100, or the housing components 211, 212, 213, 214, 215, or 216 of the device 200, or the housing components 312, 313, 317, 315, 316, or 319 of the device 300. FIG. 10A may generally correspond to a view along line 10A-10A in FIG. 4A.

The housing component 1000 may include a core portion 1002 and a cladding portion 1004. The core portion 1002 may be bonded directly to the cladding portion 1004. The housing component 1000 may be formed by co-extruding the core portion 1002 and the cladding portion 1004 to form a clad precursor material. In the clad precursor material, the core portion 1002 and the cladding portion 1004 may be fused or otherwise bonded together. The fusion may occur along an interface (which may be within the bulk of the clad member). The fusion may be characterized by a diffusion bond between the core portion 1002 and the cladding portion 1004 at the interface.

The precursor material may then be formed into the housing component 1000 (e.g., an extrudate member) using various processes. For example, the precursor material may be forged and/or machined to define the overall shape and the mechanical features of the housing component 1000, and then subjected to polishing, texturing, and/or coating operations. The mechanical features may include interlocking features for interlocking with joint structures (e.g., to mechanically couple housing components together), attachment features (e.g., holes for receiving fasteners), mounting surfaces, antenna feed and ground points, and the like.

The cladding portion 1004 may define an exterior surface 1003 of the housing component 1000. The core portion 1002 may define an interior surface of a device and/or a housing (e.g., a surface that is not exterior or externally viewable in the completed device).

The exterior surface 1003 defined by the cladding portion may have a surface texture that produces a certain visual appearance and/or tactile feel. For example, the surface texture may have a texture that produces diffuse reflections. The surface texture may be produced by grinding, lapping, machining, ablation, blasting (e.g., sand blasting, bead blasting), etching (via mechanical etching, laser etching, chemical etching, or the like), or any other suitable texturing operation(s). The exterior surface 1003 may also include a coating, such as a deposited coating. A deposited coating may be deposited on the housing components via plasma vapor deposition (PVD), chemical vapor deposition (CVD), or the like. In some cases, the cladding portion 1004 is polished (before and/or after coating).

The core portion 1002 may be aluminum (e.g., an aluminum alloy), and the cladding portion 1004 may be titanium (e.g., a titanium alloy). In some cases, the core portion 1002 is aluminum and the cladding portion 1004 is stainless steel. Other materials are also contemplated for the core and cladding portions.

Both the core portion 1002 and the cladding portion 1004 may define a portion of mounting surfaces 1006 and 1008 on which a front cover assembly and a rear cover assembly, respectively, may be coupled. For example, a frame member of a front cover assembly (which is coupled to a front cover) may be attached to the mounting surface 1006 via an adhesive. As another example, the front cover may be attached directly to the adhesive. Similarly, a rear cover may be attached to the mounting surface 1008 via an adhesive. In some cases, a rear cover assembly includes a frame member or another component, and the frame member is attached to the mounting surface 1008 via the adhesive.

The cladding portion 1004 may also define a flange or lip portion 1010 that extends around and at least partially covers the side of a front cover, and a flange or lip portion 1012 that extends around and at least partially covers the side of a rear cover. In some cases, the flange or lip portions 1010, 1012 are substantially flush with the exterior surfaces of the front and rear covers. In some cases, the flange or lip portions 1010, 1012 are defined only by the cladding portion 1004, while in other cases they are at least partially defined by the core portion 1002.

FIG. 10A also shows an example structure for inhibiting or preventing galvanic corrosion in the area of a through-hole 1017 that extends through the wall segment defined by the housing component 1000. The through-hole 1017 may represent a hole for a button, as shown, but the same or similar construction described herein may be used at holes for charging ports, speakers, SIM trays, microphones, dials, or the like. As described herein, the through-hole may be formed by drilling a hole through a core portion 1002 to reveal a surface of the cladding portion 1004, adding material inside the hole and (e.g., fusing the material to the revealed cladding surface), and then removing some of the added material (e.g., by drilling a hole in the added material) to form the through-hole as well as a lining structure 1014 that remains fused to the cladding portion 1004. Because the lining structure 1014 is formed of the same material as the cladding portion 1004, there is little or no risk of galvanic corrosion at the seam 1024 or interface between the cladding portion 1004 and the lining structure 1014 within the through-hole. Moreover, the configuration of the lining structure 1014 results in the seam 1024 between the different metals of the core portion 1002 and the cladding portion 1004 (and lining structure 1014) being positioned inside the environmentally sealed interior volume of the device, and not along the hole surface where it may come into contact with water, moisture, or other liquids or contaminants. As described herein, this configuration may help prevent or inhibit galvanic corrosion from occurring at the seam 1024 between the material of the core portion 1002 and the material of the cladding portion 1004 and/or the lining structure 1014. In some cases, the core portion 1002 and the cladding portion 1004 may be in contact at the seam 1024. In such cases, a metallurgical bond may or may not be present at the seam 1024. In some cases, a gap may be present at the seam 1024 (e.g., the core portion and the cladding portion may be set apart at the seam 1024.

As shown in FIG. 10A, the cladding portion 1004 defines a portion of a side exterior surface of a device, and a first portion 1015 of the through-hole 1017. The core portion 1002, which is coupled to the cladding portion 1004, defines a counterbore hole 1018 along the interior side of the housing component 1000. The counterbore hole 1018 extends through the core portion 1002 to the cladding portion 1004 and is aligned with the through-hole 1017. For example, the counterbore hole 1018 may be concentric with the through-hole 1017. In other cases, the counterbore hole 1018 need not be concentric with the through-hole 1017. More particularly, the counterbore hole 1018 may be provided so that the lining structure 1014 can be fused to the cladding portion 1004 along a shelf or ledge of the cladding portion 1004 (e.g., where the fusion region 1020 is located), as further illustrated in FIGS. 10C-10D. Thus, the counterbore hole 1018 may have any suitable shape that allows the material of the lining structure 1014 to be fused to the cladding portion 1004.

The lining structure 1014, which may be formed by a metal deposition and machining process, as described herein, is positioned in the counterbore hole 1018 and defines a second portion 1019 of the through-hole. As described herein, the lining structure 1014 may be formed of the same material as the cladding portion 1004 and may be fused to the cladding portion 1004 at a fusion region 1020. As such, the lining structure 1014 is represented by stippling in FIG. 10A to differentiate the lining structure 1014 from the cladding portion 1004.

The fusion region 1020 may define a third portion of the through-hole 1017, between the first portion 1015 of the through-hole and the second portion 1019 of the through-hole. Thus, as described herein, the hole surface of the through-hole may be a continuous hole surface that is defined in part by each of the cladding portion 1004, the fusion region 1020, and the lining structure 1014. More particularly, the cladding portion 1004 defines a first portion of a hole surface of the through-hole 1017, the lining structure 1014 defines a second portion of the hole surface of the through-hole 1017, and the fusion region 1020 between the cladding portion 1004 and the lining structure 1014 defines a third portion of the hole surface of the through-hole 1017. As described herein, the continuous hole surface of the through-hole 1017 may be a machined surface, formed by drilling or otherwise machining a hole through the cladding portion 1004 and through the metal material that is fused to the cladding portion 1004 (and from which the lining structure 1014 is formed).

Because the cladding portion 1004, fusion region 1020, and lining structure 1014 are formed of the same material (e.g., a titanium alloy), the hole surface of the through-hole is not subject to or is otherwise resistant to galvanic corrosion that may occur if water or other liquids or contaminants are present in the through-hole 1017. More particularly, forming the hole using the fused lining structure as shown and described herein may define a single-material surface along an interface that liquid may contact. In this way, liquid that enters the through-hole does not contact a seam between the different materials of the core and cladding portions. For example, a component such as a button, SIM tray, speaker, or the like, may extend into the through-hole 1017. For example, an input member (e.g., of a button) may define a shaft that extends into the through-hole 1017. A sealing member 1021 may be positioned in the through-hole 1017 and may be positioned against the shaft and the hole surface to define a seal against the lining structure 1014. The sealing member may define a seal between a sealed interior volume of the device and an external environment, and may inhibit ingress of liquid or moisture into the sealed interior volume of the device (where a scam 1024 between the core and cladding materials may be exposed). Accordingly, liquid is contained to the exterior region where there is no exposed seam between the core and cladding portions. Stated another way, this configuration positions the seam 1024 between different metal materials within the sealed inner volume of the device, such that the seam is less likely to encounter liquids or moisture and therefore less likely to undergo galvanic (or other) corrosion.

Figure 10B:
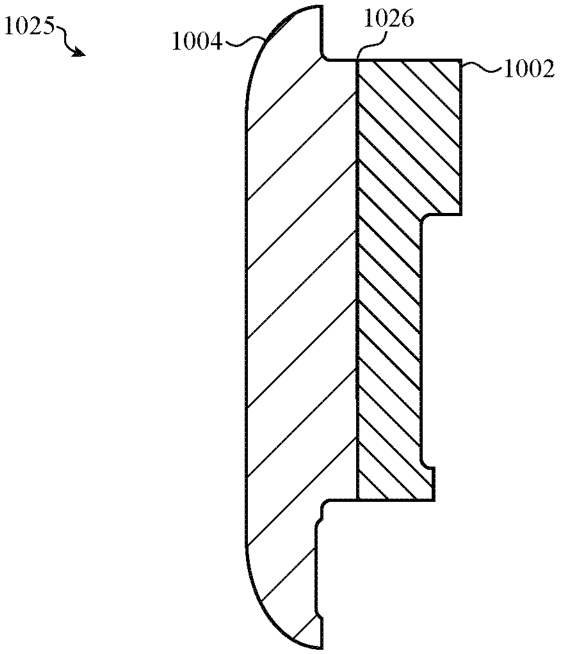
FIGS. 10B-10F are partial cross-sectional views of a housing, illustrating example operations for forming a lining structure in a housing.

FIGS. 10B-10E illustrate stages of an example process for forming a housing component, such as the housing component 1000, with a fused lining structure defining a portion of a through-hole. FIG. 10B illustrates a clad precursor 1025, which includes the cladding portion 1004 fused to the core portion 1002. As described herein, the cladding portion 1004 and the core portion 1002 may be fused together via a diffusion bond along an interface 1026. The diffusion bond may be formed during an extrusion process, as described herein.

Figure 10C:
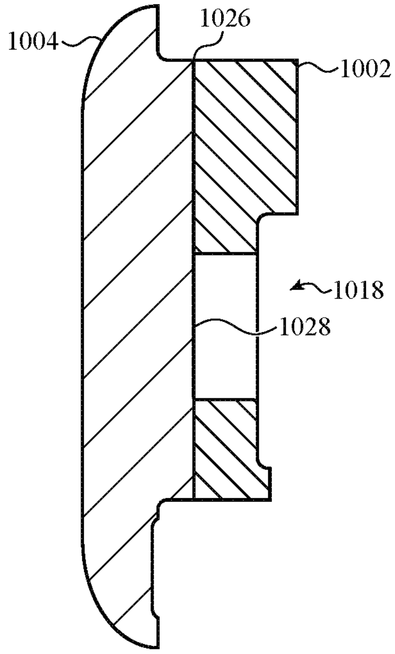

As shown in FIG. 10C, a counterbore hole 1018 may be formed in the core portion 1002. The counterbore hole 1018 may extend fully to the cladding portion 1004, and may expose a surface 1028 of the cladding portion 1004. Stated another way, the counterbore hole 1018 may be a blind hole, where at least the bottom surface of the blind hole is defined by the cladding portion 1004.

Figure 10D:
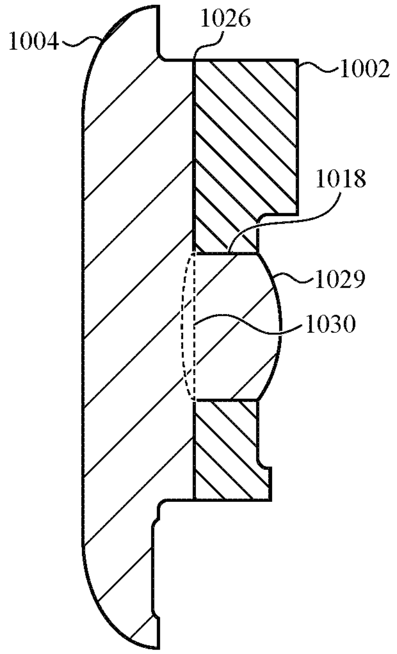

As shown in FIG. 10D, after forming the counterbore hole 1018, material 1029 may be fusion bonded to the cladding portion 1004 inside the counterbore hole 1018, along the surface 1028. For example (described in greater detail in FIG. 10F), the material 1029 may be deposited on and fused to the cladding portion 1004 via a laser-based direct metal deposition process (in which a laser is used to melt a filler material and fuse the filler material to the cladding portion 1004), thereby forming a fusion region 1030 at the interface between the cladding portion 1004 and the material 1029. The fusion region 1030 may correspond to a region where the material of the cladding portion 1004 and the material 1029 have been melted together and re-solidified. As described herein, the cladding portion 1004 and the material 1029 may be the same metal and/or metal alloy, or may otherwise be formed of materials (e.g., metals) that have less potential for galvanic interaction or corrosion. As one example, the cladding portion 1004 and the material 1029 may be or may include titanium.

While the material 1029 is fused to the cladding portion 1004 as a result of the direct metal deposition operation, in some cases the material 1029 (and thus the lining structure that is formed from the material 1029) may be fused to the core portion 1002 as well. For example, due to the heat imparted to the material 1029 during the deposition and fusion of the material 1029 to the cladding portion 1004, the material 1029 may also become fused to the core portion 1002 along the hole surface of the counterbore hole 1018 (e.g., the material 1029 and the material of the core portion 1002 have sufficiently melted together and coalesced to form a solid structure composed of a mixture of both materials). In other cases, the material 1029 may not fuse to the core portion 1002. For example, in some cases, the material 1029 may be in contact with the core portion 1002, but not fused to the core portion 1002. In yet other examples, the material 1029 and the core portion 1002 may be set apart by a gap.

After the material 1029 is deposited and fused to the cladding portion 1004 (and optionally at least partially to the core portion 1002), the through-hole 1017 is formed through the cladding portion 1004 and the added material 1029. The through-hole 1017 may be formed via a machining process, such as drilling or milling, thereby forming a continuous machined surface of the through-hole (e.g., a continuous machined surface defined along the cladding portion 1004, the fusion region 1020, and the lining structure 1014).

Figure 10E:
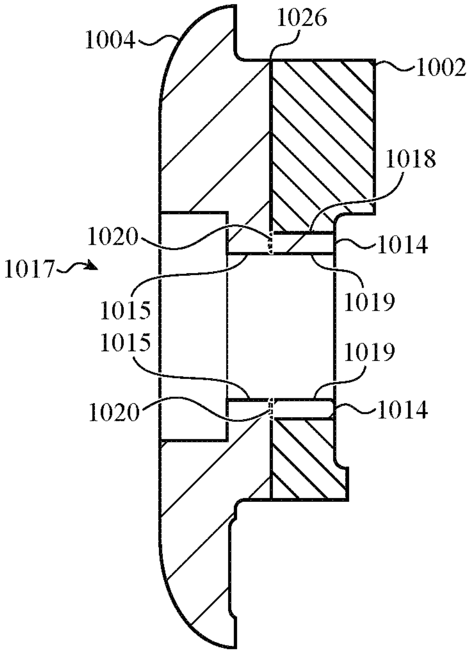

FIG. 10E illustrates the housing component 1000 after the through-hole 1017 is formed. As shown, and as described herein, the cladding portion 1004 defines a first portion 1015 of the through-hole 1017. The core portion 1002 defines the counterbore hole 1018 along the interior side of the housing component 1000. The lining structure 1014 is positioned in the counterbore hole 1018 and defines a second portion 1019 of the through-hole 1017. The lining structure 1014 may be formed of the same material as the cladding portion 1004 and may be fused to the cladding portion 1004 at a fusion region 1020 (which may be a remaining portion of the fusion region 1030), and the fusion region defines a third portion of the through-hole 1017. Thus, as shown, the hole surface of the through-hole 1017 may be a continuous hole surface that is defined in part by each of the cladding portion 1004, the fusion region 1020, and the lining structure 1014.

Figure 10F:
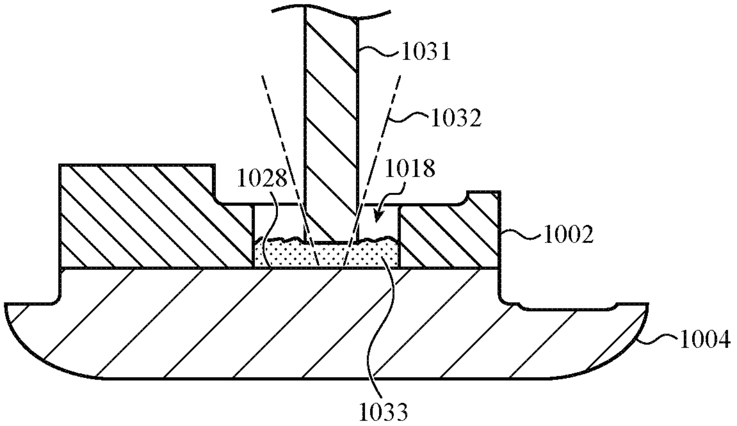

FIG. 10F illustrates an example laser-based deposition operation in which the material 1029 is ultimately deposited in the counterbore hole 1018 and fused to the cladding portion 1004. As shown, a filler material 1031, which may be the same material as the cladding portion 1004 or another material that will not substantially galvanically interact with the material of the cladding portion 1004, may be introduced into the counterbore hole 1018, and a laser beam 1032 (e.g., an annular laser beam) may be directed into the counterbore hole 1018 such that the filler material 1031 is melted and deposited in the counterbore hole 1018. During this process, the laser beam 1032 causes the cladding portion 1004 to be at least partially melted along its surface, such that the molten filler material 1031 fuses to the molten surface of the cladding portion 1004 (e.g., at the interface between the filler material 1031 and the cladding portion 1004). The filler material 1031 may be introduced into the laser beam through a center of the annular laser beam. Using this process, the counterbore hole 1018 may be filled with the melted filler material to form the deposited material 1029, as shown in FIG. 10D. The counterbore hole 1018 may be filled exclusively by the filler material. After the molten filler material 1031 is deposited into the counterbore hole 1018, it is allowed to resolidify to form the solid material portion 1029 (shown in FIG. 10D). FIG. 10F illustrates the laser-based deposition operation partway through the deposition operation, in which material 1033 (e.g., a portion of the material that ultimately forms the added material 1029 in FIG. 10D) has already been deposited into the counterbore hole 1018 by melting the filler material 1031 with the laser beam 1032.

Figure 11A:
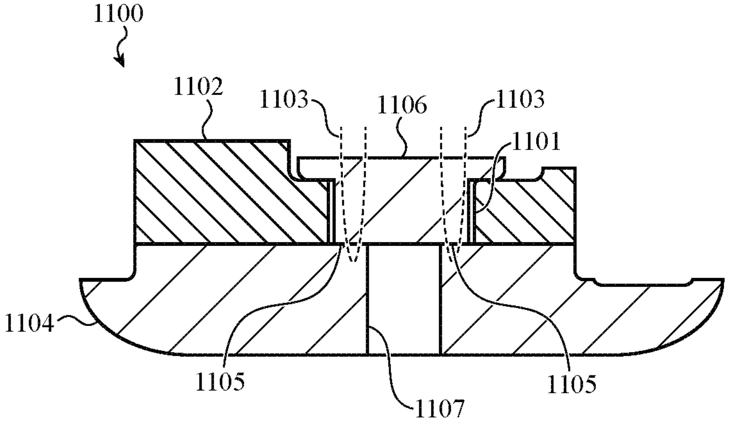
FIGS. 11A-11B are partial cross-sectional views of a housing, illustrating additional example operations for forming a lining structure in a housing.
Figure 11B:
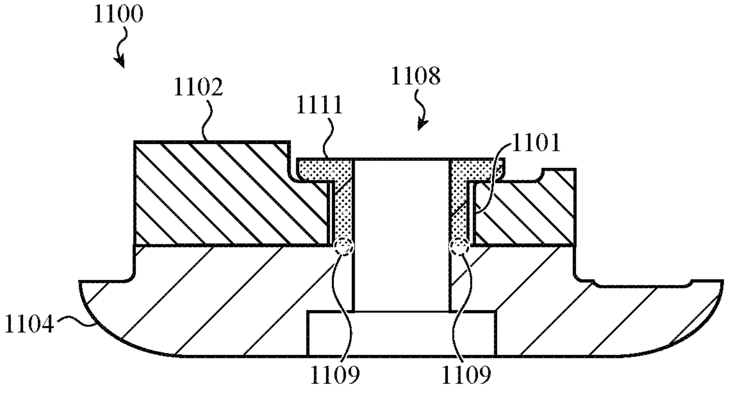

FIGS. 11A-11B illustrate another example technique for filling a counterbore hole in a core portion in order to form a lining structure as shown and described herein. FIG. 11A illustrates a clad precursor 1100 that includes a cladding portion 1104 and a core portion 1102. A counterbore hole 1101 is formed through the core portion 1102 to the cladding portion 1104, exposing a surface 1105 of the cladding portion 1104. In some cases, a hole 1107 may be formed through the cladding portion 1104 as well. An insert 1106 is positioned in the counterbore hole 1101 and on the exposed surface 1105 of the cladding portion 1104. The insert 1106 may be formed from the same material as the cladding portion 1104 (e.g., a titanium alloy). The insert 1106 may be welded to the cladding portion 1104. For example, the insert 1106 may be laser welded to the cladding portion 1104 (represented by laser beams 1103). The welding process may result in a fusion region 1109 (FIG. 11B) at the surface 1105, where the insert 1106 is fused to the cladding portion 1104. As shown, the insert 1106 has a flange at the top of the insert 1106 (e.g., forming the upside-down top hat shape in FIG. 11A), though in other cases the insert 1106 may have a cylindrical shape (e.g., without a flange), or any other suitable shape that facilitates filling the counterbore hole 1101.

FIG. 11B illustrates the clad precursor 1100 after the insert 1106 is welded to the cladding portion 1104 in the counterbore hole 1101, and after a through-hole 1108 is formed through the insert 1106 (e.g., via machining, as described herein) to form a lining structure 1111. Similar to the structure that results from the metal deposition technique described with respect to FIGS. 10B-10E, the technique illustrated in FIGS. 11A-11B results in a housing in which a continuous machined surface is defined along the cladding portion 1104, the fusion region 1109, and the lining structure 1111. Stated another way, the cladding portion 1104, the fusion region 1109, and the lining structure 1111 each define a portion of the through-hole 1108 through the clad precursor 1100 (which is ultimately formed into a housing component).

Figure 12A:
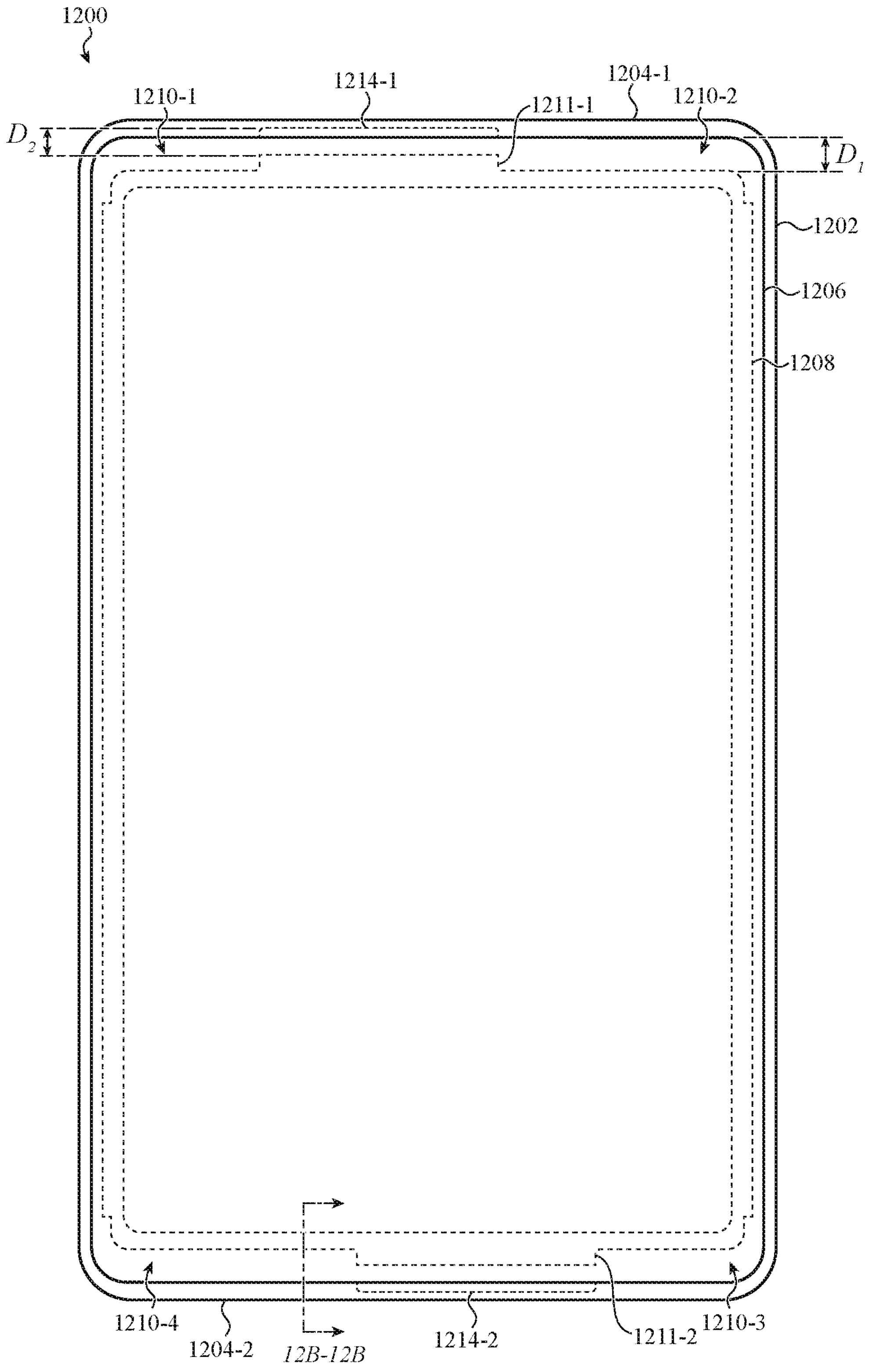
FIG. 12A is a front view of an example electronic device.
Figure 12B:
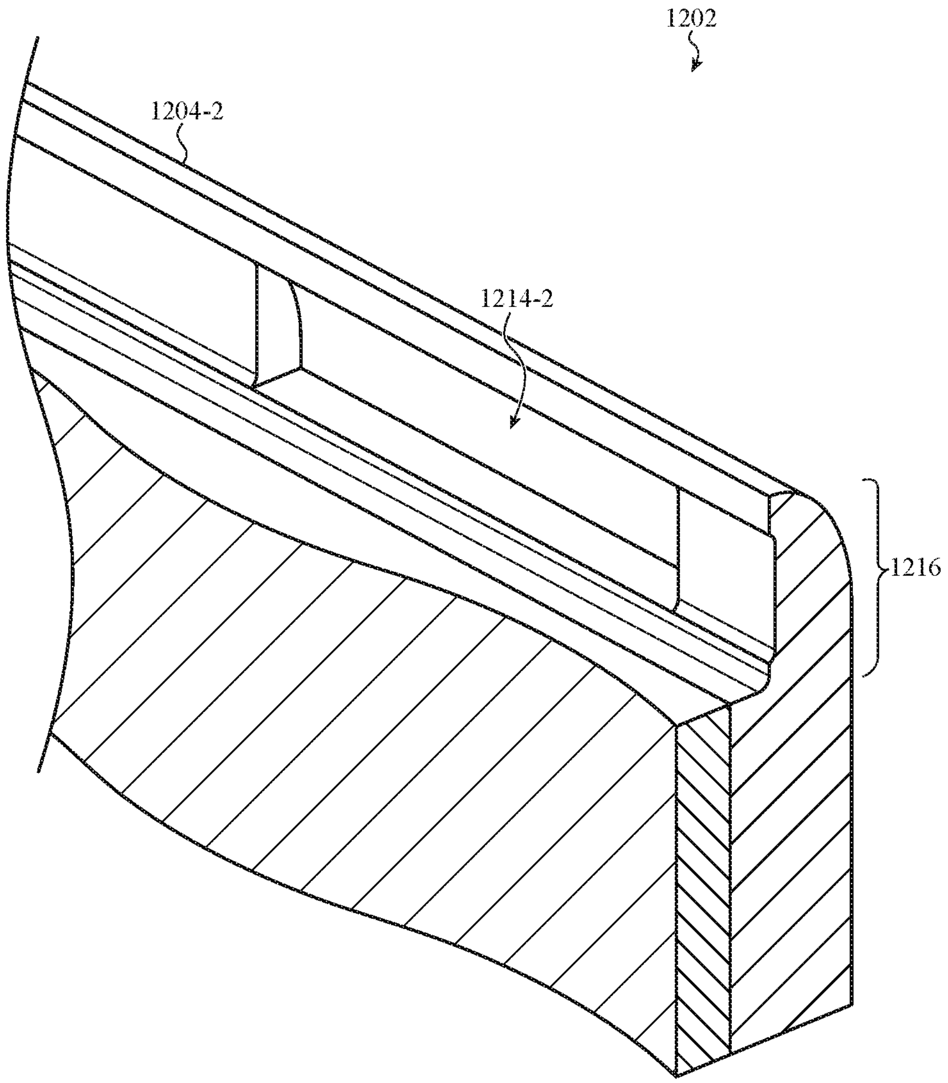
FIG. 12B is a perspective view of a portion of an example housing of an electronic device.

As described herein, housing components of an electronic device housing may be used as radiating structures for wireless communication antenna systems. In some cases, the radiating portions of the housing components may be affected by the presence of nearby conductive materials. For example, other metal structures that are proximate the radiating portions may interfere with (e.g., capacitively couple to) the radiating portions, which may affect antenna performance. FIGS. 12A-12B illustrate example housing and front cover assembly configurations that mitigate or reduce the effect of nearby conductive components on the radiating portion.

FIG. 12A illustrates a front view of an example electronic device 1200, which may be an embodiment of or otherwise correspond to any electronic device described herein. The device 1200 may include a housing 1202 (which may include multiple housing components coupled together, as described herein) and a front cover assembly 1206 coupled to the housing 1202. The front cover assembly 1206 may include a support frame 1208 that is part of the display stack that is coupled to a front cover of the front cover assembly 1206. In some cases, the support frame 1208 may be a metal structure that defines a flange and is at least partially encapsulated in a molded polymer frame that is coupled to and extends around the periphery of the front cover. The molded polymer frame may provide structural rigidity to the front cover assembly, and may define a mounting surface that is used to adhere or otherwise couple the front cover assembly to the housing 1202. For example, the frame member may define an upper surface coupled to the front cover, and a lower surface coupled to the housing. The upper surface may be coupled via direct adhesion of the molded polymer material to the front cover (as well as mechanical engagement with features of the display stack, such as the support frame 1208), and the lower surface may be coupled to the housing via an adhesive (e.g., a heat sensitive adhesive, pressure sensitive adhesive, etc.). The molded polymer material may be formed using a low injection pressure overmolding process, in which a front cover subassembly is positioned in a fixture that defines a mold cavity around the support frame 1208, and a flowable material is introduced into the mold cavity. The flowable material is then cured or otherwise hardened to form the polymer frame.

In some cases, the proximity of the support frame 1208 to the radiating portions of the housing 1202 may negatively affect the performance of (or otherwise interfere with) the radiating portions. Accordingly, the support frame 1208 and the housing 1202 may be configured with strategically located recesses, protrusions, thinned regions, and full-thickness regions that maintain suitable physical separation between the radiating portions and the support frame 1208, while also maintaining housing strength in certain locations.

For example, in some cases, the corners of the housing 1202 are used as radiating structures. Accordingly, for antenna performance, it is advantageous to increase the distance between those portions of the housing 1202 and the corners of the support frame 1208. However, the housing corners are also susceptible to drop events or other impacts, and it may not be preferrable to reduce the thickness of the housing in the corners in order to achieve a target physical separation from the support frame 1208. Accordingly, as shown in FIG. 12A, the support frame 1208 may define recessed regions 1210 (e.g., 1210-1 through 1210-4) proximate the corners of the housing 1202. The recessed regions 1210 may be recessed relative to full-width (or wider) portions 1211 of the support frame. The recessed regions 1210 set the support frame 1208 apart from the housing 1202 by a target distance (e.g., distance $D_1$ in FIG. 12A), while maintaining full thickness of the housing 1202 in the corner region.

Additionally, in areas of the housing 1202 where strength may be less important or where less material can be used to provide sufficient strength (e.g., away from the corners), the housing 1202 may be thinned to define thinned regions 1214, while the support frame 1208 may have a greater flange width in those areas. Thus, the support frame 1208 and the adjacent portion of the housing 1202 may be set apart by a target distance (e.g., distance $D_2$ in FIG. 12A). By using combinations of recessed regions 1210 on the support frame 1208 and thinned regions 1214 of the housing 1202, the distance between the support frame 1208 and the housing 1202 at different regions may be substantially the same (e.g., distances $D_1$ and $D_2$ may be the same or substantially the same, such as within about 10%, while accounting for different structural demands of the device. Thus, for example, where higher strength (or more housing material) is specified, the housing 1202 may have full thickness and the support frame 1208 may have a recessed region, and where less strength (or less housing material) is specified, the housing 1202 may have a thinned region and the support frame 1208 may have a larger flange width. Combinations of complementary thinned housings and full size support frames (and vice versa) may be positioned at various locations around the device, such as shown in FIG. 12A.

FIG. 12B illustrates a perspective view of a portion of the housing 1202, viewed along line 12B-12B in FIG. 12A. The portion of the housing 1202 shown in FIG. 12B may define at least a portion of an antenna radiator, as described herein. As shown, the housing 1202 includes a rim portion 1216 (also referred to in some cases as a flange or lip portion) that is positioned adjacent a side of a front cover assembly when the front cover assembly is attached to the housing 1202. The rim portion 1216 defines a first region 1204-2 having a first thickness (e.g., a full thickness or greatest thickness of the rim portion), and a second region 1214-2 (e.g., a thinned region) having a second thickness that is less than the first thickness. The thinned region 1214-2 may be formed via forging, machining, or any other suitable process. (FIG. 12A also illustrates a region 1204-1 having a first thickness (e.g., a full thickness or greatest thickness of the rim portion), and a second region 1214-1 (e.g., a thinned region) having a second thickness that is less than the first thickness).

The devices described herein may include buttons that incorporate multiple different sensing, press detection, and tactile feedback functionality. For example, such buttons may include a touch sensor that detects touch inputs along an exterior surface of the button (e.g., an input surface), a force sensor (e.g., a strain-based force sensor) that detects or determines a force of an input to the button, and a tactile switch that actuates when the button is pressed with a sufficient or threshold force. The tactile switch may also provide tactile feedback to indicate when the input has actuated the tactile switch. Since the button is also associated with a force sensor, however, the button may be associated with other actuation points, thresholds, or conditions (e.g., a "half press") that may cause the device to perform certain actions that are different from those performed in response to actuation of the tactile switch. In order to indicate that such actuation points have been met or satisfied, the device may produce a haptic output using an onboard haptic actuator (e.g., a device-wide haptic actuator, such as the haptic actuators 222, 322 in FIG. 2, 3, or a separate haptic actuator, such as a dedicated haptic actuator for one or more buttons). Further, as noted above, the button may include a touch sensor to detect touch (and optionally gesture) inputs to the button. Such touch inputs may cause the device to perform other actions that are different from those that are initiated by half presses (or other partial presses) and full presses (e.g., resulting in actuation of the tactile switch). Additionally, touch inputs may also be associated with or trigger haptic outputs from an onboard haptic actuator. Thus, the button is capable of multiple different types of inputs to control multiple different types of device functions (or initiate device actions), and also capable of delivering different tactile or haptic outputs in response to the various inputs.

Figure 13A:
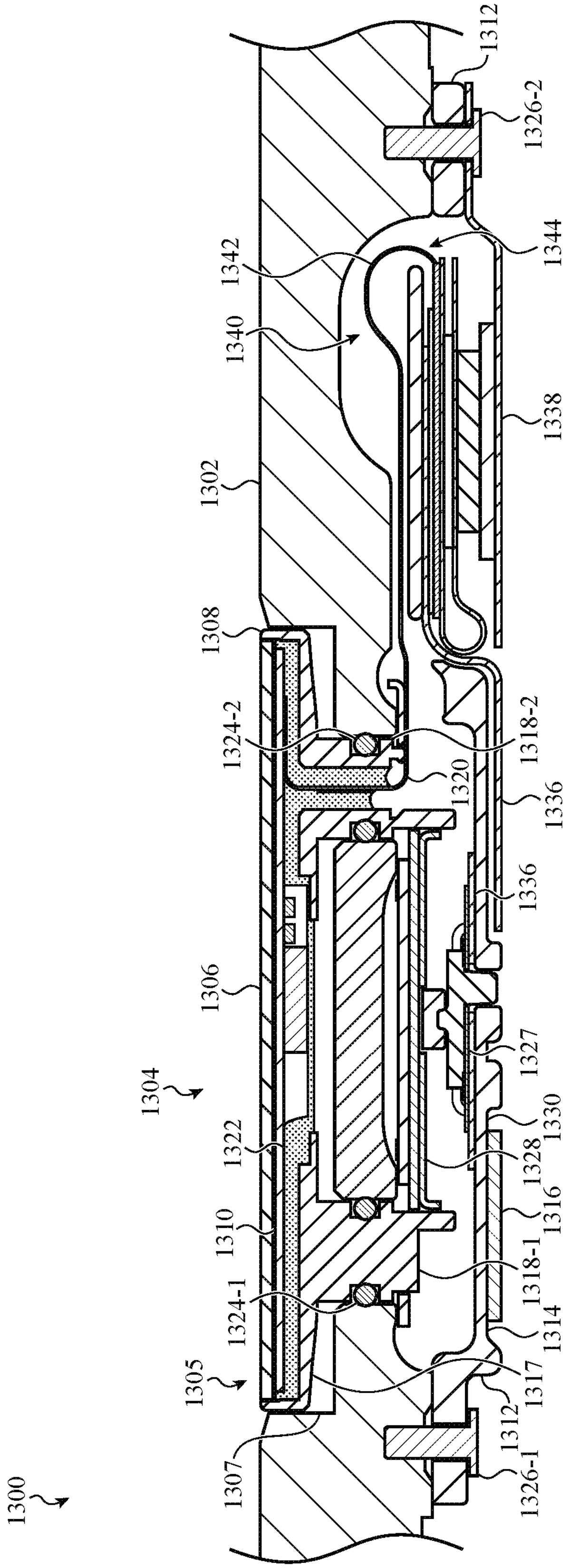
FIG. 13A is a partial cross-sectional view of a device with an example input button system.

FIG. 13A illustrates a partial cross-sectional view of a device 1300 with an input button system 1304 (also referred to herein simply as a button 1304), viewed along line 13A-13A in FIG. 1A. The button 1304 may be an embodiment of or otherwise correspond to the buttons 121, 155, or any other buttons described herein (e.g., buttons 116, 118, 120, 152, 156, 157, 285, 385). As described herein, the button 1304 may include a touch-sensitive input surface to detect touch and, optionally, gesture inputs, and both a force sensor and a tactile switch to detect various types of force inputs.

As shown in FIG. 13A, the button 1304 is positioned along a side of the device 1300. For example, the device 1300 may include a housing component 1302 that defines a side of the device 1300, and the button 1304 (and/or an input structure 1305 of the button 1304) is positioned in an opening 1307 defined in by the housing component 1302. In some cases, an input surface of the input structure 1305 (e.g., an exterior surface of the input structure 1305 that is configured to receive user inputs including touch inputs, gesture inputs, force or translational inputs, and the like) is substantially flush with (and optionally recessed relative to) the side exterior surface of the housing component 1302. In this way, accidental actuations of the button 1304 may be reduced or avoided.

The input structure 1305, and the button 1304 more generally, may be configured to receive and detect various types of inputs. For example, the button 1304 may include a touch sensor for detecting touch inputs (e.g., touches, taps, gestures, etc., as described herein), as well as a switch element that is configured to be actuated in response to a force that satisfies a particular force threshold. The button 1304 may also include a force sensing system that is responsive to a force input that satisfies one or more force thresholds that are different than the switch element. Thus, the button 1304 may be responsive to a first force input satisfying a first force threshold (e.g., as detected by a force sensing system), a second force input satisfying a second force threshold different from the first force threshold (e.g., corresponding to an actuation of a switch element), and a touch input (e.g., as detected by a touch sensing system). Additionally, in some cases, the button 1304 (or the deice more generally) may be responsive to combinations or sequences of inputs. For example, after a switch element is actuated (or a different force threshold is satisfied), the device may respond to changes in the force input. As a specific example, in response to an input that actuates a switch element, the device may initiate a video capture mode. After initiating the video capture mode, and until the button is released, changes in the force applied to the button may change the zoom of the camera (e.g., a greater force may zoom the camera in, and a lower force may zoom the camera out). Once the button is fully released, the force-based zoom operation may be terminated, and subsequent presses to the button may initiate other operations (e.g., terminating the video capture). More generally, the degree of force detected by a force sensing system may be correlated to a degree, magnitude, or other property of an action to be performed by the device. Thus, for example, pressing with a greater force may result in a greater scroll speed of a displayed list (in instances where the button input is used to control scroll functionality), or a greater speed of a volume change (in instances where the button input is used to control device output volume).

The input structure 1305 may include a button member 1308 and a touch-sensing element 1310 coupled to the button member. A cover 1306 may be positioned over the touch-sensing element 1310, and may define the input surface of the input structure 1305. The button member 1308 may include a chassis portion 1317 and posts 1318-1, 1318-2 extending from the chassis portion. The first post 1318-1 may extend through a first through-hole defined through the housing component 1302, and the second post 1318-2 may extend through a second through-hole defined through the housing component 1302. At least one of the posts (e.g., post 1318-2) may be hollow or otherwise define a passage through which a flexible circuit element 1320 (or other conductive coupler) may extend. The flexible circuit element 1320 may operatively couple the touch-sensing element 1310 to a processing system (optionally via one or more additional flexible circuit elements or other conductive couplers). Sealing members 1324 (e.g., O-rings) may be positioned around the posts 1318 to form a seal between the posts 1318 and the housing.

In some cases, a potting material 1322 at least partially fills the hollow post 1318-2 and encapsulates at least a portion of the flexible circuit element 1320 in the hollow post 1318-2. The potting material 1322 may also at least partially fill a volume defined between the cover 1306 and the button member 1308, and may at least partially encapsulate the touch-sensing element 1310 (and/or other circuitry or components in the input structure 1305). The potting material 1322 may be an adhesive, epoxy, or other polymer material, and may be flowed into the button member 1308 and then allowed to cure or otherwise harden to encapsulate the flexible circuit element 1320.

Figure 13B:
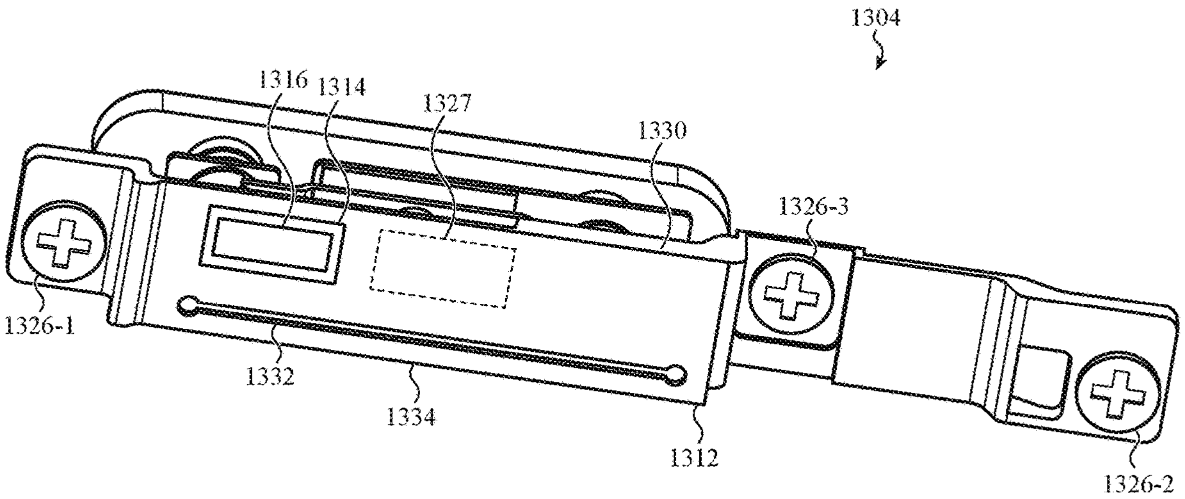
FIG. 13B is a perspective view of a portion of an example input button system.

The button 1304 further includes a beam structure 1312 at least partially within the enclosure. The beam structure 1312 may be secured to the housing component 1302 along an interior side or surface of the housing component 1302. For example, the beam structure 1312 may be secured to the housing component 1302 via fasteners 1326 (e.g., screws). FIG. 13A illustrates first and second fasteners 1326-1, 1326-2, and FIG. 13B illustrates a third fastener 1326-3 (which may not be visible in the particular cross-section shown in FIG. 13A).

The beam structure 1312, or a portion thereof, may be configured to be deflected as a result of a force input applied to the button member 1308. The button 1304 further includes a strain-sensing element 1316 (or other deflection-sensing element or system) coupled to the beam structure 1312. The strain-sensing element 1316 may include one or more strain gauges (e.g., a Wheatstone bridge) or other strain- or deflection-sensing element(s) that produce a signal that varies (e.g., continuously varies) based on a magnitude of deflection of the beam structure 1312. Other example strain- or deflection-sensing elements may include, without limitation, piezoresistive sensing elements, piezoelectric sensing elements, capacitive strain sensing elements, optical strain sensing elements, Fiber Bragg Grating strain sensing elements, magnetostrictive sensing elements, and the like. Since the magnitude of the deflection of the beam structure corresponds to the magnitude of force applied to the button member 1308, the signal from the strain-sensing element 1316 may be used to determine a characteristic of an input force to the button 1304. In some cases, additional strain-sensing elements may be positioned on the beam structure 1312 or another deflectable structure of the button.

The beam structure 1312 may be formed of metal (e.g., aluminum, stainless steel, metal alloys, etc.), or another suitable material (e.g., a polymer, reinforced polymer, etc.) that provides a target flexibility to facilitate strain sensing by the strain-sensing element. In some cases, the beam structure 1312 may be formed via metal injection molding, machining, forging, or any other suitable process and/or combinations of processes.

The device 1300 may determine, using the strain-sensing element 1316 (and associated processing system(s) and/or circuitry), whether an input applied to the button member 1308 satisfies one or more conditions. For example, the device 1300 may determine whether the input satisfies a condition indicative of a certain force or a certain deflection of the beam structure 1312 (e.g., a threshold deflection or threshold force). As another example, the device may determine whether the input satisfies a condition indicative of the button member 1308 being depressed a particular distance (of one or more potential distances). As another example, the device may determine whether the input satisfies a duration condition (e.g., the input has been detected at least for a particular duration). Conditions may be single factor conditions (e.g., a force or deflection condition) or multi-factor conditions (e.g., a force and duration condition, such as an input force being detected for a threshold duration). In response to detecting that the input satisfies the condition, the device may perform an operation (e.g., change an audio output volume, toggle between an audible and a silent mode, deactivate a screen, put the device in a "sleep" mode, or the like).

The button 1304 also includes a switch element 1327 (e.g., a dome switch) that is coupled to the beam structure 1312 and configured to collapse in response to the force input applied to the button member 1308 satisfying a force threshold. Because the button 1304 includes both the switch element 1327 and the strain-sensing element 1316, the button 1304 can be responsive to force inputs satisfying multiple different thresholds. For example, the button 1304 (and/or the device 1300 more generally) may be responsive to a first force input satisfying a first force threshold (e.g., as detected with the strain-sensing element 1316) and a second force input satisfying a second force threshold different from the first force threshold (e.g., as detected by the switch element 1327 being actuated). Further, the device 1300 may perform different operations in response to detecting the different force inputs. For example, the device may perform a first operation in response to determining, with the strain-sensing element 1316, that the force input satisfies the first force threshold, and may perform a second, different operation in response to determining (e.g., based on actuation of the switch element 1327) that the force input satisfies the second force threshold. As described herein, the device may perform a third, different operation in response to detecting a touch input with the touch-sensing element 1310, and may perform yet further different operations in response to various types of touch inputs applied to the button member (e.g., gestures, multi-touch inputs, force inputs having two application locations (e.g., two fingers), and the like). The device may perform yet further different operations in response to force inputs that originate at different locations on the input member, as described herein.

More generally, the device 1300 includes a processing system operatively coupled to the touch-sensing element 1310, the strain-sensing element 1316, and the switch element 1327. The processing system is configured to determine a location of a force input on the input structure 1305 based at least in part on a first signal from the touch-sensing element 1310, cause the device 1300 to perform a first operation in response to detecting, based at least in part on a second signal from the strain-sensing element 1316, that the force input satisfies a first force threshold that is less than a second force threshold, and cause the device 1300 to perform a second operation, different from the first operation, in response to detecting the actuation of the switch element 1327 (e.g., at the second force threshold, which is greater than the first force threshold). The processing system may also cause the device 1300 to perform a third operation, different from the first and second operations, in response to detecting (e.g., with the touch-sensing element 1310) a touch input on the input structure 1305. The device may also differentiate between different types of touch-based inputs.

Thus, the device may perform one operation in response to a tap input, and a different operation in response to a gesture input.

Returning to FIG. 13A, the button 1304 further includes an actuation structure 1328. The actuation structure 1328 is coupled to the button member 1308. For example, and as described with respect to FIGS. 16A-16C, the actuation structure 1328 may be coupled to the posts 1318 of the button member 1308. The actuation structure 1328 may be positioned above the switch element 1327, such that the switch element 1327 is between the actuation structure 1328 and the beam structure 1312, such that the actuation structure 1328 imparts an actuation force on the switch element 1327 in response to a force input applied to the button member 1308.

As described herein, the beam structure 1312 is configured to deflect, flex, or otherwise undergo strain when the button member 1308 is pushed, and the strain-sensing element 1316 (along with associated processors and circuitry) is configured to detect the strain. Since the degree of strain that the beam structure 1312 experiences is proportional to or otherwise corresponds to a magnitude of force applied to the button member 1308, the signal from the strain-sensing element 1316 may correspond to the magnitude of the force. As such, the device may perform different operations in response to different magnitudes of force input applied to the button 1304. In some cases, the beam structure 1312 may define a compliant segment 1330 (see also FIG. 13B), which may be tuned to have a target stress-strain profile. In some cases, the beam structure 1312 defines a recessed region 1314, and the strain-sensing element 1316 is coupled to the beam structure 1312 in the recessed region 1314. The recessed region 1314 may be configured to result in a particular stress-strain response of the beam structure 1312. For example, by reducing the thickness of the beam structure 1312 to define the recessed region 1314, the beam structure 1312 may experience a greater (or more uniform or otherwise more desirable) strain response. Further, the recessed region 1314 may have a different stress-strain response than other areas of the beam structure 1312, and may be more suitable for strain sensing. For example, the recessed region 1314 may experience a greater strain or deflection than other areas of the beam structure 1312 (e.g., the area where the switch element 1327 is positioned). Thus, for example, a force input to the button member 1308 may result in a relatively larger strain in the recessed region (which may improve the ability of the strain-sensing element 1316 to accurately detect the force of the input), while resulting in relatively less strain or deflection in the area where the switch element 1327 is located (which may improve the tactile response and/or establish the input force that is required on the button member 1308 to actuate the switch element 1327). The recessed region 1314 may thus at least partially decouple the strain sensing requirements from the switching requirements, as the beam structure 1312 can be tuned to provide different levels of compliance and/or deflection in different locations (e.g., greater compliance/deflection in response to a given force in one area to facilitate strain sensing, and less compliance/deflection in response to a given force in a different area to facilitate switch functionality).

FIG. 13A also illustrates an example configuration of the flexible circuit elements that operatively couple the various systems of the button 1304 to a processing system and/or other circuitry. The button 1304 may include a flexible circuit element 1320 that is operatively coupled to the touch sensing element 1310, and a flexible circuit element 1336 that is operatively coupled to the strain-sensing element 1316 and the to the switch element 1327. The flexible circuit element 1320 and the flexible circuit element 1336 may be operatively coupled together and/or to one or more other flexible circuit element(s) to ultimately couple the strain-sensing element 1316, touch-sensing element 1310, and switch element 1327 to a processing system. As shown in FIG. 13A, the flexible circuit element 1320 extends into the device at a location where it is otherwise covered by the beam structure 1312. Accordingly, the flexible circuit element 1320 may extend from the hollow post 1318-2 and along an interior side or surface of the housing component 1302. The housing component 1302 may define a recess 1340 along its interior side, and the flexible circuit element 1320 may define a loop 1342 that extends into the recess 1340. The loop 1342 allows the flexible circuit element 1320 to extend through an opening 1344 formed through the beam structure 1312, so that it can mate with the flexible circuit element 1336 (and/or another circuit element or connector) that is on the outside of the beam structure 1312. Accordingly, this configuration allows the flexible circuit element 1320 to be operatively coupled to other components within the device 1300.

In some cases, a cowling 1338 may be positioned over the flexible circuit elements 1320, 1336 and/or the conductive connectors of the flexible circuit elements. The cowling 1338 may be secured at one end via fastener 1326-2, and at another end by interlocking with an opening in the beam structure 1312.

Figure 13C:
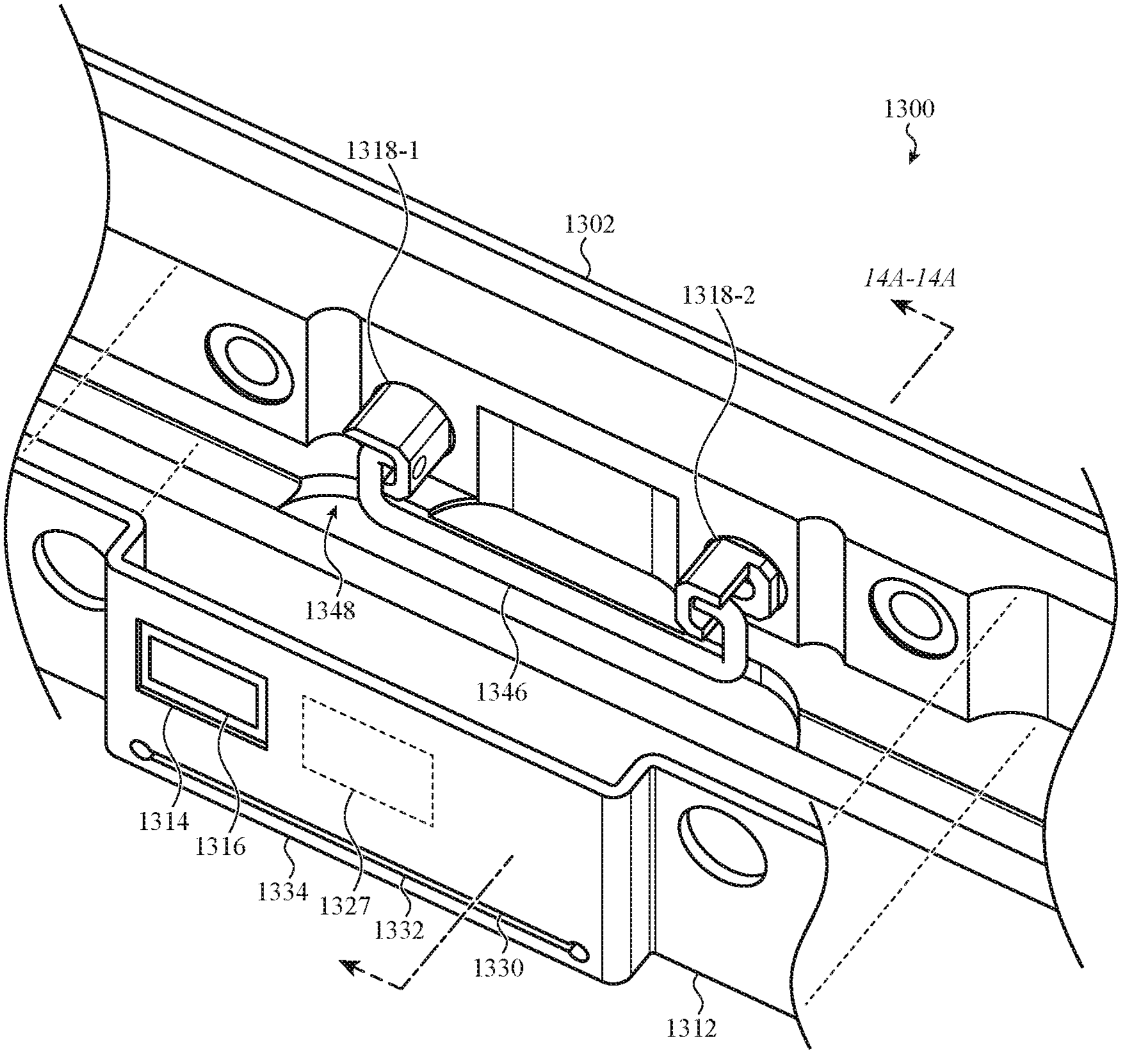
FIG. 13C is a partial exploded view of a device with an example input button system.

FIG. 13B is a partial perspective view of the button 1304, shown separate from the housing 1302, illustrating a bottom or internal side of the beam structure 1312. FIG. 13C is a partial exploded view of the button 1304 and the housing 1302. With reference to FIGS. 13B-13C, the beam structure 1312 defines a compliant segment 1330, which includes the recessed region 1314 and is configured to deflect or otherwise undergo strain when a force input is applied to the button member 1308. The strain-sensing element 1316 and the switch element 1327 are coupled to the compliant segment 1330. FIG. 13C omits the actuation structure 1328 for ease of illustration.

Figure 14A:
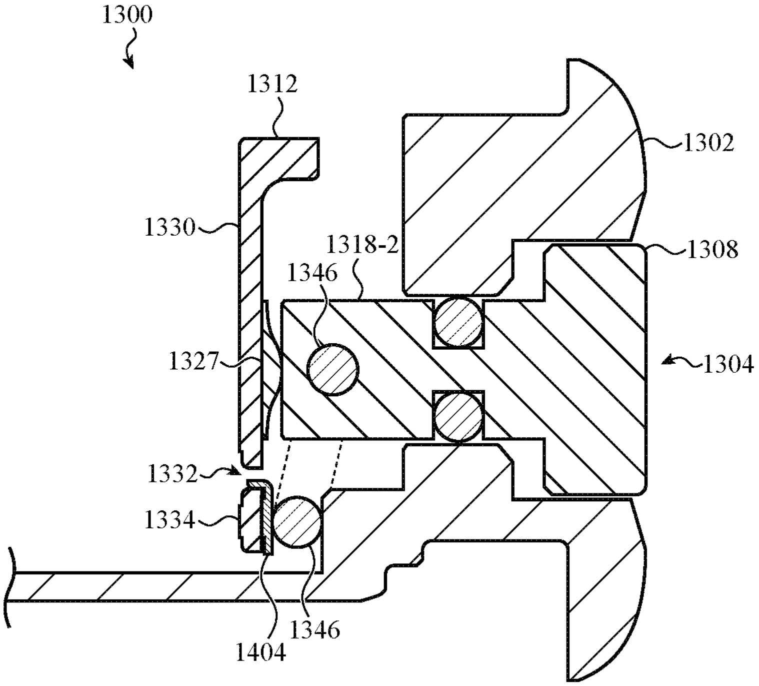
FIGS. 14A-14B are partial cross-sectional views of an example input button system.
Figure 14B:
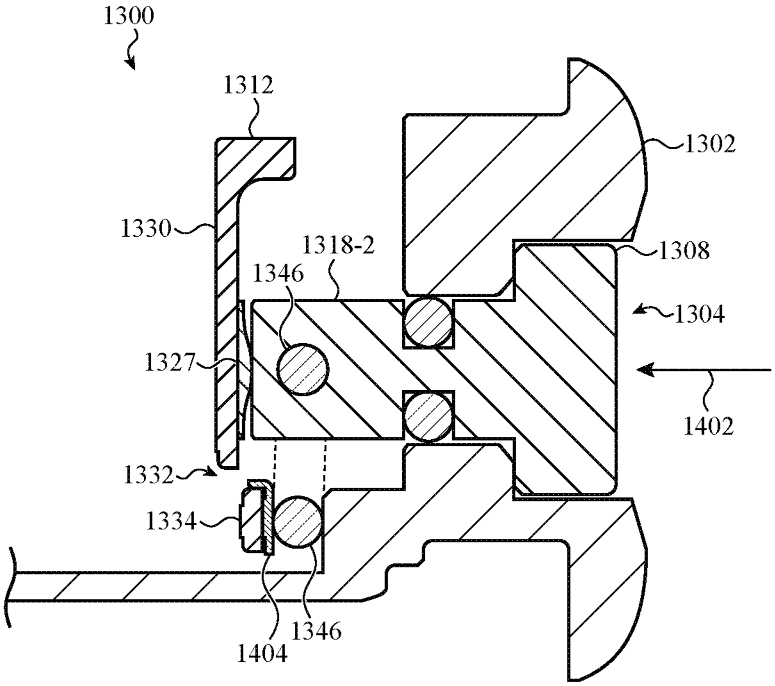

The beam structure 1312 also defines a support segment 1334 that is separated from the compliant segment 1330 by a gap 1332. Stated another way, the gap 1332 (e.g., a slot that extends through the button member 1308) may separate the beam structure 1312 into a compliant segment 1330 and a support segment 1334. As shown in FIGS. 13C and 14A-14B, the support segment 1336 may capture a stabilization bar 1346 between the support segment 1336 and the housing. For example, the stabilization bar 1346 may be positioned in a recess 1348 in the housing, and the beam structure 1312 may be secured to the housing 1302 (e.g., via fasteners 1326 as shown above), such that the stabilization bar 1346 is captured between the housing 1302 and the support segment 1334 of the beam structure 1312.

The stabilization bar 1346 is pivotally coupled to both the first and second posts 1318-1, 1318-2. The stabilization bar 1346 helps reduce racking or binding of the button member 1308 when it is pressed. For example, off-center forces applied to an elongate button member with two posts may cause the button member to twist or rock, which could result in the posts binding in their holes. The stabilization bar 1346 helps stabilize the motion of the button member 1308 during force inputs by linking the posts such that they always move substantially the same distance in response to a force input, regardless of its application location.

During a press of the button member (e.g., a force input on the input surface), a portion of the input force may be transmitted to the stabilization bar 1346. More particularly, since the support segment 1334 is used to retain the stabilization bar 1346 in place, the stabilization bar imparts a force to the support segment 1334 during the press. By separating the beam structure 1312 into a support segment 1334 and a compliant segment 1330 (e.g., with the slot or gap 1332), the force imparted to the beam structure 1312 by the stabilization bar 1346 may be substantially isolated to the support segment 1334. This may help reduce the extent to which the force from the stabilization bar 1346 affects the strain sensing function of the strain-sensing element 1316.

FIGS. 14-14B show a partial cross-sectional view of the device 1300, viewed along line 14A-14A in FIG. 13C, illustrating how the beam structure 1312 may behave during actuation of the button. FIG. 14A illustrates the button 1304 in an unactuated state, when no force is applied to the button member 1308. In this example, no input force is being transferred to the beam structure 1312.

FIG. 14B illustrates the button 1304 during actuation, when an input force 1402 is applied to the button member 1308. In response to the force input 1402, the compliant segment 1330 is deflected inward (which may be detected by the strain-sensing element 1316 and associated circuitry). The deflection of the compliant segment 1330 may be due to the input force 1402 being imparted to the compliant segment 1330 via the actuation structure 1328 applying a force to the switch element 1327. (While the switch element 1327 is shown in the cross-sections of FIGS. 14A-14B, this is merely for illustration of the operation of the button 1304, and the switch element 1327 may not be present in this particular cross-section.)

Due to the gap 1332 between the compliant segment 1330 and the support segment 1334, the forces applied to the different segments of the beam structure 1312 are substantially isolated to those segments. For example, the input force that is imparted to the compliant segment 1330 (e.g., via the actuation structure 1328 and the switch element 1327), and which results in deflection of the compliant segment 1330, may be substantially isolated from the support segment 1334. In this way, the stabilization bar 1346 remains tightly captured between the beam structure 1312 and the housing 1302 during actuation. Additionally, the force that is imparted to the support segment 1334 via the stabilization bar 1346 during button actuation is isolated from the compliant segment 1330. In this way, the force from the stabilization bar 1346 may be substantially isolated from the compliant segment 1330.

As shown in FIGS. 14A-14B, a shim member 1404 may be positioned between the support segment 1334 and the stabilization bar 1346. The shim member 1404 may ensure that the stabilization bar 1346 remains tightly captured between (e.g., in continuous contact with) the support segment 1334 and the housing 1302. The shim member 1404 may be formed from a polymer material, and may be configured to resist permanent or elastic deformation, such that the force compressing the stabilization bar 1346 remains substantially constant over time.

As noted above, the button 1304 may include a touch-sensing element to provide touch-sensing functionality to the button. The touch-sensing functionality may be used to determine various aspects of user inputs to the button 1304. For example, the touch sensor may be used to determine a location, on the input surface of the button, where an input is applied. In some cases, the location of the input on the button 1304 may at least partially determine the operation and/or function that will be initiated by the input. For example, an input (e.g., a force input) provided at one location on the button member 1308 may result in a first action or operation, and an input provided at a different location on the button member 1308 may result in a second action or operation (different from the first). Additionally or alternatively, the touch-sensing system may detect (and the device may be responsive to) touch inputs applied to the button member 1308 (e.g., inputs that do not include a force component that satisfies a force threshold). The touch-sensing system may also detect (and the device may be responsive to) gesture inputs, such as swipe gestures. To facilitate these and other touch-responsive functionalities, the button 1304 may include a touch-sensing element 1310 that includes a plurality of touch-sensing pixels to detect touch inputs, the location of touch inputs, and optionally other parameters of touch inputs, such as swipe direction, swipe speed, multiple points of contact during touch inputs (and their locations), and the like.

Figure 15:
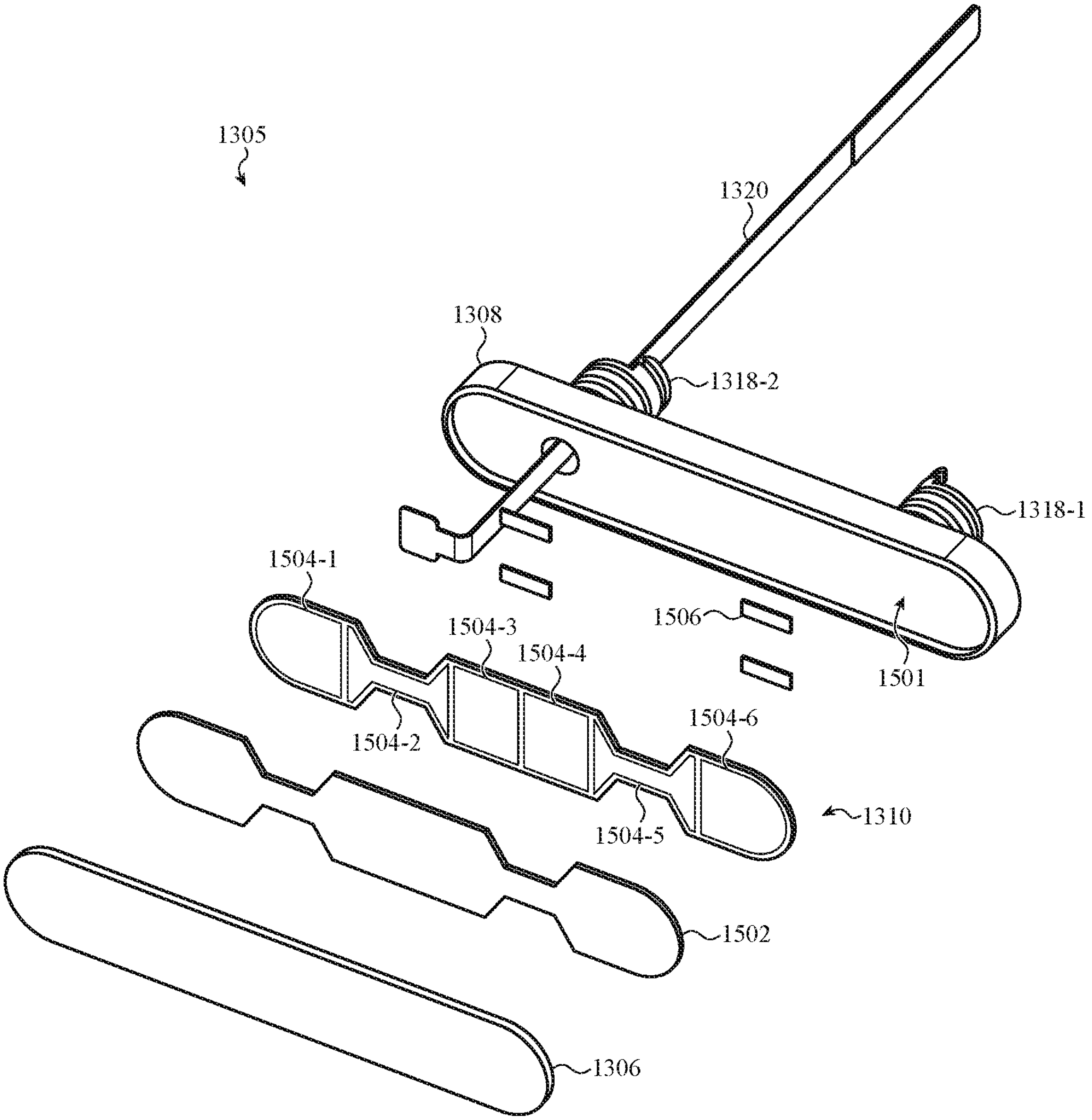
FIG. 15 is an exploded view of an example input structure of an input button system.

FIG. 15 illustrates an exploded view of the input structure 1305 of the button 1304. As shown, the button member 1308 has an elongate shape defining a longitudinal axis (which may be parallel to a y axis or y direction of the device). The button 1304 further includes a touch-sensing element 1310, which includes a linear array of touch-sensing pixels 1504 arranged along the longitudinal axis. Each touch-sensing pixel 1504 may be configured to detect a touch applied thereto. By providing multiple touch-sensing pixels 1504 along the longitudinal axis, the device 1300 can determine the location of one or more touch inputs by determining which of the touch-sensing pixels are being touched. The touch-sensing pixels 1504 may be capacitive touch-sensing pixels, which may detect touch inputs by detecting a change in capacitance due to the presence of a finger. Other types of touch-sensing pixels and/or touch-sensing technology may also be used, including resistive touch sensors, ultrasonic touch sensors, optical touch sensors, or the like.

In some cases, the device 1300 can determine parameters or properties of gesture inputs, such as a direction and a speed of a swipe gesture input. For example, as described herein, the device 1300 may be responsive to swipe gestures in which a user swipes or slides a finger along the input surface of the button 1304 in a particular direction. The touch-sensing element 1310 may determine the direction and, optionally, speed of the gesture based at least in part on the order in which the touch-sensing pixels register touch inputs. Gesture inputs may be used to control various aspects of the device, such as to zoom a camera during an image capture operation, change a device volume, change a display brightness, scroll through image capture settings, change exposure values or other image capture parameters, or the like. The direction of a swipe input may also affect the input. For example, swiping in one direction may zoom in on an image or in an image capture interface, and swiping in the other direction may zoom out. In some cases, the device may produce haptic outputs in response to touch and/or gesture inputs. The haptic output produced in response to a touch inputs, gesture inputs, and partial presses (as described above) may be different from each other, to tactilely differentiate between different inputs. Thus, a user can easily detect, via the haptic outputs, when a particular type of input has been registered by the device. In some cases, the strength or prominence of a haptic output increases with the magnitude of force of the input. Thus, for example, a touch input may be associated with a haptic output having a first strength or prominence, a partial press may be associated with a haptic output having a second strength or prominence that is greater than the first, and a full press may be associated with a haptic output produced by a tactile switch element (optionally in conjunction with a haptic output from a haptic actuator), and may have a third strength or prominence that is greater than the first and second haptic outputs.

Returning to FIG. 15, the button member 1308 defines a recess 1501 in which the touch-sensing element 1310 is positioned. The flexible circuit element 1320 may extend through the hole in the post 1318-2 and conductively couple to the touch-sensing element 1310 (and to each touch-sensing pixel 1504). The touch-sensing element 1310 may be coupled to the cover member 1306 via an adhesive 1502 (e.g., a die-attach film or other suitable adhesive). The cover member 1306 (with the attached touch-sensing element 1310) may be attached to the button member 1308 via adhesive, such as adhesive elements 1506. In some cases, the touch-sensing element 1310 defines notches (as shown), holes, or other clearance regions that allow the adhesive elements 1506 to adhere directly to the cover member 1306 and the button member 1308. The adhesive elements 1506 may therefore serve to attach the cover member 1306 and the touch-sensing element 1310 (which is adhered to the cover member 1306) to the button member 1308. The adhesive elements 1506 may be pressure sensitive adhesives, heat sensitive adhesives, flowable adhesives, adhesive films, or any other suitable adhesive.

The cover member 1306 may be formed of or include sapphire, glass, a polymer, or any other material through which touch inputs can be detected by a touch-sensing element 1310. In some cases, the cover member 1306 itself may be touch- and/or force-sensitive. The cover member 1306 may also include masks, inks, dyes, paints, or other treatments, coatings, or the like, to provide a desired appearance, texture, optical transmissivity, dielectric property, or the like.

Figure 16A:
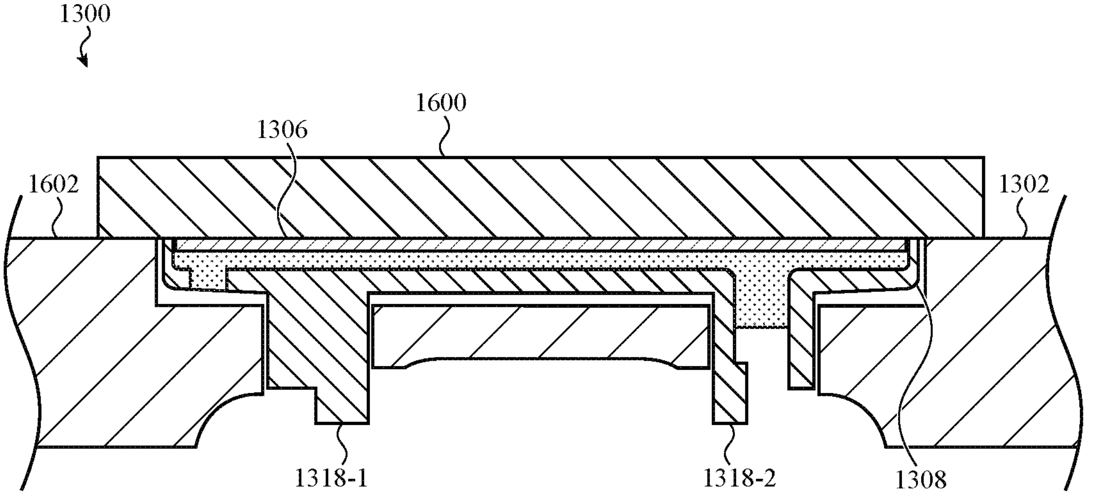
FIGS. 16A-16C are partial cross-sectional views of an example device with an example input button system.
Figure 16B:
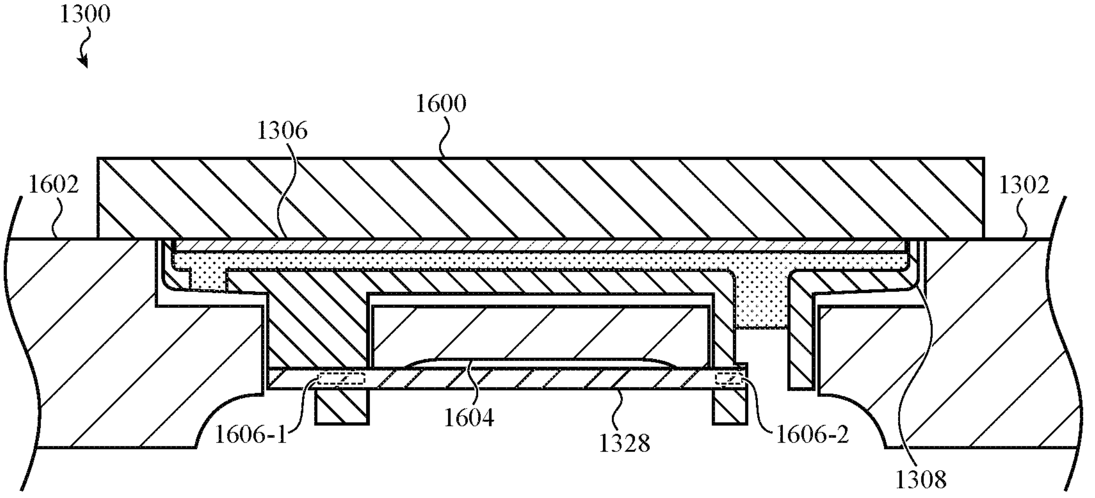
Figure 16C:
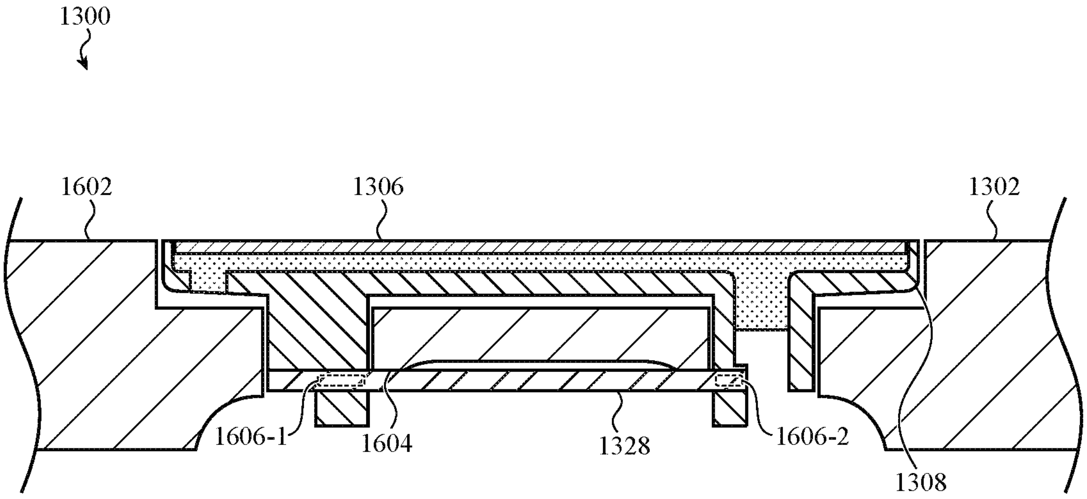

As described herein, the input surface of the button 1304 may be substantially flush with the exterior side surface 1602 of the device housing 1302. In some cases, the actuation structure 1328 may act as an outward-position stop (in addition to imparting or transferring input forces to the switch element and the beam structure 1312) in order to reliably and securely define the outward-most position of the button 1304. FIGS. 16A-16C depict partial cross-sectional views of the device 1300, generally corresponding to a view along line 13A-13A in FIG. 1A, illustrating an example technique for coupling the actuation structure 1328 to the button member such that the actuation structure 1328 interfaces with the housing 1302 to position the button member 1308 in the target position (e.g., flush with the side of the housing) and to retain the button member 1308 to the housing 1302 more generally.

As shown in FIG. 16A, a datum fixture 1600 may be positioned on the sidewall of the housing 1302 and over the button member 1308. The datum fixture 1600 shown is merely an example representation. Additionally, the button member 1308 is shown without the flexible circuit element coupled to the touch-sensing element 1310, though it will be understood that such components may already be incorporated with the button member 1308 during the illustrated operations. The housing 1302 and the button member 1308 may be biased against the datum fixture 1600 such that the input surface of the button member 1308 (e.g., defined by the cover member 1306) and the housing 1302 are flush with one another. While the housing 1302 and the button member 1308 are retained in this position, the actuation structure 1328 is positioned on the posts 1318 and secured to the posts 1318, such as via welds 1606-1, 1606-2, as shown in FIG. 16B. Other attachment techniques are also contemplated, including brazing, soldering, fasteners (e.g., screws), mechanical interlocks, and the like.

The actuation structure 1328 may be positioned such that when the housing 1302 and the button member 1308 are flush (e.g., against the datum fixture 1600), the actuation structure 1328 is in contact with a limit surface 1604 of the housing 1302. Thus, once the actuation structure 1328 is attached to the button member 1308, the outward-most position of the button member 1308 is fixed at the flush position, and the button member 1308 is retained to the housing 1302 (e.g., the actuation structure 1328 prevents the button member 1308 from falling out). FIG. 16C illustrates the device 1300 with the datum fixture 1600 removed, illustrating an example final configuration of the button member 1308 in the housing 1302. While the foregoing describes a flush configuration, the same or similar operations may be used to secure the button member 1308 in a recessed or proud configuration relative to the side surface of the housing 1302.

Figure 17A:
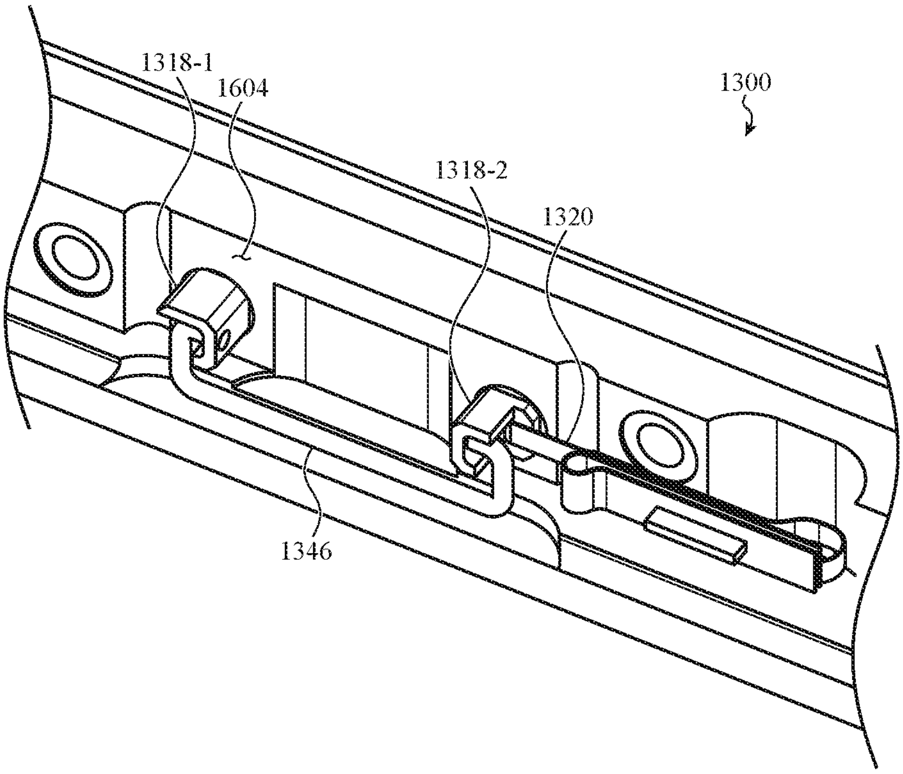
FIGS. 17A-17B are perspective views of a portion of a device with an example input button system.
Figure 17B:
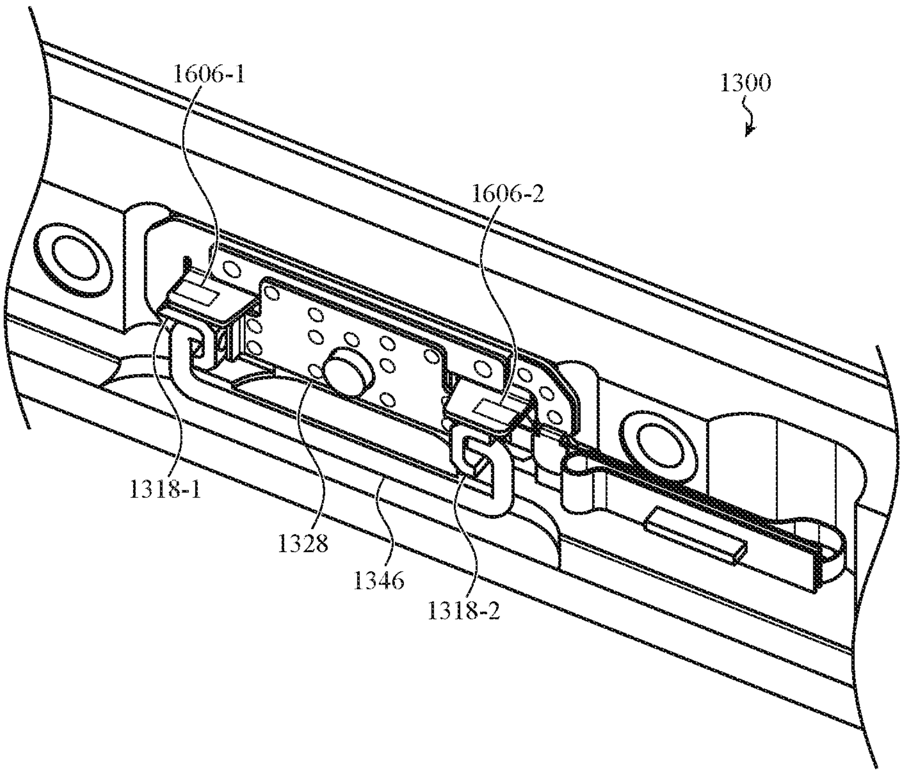

FIG. 17A is a perspective view of the device 1300 prior to attachment of the actuation structure 1328 to the button member 1308. FIG. 17B is a perspective view of the device 1300 after attachment of the actuation structure 1328 to the button member 1308. As shown, the actuation structure 1328 is secured to the posts 1318 of the button member 1308 via welds 1606-1, 1606-2. Once the actuation structure 1328 is attached as shown in FIG. 17B, the beam structure 1312 may be attached (as shown in FIG. 13C), thereby capturing the stabilization bar 1346 against the housing and positioning the sensing components (e.g., the strain-sensing element 1316 and the switch element 1327) in position.

FIGS. 18A-18F depict partial cross-sectional views of a simplified example of the device 1300, illustrating the button 1304 in example use conditions. As described herein, the button 1304 may provide continuous force sensing, input location sensing, and binary force sensing capabilities, as described herein. Input location sensing may also facilitate gesture sensing, as described herein.

Figure 18A:
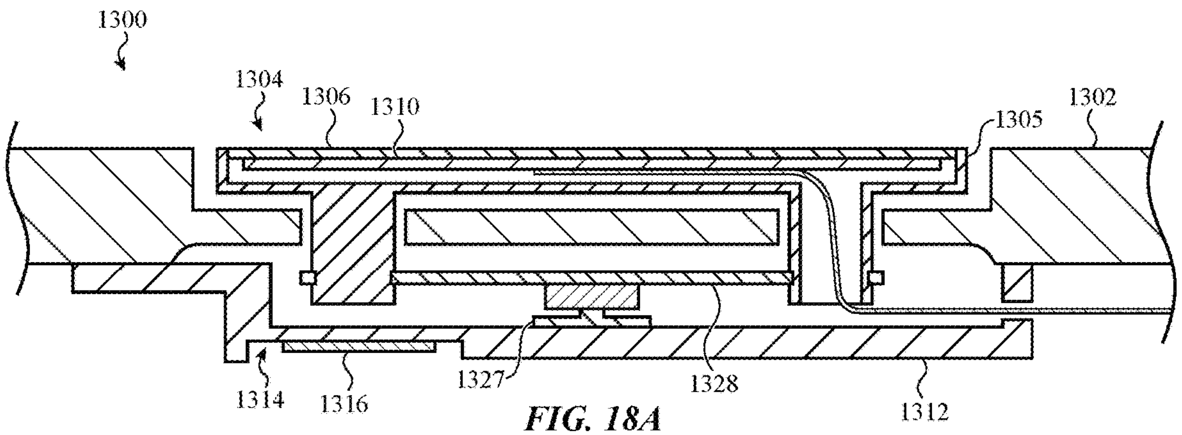
FIGS. 18A-18F are partial cross-sectional views of an input button system, illustrating example inputs to the input button system.

FIG. 18A illustrates the button 1304 in an unactuated condition, with no touch or force inputs applied to the input structure 1305. In this condition, the input surface of the input structure 1305 is flush with the side wall of the housing 1302, and the beam structure 1312 is undeflected, and the switch element 1327 is unactuated.

Figure 18B:
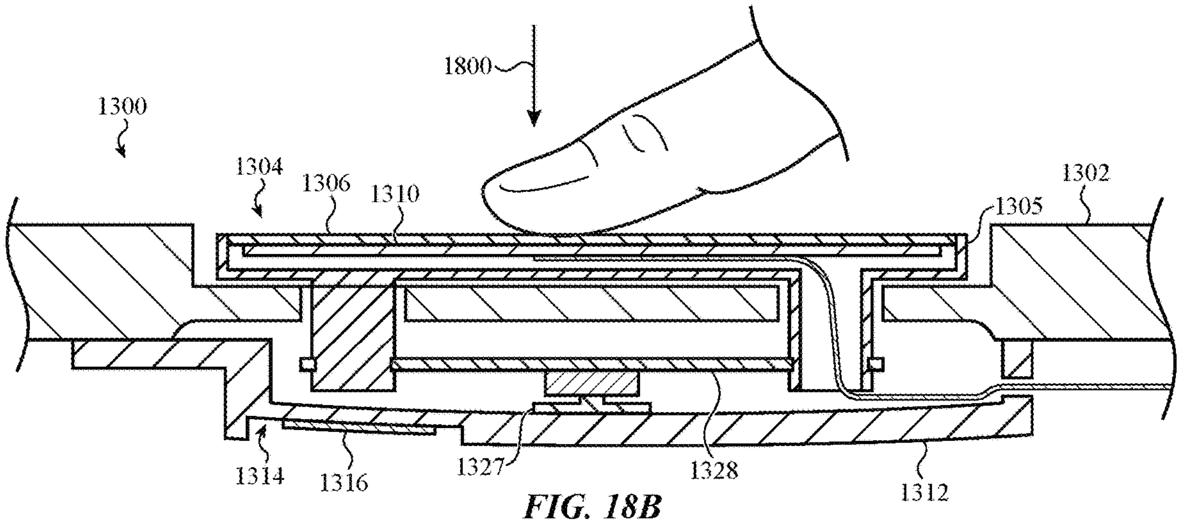

FIG. 18B illustrates the button 1304 in a partially actuated condition, in which an input force 1800 is applied to the input structure 1305. As described herein, the button 1304 may be configured to be responsive to inputs at multiple force thresholds, as determined using the strain-sensing element 1316. As shown in FIG. 18B, the input force 1800 may correspond to an input force that satisfies a first force threshold. More particularly, the beam structure 1312 has deflected a certain amount (e.g., as detected by the strain-sensing element 1316 and associated circuitry), but the switch element 1327 has not yet been actuated (e.g., the force input 1800 does not satisfy the second force threshold that results in actuation of the switch element 1327).

In response to detecting that the force input 1800 satisfies the first force threshold, as determined at least in part based on a signal from the strain-sensing element 1316, the device may perform an action (e.g., initiating or transitioning to an image capture user interface). As described herein, the device may also cause a haptic actuator to produce a tactile output in response to detecting that the force input satisfies the first force threshold.

As described, the button 1304 also includes a touch-sensing element 1310 that detects the presence and location of a touch input on the input surface. Accordingly, in addition to detecting the force input using the strain-sensing element 1316, the location of the force input 1800 may be determined. The particular action or operation that is performed in response to the force input 1800 may depend at least in part on the location of the force input that satisfies the first force threshold, as described in greater detail with respect to FIGS. 18D-18F.

As described herein, the beam structure 1312 and the switch element 1327 may be configured such that the switch element 1327 actuates at a second force threshold that is greater than the first force threshold (e.g., after the beam structure 1312 has deflected a certain amount). Accordingly, the button 1304 may act as a multi-stage button (e.g., responsive to both partial and full presses), as described herein. In some cases, the device is only responsive to some types of button inputs when the device is in a certain mode or when a certain user interface is active on the device display. For example, in some cases, the device is only responsive to touch-based inputs and partial presses when the device is in an image capture mode (e.g., when an image capture user interface is already active on the device's display). When the device is in the image capture mode, the device may respond to touch inputs, partial presses, and full presses, and more particularly, may perform operations in response to these different inputs. For example, when the device is in the image capture mode, the device may perform zoom operations in response to touch-based inputs (e.g., a swipe gesture), a focus operation in response to a partial press, and an image capture operation in response to a full press. In some cases, the location of a partial press (e.g., where, on the input surface the press is applied) may determine the particular operation that is performed. For example, a partial press at a first end of the input surface may result in a zoom in operation, a partial press at a second end of the input surface may result in a zoom out operation, and a partial press in the middle of the input surface may result in a focus operation (and/or an exposure lock operation). Other operations or combinations of operations may also be ascribed to these types and/or other types of inputs. For example, different operations may be performed depending on the location of the input, on the input surface, when a full press is applied. Moreover, while the foregoing examples are related to image capture operations, as described herein, the button may control other device operations and/or functions as well. In such cases, different functions may be ascribed to the various types of inputs (including touch, partial press, and full press, as well as partial and full press inputs that originate at different locations on the input surface). Moreover, as described above, the manner in which the device response to button inputs may depend on factors such as the mode of the device, the power state of the device, an active user interface or application of the device, etc. Thus, for example, a first set of functions may be accessed and/or controlled via the button when a first graphical user interface (e.g., a first application) is active on the device, and a second set of functions may be accessed and/or controlled via the button when a second graphical user interface (e.g., a second application) is active on the device.

In some cases, when the device is in a locked or inactive state or in a "home" state (e.g., displaying a home screen), the device is not responsive to touch-based inputs or partial presses. As described herein, in some cases, a full press on the button 1304 (e.g., satisfying the second force threshold and actuating the switch element) initiates an image capture function and an image capture user interface, at which time the device will become responsive to touch inputs and partial presses.

Figure 18C:
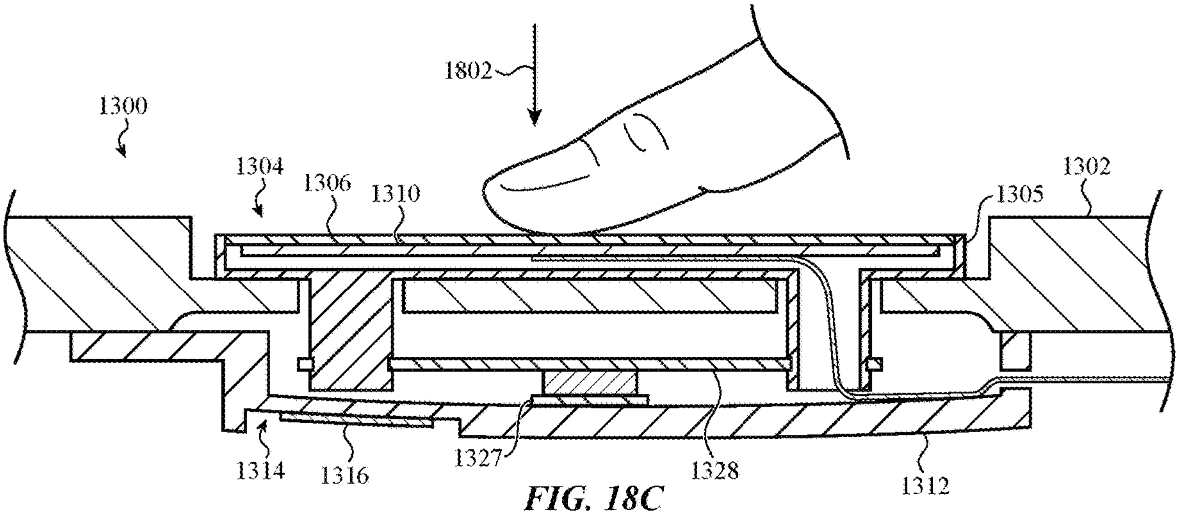

FIG. 18C illustrates the button 1304 in a fully actuated condition, in which an input force 1802 (which is greater than the input force 1800) is applied to the input structure 1305. In this condition, the input force 1802 satisfies the second force threshold, and thus the switch element 1327 is actuated. For example, where the switch element 1327 is a collapsible dome switch, the dome switch has been collapsed. In response to detecting that the switch element 1327 has been actuated (e.g., the force input 1802 satisfies a second force threshold), the device may perform an action (e.g., capturing an image with a camera). The action performed in response to the force satisfying the second threshold (e.g., a full press) is different from the action performed in response to the force only satisfying the first threshold (e.g., a partial press). As described herein, the actuation of the switch element 1327 may also produce a tactile output, which may provide a tactile indication that the button has been fully pressed. In some cases, the tactile output produced by the haptic actuator in response to the first force threshold may be different from the tactile output from the switch element 1327, such that the user can easily differentiate between the input types of presses.

In some cases, the device is also responsive to forces greater than the second force threshold. In particular, since increased force on the input structure 1305 past the second force threshold continues to increase the deflection of the beam structure 1312, the strain-sensing element 1316 (and associated circuitry) can detect the force inputs and determine whether the force satisfies further force thresholds. Thus, in some cases, the device 1300 is configured so that a user can continue to increase the input force after the actuation of the switch element 1327 in order to cause the device to perform yet another action or operation. In response to detecting force inputs that satisfy further force thresholds, the device may perform an action (e.g., capturing a slow motion video, capturing a rapid sequence of still images, etc.). As described herein, the device may also cause a haptic actuator to produce a tactile output in response to detecting that the force input satisfies the further force threshold(s).

Figure 18D:
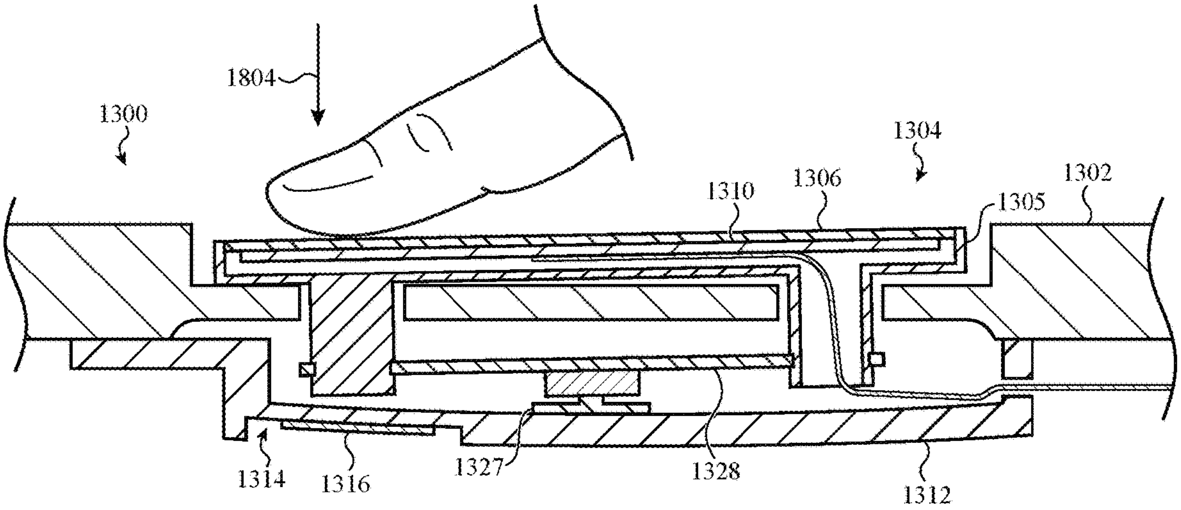
Figure 18E:
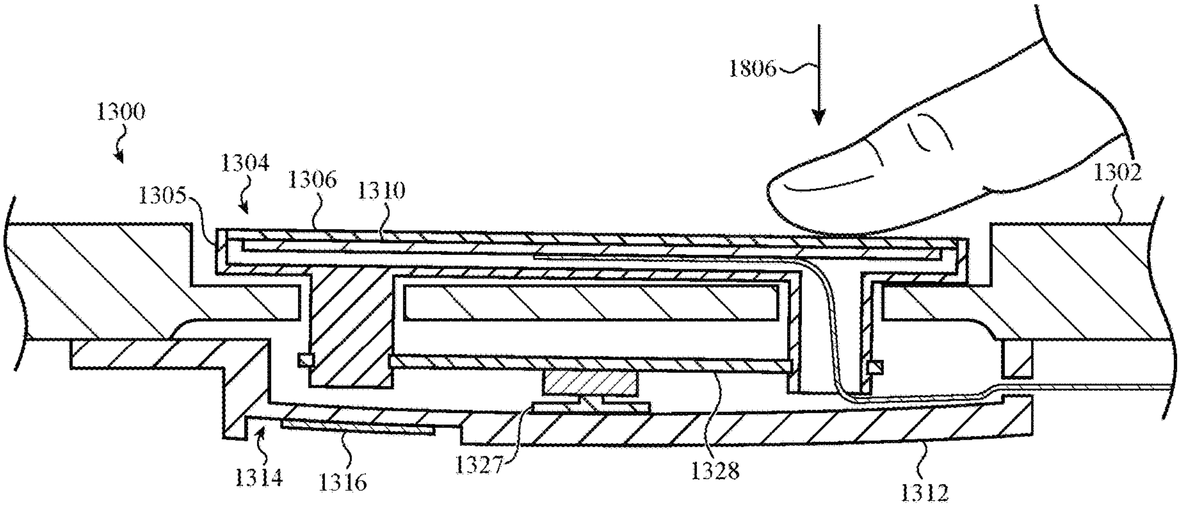

FIGS. 18D-18E illustrate the button 1304 being subjected to inputs at different locations on the input structure 1305. For example, FIG. 18D illustrates an input 1804 at a first location on the input surface, and FIG. 18E illustrates an input 1806 at a second location on the input surface. The location of the inputs may be determined by the touch-sensing element 1310 (and associated circuitry).

In some cases, different actions are associated with inputs to different locations on the input surface. Moreover, inputs to different locations may be associated with different actions based on the amount of force with which they are applied. Thus, for example, touch-based inputs that do not satisfy the first force threshold may result in one set of actions based on the touch location (e.g., increasing or decreasing device volume, depending on touch location), while inputs that satisfy the first force threshold may result in a second set of actions based on the touch location (e.g., zooming an image or a camera in or out, depending on touch location), while inputs that satisfy the second force threshold may result in a third set of actions based on the touch location (e.g., increasing or decreasing an image exposure value, depending on touch location). Thus, the particular action that is performed when a force threshold is satisfied may depend on the location of the input that resulted in satisfying the force threshold.

Figure 18F:
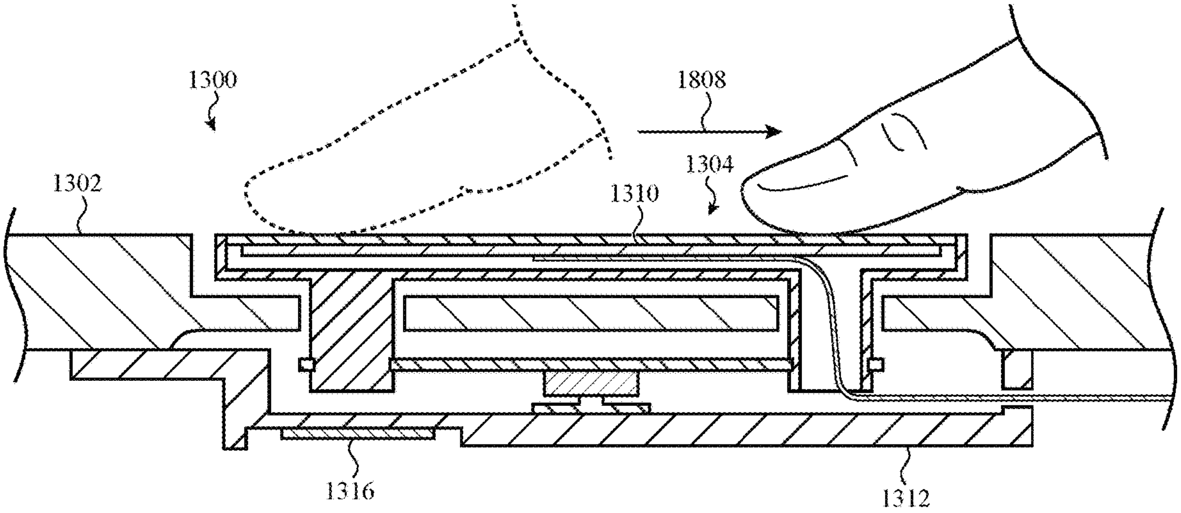

The touch-sensing element 1310 may also facilitate detecting touch-based gestures applied to the input surface. FIG. 18F, for example, illustrates a swipe gesture input 1808 being applied to the input surface. In this example, the input may include only nominal force, and thus the beam structure 1312 is not substantially deflected. The device 1300 may detect, using the touch-sensing element 1310 parameters of the gesture input, such as direction, speed, and the like, and may perform an action based on the parameters. For example, the device 1300 may zoom in or out on an image or image capture preview, increase or decrease device volume, increase or decrease an image exposure value, or the like, based on the direction and/or speed of the gesture input. In some cases, gesture inputs may also be differentiated based on the amount of force associated with the input. Thus, for example, a gesture applied with only nominal force (as shown in FIG. 18F) may result in one type of action (e.g., changing volume), and a gesture applied with a force that satisfies a first force threshold may result in a second type of action (e.g., a zooming operation).

While FIG. 18F shows the beam structure 1312 as undeflected, the strain-sensing element 1316 may still detect the nominal force associated with the gesture input, and may also detect the nominal forces associated with static touch inputs (e.g., inputs that do not satisfy a first force threshold). In some cases, detecting these nominal forces may be used to reject or ignore accidental inputs or other sensing anomalies. Thus, if the strain-sensing element 1316 (and associated circuitry) detects an input, but there is no detectable force associated with the input, the device 1300 may reject the input as accidental, and not perform an operation. If a force is detected (even if the force does not satisfy the first force threshold), the device 1300 may perform the operation.

Figure 19:
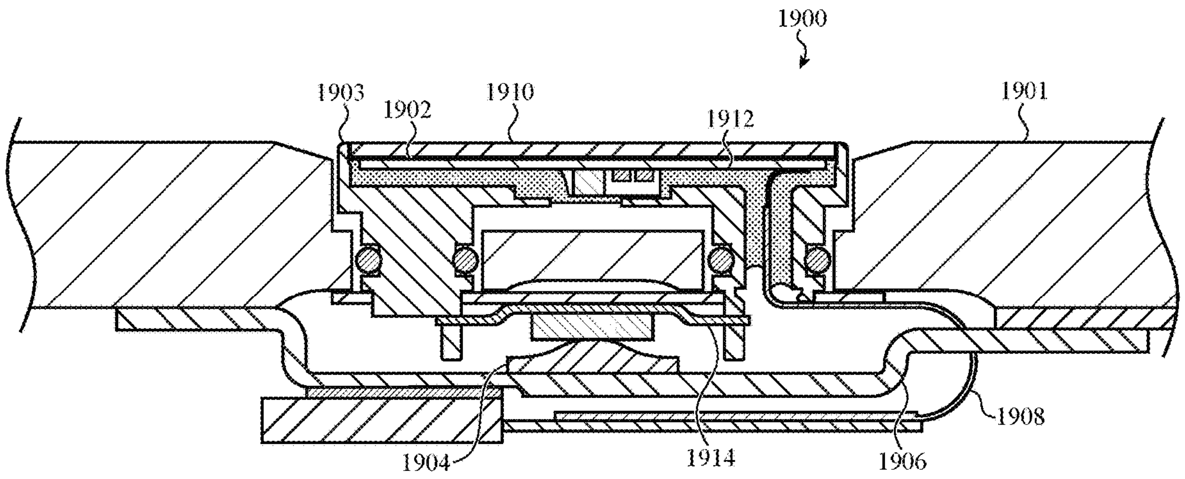
FIG. 19 is a partial cross-sectional view of an example input button system.

FIGS. 13A-18F illustrate an example button that includes touch-sensing functionality for detecting touch inputs, force-sensing functionality for determining input force magnitude, and a switch element for detecting binary inputs. In some cases, buttons may be used that include a subset of these sensing functionalities. For example, FIG. 19 illustrates an example button 1900 that includes a touch-sensing element 1902 to provide touch-sensing functionality, and a switch element 1904 (e.g., a dome switch) that is configured to actuate in response to a force input that satisfies a force threshold (e.g., an actuation force for the switch element 1904). The button 1900 may lack continuous force-sensing functionality. In some cases, removing the continuous force-sensing functionality allows the button 1900 (including internal button components) to be made smaller, while still providing expanded functionality (e.g., touch-sensing functionality). The button 1900 may correspond to other buttons described herein, such as buttons 116, 118, 120, 152, 156, and 157 (FIGS. 1A-1D), or the like.

Apart from the components that provide force-sensing functionality, the button 1900 may have a similar overall construction to the button 1304 described herein. For example, the button 1900 may include an input structure 1903 that is positioned in an opening in a housing 1901. The input structure 1903 may include posts that extend through holes in the housing. The input structure 1903 may also include a cover member 1910 (e.g., sapphire, glass, polymer, etc.) that is positioned over a touch-sensing element 1902. The touch-sensing element 1902 may include a linear array of touch-sensing pixels, or a single touch-sensing pixel. The touch-sensing element 1902 may use any suitable touch-sensing technique, including capacitive, resistive, ultrasonic, optical, or the like. The input structure 1903 may include a potting material 1912, which may at least partially encapsulate the touch-sensing element 1902 and at least partially fill the internal volume of the input structure 1903. The touch-sensing element 1902 may be operatively coupled to a processing system or other circuitry via a flexible circuit element 1908. The flexible circuit element 1908 may extend through a hollow post in the input structure 1903, and may be at least partially encapsulated by the potting material 1912. The flexible circuit element 1908 may extend through a hole formed in the beam structure 1906, and may be looped back to extend along a bottom surface of the beam structure 1906 (where it may be coupled to a conductive connector or other flexible circuit element or circuit component).

The button 1900 may also include a beam structure 1906, which may support a switch element 1904. The switch element 1904 (e.g., a dome switch) may be configured to actuate in response to a force input that satisfies a force threshold. An actuation structure 1914, which may be welded to posts of the input structure 1903, as described with respect to the button 1304, may impart the input force to the switch element 1904.

The button 1900 may be responsive to force inputs, as detected by the switch element 1904. Additionally, the button 1900 (or the device in which it is incorporated) may be responsive to touch inputs. Touch inputs may include non-gesture inputs (e.g., touches, taps, etc.), and optionally gesture inputs. Gesture inputs may be used to control device functions such as volume, image/camera zoom, display brightness, or any other suitable device parameter. Touch inputs may be used to control various aspects of the device, and may also be used to determine whether a received force input is erroneous. For example, a touch input (which does not actuate the switch element 1904) may be used to activate or wake a display, or to acknowledge or dismiss a notification or alarm, or to cycle the device between various operational modes (e.g., sleep and wake modes), or the like. In one specific example, a display may operate in an always-on display mode, in which certain graphical outputs are displayed on the display even when the device is otherwise locked (e.g., a clock display). In the always-on display mode, the device may be locked, and the display may be different (e.g., display different content) than when the device is displaying lock screen content. In such cases, a touch input to the button 1900 may cause the device to transition from the always-on display mode (e.g., outputting the always-on graphics) to displaying a lock screen. The lock screen may include more or different content than the always-on display content, including notification previews, device charge status, wireless connection status, or the like. The lock screen may also have a different brightness. Touching the button 1900 when the device is displaying the lock screen may return the device to the always-on display mode, or it may initiate a device unlocking operation (among other possible responses).

Figure 20A:
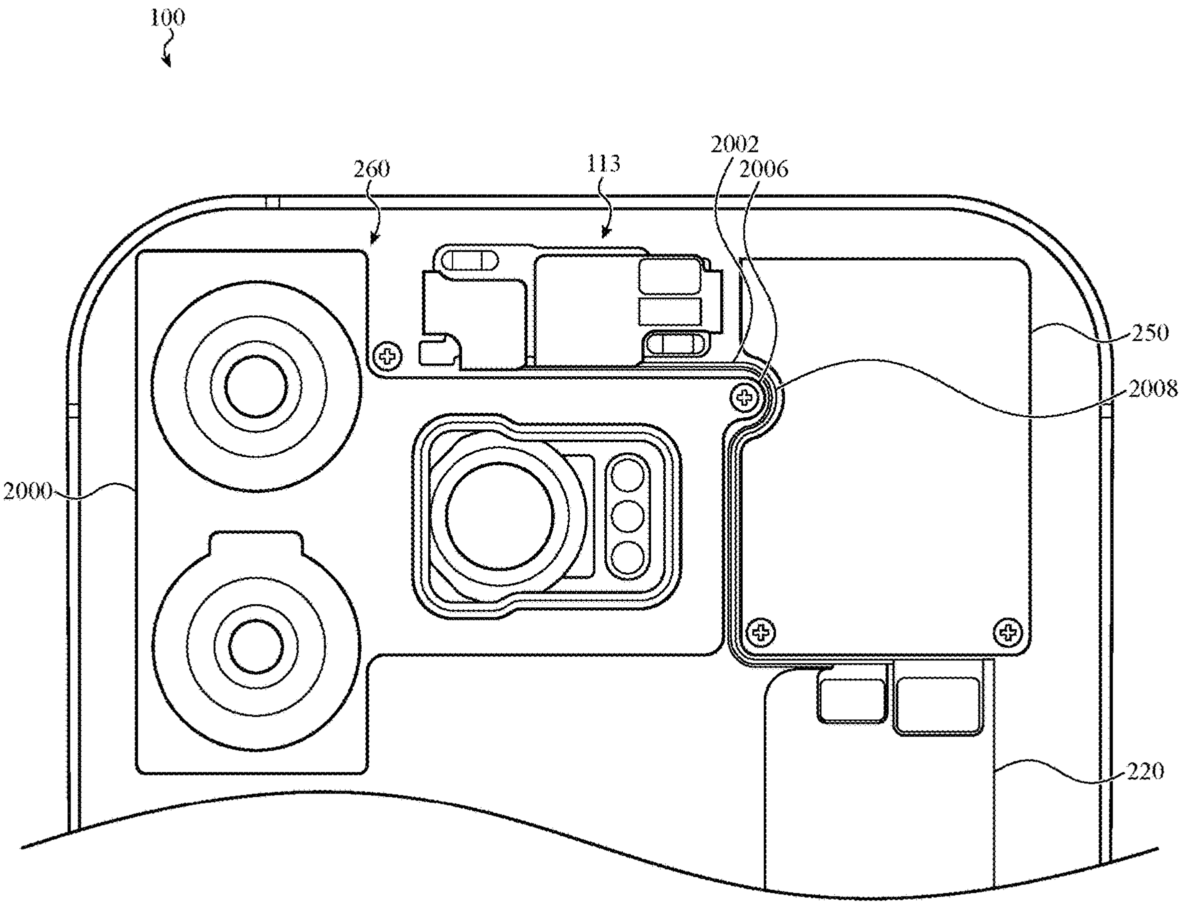
FIG. 20A depicts an example rear-facing sensor system of an electronic device.

FIG. 20A illustrates a portion of the device 100, shown with the rear cover assembly removed to expose the rear-facing sensor array 260. As shown, the rear-facing sensor array 260 includes a camera housing 2000, in which the cameras may be positioned. The camera housing 2000 may be attached to the device housing via fasteners, such as at lug 2006.

FIG. 20A also illustrates a front-facing sensor array 113, which may include front-facing cameras, facial recognition system components, depth sensor components, and the like. A flexible circuit assembly 2002 may be used to operatively (e.g., conductively) couple one or more components of the front-facing sensor array to the circuit board assembly 220. Accordingly, the flexible circuit assembly 2002 is routed along a path that is defined between the camera housing 2000 and another component (e.g., the speaker module 250 in this example). As shown in FIG. 20A, the flexible circuit assembly 2002 may define a bend 2008 where the flexible circuit assembly 2002 extends around the lug 2006.

Figure 20B:
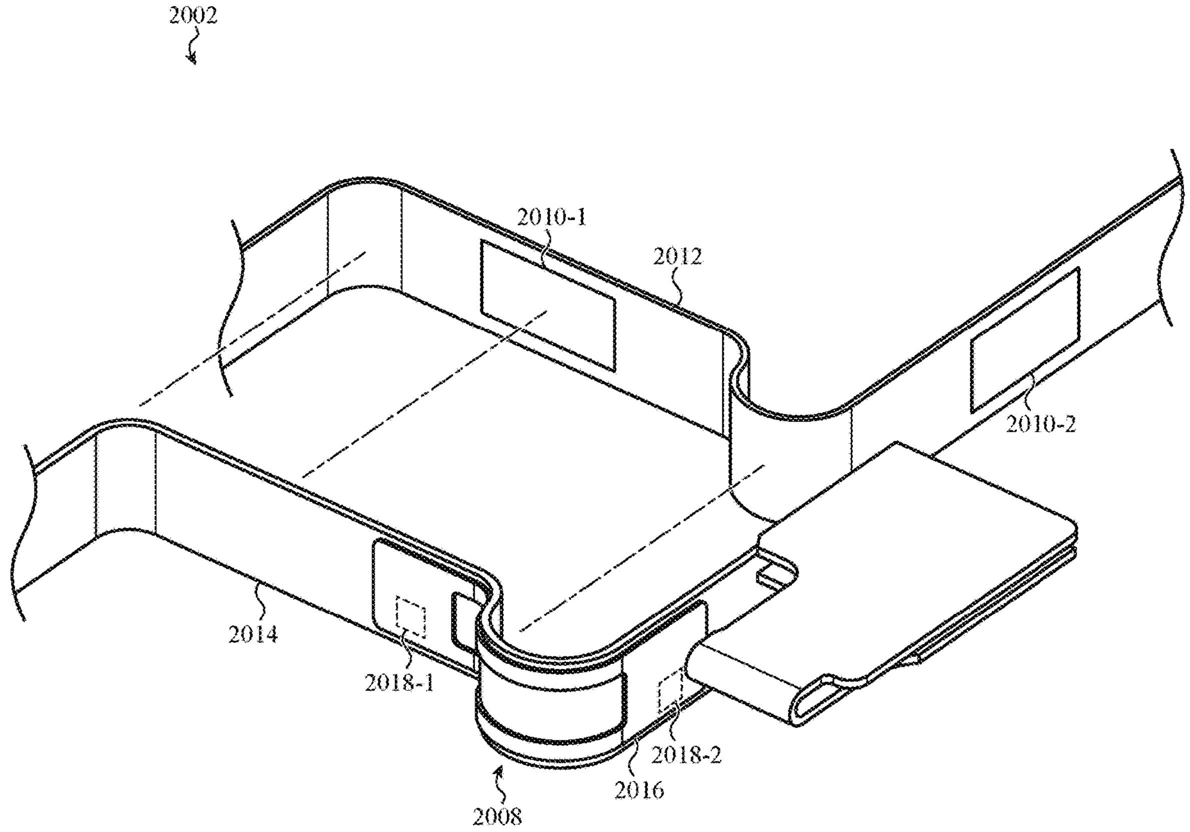
FIG. 20B is a partial exploded view of an example flexible circuit assembly.

FIG. 20B illustrates a partial exploded view of an example of the flexible circuit assembly 2002, illustrating the bend 2008 where the flexible circuit assembly 2002 curves around the lug 2006 (or any other structure that results in a curved path for the flexible circuit assembly 2002). As shown, the flexible circuit assembly 2002 may include a first flexible circuit element 2012, which is coupled to a second flexible circuit element 2014. In this example, the first flexible circuit element 2012 conductively couples to one or more first components of the device (e.g., components of a front-facing camera), and the second flexible circuit element 2014 conductively couples to one or more second components of the device (e.g., components of a facial recognition system). The first and second flexible circuit elements 2012, 2014 may be coupled to each other at one or more locations via adhesive 2010 (e.g., 2010-1, 2010-2).

A bend stiffener 2016 is coupled to the flexible circuit elements to rigidly define the bend 2008 of the flexible circuit assembly 2002. The bend stiffener 2016 may be formed from metal, and may be pre-formed to achieve a target bend radius. The target bend radius is configured to support the flexible circuit assembly 2002 in a shape that generally conforms to the path of the flexible circuit assembly 2002 through the device (e.g., between components and around a protruding structure such as the lug 2006). In some cases, the radius of the bend may be between about 1.0 mm and about 3.0 mm, between about 1.5 mm and about 2.0 mm, between about 2.0 mm and about 2.5 mm, or another suitable range.

The bend stiffener 2016 may be adhered to the flexible circuit element 2014 (or the flexible circuit element 2012), and may be positioned along the outside of the bend (as shown), or along the inside of the bend. Because the first and second flexible circuit elements are attached together (e.g., via adhesives 2010), the bend stiffener 2016 enforces the target bend radius for both the first and the second flexible circuit elements 2012, 2014 (and/or any other attached flexible circuit elements).

In some cases, the flexible circuit element to which the bend stiffener 2016 is attached includes one or more exposed conductive connectors 2018 (2018-1, 2018-2) that are conductively coupled to the bend stiffener 2016. For example, a portion of a conductive trace on the flexible circuit element 2012 may be exposed along the surface that is coupled to the bend stiffener 2016, and the conductive traces may be conductively coupled (e.g., via direct contact, soldering, conductive paste, etc.) to the bend stiffener 2016. In some cases, the conductive connectors 2018 are conductively coupled to or define an electrical ground of the device, and therefore serve to conductively couple the bend stiffener 2016 to the electrical ground.

Figure 21A:
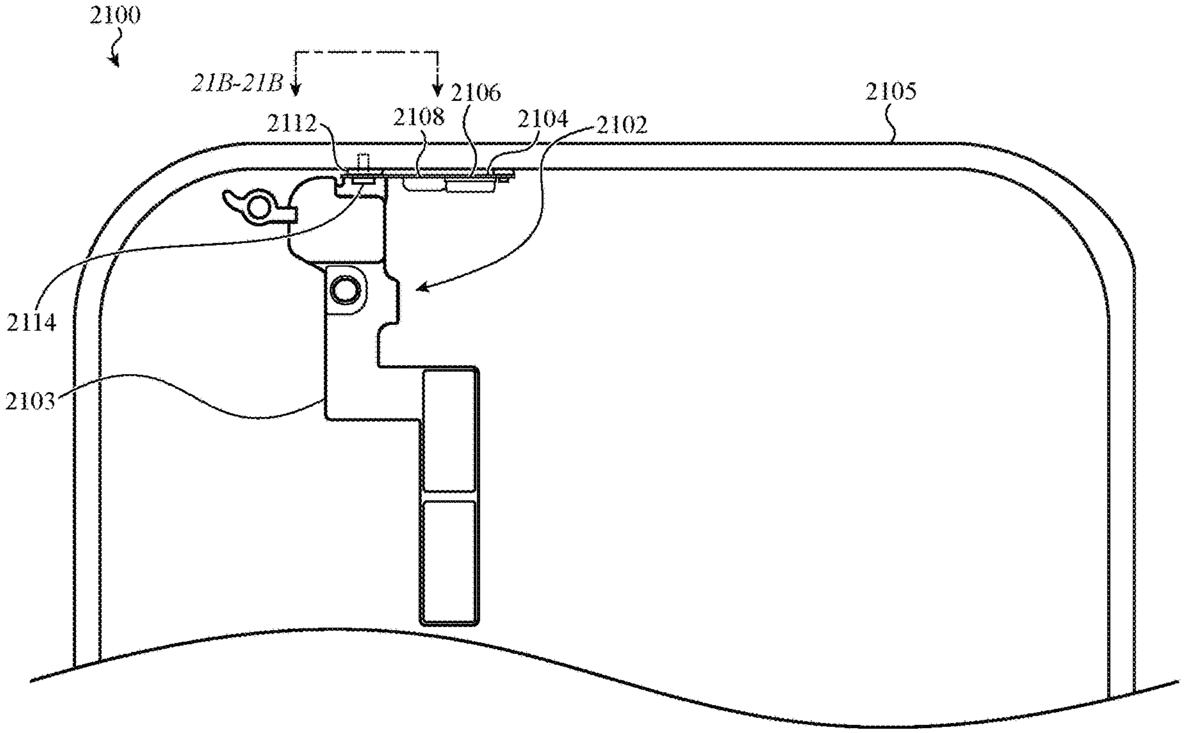
FIG. 21A depicts an electronic device with an example circuit assembly.

FIG. 21A illustrates an example device 2100, which may correspond to or be an embodiment of any of the devices described herein. The device 2100 includes a circuit assembly 2102, which may include a flexible circuit element 2103 that conductively couples components within the device. For example, the circuit assembly 2102 may include a first component 2106 (e.g., an antenna circuit element) and a second component 2108 (e.g., a microphone module) coupled to a portion 2104 of the flexible circuit element 2103, where the portion 2104 is positioned along (e.g., parallel to) a wall 2105 of the device housing. The portion 2104 of the flexible circuit element 2103 may be referred to herein as a mounting portion 2104. As described herein, the wall 2105 may be defined by or part of a housing component, which may be formed of metal (or another conductive material) and portions of which may operate as antennas (e.g., radiating antenna elements for wireless communications). Accordingly, conductive traces on the mounting portion 2104 may potentially interfere with the operation of the antennas that are defined by the wall 2105.

A spacer 2112 may be positioned between the mounting portion 2104 and the wall 2105 to both conductively couple the wall to the mounting portion 2104 (e.g., to conductively couple the wall 2105 to antenna circuitry to facilitate the wall 2105 operating as an antenna) and to set the mounting portion 2104 apart from the wall 2105 to provide physical separation of conductive traces on the mounting portion 2104 from the wall 2105. In order to achieve the proper conductivity and physical strength, the spacer 2112 may be formed from a multi-part assembly having a conductive frame and a polymer structure.

Figure 21B:
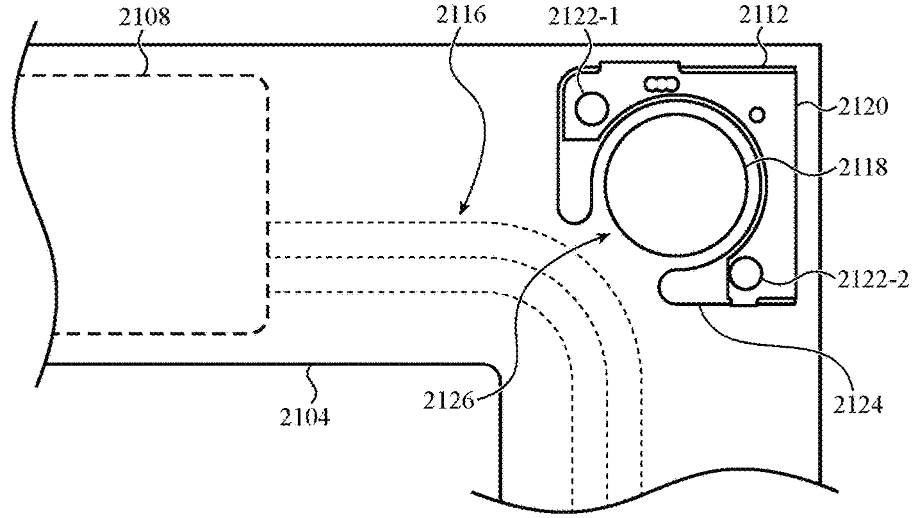
FIG. 21B depicts an example circuit assembly for an electronic device.

FIG. 21B illustrates a plan view of a portion of the mounting portion 2104, viewed along line 21B-21B in FIG. 21A, illustrating an example spacer 2112 positioned on the mounting portion 2104. As shown, conductive traces 2116 may extend along the mounting portion 2104 to conductively couple components on the mounting portion 2104 to other device components (e.g., a circuit board assembly). Accordingly, the spacer 2112 may hold the mounting portion 2104 away from the wall 2105 to reduce interference between the traces 2116 and the wall 2105 (e.g., reduce capacitive coupling between the traces 2116 and the wall 2105). The spacer 2112 may also conductively couple the mounting portion 2104 to the wall 2105, such as to provide a conductive path to the wall 2105 for antenna circuitry (e.g., antenna tuning circuitry). The spacer may include a conductive frame 2120, which is conductively coupled to the mounting portion 2104, and which may include conductive contacts 2122 (e.g., 2122-1, 2122-2) that contact the wall 2105 to conductively couple the wall 2105 to other components via the circuit assembly 2102. The conductive frame 2120 may be formed of metal, such as aluminum, stainless steel, or the like.

The spacer 2112 may also include a polymer support structure 2124 that supports the conductive frame 2120 and provides strength to the spacer 2112. For example, the spacer 2112 is positioned at a structure attachment point of the mounting portion 2104, where a fastener 2114 (FIG. 21A) extends through a hole 2118 in the mounting portion 2104 to couple the circuit assembly 2102 to the wall 2105. Accordingly, the polymer support structure 2124 may provide a structural component to resist crushing or other deformation of the conductive frame 2120, and generally ensures the target physical separation of the mounting portion 2104 from the wall 2105. As shown, the spacer 2112 extends partially around the hole 2118, though in some cases it may extend entirely around the hole. In some cases, a gap 2126 in the spacer is provided in order to position the conductive frame 2120 away from the conductive traces 2116.

Figure 21C:
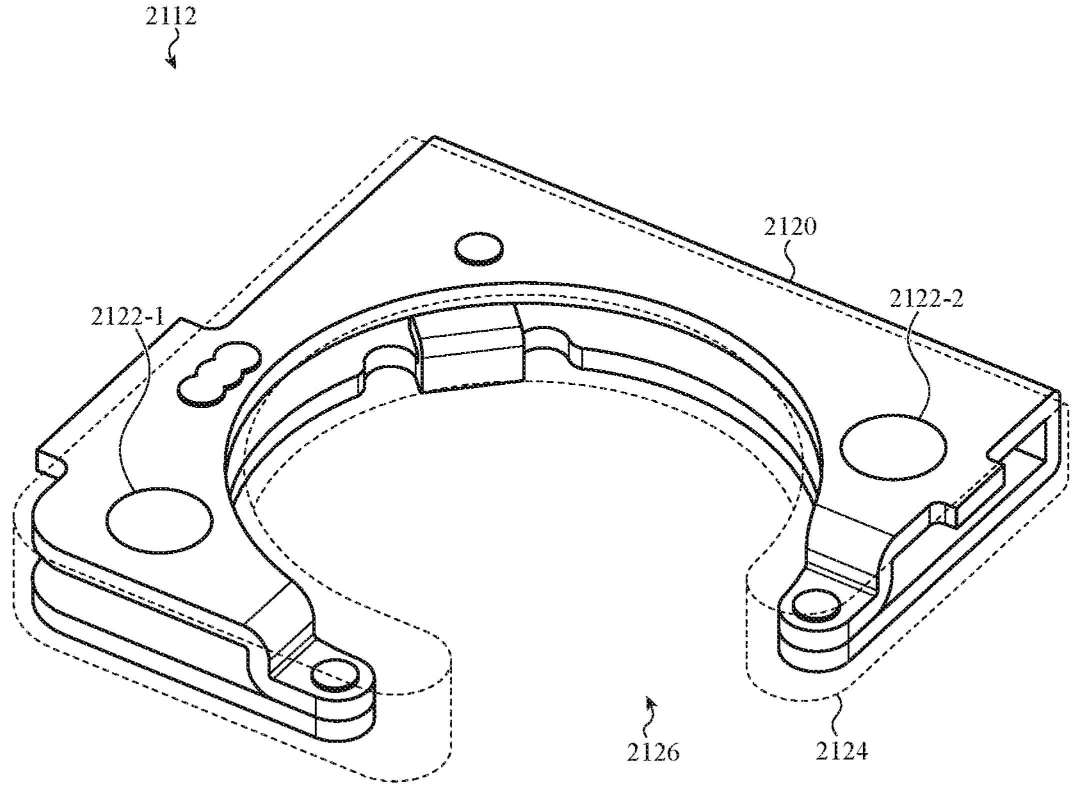
FIG. 21C depicts an example spacer for use with a circuit assembly of an electronic device.

FIG. 21C illustrates a perspective view of the spacer 2112, illustrating the conductive frame 2120 and the polymer support structure 2124 (shown in phantom). The frame 2120 may be formed first (e.g., by bending and optionally welding, riveting, brazing, or otherwise attaching the folded portions together), and the polymer support structure 2124 may be subsequently formed via an insert molding operation.

Figure 21D:
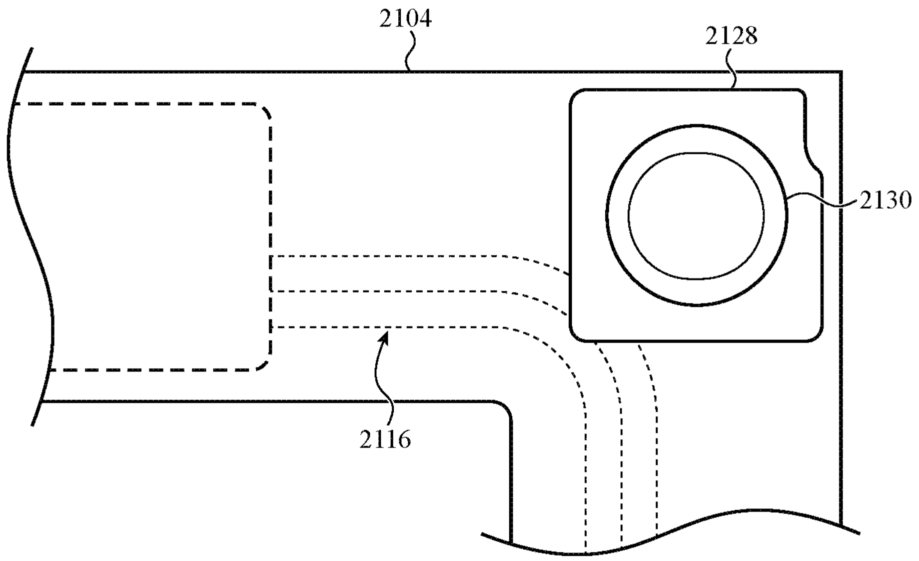
FIG. 21D depicts an example circuit assembly for an electronic device.

FIG. 21D illustrates another example spacer 2128 that may be used to define the target physical separation to the wall 2105. In this example, the spacer 2128 may be formed from a unitary polymer structure, defining a hole 2130 extending therethrough. In this example, the spacer 2128 does not conductively couple to the wall 2105, but still maintains the physical distance to the wall 2105 and provides a structural support against which a fastener (e.g., the screw 2114) may apply force. Additionally, since the spacer 2128 is nonconductive, it may overlap the conductive traces 2116 without conductively interfering with them.

Figure 21E:
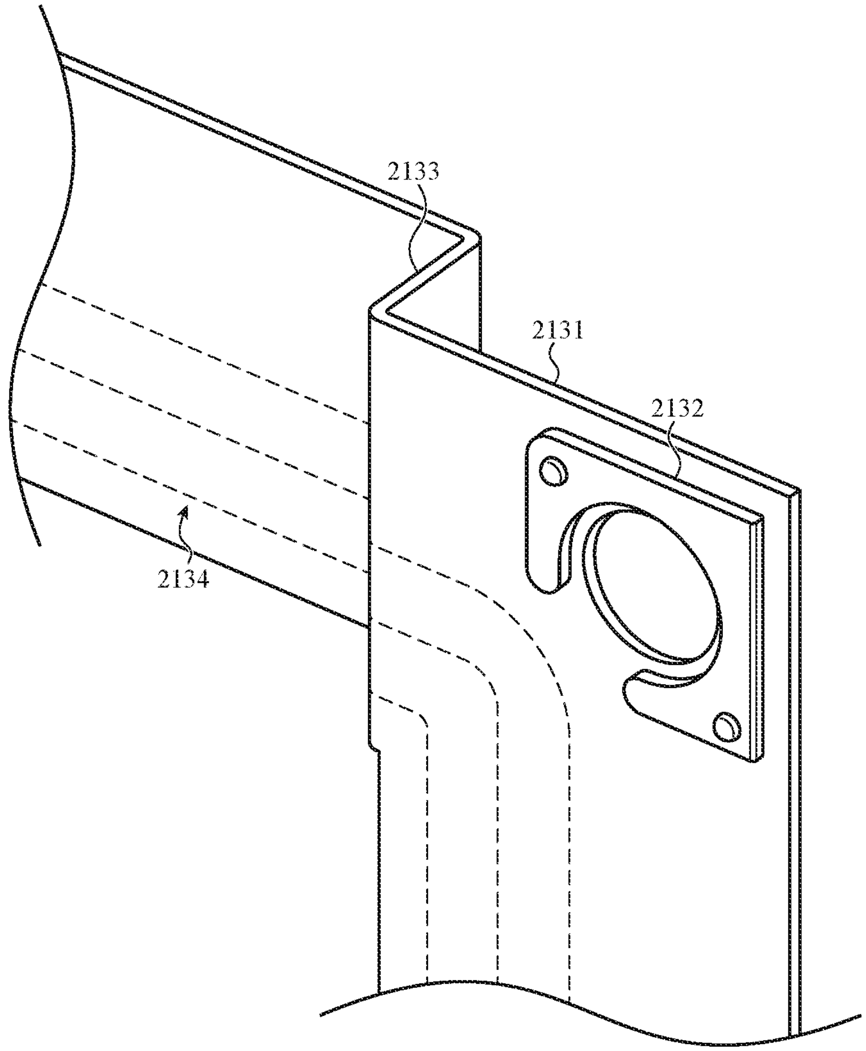
FIG. 21E depicts an example circuit assembly for an electronic device.

FIG. 21E illustrates another example spacer 2132 that may be used to conductively couple a flexible circuit element 2131 to the wall 2105. In this example, the flexible circuit element 2131 defines a bend region 2133 that offsets the conductive traces 2134 from the wall 2105 along at least a portion of the length of the traces. In this case, the portion of the flexible circuit element 2131 proximate the spacer 2132 may be positioned closer to the wall 2105. As such, the spacer 2132 may be formed from a unitary conductive (e.g., metal) structure, without a polymer structural support. In this example, the spacer 2132 conductively couples to the wall 2105 (optionally while defining a smaller distance between the flexible circuit element and the wall) and provides a structural support against which a fastener (e.g., the screw 2114) may apply force.

Figure 22A:
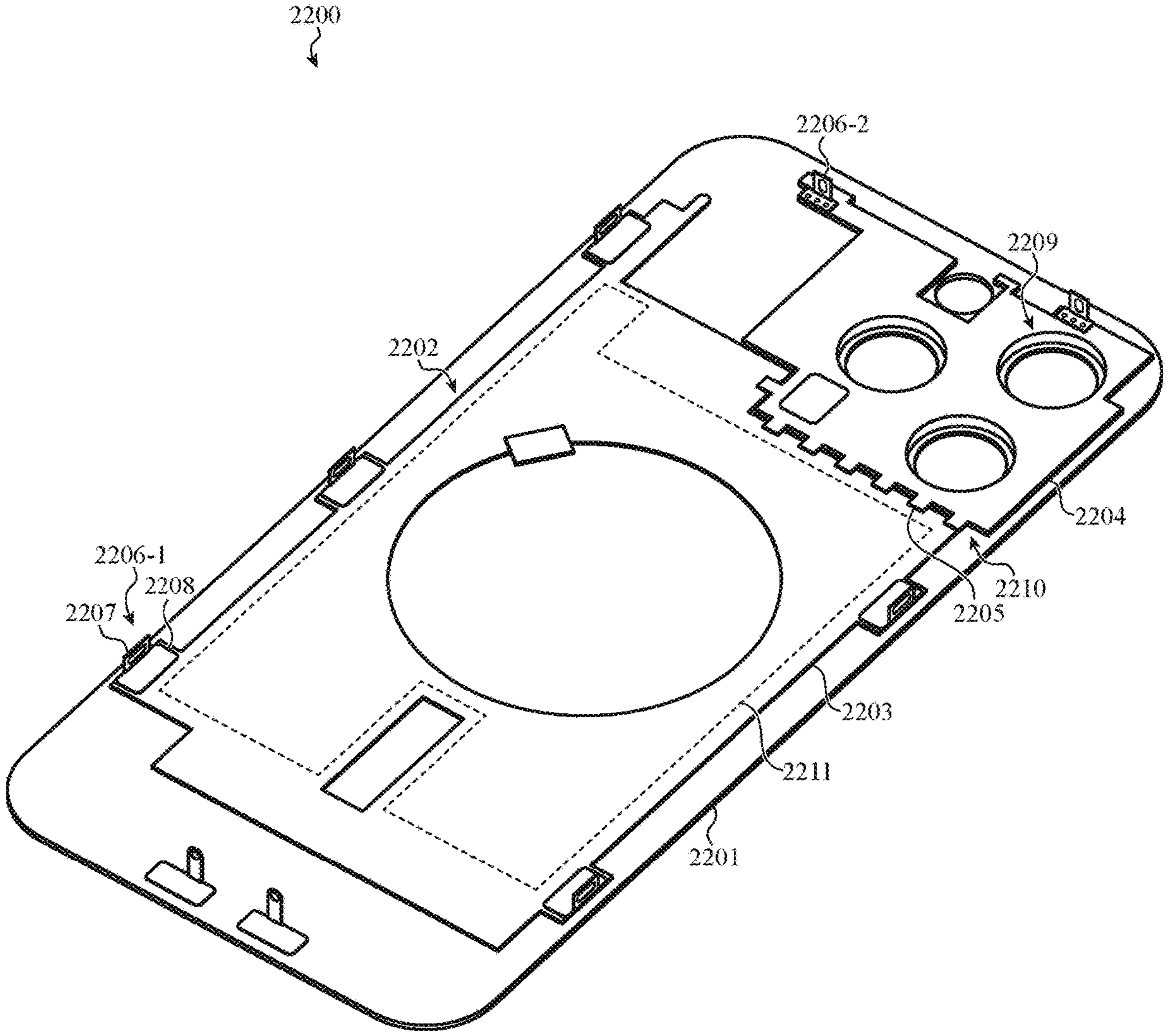
FIG. 22A is a perspective view of an example rear cover assembly for an electronic device.

FIG. 22A illustrates an example rear cover assembly 2200, which may correspond to any of the rear cover assemblies described herein. The rear cover assembly 2200 may include a rear cover 2201 (e.g., a glass or other material cover), and a support plate structure 2202. The support plate structure 2202 may be coupled to an interior surface of the rear cover 2201 (e.g., via adhesive). The support plate structure 2202 may define a structural support to which other components may be coupled. For example, mounting clips 2206 (e.g., 2206-1, 2206-2) may be coupled to the support plate structure 2202 (or defined by the support plate structure 2202). Additionally, camera components (e.g., camera trims) may be attached (e.g., welded, soldered, brazed, etc.) to the support plate structure 2202 (e.g., in camera region 2209).

The support plate structure 2202 may be formed from multiple segments, each segment formed from a different material (e.g., a different metal). For example, a first plate segment 2203 may be formed from aluminum, while a second plate segment 2204 may be formed from stainless steel. The first plate segment 2203 may be positioned proximate a battery, circuit board assembly, wireless charging coils, and other heat-generating components. Accordingly, the first plate segment 2203 may be formed from aluminum in order to take advantage of the thermal conductivity of the aluminum. More particularly, the first plate segment 2203 may also provide thermal functions to the device, by absorbing, diffusing, and/or spreading heat within the device. Accordingly, forming the first plate segment 2203 from aluminum facilitates the thermal spreading function of the first plate segment 2203. The second plate segment 2204 may include the camera region 2209, and may be used as a structural mounting point for components such as camera trims and camera windows. Accordingly, forming the second plate segment 2204 from stainless steel (which may be stronger than aluminum for a given thickness) may provide a more rigid structural support for the attached components. Additionally, in some cases, components coupled to the second plate segment 2204 may also be or include stainless steel, and forming the second plate segment 2204 from stainless steel allows the welds to be between the same metals (instead of welding between dissimilar metals).

The first and second plate segments 2203, 2204 may be physically and conductively coupled to one another at a plate interface 2210. For example, one or more tabs 2205 of the second plate segment 2204 may overlap and be attached to (e.g., via welding, soldering, brazing, conductively adhering, etc.) the first plate segment 2203. In other examples, the tabs may be defined by the first plate segment 2203, or both the first and second plate segments. Conductively coupling the first and second plate segments 2203, 2204 allows the plate segments to be at the same electrical potential (e.g., an electrical ground of the device), and coupling the plate segments generally improves the structural integrity and rigidity of the support plate structure 2202.

The mounting clips 2206 may be formed directly from the plate segments (e.g., by bending or otherwise forming the mounting clips 2206 from the material of the plate segments), or they may be formed separately and attached to the plate segments (as shown). With reference to example mounting clip 2206-1, the mounting clips may include a base 2208 and a tab portion 2207. The base 2208 may be conductively and structurally coupled to the plate segments via welding, soldering, brazing, conductive adhesives, or the like. The tab portions 2207 may be inserted into a corresponding attachment structure (e.g., a spring clip or latch) that is attached to a device housing, as described herein. The tab portion 2207 and the base 2208 may be portions of a unitary metal component. The mounting clips 2206 may be formed from metal, such as aluminum, stainless steel, titanium, or the like.

The mounting clips 2206 may structurally (and optionally) conductively couple to corresponding attachment features of a device housing. Accordingly, the mounting clips may serve to retain the rear cover assembly 2200 to a device housing (and may conductively couple the support plate structure 2202 to an electrical ground of the device).

In some cases, a thermal diffusion member 2211 may be positioned on the support plate structure 2202. The thermal diffusion member 2211 may be formed from one or more layers of graphite or other thermally conductive materials, and may be adhered to or otherwise coupled to a surface of the support plate structure 2202. The thermal diffusion member 2211 may have a thickness between about 10 microns and about 20 microns. The thermal diffusion member 2211 may extend over at least 50% of the support plate structure 2202. In some cases, the thermal diffusion member 2211 extends over 60%, over 70%, over 85%, over 90%, or over 95% of the support plate structure 2202.

The thermal diffusion member 2211 may be configured to generally receive heat from other components and spread the heat among a large area. For example, the thermal diffusion member 2211 may be positioned over or proximate components of a wireless charging system (e.g., a wireless charging coil), and may also be positioned across from other device components such as a circuit board assembly, battery, and the like (e.g., the thermal diffusion member 2211 faces towards the internal components of the device). Heat from the wireless charging system and from the components coupled to the device housing may be transferred to the thermal diffusion member 2211 (across an air gap or via direct contact). The received heat may be generally diffused or spread throughout the thermal diffusion member 2211. Example effects of the thermal diffusion member 2211 include reducing peak temperatures in the rear cover assembly, transferring heat away from the internal device components (e.g., the circuit board assembly and battery), and producing more even or uniform temperature profiles in the rear cover assembly and/or the device as a whole.

Figure 22B:
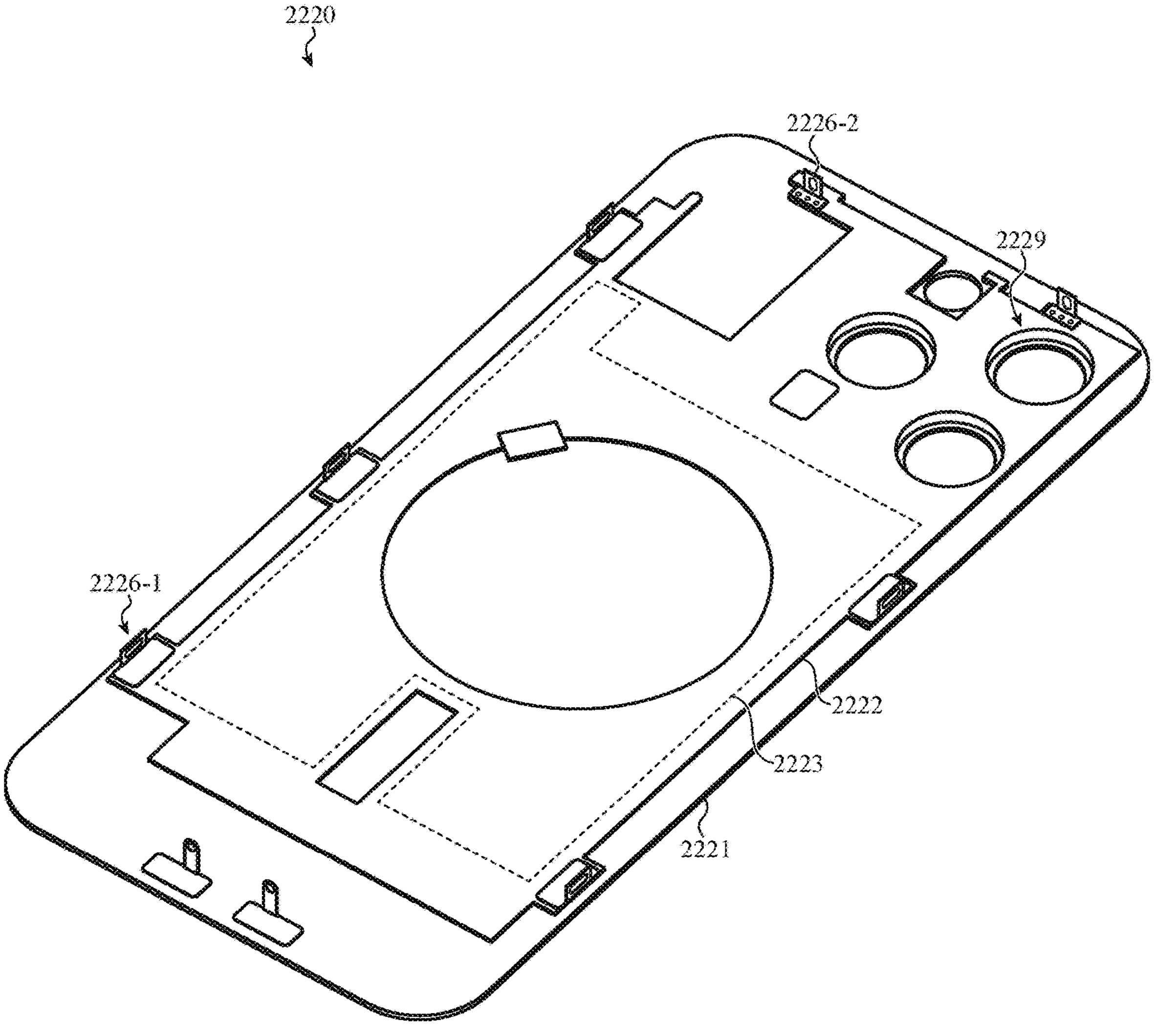
FIG. 22B is a perspective view of an example rear cover assembly for an electronic device.

FIG. 22B illustrates another example rear cover assembly 2220, which may correspond to any of the rear cover assemblies described herein. The rear cover assembly 2220 may include a rear cover 2221 (e.g., a glass or other material cover), and a support plate structure 2222. The support plate structure 2222 may be coupled to an interior surface of the rear cover 2221 (e.g., via adhesive). The support plate structure 2222 may define a structural support to which other components may be coupled. For example, mounting clips 2226 (e.g., 2226-1, 2226-2) may be coupled to the support plate structure 2222 (or be defined by the support plate structure 2222). Additionally, camera components (e.g., camera trims) may be attached (e.g., welded, soldered, brazed, etc.) to the support plate structure 2222 (e.g., in camera region 2229). The support plate structure 2222 may be formed of a single unitary metal structure, such as aluminum.

As described above, the camera region 2229 of the support plate structure 2222 may be used as a structural mounting point for components such as camera trims and camera windows. In some cases, such components are formed from stainless steel, or another metal other than aluminum. In such cases, the components (e.g., trim structures for cameras and/or camera lenses) may be welded to the support plate structure 2222 using dissimilar material welds. In particular, components formed of a first metal material (e.g., stainless steel) may be welded to the different metal material (e.g., aluminum) of the support plate structure 2222.

The mounting clips 2226 (e.g., 2226-1, 2226-2) may be formed directly from the plate segments (e.g., by bending or otherwise forming the mounting clips 2226 from the material of the plate segments), or they may be formed separately and attached to the plate segments (as shown). The mounting clips 2226 may generally correspond to the mounting clips 2206 in FIG. 22A, and may include a base and a tab portion, where the base is conductively and structurally coupled to the support plate structure 2222 via welding, soldering, brazing, conductive adhesives, or the like.

In some cases, a thermal diffusion member 2223 may be positioned on the support plate structure 2222. The thermal diffusion member 2223 may be formed from one or more layers of graphite or other thermally conductive materials, and may be adhered to or otherwise coupled to a surface of the support plate structure 2222. The thermal diffusion member 2223 may have a thickness between about 10 microns and about 20 microns. The thermal diffusion member 2223 may extend over at least 50% of the support plate structure 2222. In some cases, the thermal diffusion member 2223 extends over 60%, over 70%, over 85%, over 90%, or over 95% of the support plate structure 2222.

The thermal diffusion member 2223 may be configured to generally receive heat from other components and spread the heat among a large area. For example, the thermal diffusion member 2223 may be positioned over or proximate components of a wireless charging system (e.g., a wireless charging coil), and may also be positioned across from other device components such as a circuit board assembly, battery, and the like (e.g., the thermal diffusion member 2223 faces towards the internal components of the device). Heat from the wireless charging system and from the components coupled to the device housing may be transferred to the thermal diffusion member 2223 (across an air gap or via direct contact). The received heat may be generally diffused or spread throughout the thermal diffusion member 2223. Example effects of the thermal diffusion member 2223 include reducing peak temperatures in the rear cover assembly, transferring heat away from the internal device components (e.g., the circuit board assembly and battery), and producing more even or uniform temperature profiles in the rear cover assembly and/or the device as a whole.

Figure 23:
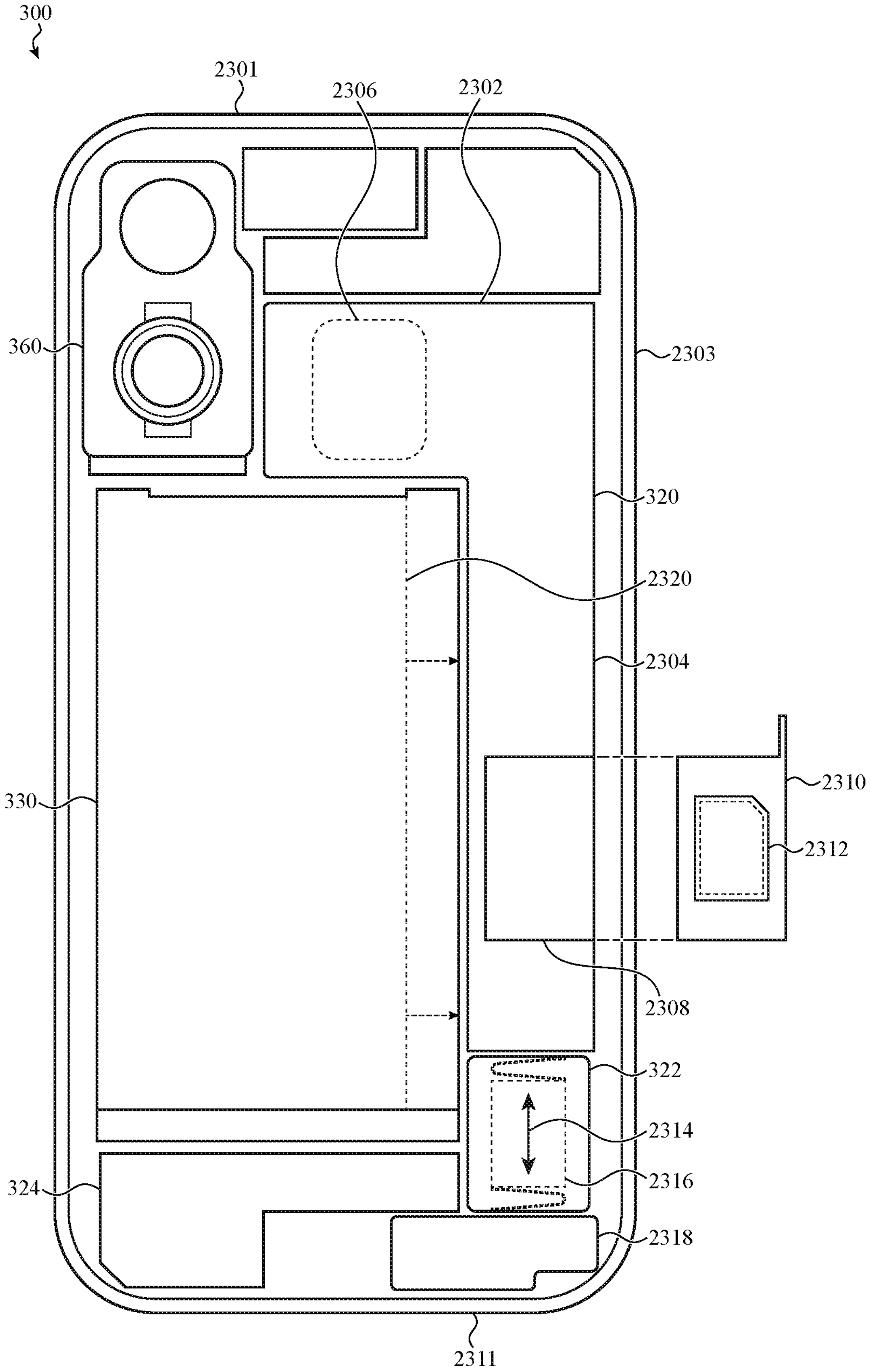
FIG. 23 depicts an example component arrangement for an electronic device.

FIG. 23 depicts a back view of the device 300, with the rear cover assembly removed. FIG. 23 illustrates an example arrangement of internal components that improves the packing efficiency in the device. The greater packing efficiency may allow a larger battery to be included, thereby improving the battery capacity and the device's battery life. In particular, the device 300 includes a circuit board assembly 320, a battery 330, a rear-facing sensor array 360, a first acoustic module (e.g., a speaker module 324), a second acoustic module 2318 (e.g., a microphone module, which may also include a barometric venting system and a pressure sensor), and a haptic actuator 322. The first and second acoustic modules may be positioned between the battery 330 and a bottom wall 2311 of the device. As described herein, by changing the orientation of the rear-facing cameras, the location of a processing element on the circuit board assembly 320, and the orientation of a subscriber identity module (SIM) tray 2310 and the haptic actuator 322, a dimension of the battery 330 in the x direction of the device may be increased.

The circuit board assembly 320 may include a first segment 2302 that is positioned between the battery 330 and a top wall 2301 of the device 300, and a second segment 2304 positioned between the battery 330 and a side wall 2303 of the device 300. As shown, positioning the rear-facing cameras in a vertical alignment may increase the space available for the first segment 2302 of the circuit board assembly 320 (relative to other possible camera orientations, such as diagonal or horizontal). Thus, the vertical alignment of the rear-facing cameras allows the first segment of the circuit board assembly 320 to be made larger (e.g., in the x direction), which in turn affords greater flexibility in component placement on the circuit board assembly 320 (e.g., such as placing the processor on the first segment 2302, as described herein).

The width (e.g., the dimension in the x direction) of the second segment 2304 of the circuit board assembly 320 may at least in part define the maximum width of the battery 330. Accordingly, reducing the width of the second segment 2304 may contribute to the ability to increase the size of the battery 330 in the x direction. As shown, a processing element 2306 (e.g., a processor) of the circuit board assembly 320 may be positioned on the first segment 2302 of the circuit board assembly 320, between the battery 330 and the top wall 2301. Since the size of the processing element 2306 is not easily modifiable, positioning this component (which may generally constrain the minimum width of the circuit board assembly 320) on the first segment 2302 allows the width of the second segment 2304 to be reduced (or more generally removes the width constraint that is mandated by the processing element 2306).

Moving the processing element 2306 alone may not provide sufficient flexibility to reduce the circuit board assembly 320, however, as other components may be positioned between the battery 330 and the side wall 2303. For example, a haptic actuator 322 may be positioned between the battery 330 and the side wall 2303. The haptic actuator 322 may include a movable mass 2316 that is configured to translate along an axis 2314 in order to produce haptic outputs. As shown, the movable mass 2316 may be rectangular, and its translation direction 2314 is parallel to its longitudinal dimension. By orienting the haptic actuator 322 as shown, with the movable mass 2316 oriented with its longitudinal dimension and translation axis 2314 parallel to the y direction of the device (e.g., parallel to the side wall 2303), the haptic actuator 322 may occupy less space in the x direction, further facilitating greater space for the battery 330.

In some cases, the circuit board assembly 320 also includes a SIM tray assembly 2308 that is coupled to the circuit board assembly 320 on the second segment 2304 of the circuit board assembly 320. The SIM tray assembly 2308 may include a SIM tray 2310 defining a SIM card cavity 2312 for receiving a SIM card therein. Since the SIM tray assembly 2308 receives a standardized physical object (e.g., a SIM card), it also has physical size constraints that cannot be easily modified. Accordingly, the SIM tray assembly 2308 may be configured so that a longitudinal axis or dimension of the SIM card cavity 2312 is parallel to the y dimension of the device (e.g., parallel to the side wall 2303).

By positioning the processing element 2306 on the first segment of the circuit board assembly 320 (e.g., and not between the battery 330 and the side wall 2303), orienting the haptic actuator 322 so that its longitudinal and translation axes are parallel to the side wall 2303, and configuring the SIM tray assembly so that the longitudinal axis of the SIM card cavity is parallel to the side wall 2303, the overall width of the components that are positioned between the battery and the side wall 2303 may be reduced or minimized. Accordingly, for a given housing size, the battery 330 can be expanded in the x direction. For example, line 2320 in the battery 330 may show the increased battery size that may be achieved by positioning the components as described herein (e.g., the dotted line may generally correspond to or represent a maximum battery size in other device configurations). In some cases, the battery size may be increased by about 5%, about 10%, about 15%, or by about 20% (e.g., as compared to a configuration in which the processing element is positioned on the second segment 2304 of the circuit board assembly, or in which the SIM tray assembly or the haptic actuator are oriented along the x direction).

As described herein, batteries may be attached to devices using an electrically debondable adhesive. An electrically debondable adhesive is an adhesive whose adhesion strength can be selectively reduced in response to an electric charge. More particularly, an electrically debondable adhesive is configured to reduce its adhesive strength along at least one of its surfaces in response to a voltage potential (e.g., a direct current voltage) applied across the electrically debondable adhesive layer. Use of an electrically debondable adhesive (EDA) facilitates simple and rapid removal of batteries from devices for replacement. As described herein, EDAs may be used to attach other components of a device, such as front and rear cover assemblies, speaker modules, circuit board assemblies, camera housings, and the like, thereby allowing for simple and rapid removal of those components as well.

Figure 24A:
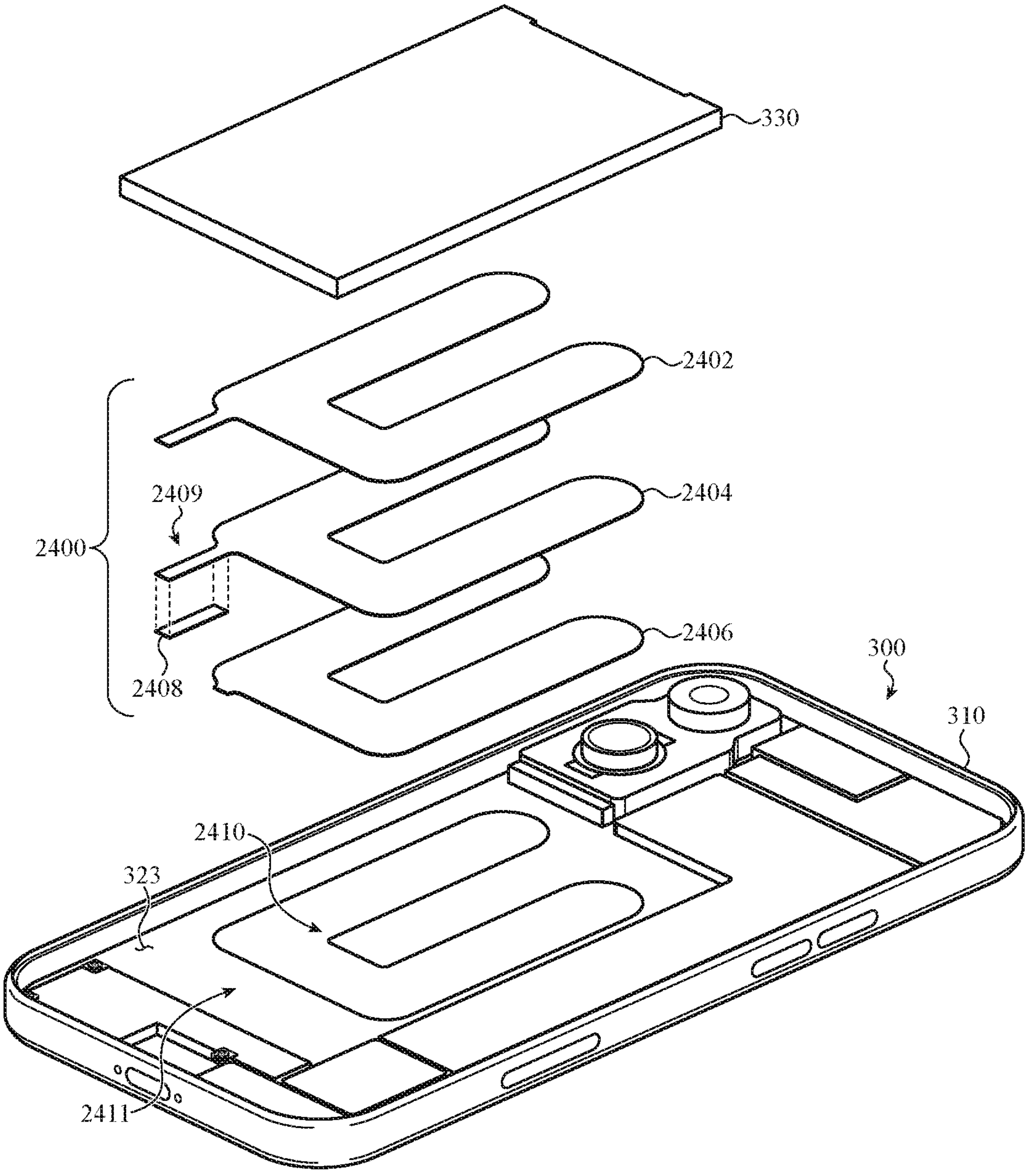
FIG. 24A is a partial exploded view of an example electronic device, illustrating an example electrically debondable adhesive structure for attaching a component to a housing.

FIG. 24A is a partial exploded view of the device 300, showing the battery 330 removed from the housing structure 310. A rear cover assembly of the device 300 (e.g., the rear cover assembly 373) has been removed. The housing structure 310 includes a chassis 323, which acts as or defines a conductive mounting structure. More particularly, and as described herein, the chassis 323 may act as one of the electrodes of an EDA structure for applying a voltage across an EDA layer.

The battery 330 may be coupled to the chassis 323 with an electrically debondable adhesive structure 2400 (referred to simply as an adhesive structure). The adhesive structure 2400 may include an electrically conductive layer 2404 that is coupled to the battery and an electrically debondable adhesive layer 2406 (EDA layer 2406) that is adhered to the electrically conductive layer 2404 and to the chassis 323. As described herein, the chassis 323 and the electrically conductive layer 2404 may define the electrodes that are used to apply a voltage across an EDA layer. The electrically conductive layers used in EDA structures may be referred to simply as conductive layers. Further, where a chassis or other conductive mounting structure is used as an electrode to apply a voltage across an EDA layer, the chassis or other conductive mounting structure may be considered part of the EDA structure.

FIGS. 25A-25D illustrate an example debonding operation of an EDA layer 2506 that is used to bond two objects 2502, 2508. FIGS. 25A-25D illustrate an example component stack 2500, which may represent a cross-sectional view of a device along line 26A-26A, or other example devices and/or component stacks. The EDA layer 2506 may generally represent the EDA layer 2406, and the objects 2502, 2508 may generally represent the battery 330 and the chassis 323, respectively. The conductive layer 2504 may generally represent the conductive layer 2404, and may be used as a first (positive, in this example) electrode for the EDA layer 2506, and the object 2508 may be used as a second (negative, in this example) electrode for the EDA layer 2506. In other examples, the polarities of the electrodes may be swapped, or a separate electrode layer may be implemented instead of using the object 2508 as an electrode.

Figure 25A:
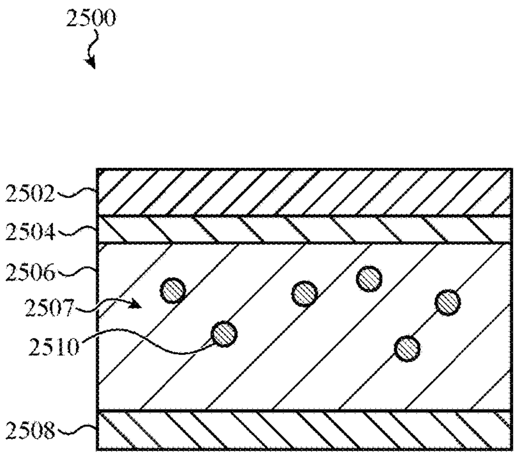
FIGS. 25A-25D are partial cross-sectional views of an example electrically debondable adhesive structure, illustrating example adhesive debonding operations.
Figure 25B:
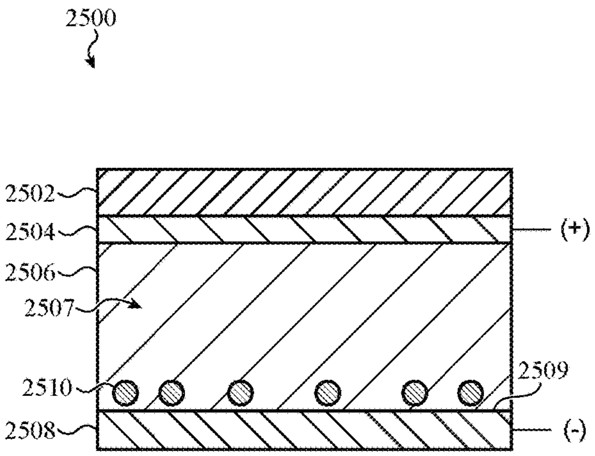
Figure 25C:
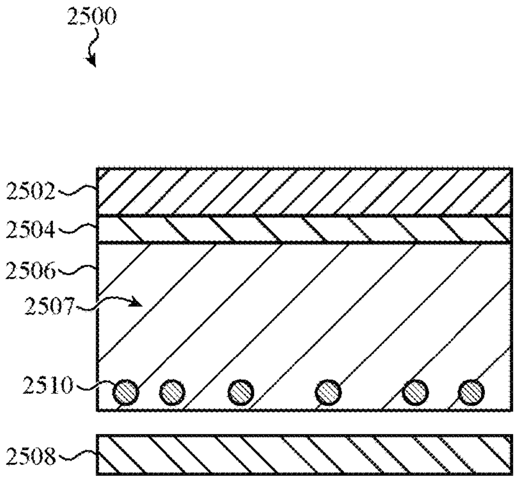

The EDA layer 2506 may include an adhesive matrix material 2507. The adhesive matrix material 2507 may be an acrylic adhesive, or any other suitable adhesive. The EDA layer 2506 may include a non-adhesive material 2510 distributed in the matrix 2507. The non-adhesive material 2510 may be responsive to electrical potential. More particularly, the non-adhesive material 2510 may migrate towards one surface of the EDA layer 2506 when a voltage potential is applied across the EDA layer 2506. For example, FIG. 25B illustrates the EDA layer 2506 when a voltage potential is applied across the EDA layer 2506 (e.g., with the positive potential coupled to the conductive layer 2504 and the negative potential coupled to the object 2508). As shown, the non-adhesive material 2510 migrates towards the surface adjacent the negative potential. After a duration, a sufficient amount of the non-adhesive material has migrated to the surface at the adhesive/object interface 2509 that the adhesive bond is reduced and the EDA layer 2506 releases from the object. FIG. 25C illustrates the EDA layer 2506 released from the object 2508 due to the presence of the non-adhesive material at the bottom surface (e.g., the negative-electrode surface) of the EDA layer 2506.

Figure 25D:
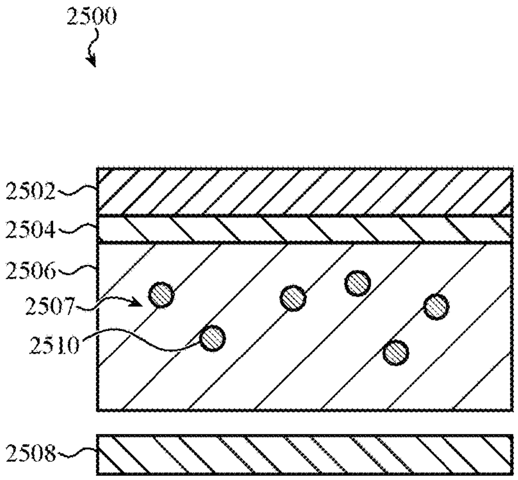

Once the voltage potential is removed from the EDA layer 2506, the non-adhesive material 2510 may redistribute within the adhesive matrix material 2507 over a duration, thereby restoring the adhesive potential at the surfaces of the EDA layer 2506. FIG. 25D illustrates the EDA layer 2506 after the voltage has been removed and a duration has passed to allow the non-adhesive material 2510 to redistribute within the adhesive matrix material 2507. Once the non-adhesive material 2510 has redistributed within the adhesive matrix material 2507 (e.g., reducing the concentration along a single side), the EDA layer 2506 may be reused. In some cases, the EDA layer 2506 may be reused before the non-adhesive material has redistributed within the adhesive matrix material 2507. In such cases, an electrical potential may be applied across the EDA layer 2506 (e.g., with a reverse polarity as compared to the debonding operation), which may accelerate the redistribution of the non-adhesive material within the adhesive matrix. In some cases, this application of reverse polarity voltage is ceased before the non-adhesive material migrates significantly to the opposite adhesive/object interface (which would reduce the adhesive strength along that interface). The application of reverse polarity voltage may be used to speed re-bonding operations when using adhesive that was recently debonded.

Returning to FIG. 24A, in some cases, the conductive layer 2404 is coupled to the EDA layer 2406 along a first side of the conductive layer 2404, and to the battery, along a second side of the conductive layer 2404, via an adhesive layer 2402. The adhesive layer 2402 may be an adhesive film, a liquid-dispense adhesive, a pressure sensitive adhesive, a heat-sensitive adhesive, or the like. In some cases, the adhesive layer 2402 is a stretch-release adhesive (or optionally an electrically debondable adhesive). The stretch-release adhesive (or adhesive with other removability functionality) may facilitate the removal of the EDA 2506 from the battery 330 after the battery 330 and the EDA layer 2506 are removed from the chassis 323. In other cases, the conductive layer 2404 is or includes an adhesive, and adheres directly to the battery 330.

As noted, applying a voltage potential across (or through) the EDA will reduce the adhesive strength along at least one surface of the EDA. Accordingly, conductive layers or electrodes may be positioned on opposite sides of an EDA layer in order to apply the voltage potential across the layer. As shown in FIG. 24A, one of the electrodes may be defined by the conductive layer 2404, and another of the electrodes may be defined by the conductive mounting structure (e.g., chassis) 323. The conductive layer 2404 may include a substrate (e.g., a flexible substrate) and a conductive material disposed on the substrate. The substrate may be a polymer film or sheet, and the conductive material may be a metal, metal film, deposited metal layer, or any other suitable conductive material. The conductive layer 2404 may be positioned in the EDA structure 2400 such that the conductive material is in contact with the EDA layer 2406 (e.g., so that it can act as one electrode for applying the voltage potential across the EDA layer 2406).

As described herein, the chassis 323 may be formed from an aluminum alloy, and may act as a second electrode for applying the voltage potential across the EDA layer 2406. In some cases, the chassis 323 may define a first surface region 2411 having an anodized surface, and a second surface region 2410 having a passivated conductive surface. More particularly, the chassis 323 may be subjected to an anodization process to produce an anodized surface. However, the anodized surface may not provide sufficient electrical conductivity to the EDA layer 2406 to facilitate the debonding operation. Accordingly, a portion of the chassis 323 may be subjected to a passivation operation to produce a surface that has sufficient electrical conductivity (and/or sufficiently low electrical resistance) to facilitate the use of the chassis 323 as an electrode for the EDA layer 2406. The EDA layer 2406 may be adhered to the passivated conductive surface in the second surface region 2410. In this way, the passivated conductive surface may act as one of the electrodes to apply the voltage potential across the EDA layer 2406. More particularly, the conductive layer 2404 may act as a first electrode for applying the voltage, and the passivated conductive surface of the region 2410 may act as a second electrode for applying the voltage.

In some cases, the passivated conductive surface may be produced by applying a passivation material to the chassis 323 to produce a different composition than the anodized surface of other portions of the chassis 323. In some cases, the composition of the passivated conductive surface may include aluminum oxide along with conductive oxides. The conductive oxides are not present in the non-passivated anodized surface of the chassis 323, and result in a greater electrical conductivity at the passivated conductive surface than the non-passivated anodized surface.

The passivation process may also inhibit further growth of aluminum oxide in the passivated surface region 2410 so that the surface remains sufficiently conductive, over time, to allow adhesive debonding operations. The passivation material may include any suitable material for promoting the passivation layer, and may be applied as a liquid using a spray deposition process, sponge or pad application process, or the like. The passivation material may include a chromate solution, a phosphate coating, a titanium and/or zirconium-containing coating, or any other suitable material.

As noted, the chassis 323 (and the housing structure more generally) may be subjected to an anodization process, along with other processes such as media blasting, coating processes, and the like. The passivation process may occur after the anodization process. In some cases, the passivation process may need a bare or exposed aluminum surface (e.g., not an anodized surface). In some cases, the surface to be passivated is anodized prior to the passivation process. In such cases, the surface may be de-anodized prior to the passivation process. For example, a laser may be used to ablate or otherwise remove the anodization layer in the second surface region 2410. In some cases, other techniques may be used, such as machining, chemical de-anodization processes, or the like. In some cases, the surface to be passivated is masked prior to the anodization process (and optionally prior to other processes such as media blasting), to prevent the anodization process (and any other surface treatments) from affecting that portion of the surface. The mask may then be removed prior to the passivation process and the surface may be passivated to produce the passivated conductive surface.

In order to apply a voltage potential across the EDA layer, the voltage potential must be applied to the first and second electrodes. Since the chassis 323 acts as one of the electrodes, the chassis 323 can be conductively coupled to one terminal of a voltage source via contact with the chassis 323, as described herein. In some cases, the chassis 323 operates as an electrical ground plane for the device, and therefore the voltage source may be applied to any portion of the chassis 323 or the device more generally that is conductively coupled to the chassis 323 (e.g., a screw that mounts a module to the chassis and conductively couples to the chassis). In some cases, a dedicated conductive terminal is defined on the chassis 323, and a terminal of a voltage source may be applied directly to the conductive terminal (e.g., via a wire, probe, clip, etc.). The conductive terminal may be an exposed portion of the chassis 323. The conductive terminal may be defined by a passivated conductive surface, a conductive coating, or the like.

To apply the voltage source to the conductive layer 2404, the conductive layer 2404 may define a tab 2409 that extends from the conductive layer 2404 (and from the EDA structure 2400 more generally) and includes a conductive terminal 2414 (FIG. 24B) for coupling to the voltage source. The tab 2409 may wrap at least partially around the battery 330 to expose the conductive terminal 2414 so that the voltage source can be applied (e.g., via a wire, probe, clip, etc.). An insulating layer 2408 may be applied to a conductive surface of the tab 2409. The insulating layer 2408 may conductively insulate a portion of the conductive surface, and may define an opening that exposes the conductive surface to define the conductive terminal 2414.

Figure 24B:
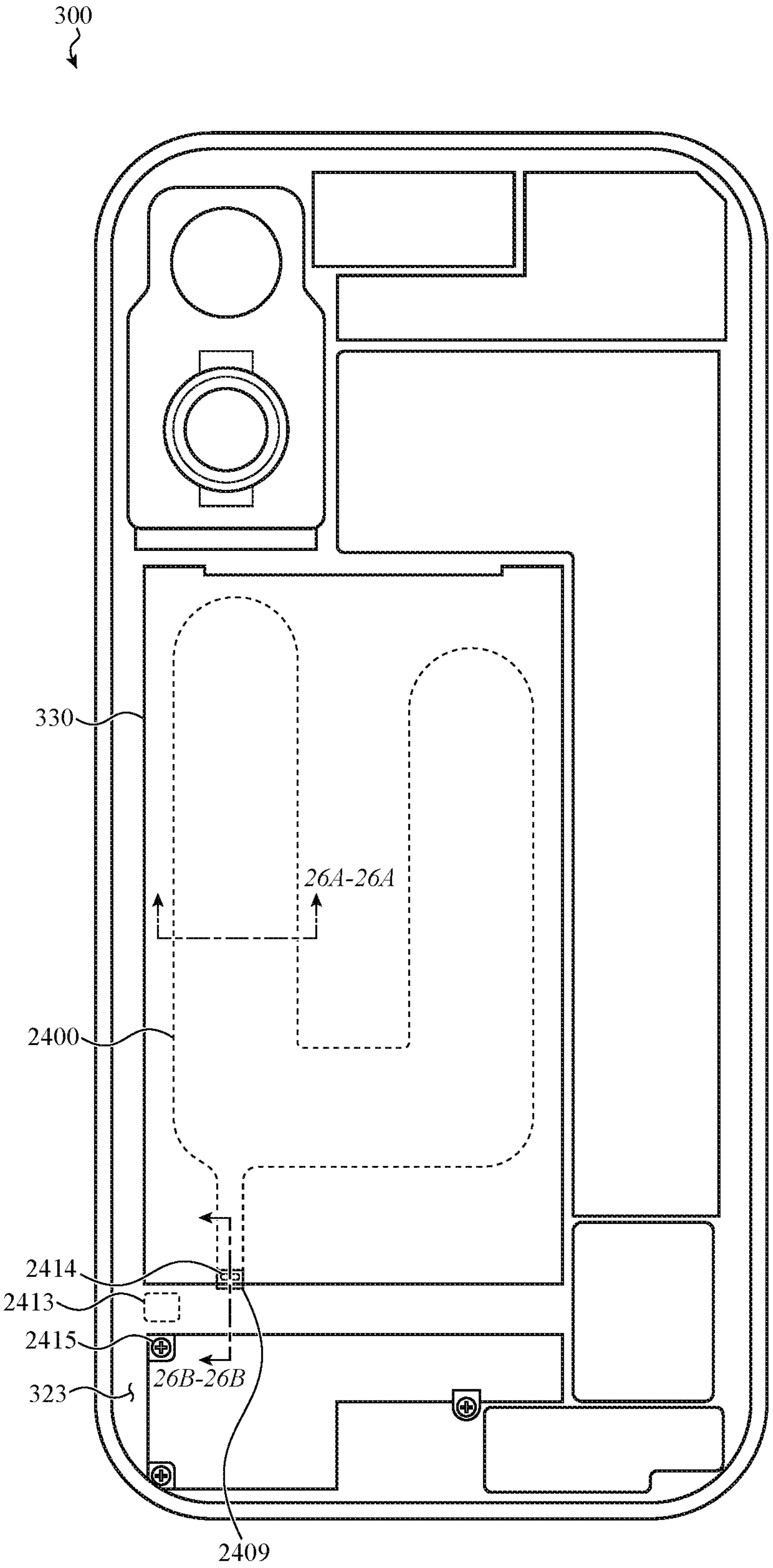
FIG. 24B is a rear view of a portion of an electronic device with an electrically debondable adhesive structure.

FIG. 24B is a rear view of the device 300 with the rear cover assembly removed. As shown, the tab 2409 extends around a side of the battery 330 so that the conductive terminal 2414 is exposed along a rear-facing side of the battery 330. In order to apply the voltage potential across the EDA layer 2406, a voltage source may be applied to the conductive terminal 2414 and to the chassis 323. As noted above, applying the voltage source to the chassis 323 may be achieved by conductively coupling a terminal of the voltage source directly to the chassis 323 (e.g., at an exposed location 2413), or to another conductive component that is conductively coupled to the chassis 323 (e.g., a fastener such as the fastener 2415).

In order to cause the EDA layer 2406 to debond, a specified voltage may be applied to the EDA layer 2406 (via the electrodes) for a specified duration. The specified voltage may be in the range of about 5 V to about 30 V, or between about 9 V and about 12 V, or another suitable voltage range (optionally including higher and lower voltage values). The specified duration may be between about 30 seconds and about 600 seconds. In some cases, the specified voltage and time to achieve debonding may be inversely related, such that higher voltages may achieve debonding in less time than lower voltages. Accordingly, various different specifications for voltage and time may be provided for the EDA layer 2406, providing a high degree of flexibility in how the debonding operation is performed.

Figure 26A:
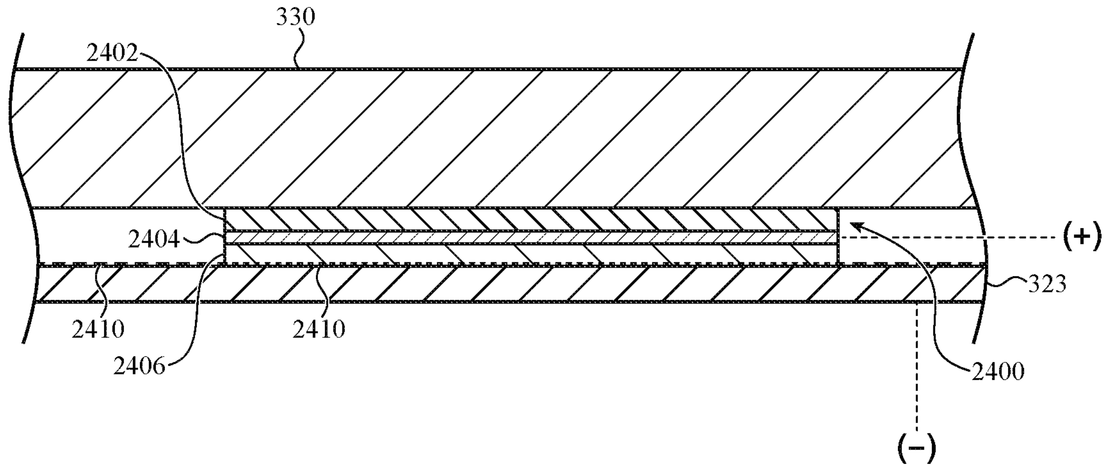
FIG. 26A is a partial cross-sectional view of a device illustrating an example electrically debondable adhesive structure.

FIG. 26A is a partial cross-sectional view of the device 300, viewed along line 26A-26A in FIG. 24B. As shown in FIG. 26A, the EDA structure 2400 couples the battery 330 to the chassis 323. The chassis 323 includes the anodized surface 2600, and the passivated conductive surface 2410. The EDA structure 2400 is coupled to the passivated conductive surface 2410, as described herein. The conductive layer 2404 is adhered to the battery 330 along a first side of the conductive layer 2404, and to the EDA layer 2406 along a second side of the conductive layer 2404. As shown, the conductive layer 2404 may act as a positive electrode for the EDA layer 2406, and the chassis 323 (via the passivated conductive surface 2410) may act as a negative electrode for the EDA layer 2406. When subjected to this voltage potential, the EDA layer 2406 may debond along the interface between the EDA layer 2406 and the chassis 323. Thus, when the EDA layer 2406 debonds and the battery is removed, the EDA layer 2406 may remain adhered to the battery 330 and the chassis 323 is exposed. In this way, another battery may be installed into a device without having to remove residual EDA layer 2406 from the chassis 323. In some cases, however, the opposite polarity may be applied, in which case the EDA layer 2406 will debond from the interface between the EDA layer 2406 and the conductive layer 2404.

Figure 26B:
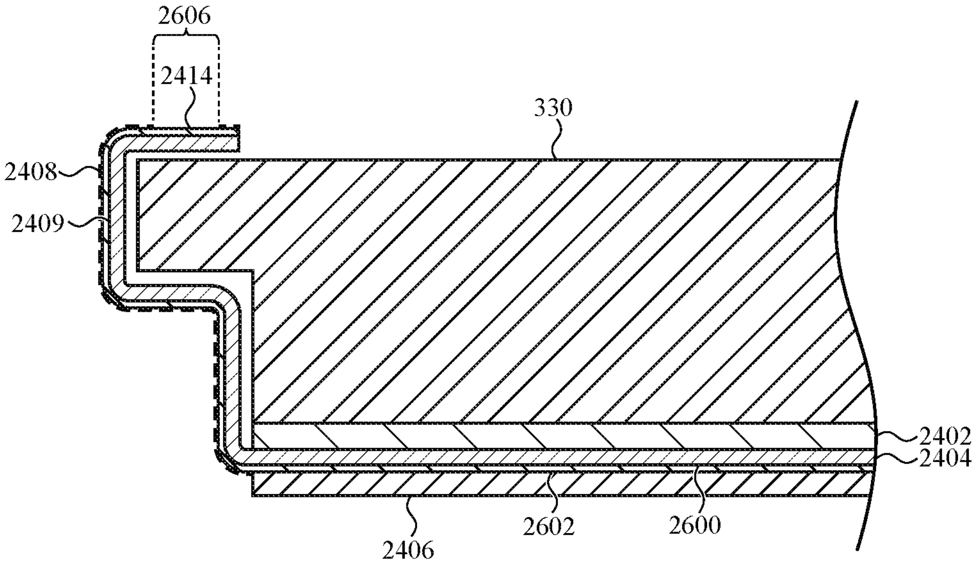
FIG. 26B is a partial cross-sectional view of an example battery and example electrically debondable adhesive structure.

FIG. 26B is a partial cross-sectional view of the battery 330, viewed along line 26B-26B in FIG. 24B. FIG. 26B illustrates the configuration of the conductive layer 2404 that defines an electrode for applying the voltage across the EDA layer 2406, and also defines the conductive terminal with which the voltage is applied to the conductive layer 2404. The conductive layer 2404 may include a substrate 2600, such as a flexible polymer substrate, and a conductive layer 2602 along a surface of the substrate 2600. As shown, the conductive layer 2404 defines a tab 2409 that extends out of the adhesive EDA structure 2400 and wraps along a side of the battery 330. The conductive layer 2602 may extend along the tab 2409, and an insulating layer 2408 may be positioned over the conductive layer 2602 on the tab 2409, thereby preventing inadvertent contact with the conductive layer 2602. The insulating layer 2408 may define an opening 2606 that exposes the conductive layer 2602 on the tab 2409 to define the terminal 2414. Thus, the terminal 2414 is ultimately defined by the same conductive layer 2602 that forms the electrode for the EDA layer 2406.

The foregoing examples illustrate the EDA layer bonding a battery to a chassis section of a housing structure. However, this is merely one example implementation, and the electrically debondable adhesive may be used to bond the battery to any structure, including other housing structures or portions, a front cover assembly, a rear cover assembly, other device components, or the like. Furthermore, if the electrically debondable adhesive is mounted to a conductive structure or surface of the device (e.g., a conductive mounting structure), that conductive structure or surface may also be used as an electrode for the EDA layer.

Figure 27:
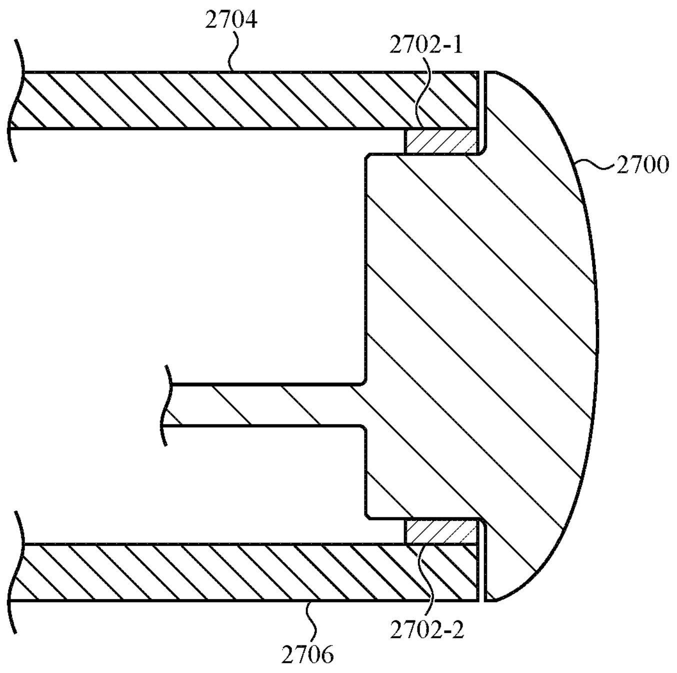
FIG. 27 is a partial cross-sectional view of an example electronic device with electrically debondable adhesive structures coupling front and rear covers to a housing.

While the foregoing examples describe electrically debondable adhesive being used to removably bond a battery to a chassis, these adhesives may be used to removably bond other device components to other structures. Further, where device components are being bonded to a conductive material such as a device housing (optionally with a passivated conductive surface), the conductive material may be used as an electrode for the adhesive. FIG. 27, for example, is a partial cross-sectional view of a portion of a device, such as the device 300, illustrating EDA structures 2702-1, 2702-2 removably bonding a front cover assembly 2704 and a rear cover assembly 2706, respectively, to a housing 2700. In this example, the housing 2700 may be conductive, and may act as one electrode for the EDA structures 2702. Conductive layers may be incorporated into the EDA structures 2702 and/or the front or rear cover assemblies to act as second electrodes. Debonding of the EDA structures 2702 to facilitate removal of the cover assemblies may be achieved using the techniques described above with respect to the battery 330.

Electrically debondable adhesive structures for removably bonding components in electronic devices as described herein may have different components and arrangements depending on, for example, whether the objects it is bonding are conductive and can be used as electrodes, as well as which surface it is desirable to debond the adhesive from. FIGS. 28A-28D illustrate cross-sectional views of several example EDA structures that may be used to removably bond objects in devices as described herein.

Figure 28A:
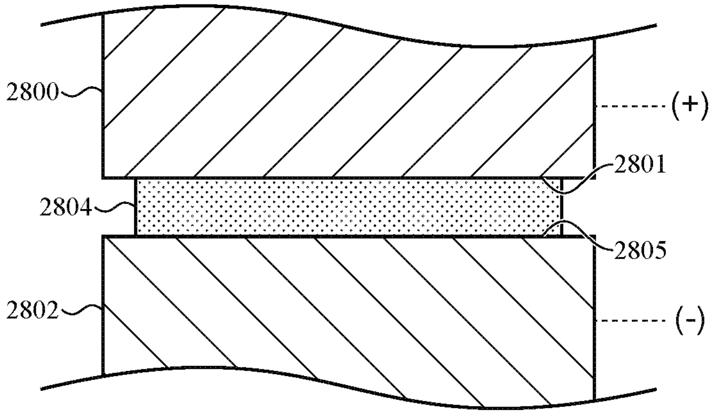
FIGS. 28A-28D are partial cross-sectional views of example electrically debondable adhesive structures.

FIG. 28A illustrates a first object 2800, a second object 2802, and an EDA layer 2804. The first and second objects are both conductive in this example, and may therefore be used as electrodes for the EDA layer 2804. Accordingly, a voltage applied to the EDA layer 2804 via the first object 2800 (e.g., a positive potential) and the second object 2802 (e.g., a negative potential) can be used to debond the EDA layer 2804 and thus decouple the first and second objects. Based on the example shown, the EDA layer 2804 may debond along the interface 2805 between the EDA layer 2804 and the second object 2802. If the polarity were reversed, the EDA layer 2804 would debond along the interface 2801.

Figure 28B:
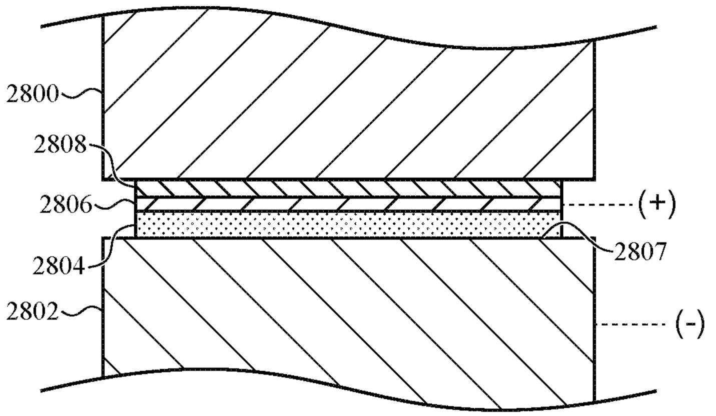

FIG. 28B illustrates an example in which the first object is not conductive, or is otherwise not used as an electrode. In this example (similar to the example in FIGS. 24A-26B), the EDA structure includes the EDA layer 2804, a conductive layer 2806, and an adhesive layer 2808 coupling the conductive layer 2806 to the first object 2800. Thus, applying the voltage to the second object 2802 and the conductive layer 2806 as shown results in the EDA layer 2804 debonding along the interface 2807. If the polarity were reversed, the EDA layer 2804 would debond along the opposite interface (e.g., the opposite surface of the EDA layer 2804).

The adhesive layer 2808 may be an adhesive film, a liquid-dispense adhesive, a pressure sensitive adhesive, a heat-sensitive adhesive, or the like. In some cases, the adhesive layer 2808 is a stretch-release adhesive (or optionally an electrically debondable adhesive).

In some cases, the adhesive portion (e.g., the adhesive matrix material) of the electrically debondable adhesive is heat activated or cured, or otherwise relies on heat in order to establish an adhesive bond. In such cases, it may be possible to incorporate heating elements in an EDA structure in order to facilitate both the heat-activated bonding process, as well as the voltage-activated debonding process.

Figure 28C:
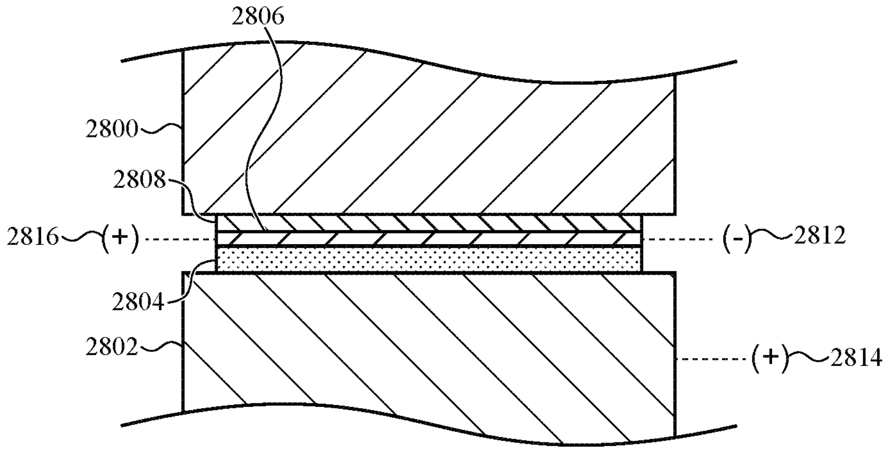

FIG. 28C illustrates an example EDA structure that may be used for both heat-based bonding and electrical debonding. The EDA structure includes an EDA layer 2804, the conductive layer 2806, and the adhesive layer 2808 coupling the conductive layer 2806 to the first object 2800. In this example, the second object is conductive and is being used as an electrode for the debonding operation. Further, the conductive layer 2806 is used both as an electrode for the debonding operation, as well as a heating element for a bonding operation. For example, during a bonding operation, a voltage may be applied across the conductive layer 2806 (represented by positive potential 2816 and negative potential 2812), which may generate heat via resistive heating. The generated heat may flow into the EDA layer 2804 to facilitate the curing and/or bonding of the EDA layer 2804. In a debonding operation, a voltage may be applied across the EDA layer 2804, represented by positive potential 2814 and negative potential 2812. The voltage across the EDA layer 2804 results in the EDA layer 2804 debonding along the interface with the conductive layer 2806, as described herein (e.g., due to the use of the conductive layer 2806 as the negative electrode).

Using the conductive layer 2806 as the negative electrode for the debonding operation may allow the use of a higher resistance conductive layer 2806. In particular, in order to effectively produce heat, the conductive layer 2806 may have a relatively higher resistance (as compared to an electrode that is designed to conduct electricity with minimal heating). Further, it may be undesirable to heat the EDA layer 2804 during a debonding operation, which may occur if the conductive layer 2806 is used as a positive electrode. By using the conductive layer 2806 as the negative electrode during the debonding operation, the voltage across the conductive layer 2806 may be less than if it were the positive electrode (or, more particularly, less than if the conductive layer 2806 were closer, in the circuit, than the EDA layer 2804 to the positive electrode). Thus, this physical and electrical configuration may allow the conductive layer 2806 to operate both as an electrode for debonding, and as a heating element for bonding.

Figure 28D:
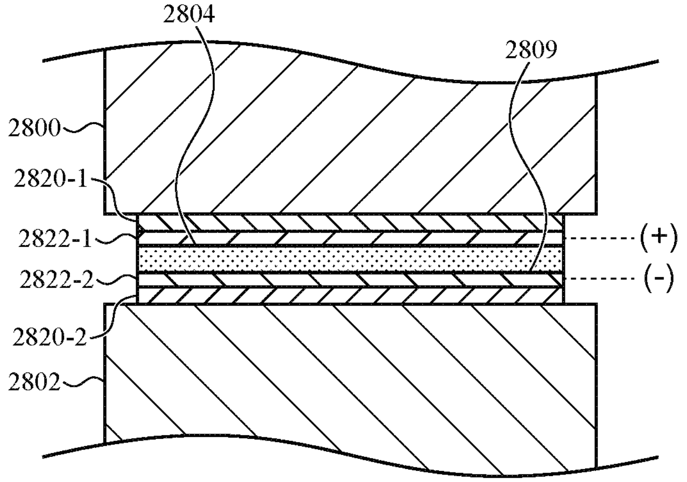

FIG. 28D illustrates an example EDA structure that may be used in instances where the objects to be bonded are not conductive or otherwise are not used as electrodes for the debonding operation. In this example, the EDA structure includes the EDA layer 2804, a first conductive layer 2822-1 along a first side of the EDA layer 2804, and a second conductive layer 2822-2 along a second side of the EDA layer 2804.

The EDA structure further includes a first adhesive layer 2820-1 coupling the first conductive layer 2822-1 to the first object 2800, and a second adhesive layer 2820-2 coupling the second conductive layer 2822-2 to the second object 2802. The adhesive layers 2820 may be adhesive films, liquid-dispense adhesives, pressure sensitive adhesives, heat-sensitive adhesives, or the like. In some cases, the adhesive layers 2820 are stretch-release adhesives (or optionally an electrically debondable adhesive). The EDA structure illustrated in FIG. 28D may be used, for example, when neither object 2800, 2802 are conductive, or where they are otherwise not configured for use as electrodes for the EDA layer 2804.

In a debonding operation, a voltage may be applied across the EDA layer 2804 via first and second conductive layers 2822-1, 2822-2, represented by positive potential and negative potential. The voltage across the EDA layer 2804 results in the EDA layer 2804 debonding along the interface with conductive layer 2822-2, as described herein.

Figure 29A:
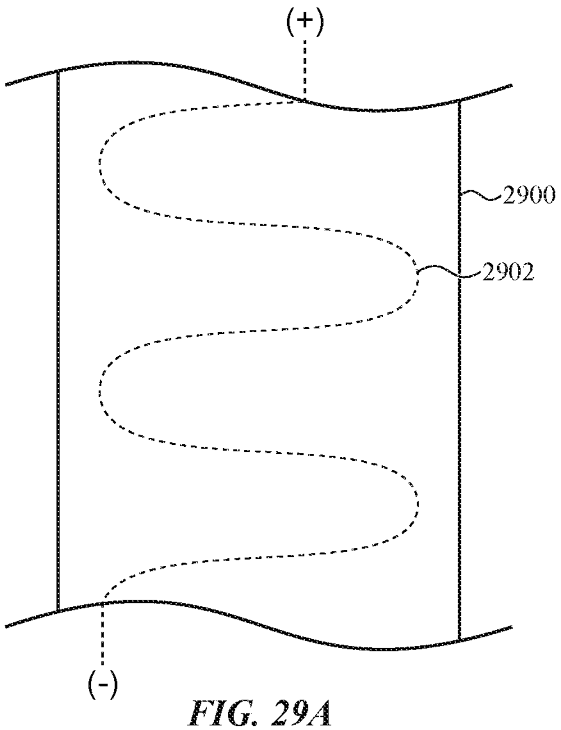
FIGS. 29A-29B illustrate heating elements for use with electrically debondable adhesive structures.
Figure 29B:
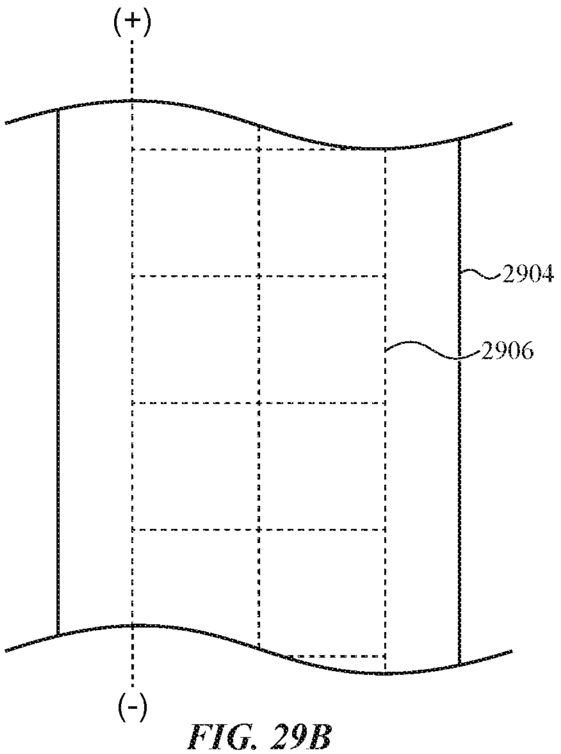

As noted above, the EDA layers may be heat activated or cured, or otherwise use heat in order to establish an adhesive bond. As described above, in some cases, an electrically conductive layer that is used as an electrode for debonding an electrically debondable adhesive may also be used as a heating element. In some cases, a separate heating element may be incorporated into a conductive layer, into the EDA layer, or into any other layer or substrate (or other structure) that is adjacent or otherwise in proximity to the EDA to impart heat to the EDA. FIGS. 29A-29B depict example configurations of heating elements that may be incorporated into a layer, substrate, or other structure to impart heat to an EDA layer. FIG. 29A illustrates an example substrate 2900 with a heating element 2902 arranged in a serpentine pattern, and FIG. 29B illustrates an example substrate 2904 with a heating element 2906 arranged in a grid pattern. The heating elements 2902, 2906 may be heated by passing a current through the heating elements (e.g., by applying a voltage across the heating elements 2902, 2906, as indicated by the positive and negative potentials in FIGS. 29A-29B).

The heating elements 2902, 2906 may be wires, conductive traces, resistive inks, or any other suitable material that can produce heat in response to a voltage/current. The substrates 2900, 2904 may be any suitable substrate, such as a circuit substrate (e.g., a rigid or flexible circuit substrate), an adhesive layer (e.g., an EDA adhesive, an adhesive layer that is used to adhere a conductive layer in an EDA structure), or the like. In some cases, a heating element may be positioned on a first side of a substrate, and an electrically conductive layer may be positioned on an opposite side of the substrate, to produce a layer that is operable both as an electrode for a debonding operation, and a heat source for a bonding operation.

Figure 29C:
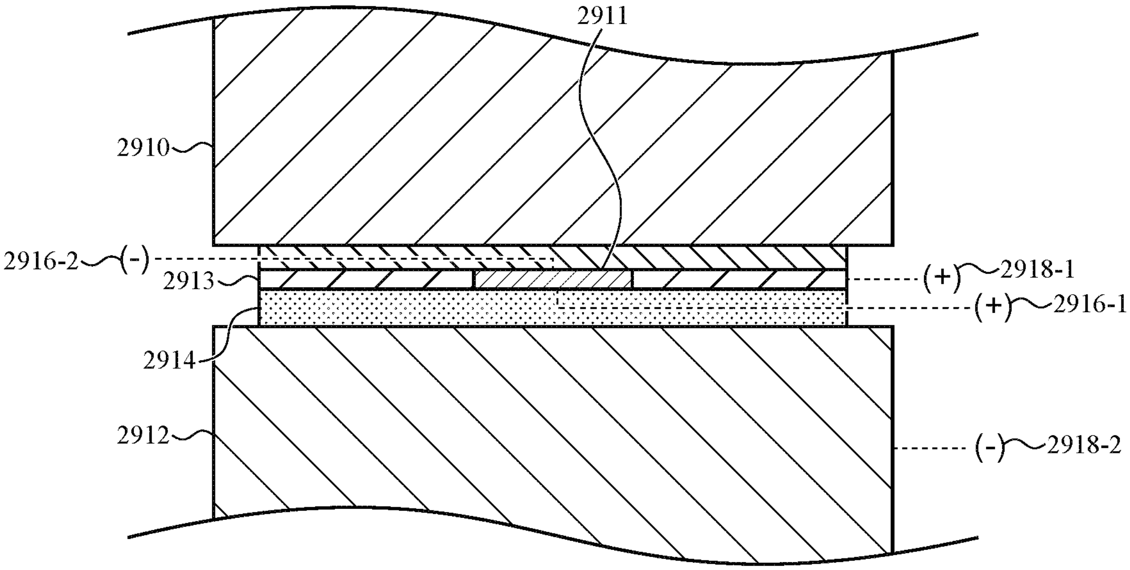
FIG. 29C is a partial cross-sectional view of an example electrically debondable adhesive structure with an incorporated heating element.

FIG. 29C illustrates another example cross-sectional view of an EDA structure that includes a heating element or layer 2911 incorporated into the EDA structure. For example, FIG. 29C illustrates a first object 2910, a second object 2912, and an EDA layer 2914. At least the second object in this example is electrically conductive, and may therefore be used as an electrode for the EDA layer 2914. The EDA structure in FIG. 29C also includes a conductive layer 2913 and a heating element 2911. The heating element 2911 may be incorporated into or be a part of the conductive layer 2913, or a separate heating layer, component, or the like. The heating element 2911 may be a conductive wire, conductive trace, resistive ink, or any other suitable material that produces heat when subjected to a voltage/current.

A voltage applied to the heating element 2911 (e.g., via positive potential 2916-1 and negative potential 2916-2) may cause the heating element 2911 to produce heat to activate or otherwise promote the adhesive function of the EDA layer 2914. Further, as described herein, a voltage applied to the EDA layer 2914 via the conductive layer 2913 (e.g., positive potential 2918-1) and the second object 2912 (e.g., negative potential 2918-2) can be used to debond the EDA layer 2914 and thus decouple the first and second objects (e.g., along the interface between the EDA layer 2914 and the second object 2912).

In order to initiate a debonding operation for an electrically debondable adhesive, a voltage is applied across the adhesive, as described above. The voltage for the debonding operation may be provided from various possible sources, and may be applied to the electrodes for the EDA layer (e.g., a conductive mounting structure and a conductive layer) in various ways. FIGS. 30A-30E illustrate various example arrangements for applying a voltage across an EDA layer from various voltage sources.

Figure 30A:
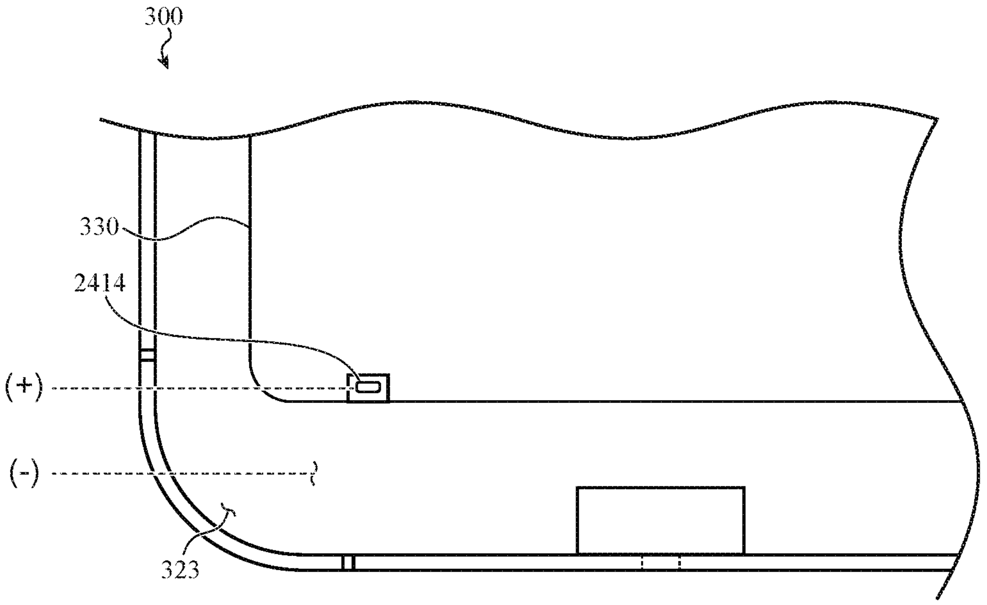
FIGS. 30A-30E depict example configurations for applying a voltage source to an electrically debondable adhesive structure.

FIG. 30A illustrates a portion of the device 300, illustrating the battery 330 coupled to the chassis 323. FIG. 30A shows the device 300 with a rear cover assembly removed to expose the interior of the device, though in other devices the interior may be exposed by removing a front cover assembly, a housing component, or the like. The device 300 also includes a conductive terminal 2414, which is coupled to and/or defined by a conductive layer of the EDA structure that couples the battery 330 to the chassis 323. A voltage potential may be applied across the EDA layer by applying a positive potential to the conductive terminal 2414, and a negative potential to the chassis 323. For example, leads of a voltage source (e.g., wires, probes, clips) may be placed in contact with the conductive terminal 2414 and the chassis (and/or to a component that is conductively coupled to chassis 323, such as a fastener). In some cases, a portion of the chassis 323 may be exposed (when the front and/or rear cover assembly is removed, or the interior of the device is otherwise exposed for battery removal), such that the lead can be applied directly to the chassis. The voltage may be applied for a duration, which may be selected based on the value of the voltage that is applied. The voltage source may be a direct current power supply, one or more external batteries, the battery 330, or any other suitable voltage source.

Figure 30B:
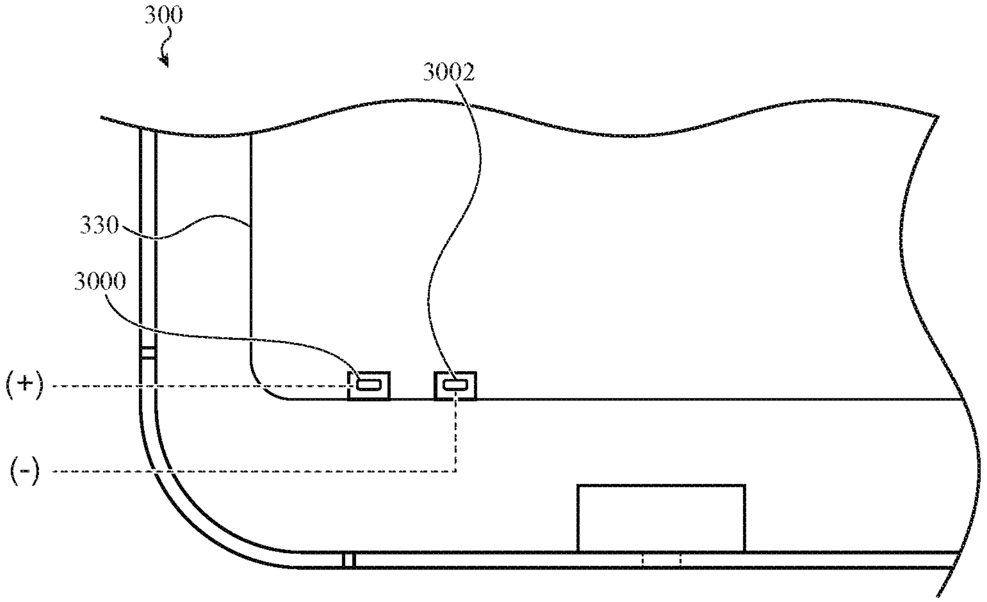

FIG. 30B illustrates an example device 300 in which an EDA structure includes two conductive terminals 3000, 3002 for applying a voltage across an EDA layer. In some cases, the first conductive terminal 3000 is defined by or conductively coupled to a first conductive layer, and the second conductive terminal 3002 is defined by or conductively coupled to a second conductive layer. In some cases, the first conductive terminal 3000 is defined by or conductively coupled to a first conductive layer, and the second conductive terminal 3002 is conductively coupled to the chassis. A voltage potential may be applied across the EDA layer by applying a positive potential to the first conductive terminal 3000, and a negative potential to the second conductive terminal 3002. For example, leads of a voltage source (e.g., wires, probes, clips) may be placed in contact with the conductive terminals 3000, 3002.

Figure 30C:
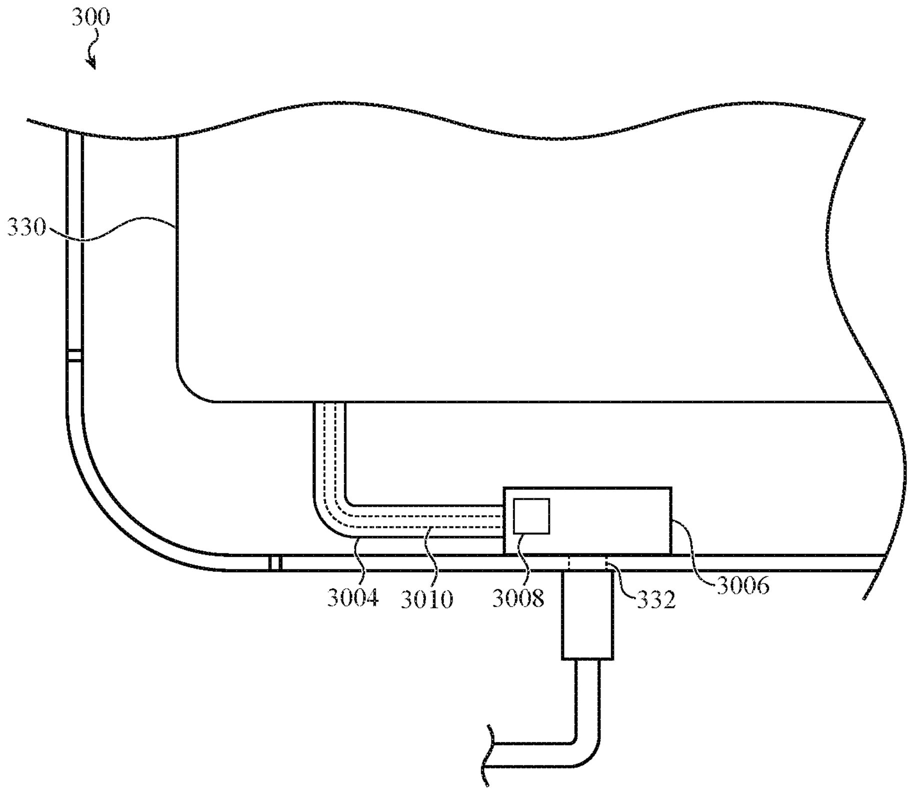

FIG. 30C illustrates an example device 300 in which the voltage potential for debonding the EDA is provided via a charging port 332. In this example, the device may include a switching element 3008 that is operatively coupled to the charging port 332 and to the electrodes of an EDA structure. For example, a circuit element 3004 (e.g., a flexible or rigid circuit element or other substrate) may include conductive paths 3010 (e.g., conductive traces, wires, etc.) that conductively couple the charging port 332 to the electrodes of the EDA structure (optionally including a chassis, where the chassis is used as an electrode of an EDA structure).

The switching element 3008 may selectively conductively couple a voltage source that is plugged into the charging port 332 to the electrodes of the EDA structure. For example, in some cases, the switching element may be a button or other electromechanical device that, when pressed or otherwise actuated by a user, connects the voltage source at the charging port 332 to the electrodes. In some cases, the switching element 3008 may include a timer and/or other circuitry to apply the voltage to the electrodes for a duration. In some cases, the duration is selected based on a determination, by the switching element 3008 or associated circuitry, of the voltage of the voltage source. Thus, for example, a greater duration may be selected when the voltage value is lower, and a shorter duration may be selected when the voltage value is higher.

In some cases, the switching element 3008 includes switching circuitry that is controllable via a display of the device. For example, as described with respect to FIG. 31, a device may be configured to display a graphical user interface from which users can initiate a debonding operation. Thus, a user may connect a voltage source (e.g., a charging cable) to the charging port 332, and then initiate a debonding operation via the user interface on the display. In response to receiving the selection to initiate the debonding operation, the device may cause the switching element 3008 to conductively couple the voltage source from the charging cable to the electrodes, thus resulting in the debonding of the EDA structure (e.g., to release the battery). In some cases, the switching element 3008 may include both a manually operated switch and circuitry to allow debonding to be initiated via a touchscreen or other input system of the device.

In some cases, the cable that provides the voltage source at the charging port 332 is a standard charging and/or communication cable. In other examples a dedicated debonding cable may be provided, which may have or rely on different physical and/or electrical configurations to provide the debonding voltage to the device.

Figure 30D:
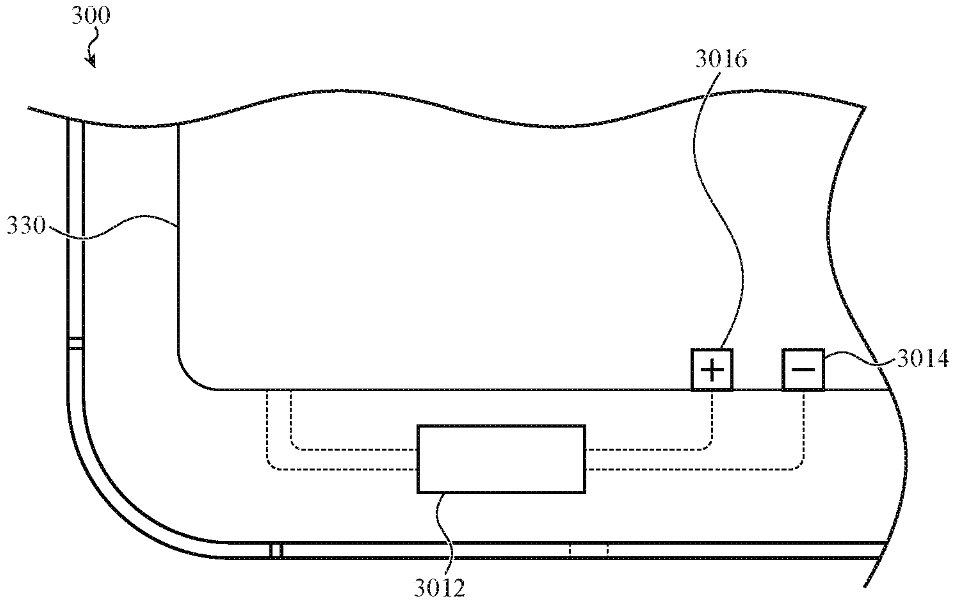

FIG. 30D illustrates an example device 300 in which the voltage potential for debonding the EDA is provided via the battery 330 itself. In this example, the device may include a switching element 3012, which may include switching circuitry that is operatively coupled to positive and negative terminals 3016, 3014 of the battery 330, and to the electrodes of an EDA structure. The switching circuitry may be configured to apply the voltage potential (from the battery) between the first electrode and the second electrode of the EDA structure.

In some cases, the switching element 3012 includes switching circuitry that is controllable via a display of the device. For example, as described with respect to FIG. 31, a device may be configured to display a graphical user interface from which users can initiate a debonding operation. Thus, a user may initiate a debonding operation via the user interface on the display. In response to receiving the selection to initiate the debonding operation, the device may cause the switching element 3012 to conductively couple the battery to the electrodes of the EDA structure, thus resulting in the debonding of the EDA structure (e.g., to release the battery). In some cases, the switching element 3012 instead or additionally includes a manually operated switch (e.g., a button or switch, as described with respect to FIG. 30C) to allow debonding to be initiated via manual operation of the switching element 3012.

Figure 30E:
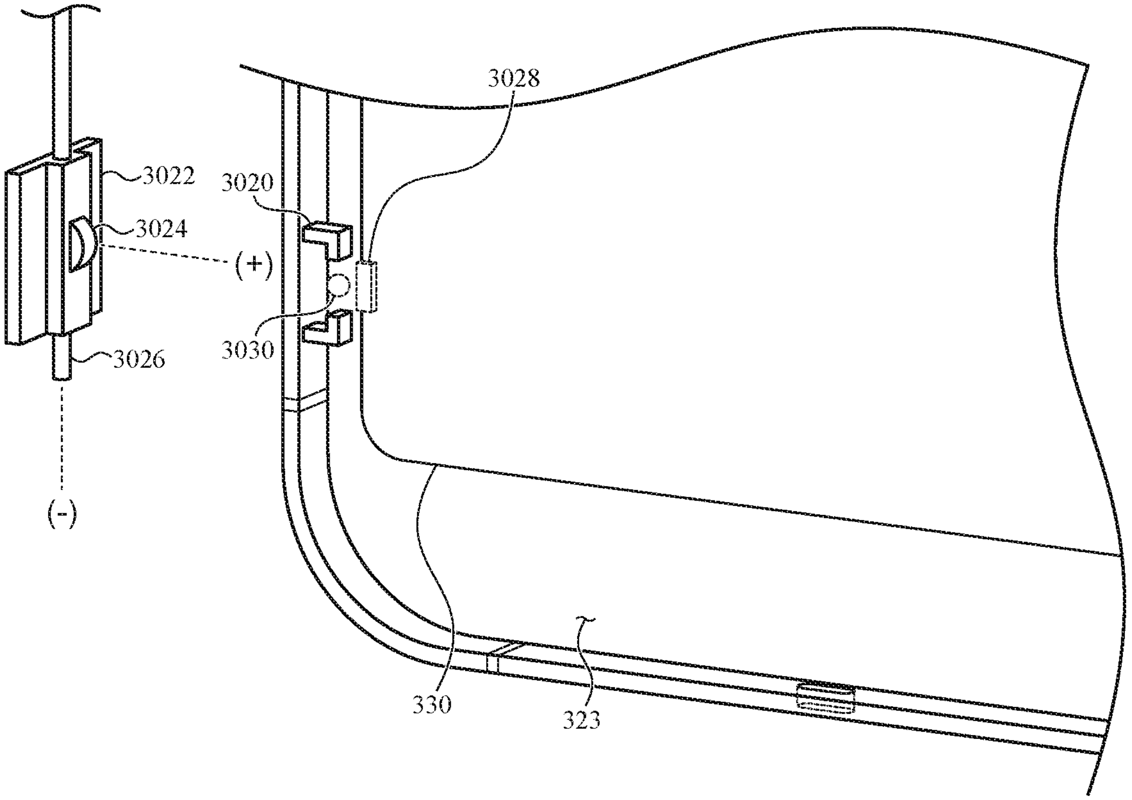

FIG. 30E illustrates an example device that is configured to receive a debonding connector that provides a voltage source for a debonding operation. The device may include receptacle 3020 that is configured to receive a complementary debonding connector 3022. The debonding connector 3022 may include conductive voltage supply terminals 3024, 3026 (e.g., spring-loaded terminals). The voltage supply terminals 3024, 3026 may be configured to provide positive and negative voltage connections (as shown), it will be understood that these may be reversed depending on the debondable adhesive structure and the particular debonding operations being performed. When the debonding connector 3022 is inserted into the receptacle 3020, the conductive voltage supply terminals 3024, 3026 may contact corresponding terminals of the EDA structure. For example, a conductive terminal 3028 may be positioned on or proximate the battery 330, and may be contacted by the first voltage supply terminal 3024 when the debonding connector 3022 is connected. As shown, the second voltage supply terminal 3026 may contact the chassis 323 (which may act as one of the electrodes for the EDA structure) at contact point 3030. (Note that the debonding connector 3022 is shown rotated from its insertion direction; it will be understood that the debonding connector 3022 is inserted into the receptacle 3020 such that the voltage supply terminal 3026 contacts the contact point 3030 of the chassis.) The debonding connector 3022 may be coupled to a voltage source, such as a direct current power supply, one or more external batteries, the battery 330, or any other suitable voltage source. While FIG. 30E illustrates one example connector configuration for the connector and receptacle, it will be understood that other physical configurations are also contemplated, including other complementary connector/receptacle shapes, as well as other configurations of conductive terminals (including configurations that do not use the chassis 323 or other conductive mounting structure as an electrode for the EDA structure).

Figure 31:
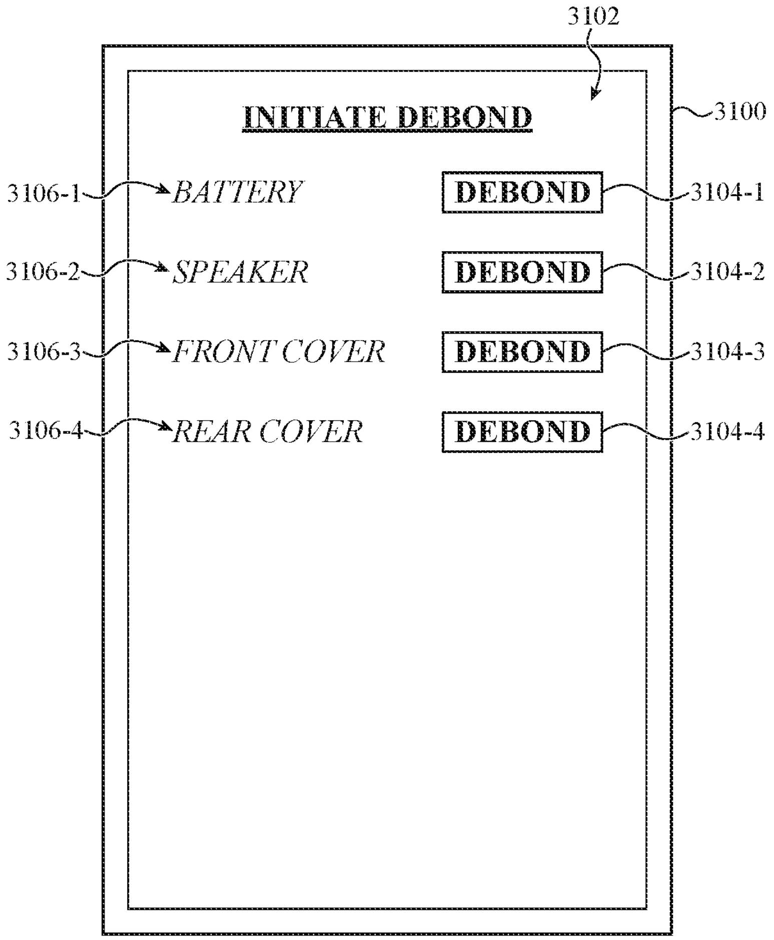
FIG. 31 depicts an example user interface for initiating debonding operations for electrically debondable adhesive structures.

As noted above, debonding operations may be initiated via a touchscreen of a device. For example, in cases where a device includes switching circuitry that is controllable by the device to apply a voltage potential across electrodes of an EDA structure, the device may include a graphical user interface that allows technicians and/or users to initiate debonding via the touchscreen. FIG. 31 illustrates an example device 3100 showing an example user interface 3102 for initiating debonding operations. The interface 3102 may include a list of components 3106 that may use EDA structures and for which debonding may be initiated. The interface 3102 may also include input elements 3104 (e.g., virtual buttons) that can be selected in order to initiate a debonding operation. Upon selection of an input element 3104, the device may cause switching circuitry to apply a voltage to the EDA structure that corresponds to the selected component. The voltage may be supplied by any source, including a charging cable, the battery of the device, a direct current power supply, one or more external batteries, or any other suitable voltage source. In some cases, in response to a selection of an input element 3104 to initiate a debonding operation, the device determines a value of a voltage of an available voltage supply (e.g., from an onboard battery or a charging or other voltage supply cable), and may determine a duration for which to apply the voltage based on the voltage value. After applying the voltage to the EDA structure for the determined duration, the device may decouple the voltage source from the EDA structure.

While the example user interface 3102 includes an example listing of components that may be debonded via a touchscreen interface, this is merely an example listing, and any component(s) that are bonded using an EDA structure and which include switching circuitry that is controllable by the device may be represented.

Additionally, in some cases, a device may include multiple options for applying a voltage to an EDA structure. For example, in some cases, a device may be unable to display the debonding interface. In such cases, the voltage may instead be applied using manual switching and/or direct application (e.g., by applying probes to conductive terminals, as described herein). Additionally, debonding operations may be initiated by providing inputs to other input devices or mechanisms of the device. For example, an input to a button or switch of the device may initiate a debonding operation.

In some cases, debonding operations that are initiated in response to inputs provided to the device may require authorization or authentication. For example, the device may require an authorization code, password, or other credential before displaying a debonding interface or otherwise initiating a debonding operation. As another example, the device may only display a debonding interface or otherwise initiate a debonding operation when a certain type of cable is coupled to the charging port. In such cases, the device may communicate with the cable (and/or a voltage supply device coupled to the cable) to authenticate the cable and/or voltage supply device. Upon determining that the cable and/or the voltage supply device is authorized and/or authenticated, the device may allow a user to access the debonding interface or otherwise initiate a debonding operation.

Figure 32:
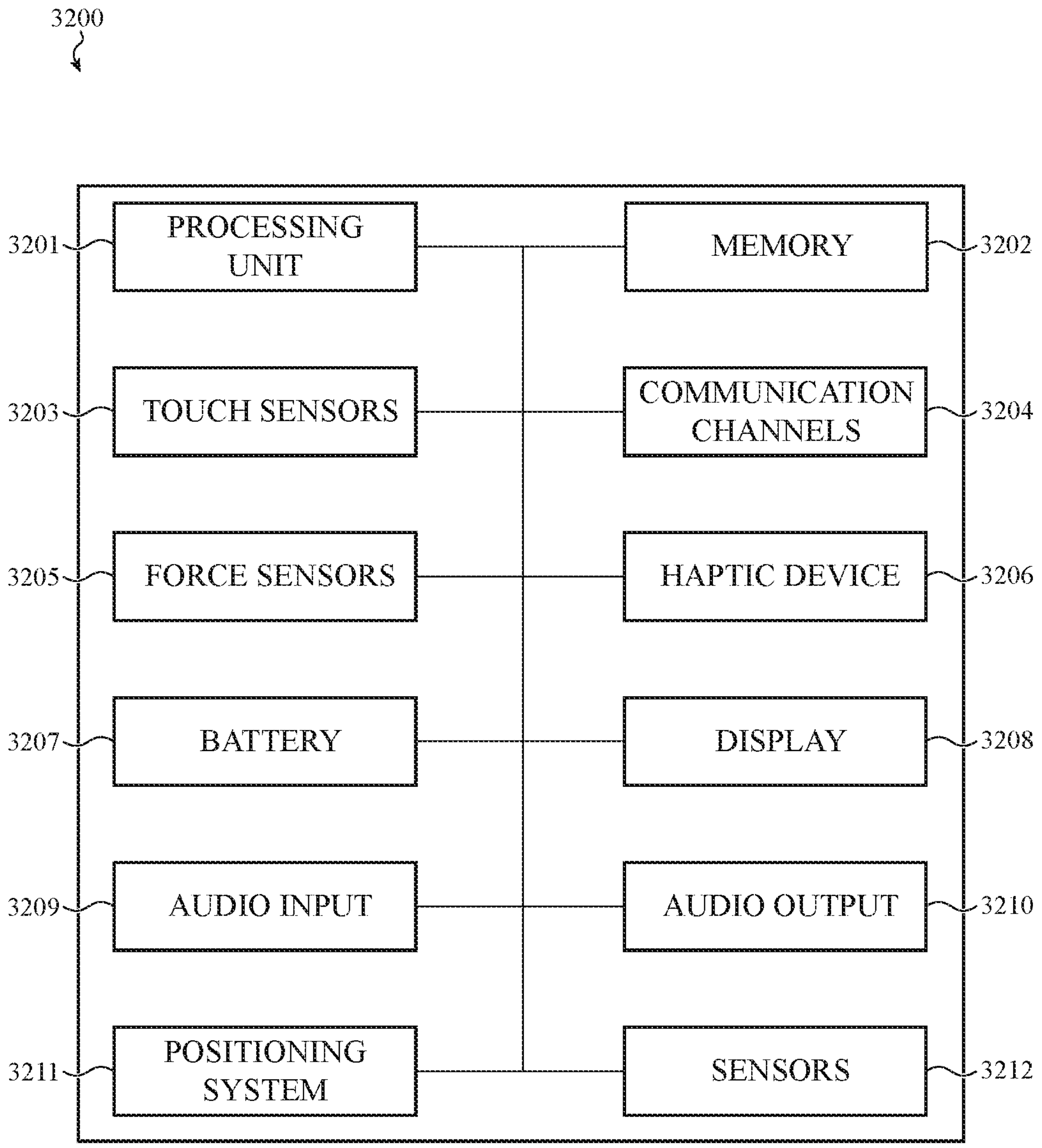
FIG. 32 is a schematic diagram of an example electronic device.

FIG. 32 depicts an example schematic diagram of an electronic device 3200. The electronic device 3200 may be an embodiment of or otherwise represent the device 100 (or other devices described herein, such as the devices 140, 200, and 300). The device 3200 includes one or more processing units 3201 that are configured to access a memory 3202 having instructions stored thereon. The instructions or computer programs may be configured to perform one or more of the operations or functions described with respect to the electronic devices described herein. For example, the instructions may be configured to control or coordinate the operation of one or more displays 3208, one or more touch sensors 3203, one or more force sensors 3205, one or more communication channels 3204, one or more audio input systems 3209, one or more audio output systems 3210, one or more positioning systems 3211, one or more sensors 3212, and/or one or more haptic feedback devices 3206.

The processing units 3201 of FIG. 32 may be implemented as any electronic device capable of processing, receiving, or transmitting data or instructions. For example, the processing units 3201 may include one or more of: a microprocessor, a central processing unit (CPU), an application-specific integrated circuit (ASIC), a digital signal processor (DSP), or combinations of such devices. As described herein, the term “processor” is meant to encompass a single processor or processing unit, multiple processors, multiple processing units, or other suitably configured computing element or elements. The processing units 3201 may be coupled to a circuit board assembly, such as the circuit board assemblies described herein.

The memory 3202 can store electronic data that can be used by the device 3200. For example, a memory can store electrical data or content such as, for example, audio and video files, images, documents and applications, device settings and user preferences, programs, instructions, timing and control signals or data for the various modules, data structures or databases, and so on. The memory 3202 can be configured as any type of memory. By way of example only, the memory can be implemented as random access memory, read-only memory, flash memory, removable memory, or other types of storage elements, or combinations of such devices. The memory 3202 may be coupled to a circuit board assembly, such as the circuit board assemblies described herein.

The touch sensors 3203 may detect various types of touch-based inputs and generate signals or data that are able to be accessed using processor instructions. The touch sensors 3203 may use any suitable components and may rely on any suitable phenomena to detect physical inputs. For example, the touch sensors 3203 may be capacitive touch sensors, resistive touch sensors, acoustic wave sensors, or the like. The touch sensors 3203 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 3203 may be integrated with or otherwise configured to detect touch inputs applied to any portion of the device 3200. For example, the touch sensors 3203 may be configured to detect touch inputs applied to any portion of the device 3200 that includes a display (and may be integrated with a display). As another example, the touch sensors 3203 may be integrated with a button, switch, or other input system, and may detect touch inputs applied to a surface of the button, switch, or other input system. The touch sensors 3203 may operate in conjunction with the force sensors 3205 to generate signals or data in response to touch inputs. A touch sensor or force sensor that is positioned over a display surface or otherwise integrated with a display may be referred to herein as a touch-sensitive display, force-sensitive display, touchscreen display, or touchscreen.

The force sensors 3205 may detect various types of force-based inputs and generate signals or data that are able to be accessed using processor instructions. The force sensors 3205 may use any suitable components and may rely on any suitable phenomena to detect physical inputs. For example, the force sensors 3205 may be strain-based sensors, piezoelectric-based sensors, piezoresistive-based sensors, capacitive sensors, resistive sensors, or the like. The force sensors 3205 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 3205 may be used in conjunction with various input mechanisms to detect various types of inputs. For example, the force sensors 3205 may be used to detect presses or other force inputs that satisfy a force threshold (which may represent a more forceful input than is typical for a standard "touch" input). Like the touch sensors 3203, the force sensors 3205 may be integrated with or otherwise configured to detect force inputs applied to any portion of the device 3200. For example, the force sensors 3205 may be configured to detect force inputs applied to any portion of the device 3200 that includes a display (and may be integrated with a display), or they may be configured to detect force inputs applied to a button (e.g., buttons 121, 155, 1304, etc.), switch, or other input system. The force sensors 3205 may operate in conjunction with the touch sensors 3203 to generate signals or data in response to touch- and/or force-based inputs.

The device 3200 may also include one or more haptic devices 3206 (e.g., the haptic actuators 222, 322 of FIGS. 2-3). The haptic device 3206 may include one or more of a variety of haptic technologies such as, but not necessarily limited to, rotational haptic devices, linear actuators, piezoelectric devices, vibration elements, and so on. In general, the haptic device 3206 may be configured to provide punctuated and distinct feedback to a user of the device. More particularly, the haptic device 3206 may be adapted to produce a knock or tap sensation and/or a vibration sensation. Such haptic outputs may be provided in response to detection of touch and/or force inputs, and may be imparted to a user through the exterior surface of the device 3200 (e.g., via a glass or other surface that acts as a touch- and/or force-sensitive display or surface).

The one or more communication channels 3204 may include one or more wireless interface(s) that are adapted to provide communication between the processing unit(s) 3201 and an external device. The one or more communication channels 3204 may include antennas (e.g., antennas that include or use housing components as radiating members), communications circuitry, firmware, software, or any other components or systems that facilitate wireless communications with other devices. In general, the one or more communication channels 3204 may be configured to transmit and receive data and/or signals that may be interpreted by instructions executed on the processing units 3201. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces (e.g., for communicating using Wi-Fi communication standards and/or protocols, including IEEE 802.11, 802.11b, 802.11a, 802.11g, 802.11n, 802.11ac, 802.11ax (Wi-Fi 6, 6E), 802.11be (Wi-Fi 7), or any other suitable Wi-Fi standards and/or protocols), TCP/IP interfaces, network communications interfaces, or any conventional communication interfaces. The one or more communications channels 3204 may also include ultra-wideband (UWB) interfaces, which may include any appropriate communications circuitry, instructions, and number and position of suitable UWB antennas.

As shown in FIG. 32, the device 3200 may include a battery 3207 that is used to store and provide power to the other components of the device 3200. The battery 3207 may be a rechargeable power supply that is configured to provide power to the device 3200. The battery 3207 may be coupled to charging systems (e.g., wired and/or wireless charging systems) and/or other circuitry to control the electrical power provided to the battery 3207 and to control the electrical power provided from the battery 3207 to the device 3200. The battery 3207 may be attached to the device via an electrically debondable adhesive, as described herein.

The device 3200 may also include one or more displays 3208 configured to display graphical outputs. The displays 3208 may use any suitable display technology, including liquid crystal displays (LCD), organic light-emitting diodes (OLED), active-matrix organic light-emitting-diode displays (AMOLED), or the like. The displays may use a low temperature polycrystalline silicone (LTPS) or low temperature polycrystalline oxide (LTPO) backplane. The displays 3208 may display graphical user interfaces, images, icons, or any other suitable graphical outputs. The display 3208 may correspond to a display 103, 203, or other displays described herein.

The device 3200 may also provide audio input functionality via one or more audio input systems 3209. The audio input systems 3209 may include microphones, transducers, or other devices that capture sound for voice calls, video calls, audio recordings, video recordings, voice commands, and the like.

The device 3200 may also provide audio output functionality via one or more audio output systems (e.g., speakers) 3210, such as the speaker systems and/or modules described herein. The audio output systems 3210 may produce sound from voice calls, video calls, streaming or local audio content, streaming or local video content, or the like.

The device 3200 may also include a positioning system 3211. The positioning system 3211 may be configured to determine the location of the device 3200. For example, the positioning system 3211 may include magnetometers, gyroscopes, accelerometers, optical sensors, cameras, global positioning system (GPS) receivers, inertial positioning systems, or the like. The positioning system 3211 may be used to determine spatial parameters of the device 3200, such as the location of the device 3200 (e.g., geographical coordinates of the device), measurements or estimates of physical movement of the device 3200, an orientation of the device 3200, or the like.

The device 3200 may also include one or more additional sensors 3212 (also referred to as sensing systems) to receive inputs (e.g., from a user or another computer, device, system, network, etc.) or to detect any suitable property or parameter of the device, the environment surrounding the device, people, or things interacting with the device (or nearby the device), or the like. For example, a device may include temperature sensors, biometric sensing systems (e.g., fingerprint sensors, facial recognition systems, photoplethysmographs, blood-oxygen sensors, blood sugar sensors, or the like), eye-tracking sensors, proximity sensors, depth sensors (e.g., time-of-flight based depth or distance sensors), ambient light sensors, retinal scanners, humidity sensors, buttons, switches, lid-closure sensors, or the like.

To the extent that multiple functionalities, operations, and structures described with reference to FIG. 32 are disclosed as being part of, incorporated into, or performed by the device 3200, it should be understood that various embodiments may omit any or all such described functionalities, operations, and structures. Thus, different embodiments of the device 3200 may have some, none, or all of the various capabilities, apparatuses, physical features, modes, and operating parameters discussed herein. Further, the systems included in the device 3200 are not exclusive, and the device 3200 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as mobile phones. The present disclosure contemplates that in some instances, this gathered data may include personal information data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adopted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

Features, structures, configurations, components, techniques, etc. shown or described with respect to any given figure (or otherwise described in the application) may be used with features, structures, configurations, components, techniques, etc. described with respect to other figures. For example, any given figure of the instant application should not be understood to be limited to only those features, structures, configurations, components, techniques, etc. shown in that particular figure. Similarly, features, structures, configurations, components, techniques, etc. shown only in different figures may be used or implemented together. Further, features, structures, configurations, components, techniques, etc. that are shown or described together may be implemented separately and/or combined with other features, structures, configurations, components, techniques, etc. from other figures or portions of the instant specification. Further, for case of illustration and explanation, figures of the instant application may depict certain components and/or sub-assemblies in isolation from other components and/or sub-assemblies of an electronic device, though it will be understood that components and sub-assemblies that are illustrated in isolation may in some cases be considered different portions of a single electronic device (e.g., a single embodiment that includes multiple of the illustrated components and/or sub-assemblies).

What is claimed is:

1. A mobile phone comprising:
- a front cover defining a front exterior surface of the mobile phone;
- a rear cover defining a rear exterior surface of the mobile phone; and
- a housing positioned between the front cover and the rear cover and comprising a wall segment, the wall segment defining a through-hole extending therethrough, the wall segment comprising:
  - a cladding portion formed from a first metal and defining:
    - a portion of a side exterior surface of the mobile phone; and
    - a first portion of the through-hole;
  - a core portion coupled to the cladding portion and formed from a second metal different from the first metal, the core portion defining a counterbore hole extending through the core portion and aligned with the through-hole; and
  - a lining structure formed of the first metal and positioned in the counterbore hole in the core portion and fused to the cladding portion at a fusion region, the lining structure defining a second portion of the through-hole.

2. The mobile phone of claim 1, wherein the fusion region defines a third portion of the through-hole.

3. The mobile phone of claim 1, wherein the lining structure is fused to the core portion within the counterbore hole.

4. The mobile phone of claim 1, wherein a seam between the lining structure and the core portion is exposed within a sealed interior volume of the mobile phone.

5. The mobile phone of claim 1, further comprising:
- an input member comprising a shaft, the shaft extending through the through-hole in the wall segment; and
- a sealing member seated against the shaft and against a hole surface of the through-hole to define a seal in the through-hole.

6. The mobile phone of claim 1, wherein:
- the first metal is a titanium alloy; and
- the second metal is an aluminum alloy.

7. A portable electronic device comprising:
- a housing comprising a wall segment, the wall segment comprising:
  - a core portion formed from a first metal and defining:
    - a portion of an interior surface of the wall segment; and
    - a first hole extending through the core portion; and
  - a cladding portion coupled to the core portion and formed from a second metal different from the first metal, the cladding portion defining:
    - a portion of a side exterior surface of the portable electronic device; and
    - a first portion of a second hole; and
  - a lining structure formed from the first metal and fused to the cladding portion, the lining structure positioned in the first hole in the core portion and defining a second portion of the second hole.

8. The portable electronic device of claim 7, wherein:

the second hole is defined by a continuous hole surface;

the lining structure defines a first portion of the continuous hole surface; and the cladding portion defines a second portion of the continuous hole surface.

9. The portable electronic device of claim 8, wherein the lining structure is fused to the cladding portion at a fusion region.

10. The portable electronic device of claim 9, wherein the fusion region defines a third portion of the continuous hole surface between the first portion and the second portion.

11. The portable electronic device of claim 10, wherein the continuous hole surface is a continuous machined surface defined along the cladding portion, the fusion region, and the lining structure.

12. The portable electronic device of claim 7, wherein the lining structure is fused to the cladding portion via a laser fusion operation.

13. The portable electronic device of claim 7, wherein the first metal is an aluminum alloy and the second metal is a titanium alloy.

14. The portable electronic device of claim 7, wherein the lining structure is fused to the core portion along a hole surface of the first hole.

15. An electronic device comprising:

a front cover defining a front exterior surface of the electronic device;

a display below the front cover;

a rear cover defining a rear exterior surface of the electronic device; and a housing positioned between the front cover and the rear cover and comprising a wall segment, the wall segment defining a first hole extending through the wall segment, the wall segment comprising:

a cladding portion formed from a first metal and defining a portion of a side surface of the electronic device;

a core portion formed from a second metal and fused to the cladding portion, the core portion defining:

a portion of an interior surface of the electronic device; and a second hole through the core portion, the second hole extending from the interior surface to the cladding portion; and a lining structure positioned in the second hole and fused to the cladding portion at a fusion region, wherein:

the cladding portion defines a first portion of a hole surface of the first hole;

the lining structure defines a second portion of the hole surface of the first hole; and the fusion region between the cladding portion and the lining structure defines a third portion of the hole surface of the first hole.

16. The electronic device of claim 15, wherein the hole surface is a continuous machined surface.

17. The electronic device of claim 15, wherein the first metal is a titanium alloy and the second metal is an aluminum alloy.

18. The electronic device of claim 15, wherein the lining structure is fusion welded to the cladding portion.

19. The electronic device of claim 18, wherein the core portion is diffusion bonded to the cladding portion.

20. The electronic device of claim 15, wherein:

the electronic device further comprises:

an input member defining a shaft, the shaft extending into the first hole; and a sealing member seated against the shaft and the hole surface of the first hole to define a seal between a sealed interior volume of the electronic device and an external environment; and a seam between the lining structure and the core portion is within the sealed interior volume of the electronic device.

* * * * *